Oct. 25, 1966 K. S. DUNLAP ETAL 3,281,539

CONTROL SYSTEM FOR COMMUNICATION SWITCHING SYSTEMS

Filed July 16, 1963 72 Sheets-Sheet 1

INVENTORS
K. S. DUNLAP
A. FEINER
R. W. KETCHLEDGE
H. F. MAY
BY John C Albert
ATTORNEY Oct. 25, 1966 K. S. DUNLAP ETAL 3,281,539

CONTROL SYSTEM FOR COMMUNICATION SWITCHING SYSTEMS

Filed July 16, 1963 72 Sheets-Sheet 2

Oct. 25, 1966 K. S. DUNLAP ETAL 3,281,539

CONTROL SYSTEM FOR COMMUNICATION SWITCHING SYSTEMS

Filed July 16, 1963 72 Sheets-Sheet 3

Oct. 25, 1966 K. S. DUNLAP ETAL 3,281,539

CONTROL SYSTEM FOR COMMUNICATION SWITCHING SYSTEMS

Filed July 16, 1963 72 Sheets-Sheet 4

Oct. 25, 1966 K. S. DUNLAP ET AL 3,281,539

CONTROL SYSTEM FOR COMMUNICATION SWITCHING SYSTEMS

Filed July 16, 1963 72 Sheets-Sheet 8

Oct. 25, 1966 K. S. DUNLAP ETAL 3,281,539

CONTROL SYSTEM FOR COMMUNICATION SWITCHING SYSTEMS

Filed July 16, 1963 72 Sheets-Sheet 11

CONTROL SYSTEM FOR COMMUNICATION SWITCHING SYSTEMS

Filed July 16, 1963 72 Sheets-Sheet 19

CONTROL SYSTEM FOR COMMUNICATION SWITCHING SYSTEMS

Filed July 16, 1963 72 Sheets-Sheet 24

Oct. 25, 1966 K. S. DUNLAP ETAL 3,281,539

CONTROL SYSTEM FOR COMMUNICATION SWITCHING SYSTEMS

Filed July 16, 1963 72 Sheets-Sheet 25

CONTROL SYSTEM FOR COMMUNICATION SWITCHING SYSTEMS

CONTROL SYSTEM FOR COMMUNICATION SWITCHING SYSTEMS

Filed July 16, 1963 72 Sheets-Sheet 35

CONTROL SYSTEM FOR COMMUNICATION SWITCHING SYSTEMS

Filed July 16, 1963 72 Sheets-Sheet 36

CONTROL SYSTEM FOR COMMUNICATION SWITCHING SYSTEMS

Filed July 16, 1963

72 Sheets-Sheet 43

Oct. 25, 1966 K. S. DUNLAP ETAL 3,281,539

CONTROL SYSTEM FOR COMMUNICATION SWITCHING SYSTEMS

Filed July 16, 1963 72 Sheets-Sheet 44

CONTROL SYSTEM FOR COMMUNICATION SWITCHING SYSTEMS

Filed July 16, 1963

72 Sheets-Sheet 46

Oct. 25, 1966 K. S. DUNLAP ETAL 3,281,539

CONTROL SYSTEM FOR COMMUNICATION SWITCHING SYSTEMS

Filed July 16, 1963 72 Sheets-Sheet 47

CONTROL SYSTEM FOR COMMUNICATION SWITCHING SYSTEMS

Filed July 16, 1963 72 Sheets-Sheet 54

CONTROL SYSTEM FOR COMMUNICATION SWITCHING SYSTEMS

Filed July 16, 1963 72 Sheets-Sheet 55

CONTROL SYSTEM FOR COMMUNICATION SWITCHING SYSTEMS

CONTROL SYSTEM FOR COMMUNICATION SWITCHING SYSTEMS

Filed July 16, 1963 72 Sheets-Sheet 68

FIG. 68 INTRA OFFICE (LINE TO LINE) CALL DIAL TONE CONNECTION (SEE FIG. 67B)

FIG. 68A RINGING CONNECTION

FIG. 68B TALKING CONNECTION

TEST CONNECTIONS

TEST CONNECTIONS 3,281,539
Patented Oct. 25, 1966

3,281,539

CONTROL SYSTEM FOR COMMUNICATION SWITCHING SYSTEMS

Kermit S. Dunlap, Colts Neck, Alexander Feiner, Holmdel, Raymond W. Ketchledge, Rumson, and Harold F. May, Holmdel, N.J., assignors to Bell Telephone Laboratories, Incorporated, New York, N.Y., a corporation of New York Filed July 16, 1963, Ser. No. 295,458
26 Claims. (Cl. 179—18)

This invention relates generally to communications switching systems and, more particularly, to the control of an electromechanical switching network and associated supervisory circuitry under the command of control signals generated by an electronic, data processing type, common control circuit.

Common control telephone switching systems generally comprise four functional components. These components include common control circuitry which determines and generates commands for certain other system components; a switching network through which input and output terminals thereof are selectively interconnected in accordance with commands from the common control circuitry; supervisory circuitry which, among other functions, monitors and controls the operation of input and output circuits of the switching network in accordance with commands; and access circuitry, which transmits the commands generated by the common control circuitry to the switching network and to the supervisory circuitry for execution thereby. The overall efficiency with which a switching system operates is dependent upon the individual and cooperative efficiencies of the above system components.

This invention is directed to an optimum blending of the advantages attained through high-speed, electronic common control circuitry with the advantageous properties of a large, multistage, space divided, electromechanical switching network.

The common control circuitry of prior art switching systems has, in general, been capable of generating commands for execution by a switching network on a one-call-at-a-time basis. Fully electromechanical switching systems, as exemplified by the well-known #5 crossbar switching system, normally utilize a multiple of identical common control units. Multiple common control units are required in such systems since a single electromechanical control unit is relatively slow in operation and, consequently, cannot individually process all the traffic which must be switched through the associated switching network.

Electronic, data processing type, common control circuits, as exemplified in W. A. Budlong et al. Patent 2,955,165, October 4, 1960, greatly increase the speed at which a single control unit can process calls. The Budlong et al. patent discloses a single common control unit which can process large amounts of traffic. Accordingly, it is not necessary to pluralize the common control circuit of Budlong et al. except for purposes of reliability in the event that one control unit is out of service.

Communications switching networks may be generally characterized as electromechanical or electronic. Electromechanical networks provide for the establishment of metallic transmission paths through electrically actuated mechanical contacts of selectively operated cross-point switching devices of which the networks are comprised. Due to the inherent inertia of the mechanical components of such networks, the completion of transmission paths through such a network is relatively slow. Examples of electromechanical networks include the well-known crossbar networks, as seen in the #5 crossbar switching system, and the ferreed networks of the type shown in the copending patent application of A. Feiner, Serial No. 862,811, filed on December 30, 1959 now Patent 3,124,-655, issued March 10, 1964.

Electronic networks include those utilizing gas tubes, as in the aforenoted Budlong et al. patent, or semiconductor elements as cross-point switching devices. A transmission path is established through an electronic network by selectively rendering the electronic cross-point switching devices conductive. Electronic networks are substantially faster in operation than electromechanical networks due to the absence of mechanical contact inertia and to the inherent speed with which the electronic cross-point devices may be rendered conductive.

Assessment of the various characteristics of electronic and electromechanical networks reveals advantages of both. Electronic networks, although faster in operation, are not readily compatible with existing communications facilities without rather extensive modifications to such facilities. Electromechanical networks, on the other hand, are fully compatible with existing communications plant. In contrast to electronic networks, electromechanical networks present no problems as to the ranges of frequency and reasonable power which can be safely transmitted through the network. Special subscriber station equipment is required when the equipment is terminated on prior art electronic switching networks. No special subscriber station equipment is required for termination on an electromechanical switching network.

The economies realized by the compatibility of an electromechanical network with existing communication facilities far outweigh the economies which may be achieved as a result of the higher operating speed of present electronic switching networks.

Accordingly, it is a general object of this invention to incorporate the high speed, data processing capabilities of an electronic common control arrangement and the economic and technical advantages of a relatively low speed, electromechanical switching network into a highly efficient and versatile communications switching system.

The supervisory circuitry of a switching system performs two broad functions. It monitors the line and trunk circuits served by the system, and it exerts control over established network connections by directing circuit operations within the individual line and trunk circuits. In monitoring the line and trunk circuits, the supervisory circuitry detects new service requests for network connections and ascertains when established network connections may be released. In exerting control of trunk and line circuit operations, the supervisory circuitry controls the final cut-through of new network connections and the initial breaking of existing network connections. It further controls the generation of call status and call information signals by trunk circuits to remote switching systems and detects similar signals transmitted from remote switching systems and local subscriber stations.

Switching systems generally provide separate, supervisory circuits within each trunk and line circuit served by the system. Signaling between the supervisory circuits of interconnected line and trunk circuits within a single switching network is accomplished over a signaling conductor, known as a "sleeve lead," which is included in the network connection between the circuits. The sleeve lead also serves as the memory element which is consulted by the common control circuitry in determining which paths through the network are available and which are busy.

Electronic switching systems, such as the aforenoted Budlong et al. system, generally utilize a central memory of busy and idle network terminations which is separate and distinct from the switching network itself. No sleeve leads are provided in the electronic switching network.

The supervisory circuitry is centralized and comprises a scanner to perform the monitoring function, and a signal distributor to perform the control function. The operation of the scanner and signal distributor is directed by commands generated by the common control circuit. Information received from the scanner is processed by the common control circuit, which also initiates appropriate control action by the signal distributor.

Although satisfactory supervision of a relatively small switching network may be achieved by such centralized supervisory circuitry, complications arise as additional lines and trunks are terminated on the switching network. The time required for each complete operation of the scanner or the signal distributor remains constant, whereas the demand for the services thereof increase in proportion to the number of line and trunk circuits supervised thereby. Therefore, a limit as to network size exists, beyond which the scanner and signal distributor cannot efficiently respond, without undue delay, to the rapidity at which demands are made for the supervisory services thereof.

It therefore is a further object of this invention to achieve effective and efficient supervision of a large electromechanical switching network under the direction of commands from a high speed, data processing type, electronic common control circuit.

The access circuitry of communications switching systems provides the all important link between the common control circuitry and the switching network and supervisory circuitry of the system. In electromechanical systems, such as the #5 crossbar system, relay type connecting circuits provide access for the multiple common control circuits to the switching network. A common control unit, or marker, is selectively connected through this relay connector to the particular portion of the switching network over which it is to exert control. The marker determines the circuit operation to be performed in the network and effects the execution of this function directly via the connector. A marker processes a single call at a time. It is held, and can perform no other function, until the call being processed has been successfully completed or otherwise disposed of. The holding time of a marker is dependent upon the speed at which the call can be completed. Since the speed of operation of the marker is substantially equal to that of the switching network, a marker is not unduly delayed in processing a subsequent call.

In electronic switching systems, such as the aforenoted Budlong et al. system, the speed at which the common control circuitry can determine and generate commands is greater even than the speed at which the electronic switching network can execute the commands. The access circuitry between the common control circuitry and the switching network of the Budlong et al. system includes an access buffer circuit in the form of a network control. The access buffer circuit receives and registers the commands generated by the common control circuitry and causes the execution thereof by the switching network, thereby allowing the common control circuitry to release before a command is completely executed. The inclusion of an access buffer circuit in access circuitry allows a high speed common control circuit to perform other functions while a slower speed switching network is executing the commands generated thereby.

The network control of the Budlong et al. system processes calls on a one-at-a-time basis. Its holding time, therefore, is dependent upon the speed at which a complete connection can be established through the switching network. This arrangement may be satisfactory for a relatively small, high speed, electronic switching network, however, it would be intolerable for a larger and slower electromechanical switching network. The holding time of the network control would be too long to allow expeditious, undelayed completion of sequential calls due to the increased rapidity of call demands in the larger network.

It therefore is a further object of this invention to provide access circuitry between a high speed, electronic, common control circuit and a large, low speed, electromechanical switching network which will fully utilize the high speed command generating capabilities of the common control circuitry without undue delay in the processing and completion of sequential calls.

These and other objectives of this invention are accomplished in one specific, illustrative, embodiment thereof wherein a large, multistage, relatively slow-operating, electromechanical switching network and its associated relatively slow-operating supervisory circuitry are respectively subdivided into a plurality of autonomous, modular, system units, each of which is exclusively controlled by a discrete access buffer control unit. Each access buffer control unit is inductively coupled via a receiver circuit to a common command bus system, whereby commands generated by the high speed electronic common control circuitry are selectively received and executed by the respective access buffer control units of any system network or supervisory unit.

The general topological organization of an illustrative switching network, the control of which may be advantageously accomplished in accordance with this invention, is described in the copending patent application of A. Feiner, Serial No. 253,083, filed January 22, 1963. The aforenoted patent application is to be considered as incorporated herein by reference.

The aforenoted Feiner application describes an illustrative communications switching network which may be advantageously controlled and supervised in accordance with this invention. The Feiner network comprises a plurality of basic, four-stage subnetworks. For purposes of network access and control, the four switching stages of the subnetworks are advantageously arranged in pairs, and each pair of switching stages is further subdivided into modular Network Units. A modular Network Unit comprises either eight "concentrator grids" or two "octal grids" as fully described in the Feiner disclosure.

In accordance with an aspect of this invention, two modular Network Units are advantageously incorporated with two discrete network access buffer control units (hereinafter called Network Control Units) through which the switching operations within those particular modular Network Units are controlled. The system component thus formed is designated a Switch Frame. Each Switch Frame further includes an individual Receiver Circuit through which the Network Control Units are inductively coupled to Command Transmission Buses and to an Enable-Verify Cable from which central processor commands and control unit enable signals are respectively received.

The subscriber lines, which are terminated at input terminals of the Feiner network, are advantageously divided into modular line groups. A modular group of lines includes those lines which are terminated on a modular Network Unit comprising eight concentrator grids. In accordance with an aspect of our invention, an individual Scanner is included in each Switch Frame on which a modular line group is terminated to monitor the supervisory state of the lines within the group. Each Scanner has two scanner access control units (hereinafter designated Scanner Control Units) either of which may be used to direct Scanner operations in accordance with central processor commands received thereby. The Receiver Circuit of a Switch Frame having lines terminated thereon inductively couples the two Scanner Control Units and the two Network Control Units of the Switch Frame to the Command Transmission Buses and Enable-Verify Cable.

As described in the aforenoted Feiner patent application, line-to-line connections through the switching network include Line Junctor Circuits through which supervisory monitoring and control of such connections are accomplished. The Line Junctor Circuits are advantageously divided into a plurality of line junctor circuit groups, each line junctor circuit group appearing on a discrete system component known as a Junctor Frame.

In accordance with an aspect of our invention, an individual Scanner is included in each Junctor Frame to monitor the supervisory state of network connections which include the Line Junctor Circuits of the line junctor circuit group appearing thereon. Each Scanner has two Scanner Control Units either of which may be used to direct Scanner operations in accordance with central processor commands received thereby.

In accordance with an aspect of our invention, an individual Signal Distributor is also included in each Junctor Frame to exert supervisory control over the Line Junctor Circuits of the line junctor circuit group appearing thereon. Each Signal Distributor has two signal distributor access buffer control units (hereinafter designated Signal Distributor Control Units), each of which is normally used to direct the operations of one-half of the Signal Distributor, but either of which may be used to direct the operations of the entire Signal Distributor in accordance with appropriate central processor commands.

Each Junctor Frame further includes an individual Receiver Circuit through which both Scanner Control Units and both Signal Distributor Control Units of the Junctor Frame are inductively coupled to the Command Transmission Buses and the Enable-Verify Cable from which central processor commands and enable signals are respectively received.

The trunk and service circuits, which are terminated at the output terminals of the Feiner network, are advantageously divided into modular trunk circuit groups, each trunk circuit group appearing on a discrete system component known as a Trunk Frame. In accordance with an aspect of this invention each Trunk Frame includes an individual Scanner, an individual Signal Distributor and an individual Receiver Circuit, the functions of which are analogous to the Scanners, Signal Distributors and Receiver Circuits of the above-described Junctor Frames.

All system units, including Network Control Units, Scanner Control Units, Signal Distributor Control Units and other administrative type circuits, are subject to the commands of a central processing circuitry complex. This Central Processor includes memory and logic circuitry whereby information ascertained from the switching network by means of the respective Scanners and information directly available from the Central Processor memory circuits is analyzed, and appropriate commands are determined and generated. Central processor commands, when transmitted to the various system units, initiate the establishment and release of connections through the various modular Network Units, the monitoring of the supervisory state of various system elements, the performance of system diagnostic and maintenance operations and the performance of various other system functions necessary to the continued reliable operation of the switching system. The Central Processor can sequentially generate diverse commands for various system operations relating to many calls at eleven microsecond intervals.

Most of the system units are relatively slow in operation when compared to the command generating capability of the Central Processor. The majority of system units require in the order of twenty milliseconds to execute a central processor command, and most individual system units, therefore, cannot receive central processor commands at intervals of less than twenty milliseconds. However, the high speed of the Central Processor may be advantageously utilized in accordance with out invention by directing sequential commands relating to the same or different calls to different system units at eleven microsecond intervals. Thus, various switching and supervisory operations relating to diverse and nonassociated calls may be in the process of completion by various system units at substantially the same time.

Duplicate Command Transmission Buses, each of which is inductively coupled via the Receiver Circuits to the Control Units of all system components, are used for the selective transmission of commands from the Central Processor to individual Control Units. Central processor commands may be transmitted via either Command Transmission Bus to the various system units at eleven microsecond intervals, thus allowing asynchronous time sharing of the high speed Central Processor by the relatively low speed system units.

The Control Units of each system component will accept central processor commands only when a command is accompanied by an enable signal discrete to the particular Control Unit which is to execute the central processor command and also discrete to the Command Bus via which the command is transmitted. Each Control Unit is inductively coupled to two enable-verify pairs which are discrete thereto. Each of the two enable-verify pairs is associated with one of the duplicate Command Transmission Buses from which central processor commands may be received. A unipolar enable signal received from an enable-verify pair will enable the Control Unit to which it is coupled. The enabled Control Unit will accept the accompanying central processor command from the Command Transmission Bus associated with the enable-verify pair from which the enable signal was received. The execution of the command is then initiated by the enabled Control Unit.

The enable-verify pairs, which are discrete to the respective Control Units of all system components, are selectively energized by a Central Pulse Distributor, associated with the Central Processor. The Central Pulse Distributor receives from the Central Processor the address of a particular Control Unit to which the Central Processor is about to direct a command, and accordingly transmits an enable signal to the appropriate Control Unit over the enable-verify pair which is discretely coupled thereto. Responsive to the receipt of an enable signal, an enabled Control Unit generates a verify signal, which is sufficiently delayed in time to avoid interference with the enable signal, to verify that the Control Unit has accepted the accompanying central processor command. The verify signal is applied to the same enable-verify pair from which the enable signal was received, and transmitted thereover to the Central Pulse Distributor. The Central Pulse Distributor translates the verify signal into a control unit address and forwards this address to the Central Processor wherein it is compared to the address originally transmitted from the Central Processor to the Central Pulse Distributor to verify that the proper Control Unit has been enabled.

In accordance with a feature of the present invention, a multistage switching network is divided into pairs of switching stages, and each such pair of switching stages is further subdivided into a plurality of autonomous, modular, network units. The switching operations in each modular network unit are controlled by a network access buffer control unit discretely associated therewith, and physically proximate thereto.

In accordance with a further feature of the invention, the network access buffer control units are arranged in pairs, and each of the two network control units of a pair normally controls switching operations only in its discretely associated network unit, but either network control unit is further capable of controlling switching operations in the network unit discretely associated with the other network control unit of the pair.

In accordance with another feature of this invention, the supervisory monitoring circuitry associated with switching network operation is subdivided into a plurality of autonomous, modular, scanner circuits, each of which monitors a specific group of trunk and service circuits, line junctor circuits or lines. Each scanner circuit is physically proximate the specific group of trunk and service circuits, line junctor circuits or lines which it monitors.

In accordance with another feature of the invention, two scanner access control units are included in each modular scanner circuit. Either of the two scanner control units of a scanner circuit may be used to direct the scanner circuit in monitoring its associated group of lines, trunk and service circuits or line junctor circuits in accordance with appropriate central processor commands.

In accordance with a further feature of the present invention, the supervisory control circuitry associated with switching network operation is subdivided into a plurality of autonomous, modular, signal distributor circuits each of which controls the operations of a specific group of trunk and service circuits or line junctor circuits. Each signal distributor circuit is physically proximate the specific group of trunk and service circuits or line junctor circuits whose operation it controls.

In accordance with another feature of this invention, two signal distributor access buffer control units are included in each signal distributor circuit. Each of the two signal distributor control units of a signal distributor circuit normally exerts control over one-half of the associated group of trunk and service circuits or line junctor circuits. However, either of the two signal distributor control units is capable of exerting control over the entire group of associated trunk and service circuits or line junctor circuits in accordance with appropriate central processor commands.

In accordance with the above features and as a feature of the present invention, the access control buffer circuitry of a switching system is divided into a plurality of autonomous access control buffer units, each of which is discretely associated with either a modular subdivision of the switching network, a modular subdivision of the supervisory monitoring circuitry, a modular subdivision of the supervisory control circuitry or other circuits whose operations are subject to the command of the central processor circuitry.

In accordance with another feature of this invention, a common command transmission bus for transmitting commands from the central processor is asynchronously time shared by the various access buffer control units which are discretely associated with each of the network units, the scanner circuits, the signal distributor circuits and the other circuits which are subject to the commands of the central processor.

In accordance with a further feature of this invention, each pair of modular network units has discretely associated therewith a receiver circuit through which the network control units associated therewith are inductively coupled to the common command transmission bus.

In accordance with another feature of this invention, the receiver circuits associated with network units having lines terminated thereon serve also to inductively couple the associated line scanner control units to the common command transmission bus.

In accordance with another feature of the present invention, each group of trunk and service circuits and each group of line junctor circuits has respectively associated therewith a receiver circuit through which the associated scanner and signal distributor control units are inductively coupled to the common command transmission bus.

In accordance with a further feature of this invention, either of the duplicate command transmission buses may be used to selectively transmit commands to any of the access buffer control units of any system component. Central processor commands are accepted only by the particular access buffer control unit to which they are directed.

In accordance with a still further feature of this invention, responsive to an enable signal, an access buffer control unit returns a verify signal over the same enable signal transmission pair from which the enable signal was received. A hybrid arrangement in the receiver circuit, through which the control unit is inductively coupled to the enable signal transmission pair, effectively isolates the control unit from the verify signal generated thereby.

In accordance with still another feature of the present invention, successive central processor commands may be received by different network control units at approximately eleven microsecond intervals, thereby initiating the substantially concurrent establishment of discrete segments of various connections through the switching network. These segments may be either portions of one complete call connection through the switching network or portions of various nonassociated call connections. The operating cycle time required by a network control unit to establish a partial call connection through its associated network unit is approximately twenty milliseconds. In view of the large difference between control unit cycle time and the rapidity at which central processor commands may be received by network control units and other access control units, may separate and distinct supervisory and network switching operations may be in the process of completion at any given time.

The above and other objects and features of the present invention will be more fully comprehended from the following description when read with reference to the drawing in which.

Figure 65:
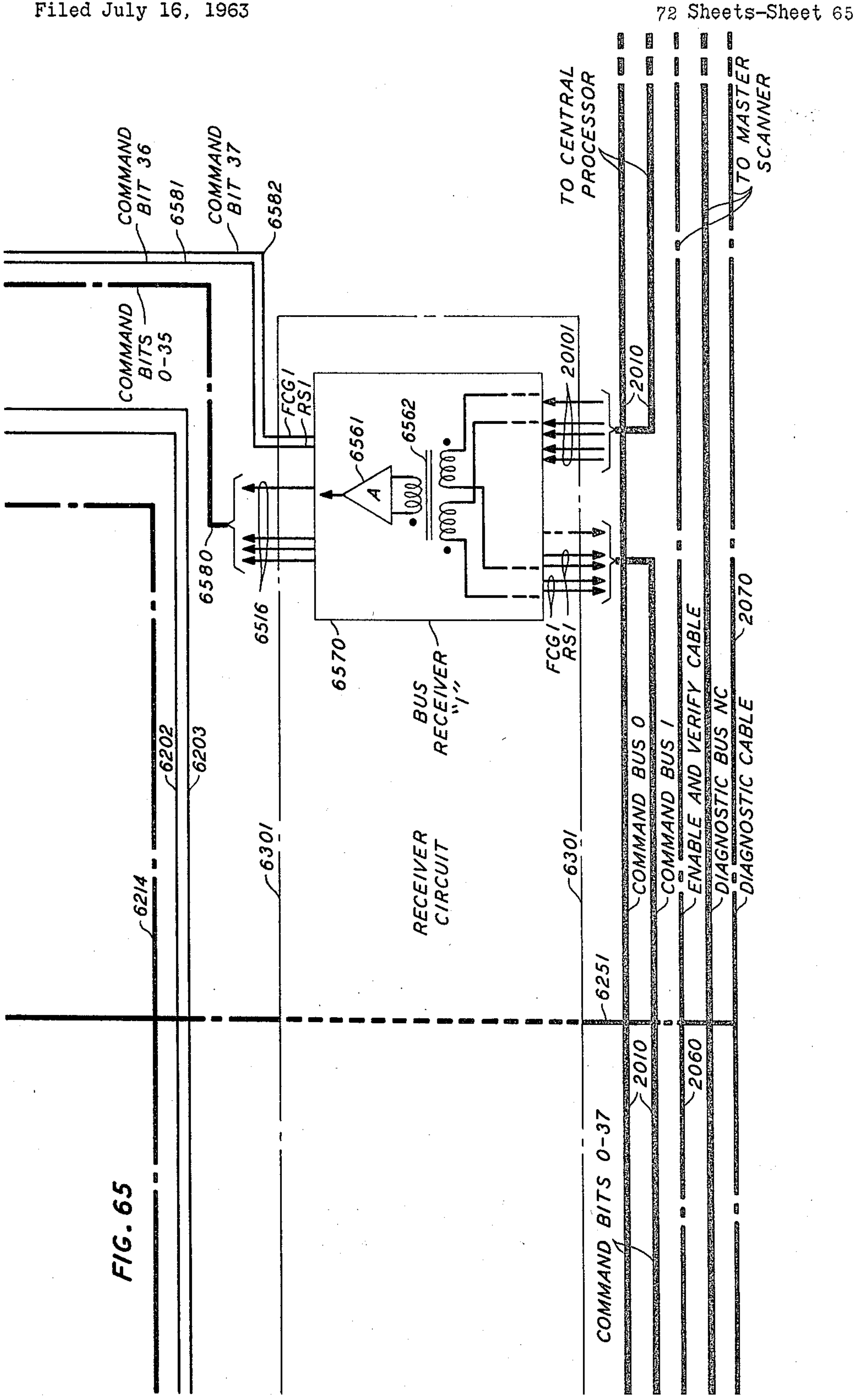
Figure 66A:
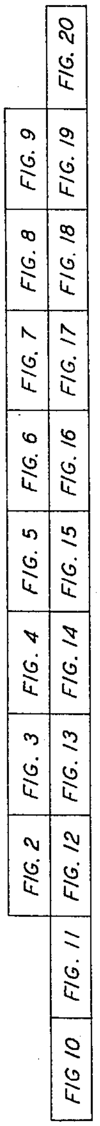
Figure 66B:
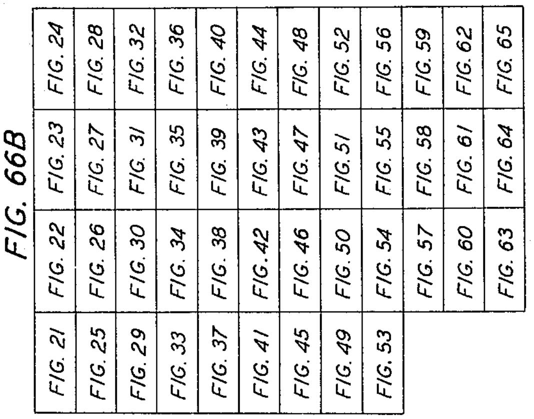

FIGS. 66A and 66B respectively depict the proper arrangement of FIGS. 2–20 and FIGS. 21–65; and FIGS. 67–72 are schematic representations of the switching and supervisory operations performed in processing various types of calls.

The following description of the supervision and control of an illustrative switching network in accordance with this invention is presented in two general phases. A broad functional description of the various switching system components is presented, which is followed by a more detailed description of the operation of the system components which are pertinent to the understanding of the present invention. Frequent reference to the aforenoted copending patent application of A. Feiner will be made hereinafter to more fully illustrate circuitry which may be advantageously incorporated with the present invention.

INDEX

| INDEX | Column |
|---|---|
| General Description | 9 |
| System Organization (FIG. 1) | 9 |
| Bus Systems and Cable Systems (FIGS. 1–20) | 10 |
| System Equipment (FIGS. 2–20) | 11 |
| Central Processor | 11 |
| Central Pulse Distributor | 12 |
| Master Scanner | 13 |
| Teletype Unit | 14 |
| Program Store Card Writer | 14 |
| AMA Tape Unit | 14 |
| Switch Frames | 14 |
| Main Distribution Frame | 17 |
| Junctor Frames | 17 |
| Trunk Frames | 19 |
| Trunk Distribution Frame | 20 |
| Junctor Grouping Frame | 20 |
| Junctor Link Network | 21 |
| Modes of Operation (FIGS. 2–20) | 21 |
| Quarantine Mode of Operation | 21 |
| Combined Mode of Operation | 21 |
| Test Point Access Mode of Operation | 22 |
| Detailed Description | 22 |
| Line Switch Frame (FIGS. 2, 10–12) | 22 |
| Line Network Units | 22 |
| Line Network Control Units | 23 |
| Enable-Verify Operation | 23 |
| Line Network Unit Operations | 26 |
| Mode of Operation Control | 28 |
| Reset | 29 |
| Line Scanner | 30 |
| Junctor Switch Frame—Functional Description (FIGS. 3, 13) | 30 |
| Junctor Network Units | 31 |
| Junctor Network Control Units | 31 |
| Enable-Verify Operation | 31 |
| Junctor Network Operations | 32 |
| Mode of Operation Control | 32 |
| Junctor Switch Frame Test-Vertical Operations | 33 |
| Junctor Switch Frame—Detailed Description (FIGS. 21–65) | 35 |
| Junctor Switch Frame Circuits | 36 |
| Receiver Circuit | 36 |
| Junctor Network Control Units | 36 |
| Enable-Verify Circuit | 36 |
| Bus Selector | 36 |
| Execution Control | 36 |
| Diagnostic Control | 37 |
| Junctor Network Units | 37 |
| Network Unit Organization | 37 |
| Network Unit Control | 38 |
| Junctor Switch Frame Operations in General | 39 |
| Enable-Verify Operation | 39 |
| Command Execution Cycle | 42 |
| Group Check Operations | 47 |
| External Reset Operation | 48 |
| Supervisory Scan Points | 50 |
| Specific Command Execution Operations | 51 |
| Connect Command | 51 |
| Test-Vertical Operations | 52 |
| Connect-with-FCG Command | 52 |
| Restore-Verify Command (loop-start) | 55 |
| Restore-Verify Command (ground-start) | 56 |
| Operate-No-Test Command | 57 |
| Remove No-Test-FCG-Verify Command | 58 |
| Test Commands (Mode of Operation Control) | 59 |
| Combined Mode of Operation | 59 |
| Quarantine Mode of Operation | 61 |
| Test-Point Access Mode of Operation | 62 |
| Return-to-Normal Mode of Operation | 64 |
| Power-Off Mode | 64 |
| Trunk Switch Frame (FIGS. 7, 17) | 65 |
| Trunk Network Units | 65 |
| Trunk Network Control Units | 65 |
| Trunk Junctor Switch Frame (FIGS. 6, 16) | 66 |
| Junctor Network Units | 66 |
| Trunk Junctor Switch Frame Operation and Control | 66 |
| Junctor Frame (FIGS. 5, 15) | 67 |
| Junctor Scanner | 67 |
| Junctor Signal Distributor | 67 |
| Trunk Frames (FIGS. 8, 18, 9, 19) | 68 |
| Call Processing | 69 |
| Intraoffice Traffic | 69 |
| Dial-Tone Connection | 69 |
| Ringing Connections | 70 |
| Intraoffice Talking-Connection | 71 |
| Disconnect | 71 |
| Interoffice Outgoing Traffic | 71 |
| Dial-Tone Connection | 72 |
| Out-Pulsing Connection | 72 |
| Outgoing Talking Connection | 73 |
| Disconnect | 73 |
| Interoffice Incoming Traffic | 73 |
| Call-Signaling Connection | 73 |
| Ringing Connections | 74 |
| Talking Connection | 74 |
| Disconnect | 74 |
| Tandem Traffic | 74 |
| Talking Connection | 75 |
| Disconnect | 75 |
| Test Connections | 75 |
| False-Cross-and-Ground Test | 75 |
| Restore-Cut-off-Verification-Test | 76 |

GENERAL DESCRIPTION

Figure 1:
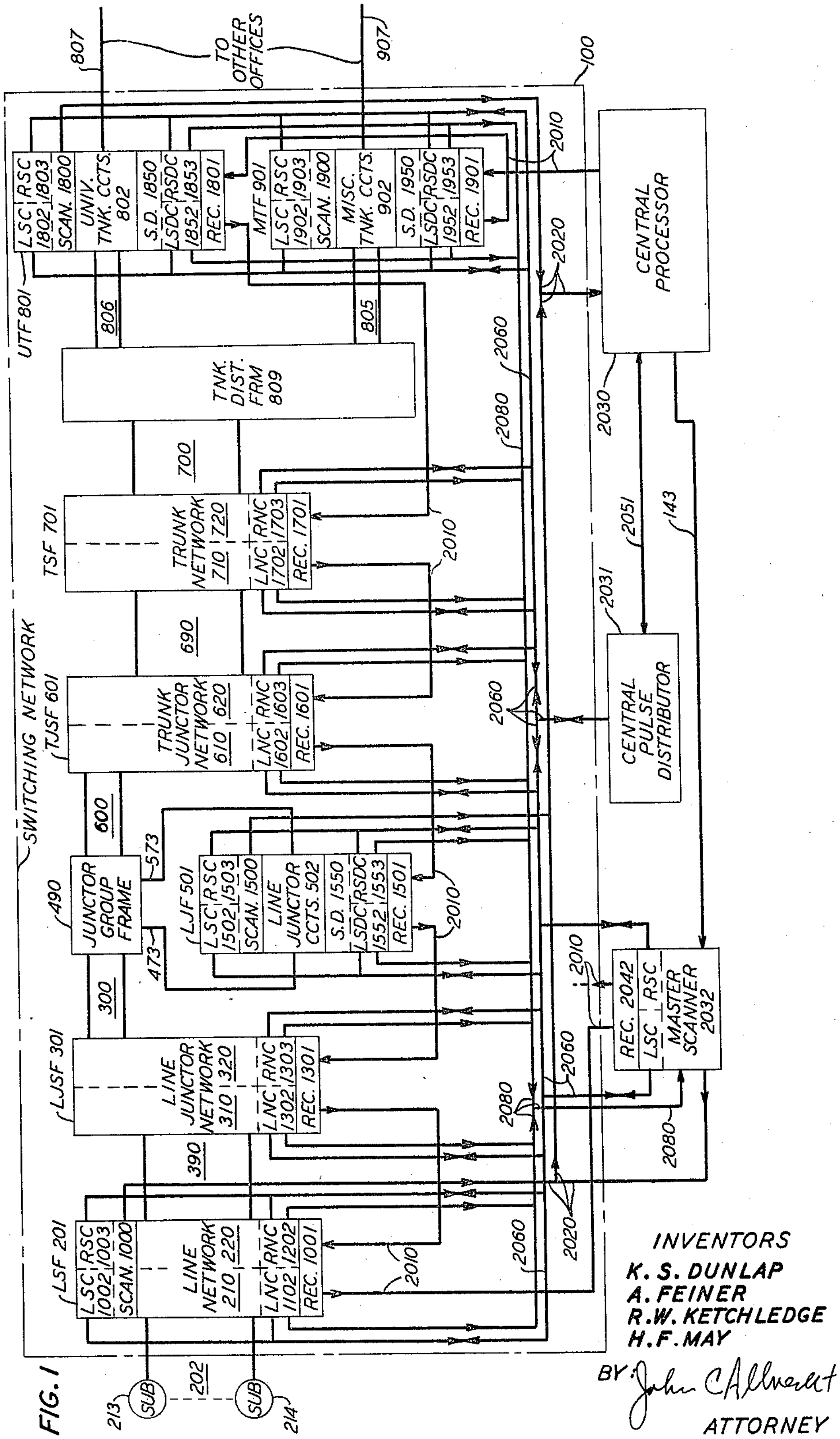
FIG. 1 is a block diagram of a switching system arrangement in accordance with our invention.

*System organization, FIG. 1*

FIG. 1 illustrates a portion of an illustrative switching system wherein supervision and control of the system network components may be advantageously accomplished in accordance with this invention. The illustrative switching system is commanded by a Central Processor 2030, wherein information obtained from system components is processed with reference to control program sequences and system status information stored in the memories of the Central Processor 2030, and wherein system commands are generated to initiate appropriate system operations in accordance with the result of such processing. Central processor commands are transmitted via a Command Bus System 2010 to various system components, such as Line Switch Frame 201, Line Junctor Switch Frame 301, Junctor Frame 501 Trunk Junctor Switch Frame 601, Trunk Switch Frame 701, Universal Trunk Frame 801, Miscellaneous Trunk Frame 901 and Master Scanner 2032, which respectively execute the commands directed thereto. For reliability each system component comprises a plurality of Control Units, such as the Left and Right Line Network Control Units 1102 and 1202 of Line Switch Frame 201.

Most system network components, such as those listed above, are slow in operation in comparison to the Central Processor 2030. In order that the Central Processor 2030 is not delayed in continuing its sequential, high speed operating cycles, buffer access control units, for example Left and Right Line Network Control Units 1102 and 1202 of Line Switch Frame 201, are included in each system component. These Control Units register the central processor commands directed thereto and independently direct the execution of such commands by the respective system components. When a central processor command has been executed, the directing buffer control unit resets itself and awaits a new central processor command. The Central Processor 2030 is thus permitted to continue its highly important information processing and command generation without awaiting the complete execution of its previous commands.

*Bus systems and cable systems*

Communications between the Central Processor 2030 and the system network components of this illustrative switching system are by way of multiconductor bus systems such as 2010, 2020 and 2080 and by way of multiconductor cables such as 2060. Although bus systems and cables are utilized throughout the switching system, only those which are pertinent to a description of the present invention are shown on the drawing and will be described herein.

A bus system, as defined herein, comprises a plurality of conductor pairs which may in many respects be compared to a tapped delay line. The time delay of a bus system is not necessarily an advantageous aspect thereof but is rather an inherent characteristic thereof. A bus is a unidirectional means for transferring information from one or more sources to a plurality of destinations. A bus is transformer coupled both to the information source or sources and to the destination loads. The information sources are connected to the bus conductors in parallel, and the loads are coupled to transformers which are serially connected in the bus conductors. Dual winding load transformers are employed, and one winding of the pair of windings is connected in series with each individual conductor of a conductor pair of a bus. The load is lightly coupled to the bus, as are the taps of a delay line, and the bus is terminated in its characteristic impedance in a manner well known with regard to delay lines.

A bus system is connected to a number of equipment units which may be physically separated by large distances as compared to the normal distances between the taps of the usual delay line. Data transmitted over a bus is in pulsed form and, in this particular embodiment, extremely short pulses in the order of one-half microsecond in duration are utilized.

Information is transmitted over a bus in parallel, i.e., the respective bits of a data word or command are transmitted in parallel over the plurality of conductor pairs of which a bus is comprised. It is important that these parallel data bits arrive at a given load equipment unit at the same time. Accordingly, the conductor pairs of a bus system are arranged to follow similar physical paths, and their lengths are kept substantially identical.

Although each of the buses of this illustrative embodiment is shown in the drawing as a single conductive path from information sources to information destinations, there are many special techniques employed to minimize propagation time from an information source to a destination point and to equalize propagation between information sources and similar destinations. Such techniques are not discussed herein as they are not essential to an understanding of this invention. However, in a large switching center the routing of buses and the special techniques employed to achieve the above-mentioned desirable result are relatively important.

A bus system generally comprises two duplicate buses which in the drawing (FIGS. 2–20) are labeled bus 0 and bus 1. Since there is more than one bus system, as hereinafter described, there is more than one bus labeled bus 0 and more than one bus labeled bus 1; however, each bus system is functionally identified in the drawing.

In addition to the above-described bus systems, a plurality of multiconductor cables are utilized as discrete pulse paths between particular components of the switching system. The conductor pairs of these cables are in many instances, for example Enable-Verify Cable 2060, transformer coupled both to the pulse source and the pulse destination; however, there are also a number of cables wherein D.C. connections are made both to the pulse sources and the pulse destinations.

The bus systems and the cables used in this illustrative switching system are distinguishable in that cables generally provide unduplicated and individual pulse transmission paths between specific system components, whereas bus systems generally provide duplicated paths between several selected system components. Furthermore, certain cables provide bidirectional pulse transmission paths, whereas the buses provide only unidirectional pulse transmission paths.

The function of each of the system elements shown in FIG. 1 will be more apparent from the description of FIGS. 2–20 which follows below.

*System equipment, FIGS. 2–20*

Throughout the remainder of this specification the numerical designations assigned the various cables, buses, leads and other elements of this illustrative switching system will indicate either the particular figure of the drawing on which the designated element is shown or the particular figure of the drawing on which the designated lead, cable or bus originates, as well as the specific designation of the system element. The first digit or digits of each numerical designation will indicate the number of the appropriate figure of the drawing and the latter digits of each numerical designation will indicate the number of the designated element. For example, the first two digits of the designation 2010 indicate FIG. 20 on which Command Bus Sytem 2010 originates and all four digits thereof indicate the number of Command Bus System 2010. Further, the first two digits of the designation 2030 indicate FIG. 20 on which Central Processor 2030 is shown and all four digits thereof indicate the number assigned Central Processor 2030. Where possible, the latter digits of the numerical designations assigned to similar system elements shown on different figures of the drawing are retained on all figures. For example, the designation—01 is common to all Receiver Circuits such as 1001, 1301, 1401, 1501, 1601, etc.

CENTRAL PROCESSOR 2030

Figure 20:
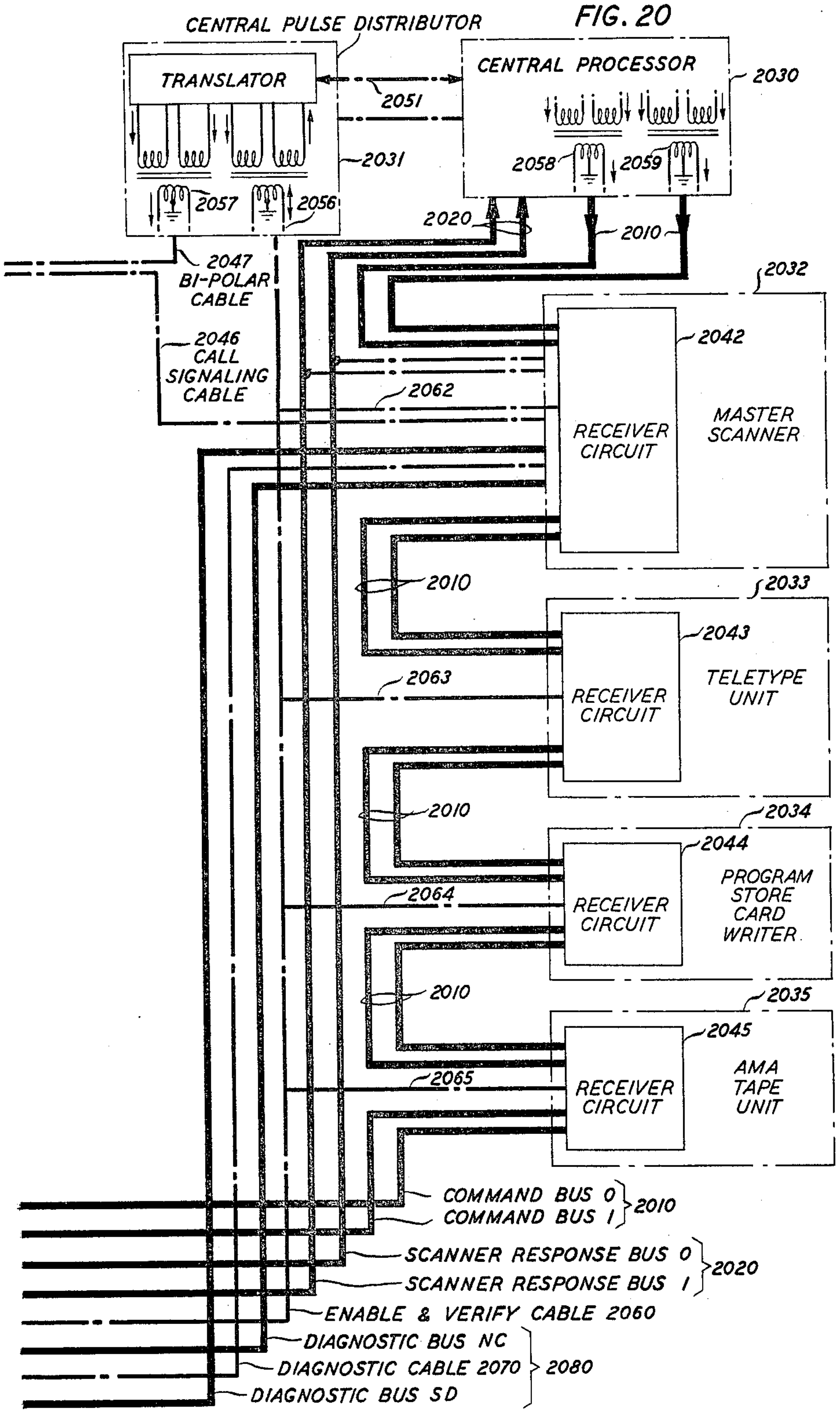
FIGS. 20 is a block diagram showing a Central Processor, a Central Pulse Distributor, the Master Scanner and other administrative-type circuits of the switching system.

The Central Processor 2030 shown in FIG. 20 is a centralized, data processing, facility comprising logic and memory circuitry which is employed to implement the many switching, administrative, supervisory and maintenance functions of the various switching system components. Central processor commands are generated in accordance with a logical analysis of the system program, other appropriate information stored in the central processor memories and system status information received by the Central Processor 2030 from the various switching system components.

The Central Processor 2030 includes two basic types of memory circuits. A semipermanent memory is used to store information which is not subject to frequent change, such as the system program; the semipermanent memory may be of any type known in the art such as a permanent magnet memory, as described in S. M. Shackell application Serial No. 708,127, filed January 10, 1958, utilizing twistors, as disclosed in A. H. Bobeck patent 3,083,353, March 26, 1963. A temporary memory, which may be easily changed in accordance with changes in system status information, is used to store more transitional information, such as that relating to the current processing of calls and the busy-idle states of the various switching network links and terminals. This may be of any type known in the art, such as an apertured ferrite sheet as disclosed, inter alia, in P. A. Harding application Serial No. 179,870, filed March 15, 1962 and Genke-Ketchledge-Sager application Serial No. 251,214, filed January 14, 1963.

The Central Processor 2030 accomplishes the above-mentioned information processing and can generate system commands in accordance therewith on a basic eleven microsecond cycle. It is capable of processing a plurality of calls at substantially the same time, and it can sequentially generate system commands relating to any of the calls being processed in addition to commands relating to other supervisory, administrative and maintenance functions at eleven microsecond intervals.

Central processor commands are transmitted to system units via the Command Bus System 2010 which comprises duplicate Command Buses 0 and 1. Accompanying each system unit command the Central Processor 2030 generates an enable command which includes the address of the particular Control Unit which is to execute the system unit command. The enable command is transmitted via the Central Pulse Distributor Address and Control Bus 2051 to the Central Pulse Distributor 2031, which then directs an enable signal to the proper Control Unit via Enable-Verify Cable 2060. The Central Pulse Distributor 2031 is briefly described later herein.

Also terminated in the Central Processor 2030 is the Scanner Response Bus System 2020 which comprises Scanner Response Buses 0 and 1. The Scanner Response Buses 0 and 1 provide duplicated transmission paths for supervisory and maintenance information which is obtained and transmitted from various system Scanners in response to central processor commands requesting such information. The significance of the information transmitted to the Central Processor 2030 and the sources from which the information is obtained will be more fully described later herein.

The above brief description of a Central Processor 2030 is felt to be sufficient for an understanding of the present invention.

CENTRAL PULSE DISTRIBUTOR 2031

The Central Pulse Distributor 2031 is a high speed, electronic translator which provides two classes of output signals in response to commands from the Central Processor 2030. These classes of output signals are respectively designated unipolar signals and bipolar signals. Both classes of signals comprise pulses which are transmitted from the central Pulse Distributor 2031 to the using circuits via individual transmission pairs such as 2056, 2057 which are grouped into a plurality of cables 2047, 2060. The transmission pairs 2056, 2057 are inductively coupled both to the load circuits, such as Line Switch Frame 201, and to the Central Pulse Distributor 2031.

Unipolar signals are most commonly used to momentarily enable a particular Control Unit, although certain less important circuit functions are also performed responsive to unipolar signals. As previously mentioned, accompanying each central processor command to a Control Unit, the Central Processor 2030 transmits an enable command to the Central Pulse Distributor 2031 which includes the address of the particular Control Unit which is to direct the execution of the system unit command. The Central Pulse Distributor 2031 translates the control unit address and transmits a unipolar enable signal to the particular Control Unit in accordance with the translated enable address. The enable signal is transmitted via an enable-verify signal transmission pair, such as 2056, which is discrete to the Control Unit to be enabled and also discrete to the Command Bus 0 or 1 via which the system unit command is transmitted by the Central Processor 2030. Upon receipt of the enable signal, the Control Unit accepts the system unit command from the selected Command Bus 0 or 1 and returns a verify signal to the Central Pulse Distributor 2031 over the same enable-verify pair 2056 that was used to transmit the enable signal. The verify signal is translated by the Central Pulse Distributor 2031 into the same form as the address portion of the enable command which initiated the enable signal. The translated verify signal is transmitted to the Central Processor 2030 wherein it is compared to the address portion of the original enable command. A match assures that the correct Control Unit has been enabled.

The group of transmission pairs, similar to pairs 2056, 2057, over which enable signals and verify signals are transmitted is termed the Enable-Verify Cable 2060. A more detailed description of the enable-verify operation is included hereinbelow.

Central pulse distributor bipolar signals are most commonly used to set and reset flip-flops at speeds which are beyond the capabilities of the respective, relatively low speed, Junctor and Trunk Signal Distributors 1550, 1850, 1950 which are hereinafter described. Other circuit operations requiring a high speed of execution are performed responsive to central pulse distributor bipolar signals. Such operations include the sending of dial pulse signals and multifrequency signals to a distant switching center via a trunk circuit 902. The transmission pairs over which bipolar signals are transmitted are grouped into cables designated Bipolar Cables, one of which 2047 is shown in the drawing.

MASTER SCANNER 2032

The Master Scanner 2032 shown on FIG. 20 is a system component which is employed to supervise strategically located circuit elements of various other system components. The supervisory states of these strategic elements reflect the general operating condition of the switching system as a whole. This information is helpful in system maintenance and trouble diagnosis. The Diagnostic Bus and Cable System 2080, comprising Diagnostic Bus NC, Diagnostic Bus SD and a Diagnostic Cable 2070 provides transmission paths for the above information. The various strategic circuit elements from which the above information is obtained are more fully described later herein.

The Master Scanner 2032 is also employed to monitor a few trunk and service circuits 902 which terminate on the switching network. For example, the Master Scanner 2032 is employed to monitor the signal-present terminals of the TOUCH-TONE or Multifrequency Receivers 7002 on FIG. 70.

In addition to a ferrod matrix to which the supervised strategic circuit elements are connected, the Master Scanner 2032 includes buffer control circuitry, a Receiver Circuit 2042 and means for selectively transmitting the supervisory states of a selected group of supervised circuit elements via a selected Scanner Response Bus 0 or 1; a "ferrod" is a scanning element as disclosed in Baldwin-May application Serial No. 26,758, filed May 4, 1960, now Patent 3,175,042, issued March 23, 1965. The Master Scanner 2032 functions in response to an appropriate central processor command transmitted thereto via Command Bus 0 or Command Bus 1. This circuitry is similar to that of the hereinafter described Junctor, Trunk and Line Scanners 1500, 1800, 1900, 1000 which are associated with the respective terminal circuit groups 508, 802, 902, 230, 235 of the switching network. A complete description of a typical ferrod scanner which may advantageously be utilized in accordance with this invention is given in the copending U.S. patent application of Guercio-May, Serial No. 250,416, filed January 9, 1963.

The Master Scanner 2032, unlike many of the other system components, is a relatively high speed circuit. Successive central processor commands may be directed thereto at interval of eleven microseconds.

TELETYPE UNIT 2033

The Teletype Unit 2033 shown on FIG. 20 is a system component which provides means whereby maintenance personnel may request certain limited system operations, and whereby the switching system can communicate information relating to trouble conditions which it has encountered to the maintenance personnel. Also, routine changes in the transitional information stored in the temporary memory of the Central Processor 2030 may be read into the temporary memory by way of the Teletype Unit 2033.

PROGRAM STORE CARD WRITER 2034

The system component designated Program Store Card Writer 2034 on FIG. 20 provides means for coding the information cards which provide the semipermanent memory of the Central Processor 2030. Information to be placed on these magnet cards is obtained either from magnetic tape or the Central Processor 2030. A program card writer is disclosed in C. F. Ault et al. application Serial No. 266,962, filed March 21, 1963.

AMA TAPE UNIT 2035

The system component designated AMA (Automatic Message Accounting) Tape Unit 2035 on FIG. 20 is utilized by the system to store telephone call charging information. This information is stored on magnetic tape. Either the tape itself or the information stored thereon is transmitted to a data processing accounting center where the charge information is employed in computing a subscriber's cumulative charges for the various telephone calls he has made, as is known in the art.

SWITCH FRAMES 201, 301, 601, 701

The system components through which switching network connections are selectively established are designated Switch Frames 201, 301, 601 and 701 which are respectively shown on FIGS. 2, 3, 6 and 7. Three basic types of Switch Frames are utilized in this illustrative switching system which are: the Line Switch Frame 201, the Junctor Switch Frame 301, 601, and the Trunk Switch Frame 701. The following description is directed to Switch Frames generally, and a more detailed description of each type of Switch Frame will be included later herein.

FIGS. 2, 3, 6 and 7 when taken together illustrate the subdivision of the illustrative switching network described in the aforenoted copending U.S. patent application of A. Feiner into a plurality of modular, two-stage Network Units. Each Network Unit comprises either two octal grids or eight concentrator grids, both of which grid types are fully described in the Feiner application. Each Switch Frame comprises two such modular Network Units. A Network Unit provides selectable, bidirectional, connecting facilities between the input terminals of its respective grids and the output terminals thereof via interstage links.

FIGS. 11, 12, 13, 16 and 17 when taken together illustrate the subdivision of the network control circuitry of the aforenoted A. Feiner patent application into a plurality of modular network Control Units 1102, 1202, 1302, 1303, 1602, 1603, 1702, 1703 and the advantageous association thereof with the modular Network Units 210, 220, 310, 320, 610, 620, 710, 720 of FIGS. 2, 3, 6 and 7, respectively. A discrete Network Control Unit is individually associated with each of the two Network Units of each Switch Frame. These Network Control Units 1102, 1202, 1302, 1303, 1602, 1603, 1702, 1703 serve as buffers between the high speed Central Processor 2030 and the relatively low speed Network Units 210, 220, 310, 320, 610, 620, 710, 720. Central processor commands are transmitted to a particular Network Control Unit and registered therein. The Network Control Unit directs its associated Network Unit in executing the registered central processor command and, upon the execution thereof, resets itself to await another central processor command. The Central Processor 2030 is thus released to implement other system operations while the Network Control Unit directs the execution of a command registered therein.

Each Switch Frame further includes a Receiver Circuit 1001, 1301, 1601, 1701 through which the two Network Control Units of the Switch Frame are inductively coupled to the respective conductor pairs 20100, 20101 of the two Command Buses 0 and 1 of the Command Bus System 2010. Each of the Network Control Units of a Switch Frame is also inductively coupled via the respective Receiver Circuits to two discrete enable-verify signal transmission pairs of the Enable-Verify Cable 2060. Each enable-verify pair is individually associated with one of the duplicate Command Buses 0 and 1.

A central pulse distributor enable signal is received by a Network Control Unit via one of its two enable-verify pairs and the Receiver Circuit. Responsive to the receipt of an enable signal, the Network Control Unit accepts and registers the central processor command from the particular Command Bus, 0 or 1, which is associated with the enable-verify pair from which the enable signal was received. The Network Control Unit then returns a verify signal via the identical enable-verify pair from which the enable signal was received.

The association of a discrete Network Control Unit with each modular Network Unit, in accordance with an aspect of this invention, permits the asynchronous time sharing of the high speed Central Processor 2030 by a plurality of low speed Network Control Units. It is to be noted that, during normal operations, sequential central processor commands can be transmitted to the two Network Control Units of a single Switch Frame. Thus, separate network switching operations may be performed at substantially the same time within a single Switch Frame.

Each Network Control Unit of a Switch Frame normally directs the execution of central processor commands only in its discretely associated Network Unit. However, each Network Control Unit of a Switch Frame is capable of directing the execution of central processor commands in both of the Network Units of the Switch Frame. This mode of operation is commanded by the Central Processor 2030 when one of the Network Control Units of a Switch Frame encounters trouble or is undergoing certain diagnostic testing operations as further described later herein.

Each Network Control Unit of a Switch Frame includes a plurality of strategic scan points, the state of which reflect the progress of the Network Control Unit in completing a command executing cycle. Certain of these scan points, known as supervisory scan points, are normally connected via the Diagnostic Cable 2070 to the Master Scanner 2032. Others of the strategic scan points, known as diagnostic scan points, may be connected to the Diagnostic Bus NC in response to a central processor command. The supervisory scan points provide supervisory information concerning the general operation of the Network Control Unit from which the Central Processor 2030, by selective interrogation of the Master Scanner 2032, can ascertain nonstandard operating conditions. The diagnostic scan points provide more specific supervisory information concerning the circuitry of the Network Control Unit. This information is used by the Central Processor 2030 to diagnose nonstandard operating conditions previously detected.

A selected input terminal of the first switching stage of a Network Unit is selectively connectable to a selected output terminal of the second stage of the Network Unit via an interstage link. Such a connection is achieved by closing the first and second stage crosspoint device contacts which respectively define the matrix intersections of an interstage link with the selected input terminal and the selected output terminal.

The crosspoint device contacts of a Network Unit are selectively closed and opened under the direction of the associated Network Control Unit in accordance with central processor commands received thereby and registered therein. The address portion of central processor commands directed to Switch Frames includes, among other information, the identities of the particular grid through which a partial call connection is to be established, a selected input terminal, a selected output terminal and an appropriate interstage link. This information is registered in the Network Control Unit which then directs the Network Unit in establishing the partial call connection as commanded.

As will be noted from the detailed description of the various Switch Frames 201, 301, 601, 701 which is given later herein, central processor commands are not specifically provided to release established call connections. This is due to the use of crossing point switching devices, known as differentially wound ferreeds, in a particular coordinate array arrangement in the illustrative switching network. Copending patent application, Serial No. 206,055, of W. S. Hayward, Jr., filed June 28, 1962, now Patent 3,110,772, issued November 12, 1963, discloses such a coordinate array arrangement of differentially wound ferreeds. In such an arrangement, ferreed contacts through which an unwanted connection remains extablished are opened and the unwanted connection is released in response to signals operating the ferreed contacts through which a new connection is established. Although specific release commands are not provided by the Central Processor 2030 as contemplated by this description, due to the nature of the crosspoint switching devices of the illustrative network, the ability to generate release commands and the control of a switching network responsive to such commands is to be understood as included in the scope of this invention.

A complete telephone connection through the switching network generally is extended through four modular Network Units which represent, in combination, eight switching stages. (A complete connection may extend through the same Network Unit twice if the terminals to be connected, as selected by the Central Processor 2030, are on the same Network Unit.) A complete eight-stage call connection, therefore, is comprised of four, two-stage, partial call connections, each extending through the two switching stages of a Network Unit. The four partial call connections of a complete call connection may be established at substantially the same time by sequentially commanded Network Control Units, or they may be established at varying intervals, depending upon the existing requirement for the performance of other more important switching system operations for which the Central Processor 2030 must generate commands.

The final routing of various types of calls through the switching network is described in the aforenoted A. Feiner patent application; however, in processing a call it is generally necessary to establish more than one complete call connection. A more complete description of the various complete call connections which are established in processing various types of calls is included hereinafter.

Included among the conductor pairs 20100, 20101 of each Command Bus 0, 1 is a RESET conductor pair RS0, RS1. In the event that the Central Processor 2030 ascertains that an error has been made in a command transmitted to a Control Unit or that an improper Control Unit has accepted a command, the Central Processor 2030 transmits a RESET signal via the RESET conductor pair RS0, RS1 of the Command Bus 0 or 1 via which the erroneous command was transmitted or from which a command was accepted by an improper Control Unit. The Control Units are arranged so that a RESET signal must be received within five milliseconds after receipt of an enable signal or else the Control Unit will not respond to the RESET signal.

In response to a RESET signal received via a Command Bus 0, 1, all Control Units which received central processor commands from that particular Command Bus 0, 1 within the previous five milliseconds will be RESET, and the execution of the central processor commands thereby effectively canceled. For example, assuming successive commands were transmitted from the Central Processor 2030 via Command Bus 0 to respective Network Control Units of Switch Frames 201, 301, 601, 701 and Central Processor 2030 ascertains that the last command is erroneous, a RESET signal is transmitted via conductor pair RS0. In response to the RESET signal, the Network Control Units of Switch Frames 201, 301, 601, 701 will RESET themselves and cancel the execution of the commands previously transmitted thereto via Command Bus 0. Assuming that other central processor commands were transmitted via Command Bus 1 to other system components such as 2032, 2035, 801, 501, etc., these commands will not be canceled and the execution thereof by these respective components will continue.

MAIN DISTRIBUTION FRAME 910

Figure 2:
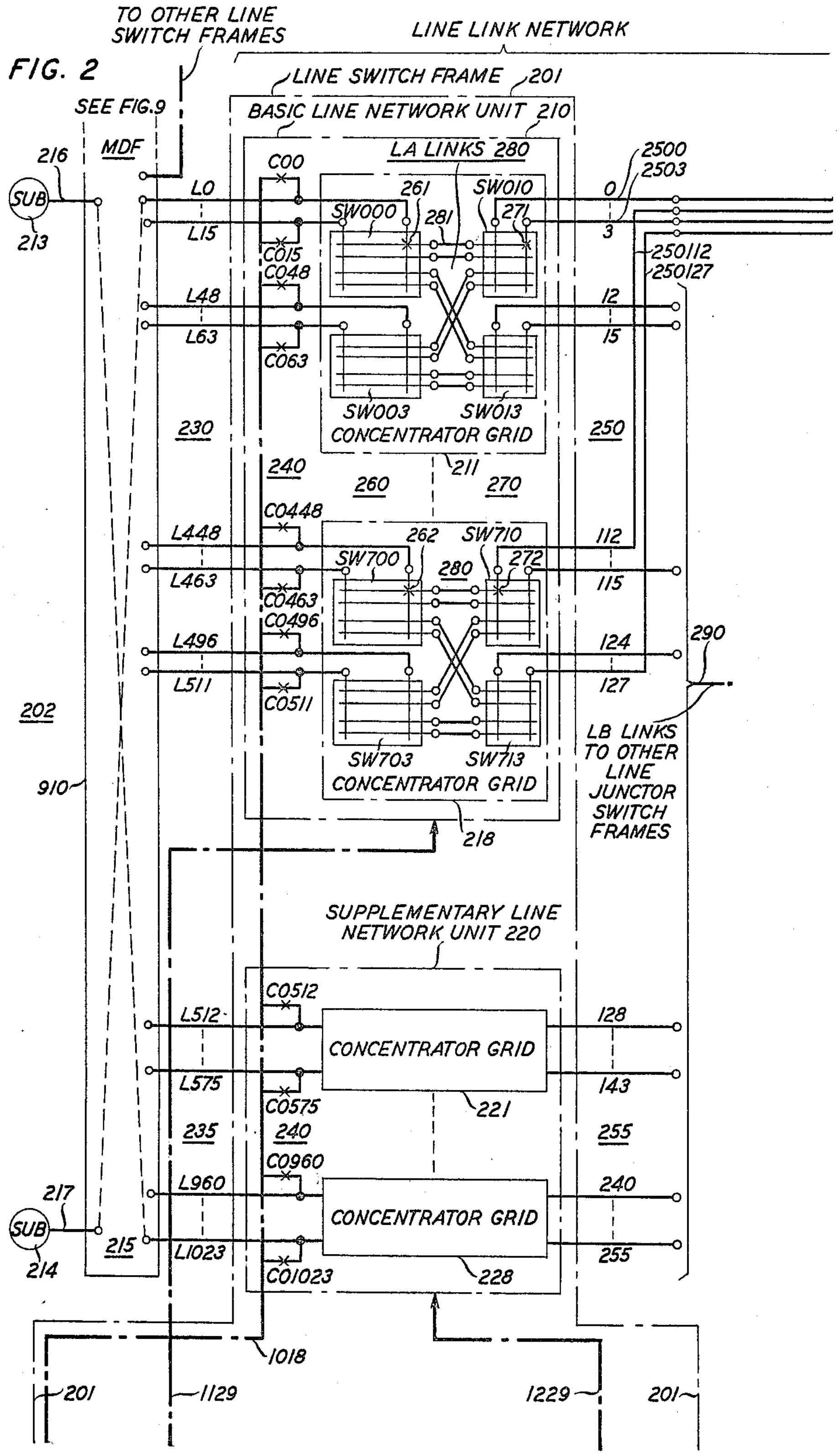
FIGS. 2, 10, 11 and 12 are a schematic representation of a Line Switch Frame and a portion of the Main Distribution Frame.
Figure 9:
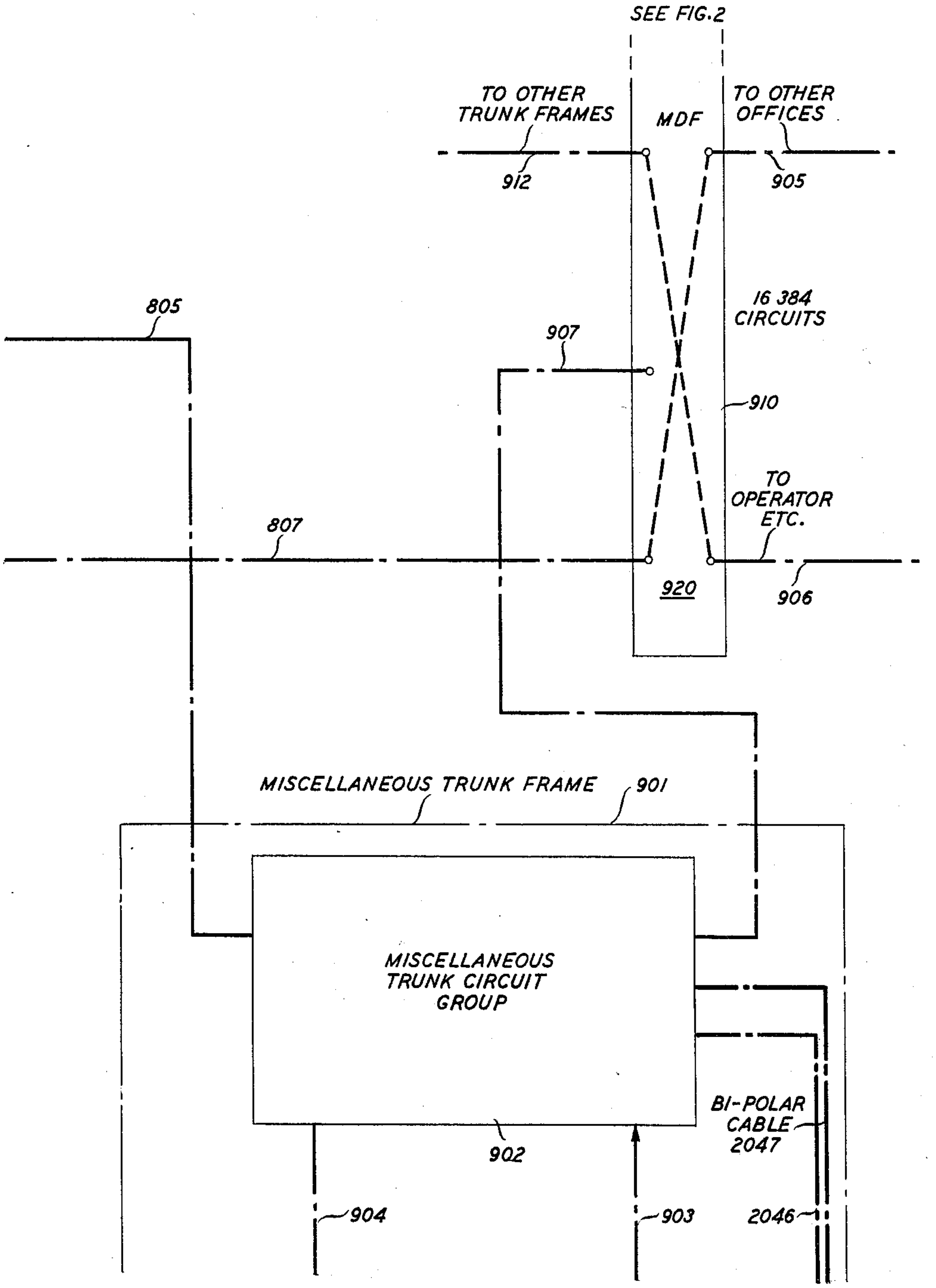
FIGS. 9 and 19 are a schematic representation of a Miscellaneous Trunk Frame and a portion of the Main Distribution Frame.
Figure 10:
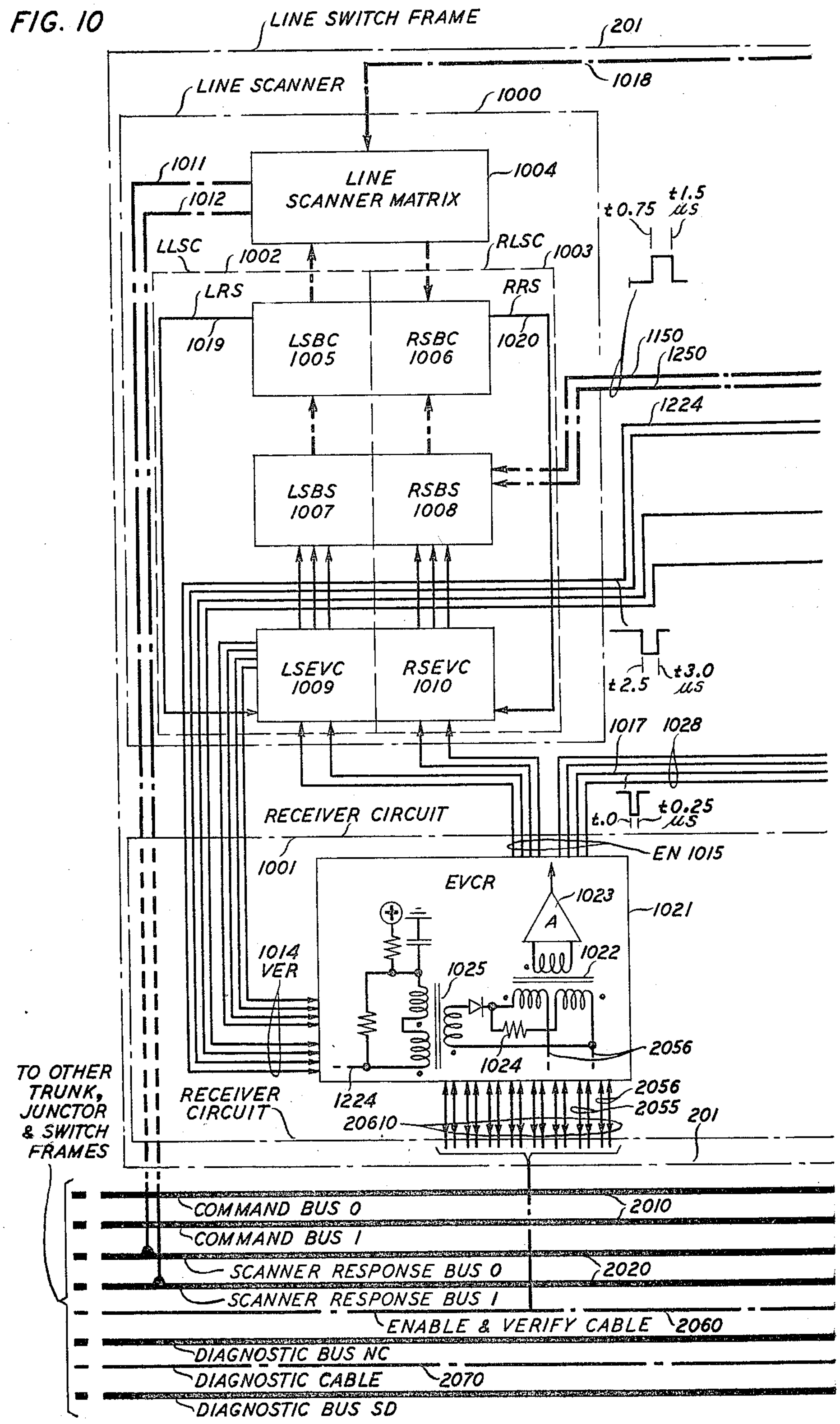
Figure 11:
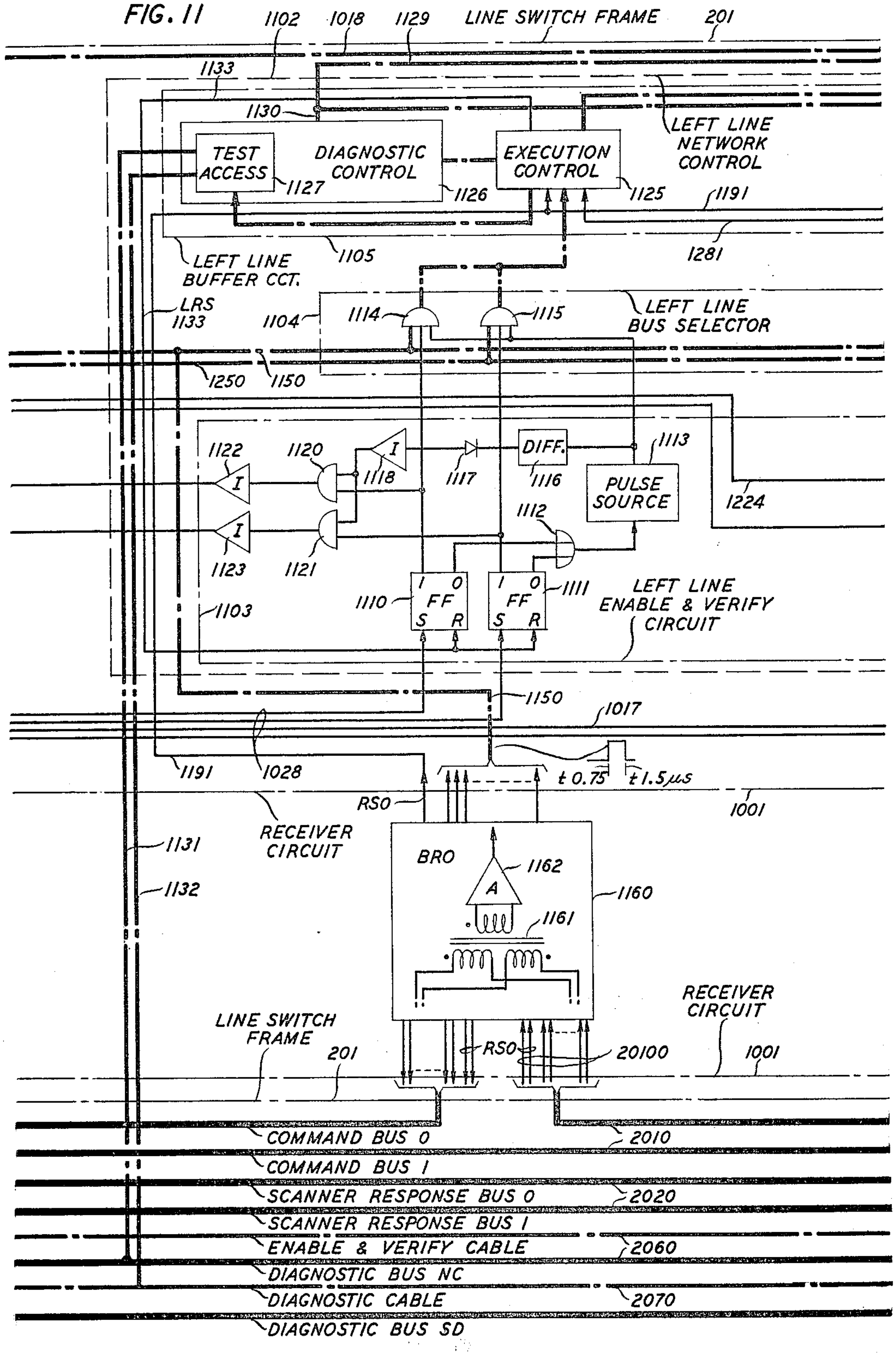

The Main Distribution Frame 910 shown in FIGS. 2 and 9 is a cross-connection field which provides interchangeable cross-connection facilities 920 and 215 between the input terminals 230, 730 of the switching network and the cable conductors 905, 906, 216, 217 whereby the switching network is connected to distant switching centers and to local subscribers 202. The portion of the Main Distribution Frame 910 shown in FIG. 2 represents the cross-connection facilities 215 between the line terminals 230, 235 of Line Network Units such as 210 and 220 and local subscriber cable pairs such as 217, 216 whereby individual subscriber stations 213, 214 are connected to the local switching network. The portion of the Main Distribution Frame shown in FIG. 9 represents the cross-connection facilities 920 between trunk circuits of trunk circuit groups such as 802, 902 and interoffice trunk cable pairs 905 whereby distant switching centers are connected to the local switching network.

JUNCTOR FRAMES 501

As described in the aforenoted A. Feiner patent application, a call from one subscriber line 213 to another subscriber line 214 results in the establishment of a complete call connection through the switching network which includes a line junctor circuit. Each of the line junctor circuits comprises cut-through relay contacts, whereby final line-to-line cut-through is accomplished, and scan points, whereby the supervisory states of the originating subscriber line 213 and the terminating subscriber line 214 are monitored. Line junctor circuits are advantageously arranged in modular groups 502 for purposes of monitoring and control. Each modular line junctor circuit group 502 is included in an individual Junctor Frame 501.

Also included on a Junctor Frame 501 is a Junctor Signal Distributor 1550 which exerts supervisory control over the line junctor circuit group 502 of the Junctor Frame 501. The Junctor Signal Distributor 1550 is a relatively low speed, relay type translator which provides bipolar output signals in response to central processor commands. The bipolar output signals are used to selectively operate and release the magnetic latch-type relays which control the cut-through contacts of the respective line junctor circuits of line junctor circuit group 502.

The address portion of a central processor command directed to a Junctor Signal Distributor 1550 is utilized to direct either a positive or a negative signal via the closed contacts of a plurality of selectively operated translation relays to a particular signal distributor output (commonly termed a signal distributor point). A signal of one polarity operates the selected relay and a signal of the opposite polarity releases the selected relay. Each signal distributor point is discretely connected to the control winding of a particular relay in a line junctor circuit.

A Junctor Signal Distributor 1550 is relatively slow in operating having a maximum command execution cycle in the order of twenty milliseconds. Central processor commands therefore are directed thereto at intervals of no less than twenty milliseconds. Buffer Control Units 1552, 1553 are similar to those described with reference to Switch Frames. They register central processor commands and direct the execution thereof by the Signal Distributor 1550, thus avoiding any delay in Central Processor operation. A Junctor Signal Distributor 1550 is equipped with two Signal Distributor Control Units 1552, 1553, each of which normally directs the Junctor Signal Distributor 1550 in controlling the line junctor circuits of the associated line junctor circuit group 502 via one-half of the output points of the Signal Distributor.

The Signal Distributor Control Units 1552, 1553 are selectively enabled responsive to central pulse distributor enable signals and can accept central processor commands from either of the duplicate Command Buses 0 and 1 in a manner similar to that previously described with reference to the Network Control Units of the Switch Frames. A verify signal is returned by a Signal Distributor Control Unit 1552, 1553 to the Central Pulse Distributor 2031 in the same manner as that of the Network Control Units. Following the execution of a central processor command, a Signal Distributor Control Unit 1552, 1553 resets itself to await further central pulse distributor enable signals and accompanying central processor comands.

Although each Signal Distributor Control Unit 1552, 1553 of a Junctor Signal Distributor 1550 normally exerts control over the line junctor circuits of a line junctor circuit group 502 via only one-half of the output points, either Signal Distributor Control Unit 1552 or 1553 is capable of exerting control over the line junctor circuit group 502 via all of the output points of the Signal Distributor. This mode of operation is usually commanded by the Central Processor 2030 when one Signal Distributor Control Unit, 1552 or 1553, is not operating properly or during certain routine testing operations as hereinafter described.

Each Signal Distributor Control Unit 1552, 1553 includes certain strategic supervisory scan points which are normally connected via the Diagnostic Cable 2070 to the Master Scanner 2032. These scan points provide supervisory information concerning the progress of the Control Unit 1552, 1553 in completing a command execution cycle. This information is used by the Central Processor 2030 to detect nonstandard operating conditions in the Control Unit 1552, 1553. Each Signal Distributor Control Unit 1552, 1553 further includes other strategic diagnostic scan points which may be connected to the Master Scanner 2032 via the Diagnostic Bus SD responsive to a central processor command. These diagnostic scan points provide more specific supervisory information concerning the operations of the Control Unit circuitry. This more specific information is used by the Central Processor 2030 in diagnosing previously detected nonstandard operation conditions in the Signal Distributor Control Unit 1552, 1553.

In addition to a Junctor Signal Distributor 1550, each Junctor Frame 501 includes a Junctor Scanner 1500 which monitors the supervisory states of those network connections which include a line junctor circuit of the line junctor circuit group 502 associated with the Junctor Frame 501. A detailed description of a typical scanner of the type used in this illustrative switching system is given in the aforenoted copending U.S. patent application of A. M. Guercio et al. A brief functional description of a Junctor Scanner 1500 is included herein as background for an understanding of the present invention.

A Junctor Scanner 1500 comprises a Scanner Ferrod Matrix 1504 wherein each scan point of the respective line junctor circuits of the line junctor circuit group 502 is terminated, via cable 504, on an individual ferrod. The Scanner Matrix 1504 is selectively interrogated in response to central processor commands. Information reflecting the respective states of the selected group of ferrods interrogated is transmitted from the Junctor Scanner 1500 via cables 1511 and 1512 and the Scanner Response Bus System 2020 to the Central Processor 2030.

Each Junctor Scanner 1500 further comprises two buffer Control Units 1502, 1503 known as Scanner Control Units, which direct the selective interrogation of the Scanner Matrix 1504 in accordance with central processor commands. Only one of the Scanner Control Units 1502, 1503 of a Scanner 1500 is enabled at any given time, and either Scanner Control Unit 1502, 1503 may direct the selective interrogation of the entire Scanner Matrix 1504. The Scanner Control Units 1502, 1503 are used alternatively in accordance with enable signals received from the Central Pulse Distributor 2031 via Enable-Verify Cable 2060.

The enablement of a Scanner Control Unit 1502, 1503 in response to a central pulse distributor enable signal, the acceptance of a central processor command from one of the Command Buses 0 and 1, the return of a verify signal to the Central Pulse Distributor 2031 and the reset operation are substantially analogous to the aforedescribed operations of the Network Control Units and the Signal Distributor Control Units. The Junctor Scanner, however, has a command execution cycle of approximately eleven microseconds and therefore can receive sequential commands at eleven microsecond intervals.

The above-described physical association of a discrete Junctor Signal Distributor and a discrete Junctor Scanner with each modular line junctor circuit group, in accordance with one aspect of this invention, permits the aynchronous time sharing of the high speed Central Processor 2030 by a plurality of low speed supervisory circuits, such as Junctor Signal Distributor 1550.

Each Junctor Frame 501 also includes a Receiver Circuit 1501, similar to the Receiver Circuits 1001, etc., of the switch frames 201, 301, 601, 701, through which the Signal Distributor Control Units 1552, 1553 and the Scanner Control Units 1502, 1503 of the Junctor Frame 501 are inductively coupled to the duplicate Command Buses 0 and 1 and to the discrete enable-verify pairs 20615 of the Enable-Verify Cable 2060 associated with the respective Signal Distributor and Scanner Control Units 1552, 1553, 1502, 1503.

TRUNK FRAMES 801, 901

Two genereal types of circuits are teminated via the Trunk Distribution Frame 803 at the trunk terminals 730 of the switching network. The first type is designated trunk circuits and includes those circuits through which the switching network may be connected to distant switching exchanges. The second type is designated service circuits and includes those circuits to which connections are established through the switching network for various call processing services. Service circuits include tone circuits, multifrequency receivers, TOUCH-TONE receivers, combined subscriber dial pulse and TOUCH-TONE receivers, multifrequency and dial pulse transmitters, recorded announcement circuits and other similar circuits used during call processing.

The trunk circuits and service circuits are further arranged in two classes. A first class is comprised of those trunk and service circuits which may be readily interchanged as plug-in units due to a similarity of supervisory control and monitoring requirements. A second class is comprised of those trunk and service circuits which require nonstandard supervision.

The first class of trunk and service circuits is divided into universal trunk circuit groups 802, each group appearing on an individual Universal Trunk Frame 801. The second class of trunk and service circuits is divided into miscellaneous trunk circuits groups 902, each group appearing on an individual Miscellaneous Trunk Frame 901.

Each individual Trunk Frame 801, 901, be it universal or miscellaneous, is equipped with a Trunk Signal Distributor 1850, 1950 and a Trunk Scanner 1800, 1900. The operations of a Trunk Signal Distributor 1850, 1950 and a Trunk Scanner 1800, 1900 are similar to those of the previously described Junctor Signal Distributor 1550 and Junctor Scanner 1500.

This association of a discrete Trunk Scanner 1800, 1900 and a discrete Trunk Signal Distributor 1850, 1950 with each universal trunk circuit group 802 and each miscellaneous trunk circuit group 902, in accordance with an aspect of this invention, permits the asynchronous time sharing of a high speed Central Processor 2030 by a plurality of low speed supervisory components, such as Trunk Signal Distributors 1850, 1950.

As previously mentioned with respect to the Central Pulse Distributor 2031, a bipolar cable 2047 is provided between the Central Pulse Distributor 2031 and certain of the trunk and service circuits of a miscellaneous trunk circuit group 902 appearing on a Miscellaneous Trunk Frame 901. Bipolar signals are transmitted via the bipolar cable 2047 to control certain high speed operations of the trunk and service circuits 902 which are beyond the capabilities of the relatively slow speed Trunk Signal Distributor 1950.

As previously mentioned with respect to the Master Scanner 2032, certain circuit operations of specific trunk and service circuits 902 are more readily monitored by the Master Scanner 2032 than by the Trunk Scanner 1900 of the Trunk Frame 901 upon which the circuits appear. The scan points within these specific trunk and service circuits 902 which reflect their circuit operations are connected via a call signaling cable 2046 to the ferrod matrix of the Master Scanner 2032.

TRUNK DISTRIBUTION FRAME 809

The Trunk Distribution Frame 809 is a cross-connection field which provides interchangeable cross-connection facilities 810 between the trunk terminals 730 of Trunk Switch Frames such as 701 and the trunk and service circuits of the universal and miscellaneous trunk circuit group 802 and 902. Trunk terminals 730 may be connected via cables such as 700, 800, 805, 806, 808 and the Trunk Distribution Frame 809 to any of the trunk circuits or service circuits 802, 902 appearing on any Universal or Miscellaneous Trunk Frames such as 801 and 901 of the switching system.

JUNCTOR GROUPING FRAME 490

The Junctor Grouping Frame 490 is a cross-connection field which provides interchangeable cross-connection facilities 495 between the line junctor terminals 350 and trunk junctor terminals 650 of the respective Line and Trunk Junctor Switch Frames such as 301 and 601. Any line or trunk junctor terminal 350, 650 may be connected via cables such as 300, 496, 600, 400 and Junctor Grouping Frame 490 to any other line or trunk junctor terminal 350, 650.

Junctor Grouping Frame 490 further provides interchangeable cross-connection facilities 495 between line junctor terminals 350 and the line junctor circuits 502 of all Junctor Frames, such as 501. When a Junctor Link Network 401 is provided, as hereinafter described, the Junctor Grouping Frame 490 provides interchangeable cross-connection facilities 495 between junctor link terminals 430 and line junctor terminals 350. A more complete description of the Junctor Grouping Frame 490 is included in the aforenoted patent application of A. Feiner which has been incorporated herein by reference.

JUNCTOR LINK NETWORK 401

Figure 4:
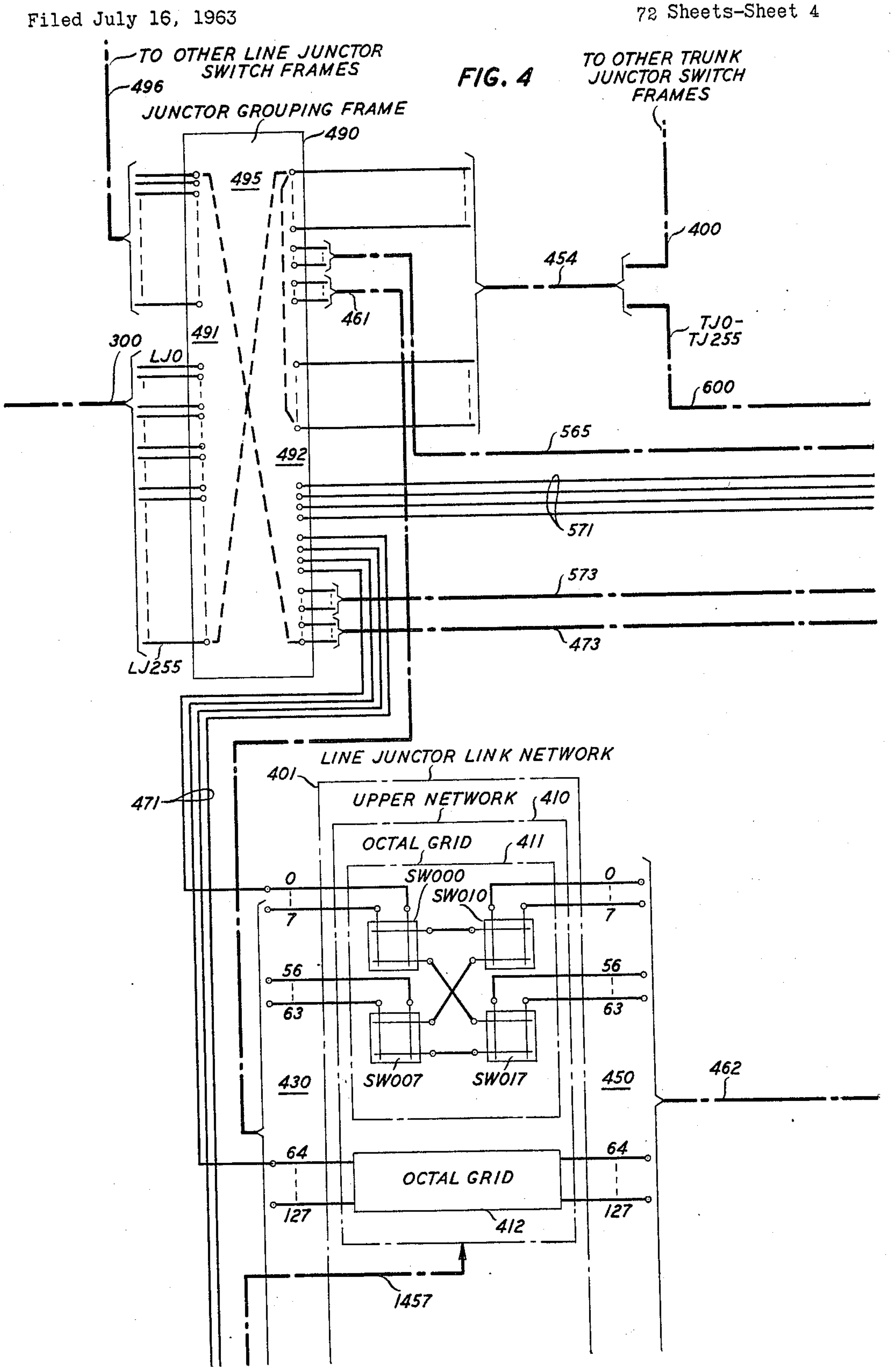
FIGS. 4 and 14 depict the Junctor Grouping Frame and a schematic representation of a Line Junctor Link Network.
Figure 14:
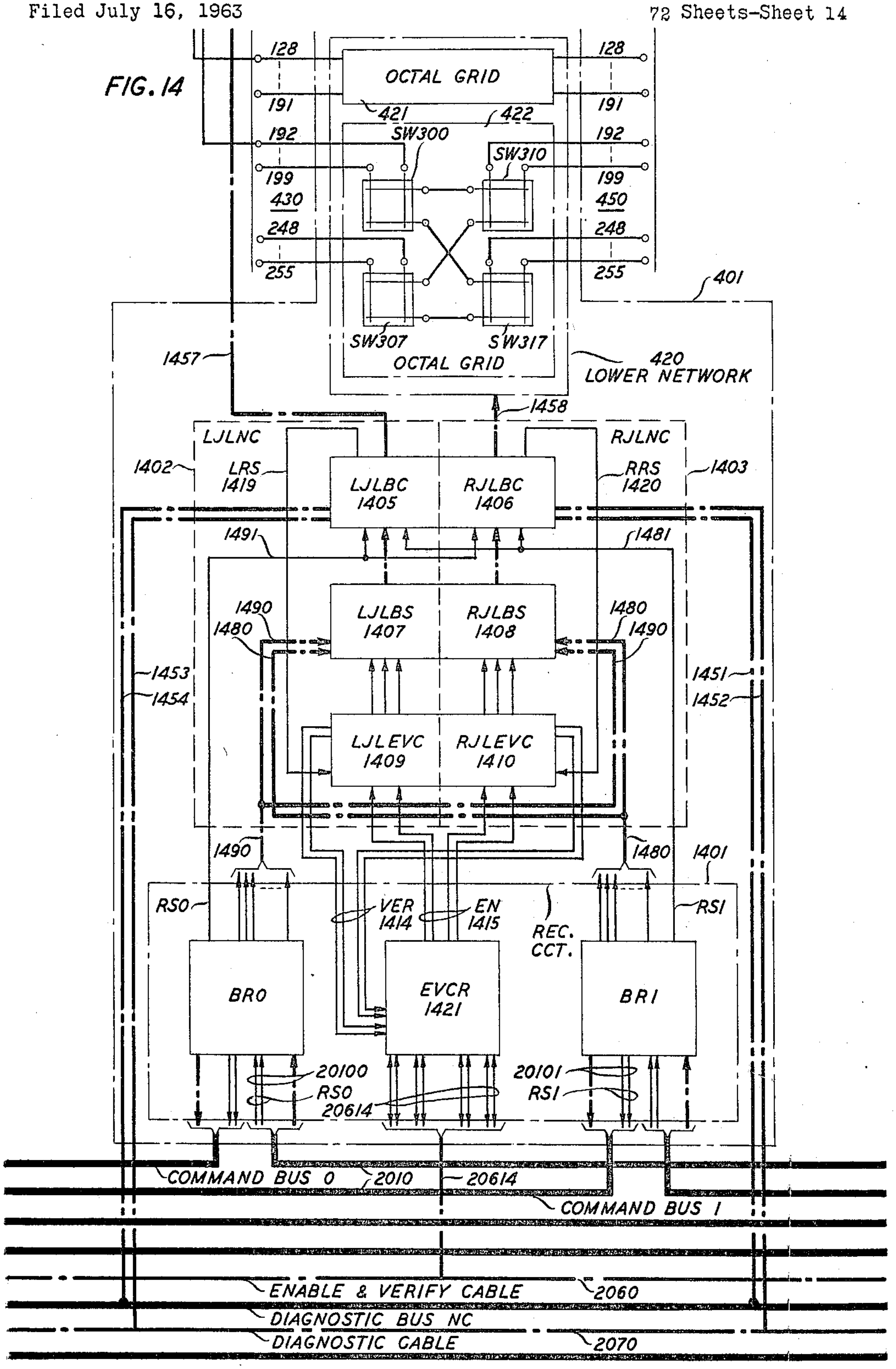

The Junctor Link Network 401 shown in FIGS. 4 and 14 is provided to increase the flexibility of interconnection of line junctor terminals and trunk junctor terminals 350, 650 in a large switching center. It is similar in composition to a Trunk Switch Frame, such as Trunk Switch Frame 601, which is further described hereinbelow. The above description of Switch Frames in general is equally applicable to Junctor Link Network 401. The aforenoted patent application of A. Feiner includes a more detailed description of the utility of a Junctor Link Network such as 401. It has been included in the drawing to illustrate that the control thereof is completely analogous to the control of other Switch Frames as hereinafter described.

*Modes of operation*

During normal system operating conditions the system unit commands generated by the Central Processor 2030 relate to the routine switching and supervisory operations of the various system components. However, when the Central Processor 2030 receives information indicating that one or more Control Units have encountered nonstandard conditions, the Central Processor 2030 may selectively command any of the respective Control Units 1002, 1003, 1102, 1202, 1302, 1303, 1402, 1403, 1502, 1503, 1552, 1553, etc., to enter any of several modes of operation. Although such non-normal modes of operation are usually commanded to facilitate performance of diagnostic testing and maintenance operations, the Central Processor 2030 may also command such modes of operation for routine testing purposes in accordance with its system maintenance program.

QUARANTINE MODE OF OPERATION

A buffer Control Unit of any of the above-described Switch Frames 201, 301, 601, 701 and Signal Distributors 1550, 1850, 1950 is considered to be in the quarantine mode of operation when it has been effectively disassociated from the Network Unit 210, 220, 310, 320, 610, 620, 710, 720 or from the line junctor or trunk circuit group 502, 802, 902 over which it normally exerts control. When in the quarantine mode, a Control Unit can accept central processor commands and operate in a completely normal manner with the important exception that its operations have no effect on the Network Unit or signal distributor output points which it normally controls.

This mode of operation is used to permit the comprehensive testing of a Control Unit by the Central Processor 2030 without disrupting the normally controlled Network Unit, trunk circuit group or line junctor circuit group. Generally, a Control Unit is commanded to enter the quarantine mode when supervisory information received by the Central Processor 2030 via Master Scanner 2032 indicates that the Control Unit is not functioning properly and diagnostic testing operations are required to ascertain the cause of trouble.

COMBINED MODE OF OPERATION

A buffer Control Unit of any of the above-described Switch Frames 201, 301, 601, 701 and Signal Distributors 1550, 1850, 1950 is said to have entered the combined mode of operation when it is exercising its capability of controlling two Network Units 210 and 220, 310 and 320, 610 and 620, 710 and 720, an entire trunk circuit group 802, 902 or an entire line junctor circuit group 502. When in the combined mode, a Control Unit can accept central processor commands for execution in either of the Network Units of a switch frame or for execution via all the output points of a Signal Distributor.

This mode of operation is used when the other of the two Control Units of a Switch Frame or Signal Distributor is commanded to enter the above-described quarantine mode of operation. It is this combined mode of operation that assures continued system reliability in the event that trouble is encountered in a buffer Control Unit.

The combined mode of operation is also used when a Control Unit is placed in the power-off mode of operation, wherein the Control Unit is completely disabled for maintenance purposes and its mate Control Unit must assume control of both Network Units or the entire trunk circuit group or line junctor circuit group.

TEST POINT ACCESS MODE OF OPERATION

A buffer Control Unit of any of the above-described Switch Frames 201, 301, 601, 701 and Signal Distributors 1550, 1850, 1950 is considered to be in the test point access mode of operation when a plurality of control unit diagnostic scan points, in addition to the normally connected supervisory scan points, have been connected via the Diagnostic Bus System 2080 to the Master Scanner 2032. The states of the various diagnostic scan points reflect the control unit operation and serve as a means whereby the Central Processor 2030 can follow, by selective interrogation of the Master Scanner 2032, the complete operating cycle of a Control Unit and diagnose any nonstandard conditions encountered.

This mode of operation may be entered either during normal control unit operations or when a Control Unit is in the quarantine mode. The control unit supervisory scan points, normally connected via the Diagnostic Cable 2070 to the Master Scanner 2032, are transferred to corresponding conductor pairs of the appropriate Diagnostic Bus NC or SD when a Control Unit is in the test point access mode.

A more complete description of the various modes of operation is included later herein.

DETAILED DESCRIPTION

*Line switch frame 201*

FIGS. 2, 10, 11 and 12 illustrated the organization of a typical Line Switch Frame 201. Although only one representative Line Switch Frame 201 is shown in the drawing, a plurality of Line Switch Frames are included in the switching system. The aforenoted patent application of A. Feiner describes the arrangement of a plurality of Line Switch Frames in an illustrative switching network.

Each Line Switch Frame 201 includes two modular Line Network Units 210 and 220 each comprising eight concentrator grids, 211–218 and 221–228; two Line Network Control Units 1102 and 1202; a Line Scanner 1000 comprising a Scanner Ferrod Matrix 1004 and two Scanner Control Units 1002 and 1003; and a Receiver Circuit 1001 through which the Line Network and Scanner Control Units 1102, 1202, 1002 and 1003 are inductively coupled to discrete enable-verify pairs 20610 of the Enable-Verify Cable 2060 and to each of the respective conductor pairs 20100 and 20101 of the Command Buses 0 and 1.

LINE NETWORK UNITS 210 AND 220

The two respective Line Network Units of a Line Switch Frame 201 are designated Basic Line Network Unit 210 and Supplementary Line Network Unit 220. A Line Network Unit 210 comprises eight concentrator grids 211–218, each providing selectable, bidirectional, connecting facilities between sixty-four line terminals 230 and sixteen LB link terminals 250 via LA interstage links 280 through two switching stages 260, 270. Each Line Network Unit 210, 220 therefore provides respective line terminals 230, 235 for a line group of 512 subscriber lines 202 and LB link terminals 250, 255 for 128 LB links 390. A Line Switch Frame 201 may be partially equipped with only a Basic Line Network Unit 210 if desired. A supplementary Line Network Unit 220 may be added at any time to augment the line terminal capacity of the Line Switch Frame 201 when an additional line group 235 of subscriber lines 202 must be terminated.

A line network unit partial call connection between a selected line terminal L0 and a selected LB link terminal 2503 is established by selecting an LA link 281 and closing the crosspoint switching device contacts 261 and 271 at the respective crosspoints of the selected line and LB link terminals L0 and 2503 and the selected LA link 281.

In addition to the first stage crosspoint switching device contacts 260 through which line network unit partial call connections are established, each line terminal 230, 235 is connectable through discrete cut-off relay contacts 240 to an individual ferrod in the Scanner Matrix 1004 of the Line Scanner 1000 via scanner cable 1018. These cut-off contacts 240 are opened and closed as directed by the Line Network Control Units 1102, 1202 to selectively connect and disconnect the ferrods of the Scanner Matrix 1004 and their respectively associated line terminals 230, 235. Supervisory monitoring of the respective line terminals 230, 235 may thus be discontinued and resumed as hereinafter described.

LINE NETWORK CONTROL UNITS 1102 AND 1202

The two respective Line Network Control Units 1102, 1202 of a Line Switch Frame 201 are designated Left Line Network Control Unit 1102 and Right Line Network Control Unit 1202. The left Line Network Control Unit 1102 normally directs switching operations in the Basic Line Network Unit 210. However, when the Left Line Network Control Unit 1102 enters the combined mode of operation, it also directs switching operations in the Supplementary Line Network Unit 220. Correspondingly, the Right Line Network Control Unit 1202 normally directs switching operations in the Supplementary Line Network Unit 220 but, when in the combined mode of operation, it can also direct switching operations in the Basic Line Network Unit 210.

Each Line Network Control Unit, such as 1202, comprises an enable-verify circuit 1203 which receives a central pulse distributor enable signal, generates a command-accept signal and subsequently generates a verify signal; a bus selector 1204, which accepts the central processor command from Command Bus 0 or 1, as indicated by the command-accept signal; and a buffer circuit 1205 which registers the accepted central processor command, directs the execution thereof by an associated Line Network Unit 210, 220 and subsequently generates a RESET signal to prepare itself and the enable-verify circuit 1203 for another enable signal and accompanying central processor command.

ENABLE-VERIFY OPERATION

The Central Pulse Distributor 2031, in accordance with an enable command received from the Central Processor 2030, energizes an enable-verify pair, such as 2056, discretely associated with one of the Command Buses, for example Command Bus 0, and with a particular Control Unit, for example Right Line Network Control Unit 1202 of Line Switch Frame 201. The Central Processor 2030 then selectively energizes the respective conductor pairs 20100 of the associated Command Bus 0 which represent the appropriate information bits of the accompanying control unit command.

Eight enable-verify pairs 20610 enter the Receiver Circuit 1001 of the Line Switch Frame 201. Two of the eight enable-verify pairs 20610 are discrete to each respective Control Unit 1002, 1003, 1102, 1202. Each of the enable-verify pairs 20610 is further discretely associated with one of the duplicate Command Buses 0 and 1. Thus, an enable signal received from an enable-verify pair will identify the particular Control Unit to be enabled and the particular Command Bus from which a central processor command accompanying the enable siganl is to be accepted. For example, an enable signal received from enable-verify pair 2056 indicates that the Right Line Network Control Unit 1202 is to accept a central processor command from Command Bus 0. Had the enable signal been received from enable-verify pair 2055, the Right Line Network Control Unit 1202 would accept a central processor command from Command Bus 1. The others of enable-verify pairs 20610 are respectively associated in pairs with the Left Line Network Control Unit 1102, the Left Scanner Control Unit 1002 and the Right Scanner Control Unit 1003.

Each of the enable-verify pairs 20610 is terminated in its characteristic impedance 1024 in a cable receiver 1021 through two balanced primary windings of a pick-off transformer 1022. Although only one representative cable receiver 1021 is shown in the drawing, it is understood that similar cable receivers are provided in the Receiver Circuit 1001 for each of the enable-verify pairs 20610.

Each of the conductor pairs 20100, 20101 of the duplicate Command Busese 0 and 1 is terminated in its characteristic impedance (not shown). However, as these conductor pairs 20100, 20101 are not discretely associated with any particular Control Unit, this termination is not accomplished in the bus receivers 1160 and 1260 of the Receiver Circuit 1001 but rather at the end of the respective Command Buses 0 and 1.

Each of the command bus conductor pairs 20100, 20101 has serially included therewith a balanced pair of primary windings of a pick-off transformer, such as 1161, in each respective bus receiver BR0, BR1 of each system component 201–901, 2032–2035. A representative bus receiver BR0 1160, BR1 1260 for each Command Bus 0 and 1 is shown in Receiver Circuit 1001, it being understood that similar bus receivers BR0, BR1 are provided in the Receiver Circuits 1301, 1401, 1501, 1601, 1701, 1801, 1901, etc., of all system components for each respective one of the command bus conductor pairs 20100, 20101.

When the Central Pulse Distributor 2031 applies an energizing pulse to an enable-verify pair 2056, or when the Central Processor 2030 applies an energizing pulse to a command bus conductor pair 2059, one conductor of the energized pair, such as 2056, is made positive with respect to the other conductor of the pair for approximately 0.5 microsecond. The pulse induced in the secondary winding of the pick-off transformer 1022, whose primary windings are in series with the conductors of the energized pair 2056, as a result of the energizing pulse applied thereto, is detected and amplified by the amplifier 1023 of the cable receiver 1021.

For purposes of simplicity, only the operation of the Right Line Network Control Unit 1202 will be described herein, it being understood that the operation of the other Control Units 1102, 1002, 1003, of the Line Switch Frame 201 is similar thereto. The basic sequence of operation is illustrated by the respective time designations shown in FIGS. 10–12, it being assumed that time $t0.0$ microsecond represents the time at which an enable signal is received from enable-verify pair 2056.

Each of the enable-verify pairs 20610 is discretely coupled to one of the enable leads 1015 via a cable receiver such as 1021. Each of the network control unit enable leads 1028 is connected to the SET terminal S of a discrete enable flip-flop such as 1110, 1111, 1210, 1211. The receipt of an enable signal from one of the enable-verify pairs 20610 will therefore SET a corresponding enable flip-flop 1110, 1111, 1210 or 1211.

The enable signal pulse is induced into the secondary winding of pick-off transformer 1022, amplified by amplifier 1023 and applied as a negative going pulse, approximately 0.25 microsecond in duration, to the SET input terminal S of enable flip-flop 1210 via enable lead 1017. Flip-flop 1210 is therefore SET at time *t*0.0 microsecond.

In its SET condition, flip-flop 1210 applies ground to its 0 output terminal and positive potential to its 1 output terminal at time *t*0.0 microsecond. These potentials remain on the 0 and 1 output terminals of flip-flop 1210 until it is RESET, as hereinafter described.

The ground on the 0 terminal of flip-flop 1210 is extended through OR gate 1212 to pulse source 1213. Responsive to the application of ground potential thereto at time *t*0.0 microsecond, pulse source 1213 generates a positive going command-accept signal at time *t*0.5 microsecond, which lasts until time *t*2.5 mircroseconds. The command-accept signal is applied, during this time interval, via lead 1283 to one of the three input terminals of schematic AND gates 1214 and 1215, respectively. The positive potential present on the 1 terminal of flip-flop 1210 in its SET condition is applied via lead 1282 to a second of the three input terminals of AND gate 1214.

As previously mentioned, each of the conductor pairs 20100, 20101 of the duplicate Command Buses 0 and 1 represents one bit of the information of which a central processor conmmand is comprised. A central processor command is communicated to the Control Units by selectively energizing the conductor pairs 20100, 20101 of Command Bus 0 or 1. The command bit pulses are received approximately 0.75 microsecond after the receipt of the enable signal associated with the command.

Since the above-described enable signal was received from enable-verify pair 2056 which is associated with Command Bus 0, the Right Line Network Control Unit 1202 will accept the central processor command present on Command Bus 0 via bus receivers such as 1160. The command bit pulses of which the conmmand is comprised are detected from those of conductor pairs 20100 which are energized, and amplified in the respective bus receivers, as represented by bus receiver BR0 1160, in a manner similar to the above-described detection of the enable signal. The command bit pulses are then applied via cable 1150 to the third input terminal of the respective AND gates 1114, 1214 and similar AND gates associated with Command Bus 0 in the bus selector circuits 1007, 1008 of the Line Scanner 1000. AND gates 1114, 1115, 1214 and 1215 schematically represent a plurality of AND gates, each having one input terminal thereof connected to one conductor of cables 1150 and 1250, and having its other input terminals connected in parallel to pulse sources 1113, 1213 and flip-flops 1110, 1111, 1210, 1211 as indicated. AND gate 1214 now has positive potential applied to all three of its input terminals during the application of the respective command bit pulses, ie., from time *t*0.75 microsecond until time *t*1.5 microseconds. During this interval of coincidence between the command bit pulses (*t*0.75 microsecond–*t*1.5 microseconds), the command-accept signal (*t*0.5 microsecond–*t*2.5 microseconds) and the positive potential on the 1 output terminal of flip-flop 1210 (*t*0.0 microsecond–flip-flop 1210 RESET), the command bit pulses of the command are received by the buffer circuit 1205 via AND gate 1214 and registered therein. The command-accept signal is purposely allowed to endure for a longer interval than the command bit pulses to provide for possible variation in the propagation time of the various command bit pulses.

As previously mentioned, each enable Control Unit generates a verify signal which is returned to the Central Pulse Distributor 2031 via the enable-verify pair from which an enable signal has been received. The verify signal is utilized by the Central Processor 2031 to assure that the proper Control Unit has been enabled and that a command-accept signal of sufficient duration to allow acceptance of the central processor command accompanying the enable signal has been generated.

Figure 12:
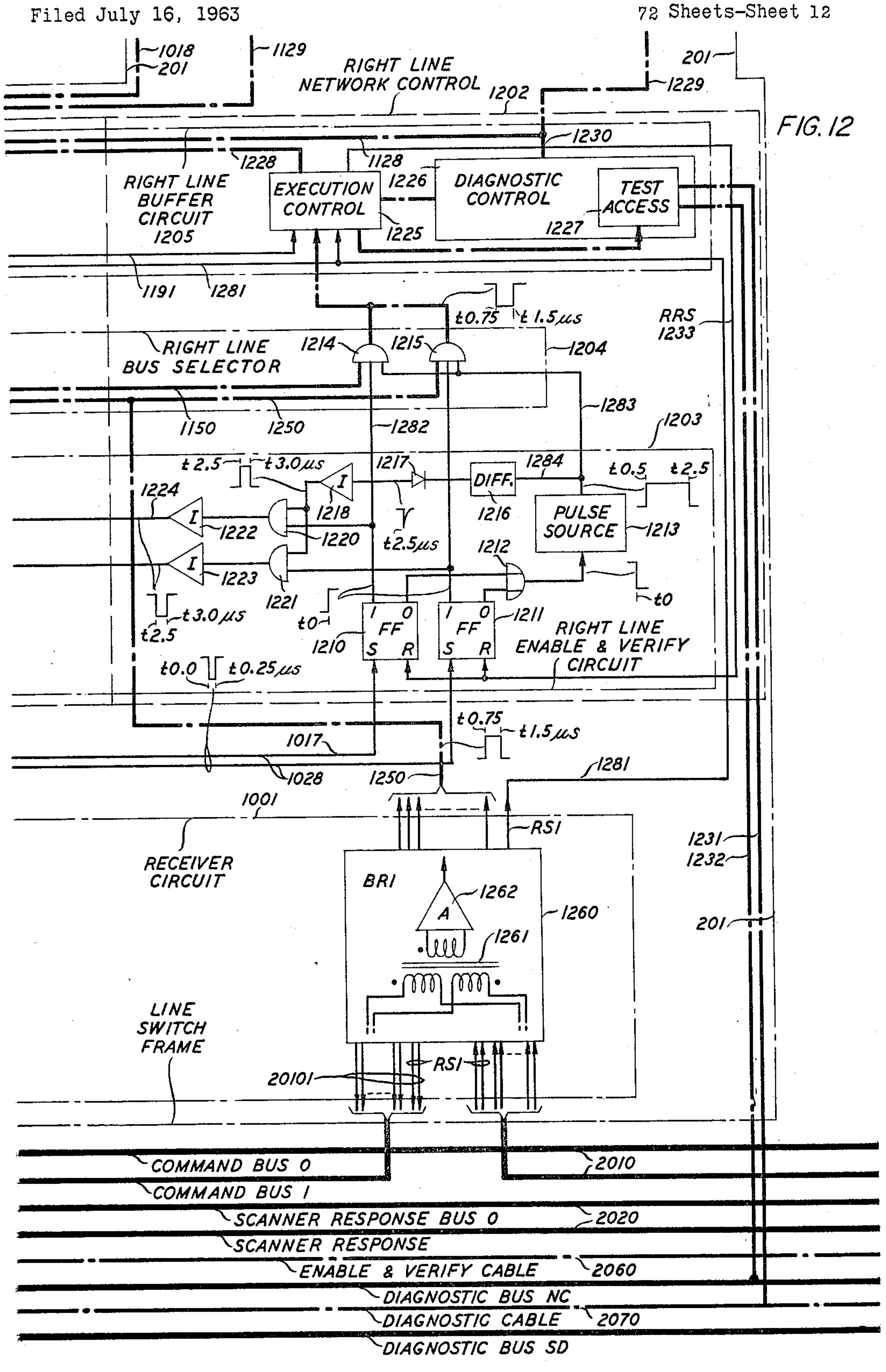

Referring now to FIG. 12, it is seen that the two microsecond command-accept pulse is also applied via lead 1284 to differentiator 1216. The differentiated command-accept signal, which appears at the output terminal of differentiator 1216, comprises a sharp positive going pulse (not shown), at time *t*0.5 microsecond and a sharp negative going pulse (not shown) at time *t*2.5 microseconds which respectively correspond in time to the start and the end of the command-accept signal pulse. Diode 1217 rectifies the output of differentiator 1216 and passes only the negative going portion thereof. This sharp negative going pulse generated at time *t*2.5 microseconds is the verify signal which is returned to the Central Pulse Distributor 2031.

The verify signal is inverted and amplified by amplifier-inverter 1218 resulting in a positive going pulse at the output terminal thereof which is approximately 0.5 microsecond in duration. The verify signal is applied 1221 are respectively connected to the 1 output terminals of the respective AND gates 120 and 121 between times *t*2.5 microseconds and *t*3.0 microseconds. The other of the two terminals of the respective AND gates 1220 and 1221 are respectively connected to the 1 output terminals of flip-flops 1210 and 1211. As previously described, flip-flop 1210 is in its SET condition and positive potential appears on its 1 output terminal. Both of the input terminals of AND gate 1220, therefore, have positive potential applied thereto from time *t*2.5 microseconds until time *t*3.5 microseconds. The output terminal of AND gate 1220 will, therefore, have a positive going pulse appearing thereon during this time interval. This positive going pulse is inverted by amplifier-inverter 1222 and applied as a negative going pulse from time *t*2.5 microseconds until time *t*3.0 microseconds to lead 1224. The verify signal, in the form of this negative going pulse, is then applied to the identical cable receiver 1021 through which the enable signal was received approximately 2.5 microseconds after receipt of the enable signal from enable-verify pair 2056.

Each verify lead 1014 is inductively coupled via an individual answer-back transformer 1025 to each of the respective enable-verify pairs 20610 in the cable receivers respectively associated therewith. As previously mentioned, only one representative cable receiver 1021 is shown in the drawing, it being understood that a similar cable receiver is provided for each of the eight enable-verify pair 20610 entering the Receiver Circuit 1001.

The negative going vertify signal pulse is applied via verify lead 1224 to positive battery potential through the primary winding of the answer-back transformer 1025, the secondary winding of which is connected across enable-verify pair 2056. The secondary winding of the answer-back transformer 1025 straddles the primary windings of the pick-off transformer 1022 in such a manner that the verify signal pulse induced therein is substantially canceled in the secondary winding of the pick-off transformer 1022. Thus, the verify signal is effectively isolated from the Right Line Network Control Unit 1202.

The receipt of the verify signal by the Central Pulse Distributor 2031 a short time later (at approximately time *t*4.5 microseconds) signifies to the Central Processor 2030, as herein before described, that the proper Control Unit 1202 has been enabled and that a command-accept signal associated with the proper Command Bus 0 has been generated by the enabled Control Unit 1202.

LINE NETWORK UNIT OPERATIONS

A central processor command to a Control Unit includes information bits identifying the type of operation to be performed by the system component and further includes other information bits identifying the location or locations within the system component at which the identified operation is to be performed. The first type of information is known as the order portion of the command, and the latter type of information is known as the address portion of the command. Several different types of orders can be executed in a Line Network Unit 210, 220 under the direction of Line Network Control Units 1102, 1202 in response to central processor commands. The purpose of the various orders described below will be more apparent when they are incorporated in the description of the processing of various types of calls by this illustrative system which appears later herein.

An FCG order (false cross and ground order) is generally commanded prior to the establishment of a connection to a line terminal 230, 235. This order results in the opening of all the first stage cross-point device contacts 260 through which a selected LA link 280 may be connected to any line terminal 230, 235, and the closing of the second stage cross-point device contacts 270 to connect a selected LB link terminal 250, 255 to the selected LA link 280. The cut-off contacts 240 of the line terminal 230, 235, to which subsequent connection is to be made, remain closed in order that supervisory monitoring of the subscriber line 202 may continue to detect a terminal 230, 235, to which subsequent connection is to establish a test connection whereby the call connection path to be established may be tested, via Line Junctor Switch Frame 301, for foreign potentials prior to the final establishment of the call connection to a selected line terminal 230. This test is further described later herein with reference to Line Junctor Switch Frame 301.

A connect order is used to establish a partial call connection through a Line Network Unit 210, 220 and to discontinue the supervisory monitoring of the selected line terminal 230, 235 to which connection is to be made. This order results in the closing of the first and second stage cross-point device contacts 260, 270 through which the selected line terminal 230, 235 is connected via the selected LA link 280 to the selected LB link terminal 250, and in the opening of the cut-off contacts 240 through which the selected line terminal 230, 235 is connected to the line scanner ferrod matrix 1004 via scanner cable 1018.

The restore-cut-off order is generally commanded when the Central Processor 2030 receives supervisory information indicating that a call connection is no longer in use and supervisory monitoring of the line terminal 230, 235 to which the call connection was established should therefore resume. This order results in the opening of all first stage cross-point device contacts 260 through which a selected line terminal 230, 235 may be connected to any LA line 280 and in the closing of the cut-off contacts 240 associated with the selected line terminal 230, 235 thereby reconnecting the line terminal 230, 235 to its associated ferrod in the Line Scanner Ferrod Matrix 1004 via scanner cable 1018.

The connect-with-cut-off closed order is used to provide a path for a restore-cut-off-verification test. This order results in the closing of first and second stage cross-point contacts 260, 270 analogous to those closed as a result of the above-described connect order; however, the cut-off contacts 240 associated with the selected line terminal 230, 235 remain closed. A successful restore-cut-off-verification test assures that supervisory monitoring of the selected line terminal 230, 235 has been resumed, and that service requests from the subscriber line 202 terminated thereon will be detected by the Line Scanner 1000. This test may also be used to test specific ferrods of the Line Scanner Matrix 1004. A more detailed description of the restore-cut-off-verification test is included later herein with reference to Line Junctor Switch Frame 301.

The remove-cut-off order is used to discontinue supervisory monitoring of a selected line terminal 230, 235. This order results in the opening of the cut-off contacts 240 through which a selected line terminal 230, 235 is connected to the Line Scanner Matrix 1004.

MODE OF OPERATION CONTROL

In addition to commanding various switching and supervisory operations in the Line Switch Frame 201, the Central Processor 2030 can selectively command the Line Network Control Units 1102, 1202 to enter the several nonnormal modes of operation hereinbefore described. Since these modes of operation are usually entered when a Control Unit is not operating properly, a Line Network Control Unit 1102, 1202 is placed in a nonnormal mode of operation responsive to central processor commands directed to the other Line Network Control Unit 1202, 1102 of the Line Switch Frame 201. For example, if it is desired to place the Left Line Network Control Unit 1102 in the quarantine mode of operation, a command is directed to the Right Line Network Control Unit 1202 which then directs operations in the Left Line Network Control Unit 1102 to disassociate the Left Line Network Control Unit 1102 from the Basic Line Network Unit 210. This method of operation assures that central processor commands, the execution of which are to accomplish actual system operations, are always directed to a properly operating Control Unit.

Mode of operation control is accomplished in a Line Switch Frame 201 responsive to a test order. The execution of a test order does not involve any operations within the Line Network Units 210, 220 but is concerned with the control of one Line Network Control Unit 1102 by the other Line Network Control Unit 1202 (or vice versa) of a Line Switch Frame 201.

There are several types of test orders. The order portion of the control processor command incorporating a test order alerts the Line Network Control Unit 1102, 1202, to which the command is directed, that one of the various types of test orders is to be performed. The address portion of this central processor command contains specific information bits which identify the type of test order to be performed.

The various types of test order operations include placing a Line Network Control Unit 1102, 1202 in quarantine mode of operation, placing a Line Network Control Unit 1102, 1202 in the test point access mode of operation and returning a Line Network Control Unit 1102, 1202 from either or both of these nonnormal modes of operation to a normal mode of operation.

A brief discussion of the manner in which a Line Network Control Unit 1102 is placed in various nonnormal modes of operation follows. Buffer circuit 1205 of Right Line Network Control Unit 1202 comprises an execution control 1225 and a diagnostic control 1226. The command bits comprising the order and address portion of an accepted central processor command are registered in the execution control 1225. The order bits are processed by translation and logic circuitry to ascertain the type of operation to be performed, and the address bits are processed by translation and logic circuitry to ascertain the locations within the associated Line Network Unit 220 at which the command is to be executed. As previously mentioned, the Right Line Network Control Unit 1202 normally controls switching operations in the Supplementary Line Network Unit 220. This control is accomplished by way of the diagnostic control 1226 for reasons which will be more apparent hereinbelow. Included in the address portion of the accepted command is information identifying in which of the two Line Network Units 210, 220 the command is to be executed. When the Left Line Network Control Unit 1102 is in the quarantine mode, as hereinafter described, the execution control 1225 of the right buffer circuit 1205 can control switching operations in the Basic Line Network Unit 210 via cables 1228 and 1129, thereby bypassing diagnostic control 1126 when so commanded by the Central Processor 2030.

The diagnostic control 1226 serves two basic purposes, It provides controllable connecting means (herein designated test access circuit 1227) between the aforenoted strategic supervisory and diagnostic scan points of the right line network conrtol unit 1202 and the Diagnostic Cable 2070 and Diagnostic Bus NC. It further provides controllable connecting means between the execution control 1225 and the Supplementary Line Network Unit 220, which is normally directed by the Right Line Network Control Unit 1202. It is by way of the diagnostic control 1126 that the associated Left Line Network Control Unit 1102 is placed in the above-mentioned nonnormal modes of operation.

To place the Left Line Network Control Unit 1102 is a quarantine mode of operation, a central processor command including a test order is directed to Right Line Network Control Unit 1202. This command is accepted and registered in execution control 1225 are previously described. Execution control 1225 processes the order and address bits of the command to ascertain the type of test order commanded. Execution control 1225 then directs diagnostic control 1126 of the Left Line Network Control Unit 1102 via cables 1228 and 1130 to disconnect execution control 1125 of Left Line Network Control Unit 1102 from the Basic Line Network Unit 210. Thus, when the Left Line Network Control Unit 1102 is placed in the quarantine mode, the aforenoted controllable connecting means between the execution control 1125 and the Basic Line Network Unit 210 is disabled. Commands directed to the Left Line Network Control Unit 1102 therefore will result in a complete command execution cycle of operation by Left Line Network Control Unit 1102, but will have no effect upon the Basic Line Network Unit 210.

The Left Line Network Control Unit 1102 is placed in the test point access mode of operation responsive to a central processor command including a test order which is directed to Right Line Network Control Unit 1202. The command is received and registered in execution control 1125. Execution control 1225 processes the command information bits and, in response thereto, directs diagnostic control 1126 via cables 1228 and 1130 to enable test access circuit 1127. The enablement of test access circuit 1127 connects the diagnostic scan points of the Left Line Network Control Unit 1102 via cable 1131 to Diagnostic Bus NC. The supervisory scan points of Left Line Network Control Unit 1102, which are normally connected via cable 1132 to the Diagnostic Cable 2070, are transferred by test access circuit 1127 to the Diagnostic Bus NC via cable 1131.

The return of Left Line Network Control Unit 1102 to a normal mode of operation from either of the above-described nonnormal modes is accomplished in response to a central processor command received and registered in execution control 1225 of Right Line Network Control Unit 1202. This command also includes a test order, the address bits providing information as to the type of test order to be performed. Execution control 1225 controls diagnostic control 1126 via cables 1228 and 1130 to reconnect execution control 1125 to the Basic Line Network Unit 210, or to disconnect the diagnostic and supervisory scan points from Diagnostic Bus NC and reconnect the supervisory scan points to the Diagnostic Cable 2070 via cable 1132. As previously mentioned, a Network Control Unit 1102 can be in both the quarantine mode and the test point access mode at the same time.

RESET

The final step in the command execution cycle of a Line Network Control Unit 1202 is the generation by the execution control 1225 of an internal RESET signal. The internal RESET signal prepares the circuitry of the execution control 1225 for the reception of another central processor command. The RESET signal is also applied via right RESET lead 1233 to the RESET input terminal R of enable flip-flops 1210, 1211. Assuming enable flip-flop 1210 is in a SET condition, as previously described, it will be reset by the RESET signal on lead 1233. The positive potential applied to AND gates 1214 and 1220 via lead 1282 from the 1 terminal of flip-flop 1210 is thereby removed, and central processor commands are excluded from buffer circuit 1205 until another enable signal causes enable flip-flop 1210 to be set, and the above-described enable-verify operation is repeated.

LINE SCANNER 1000

In addition to the above-described Line Network Units 210 and 220 and Network Control Units 1102, 1202, each Line Switch Frame 201 further includes a Line Scanner 1000 which monitors the supervisory state of respective subscriber lines 202 which are terminated on the two Line Network Units 210, 220. Line Switch Frames such as 201 are the only type of Switch Frame which includes a Scanner.

The Line Scanner 1000 includes a Scanner Matrix 1004 which comprises a plurality of ferrods. Each ferrod is connected via line scanner cable 1018 to an individual line terminal 230, 235 of Line Network Units 210, 220. The supervisory condition of the respective subscriber lines 202 terminated on line terminals 230, 235 is reflected by the supervisory state of the ferrods individually connected thereto. The ferrods are selectively interrogated in response to central processor commands. The states of the interrogated ferrods are transmitted via cables 1011, 1012 and the Scanner Response Bus System 2020 to the Central Processor 2030. In this manner, service requests from subscriber lines 202 are detected by the Central Processor 2030 in accordance with system program routines.

The Line Scanner 1000 of Line Switch Frame 201 shares the Receiver Circuit 1001 of the Line Switch Frame 201 with the Line Network Control Units 1102, 1202 thereof. Each of the Scanner Control Units 1002, 1003 comprises a scanner enable-verify circuit 1009, 1010, a bus selector circuit 1007, 1008 and a buffer circuit 1005, 1006 which function in a manner similar to the corresponding circuits 1103, 1203, 1104, 1204, 1105, 1205, respectively, of the Left and Right Line Network Control Units 1102, 1202. A detailed description of a scanner analogous to the Line Scanner 1000 is given in the aforenoted copending U.S. patent application of A. M. Guercio et al. which has been included herein by reference. The Line Scanner 1000 is similar in general operation to the Trunk and Junctor Scanners 1500, 1800, 1900 as described above and further described later herein.

Although the Line Scanner Control Units 1002, 1003 cannot be placed in a quarantine mode of operation in response to central processor commands received thereby, each Line Scanner Control Unit 1002, 1003 is discretely associated with one of the Line Network Control Units 1102, 1202 and is disabled when the associated Line Network Control Unit 1102, 1202 enters the quarantine mode of operation.

*Junctor switch frame 301 (functional description)*

Figure 3:
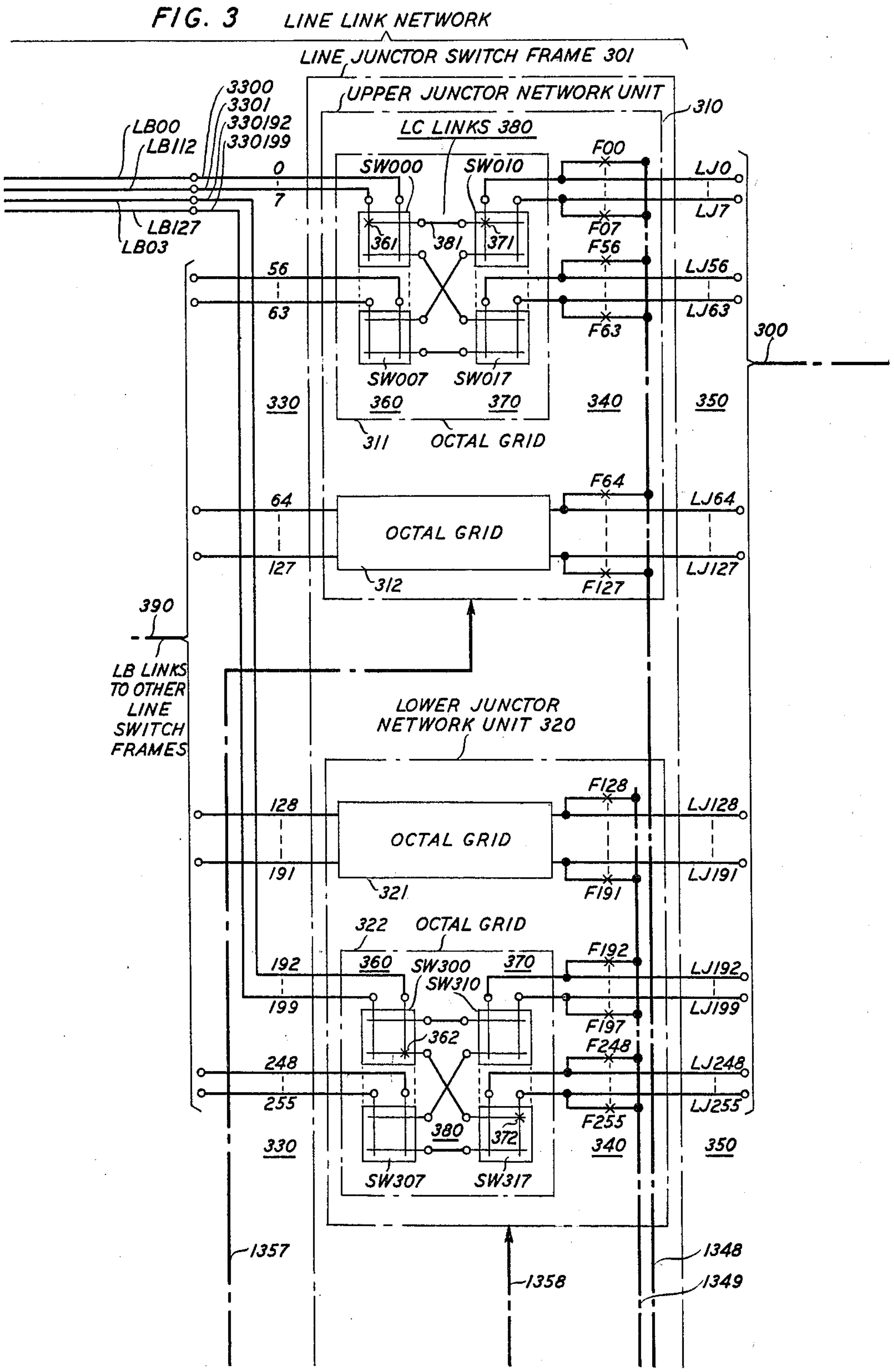
FIGS. 3 and 13 are a schematic representation of a Line Junctor Switch Frame.
Figure 6:
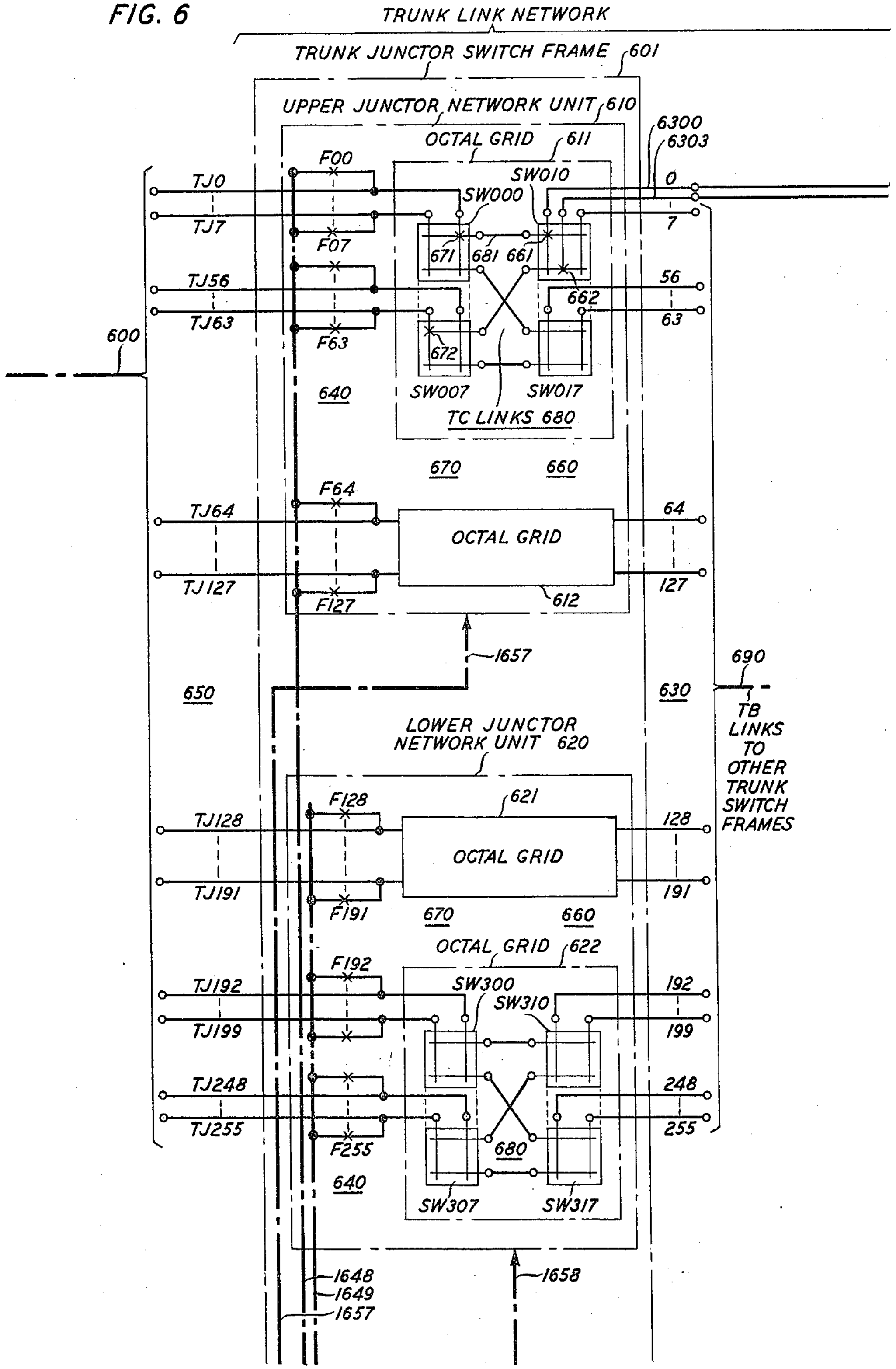
FIGS. 6 and 16 are a schematic representation of a Trunk Junctor Switch Frame.
Figure 13:
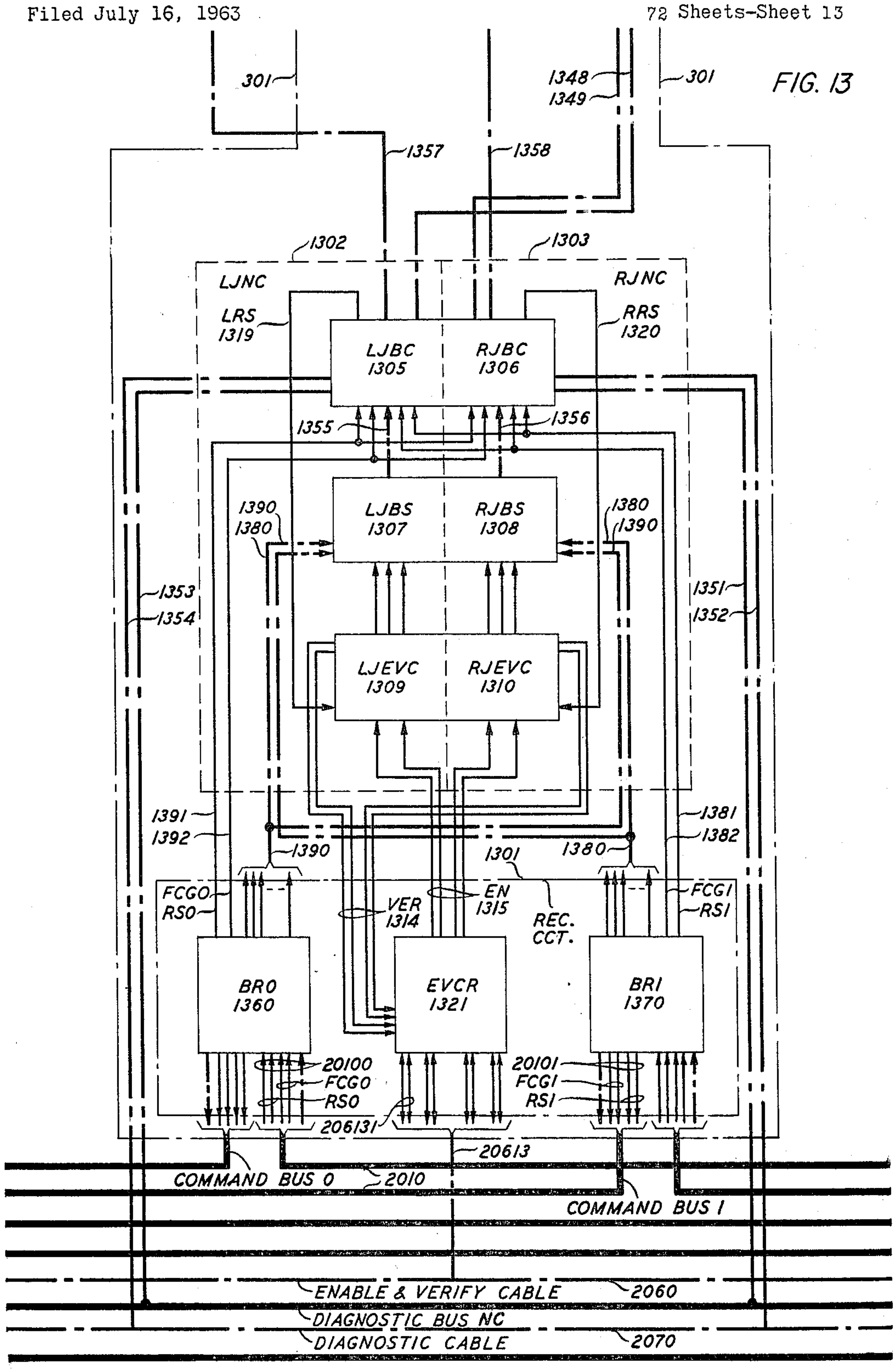
Figure 16:
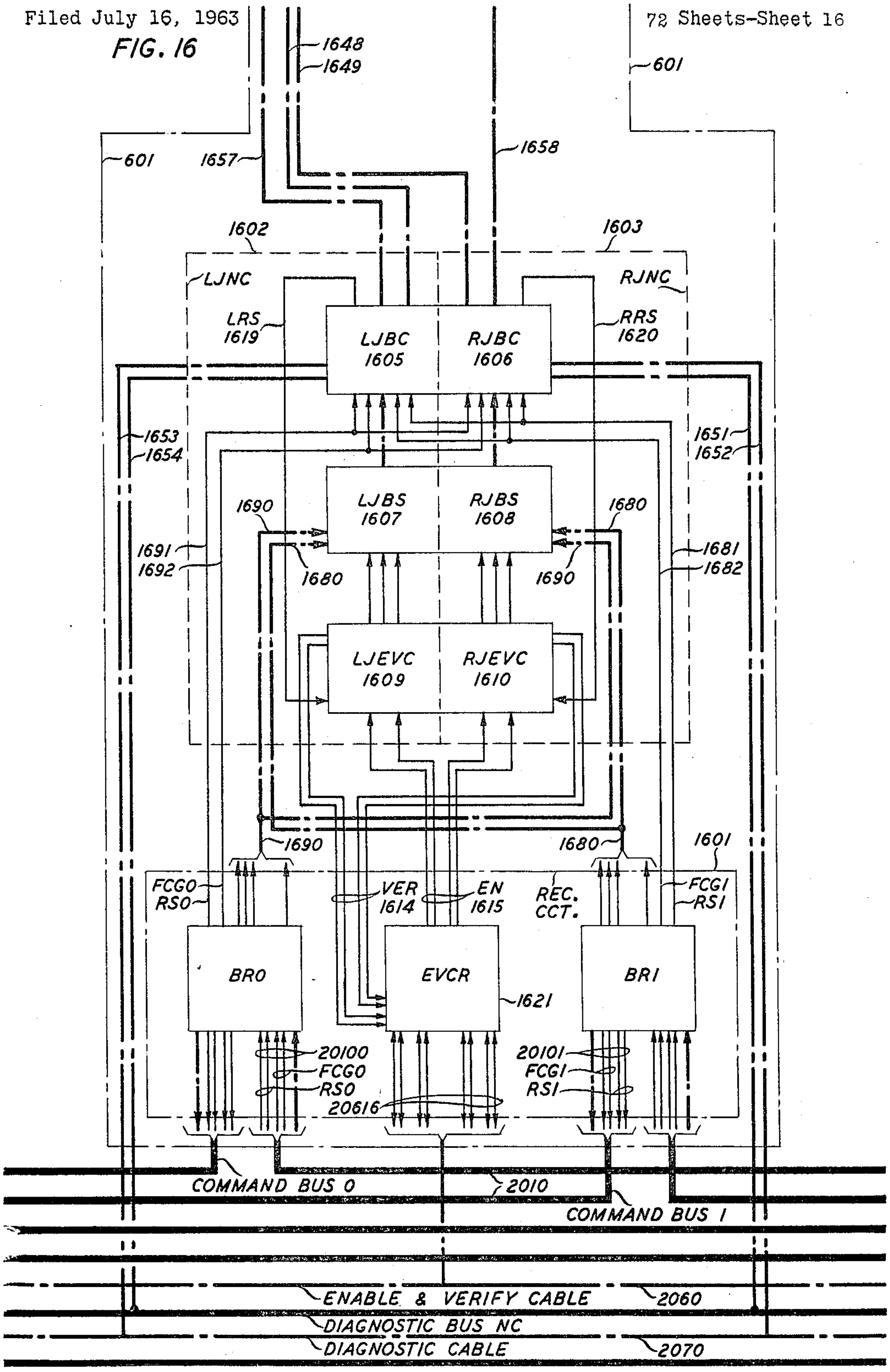

FIGS. 3 and 13 illustrate the organization of a typical Line Junctor Switch Frame 301. FIGS. 6 and 16 illustrate the organization of a typical Trunk Junctor Switch Frame 601. Trunk Junctor Switch Frame 601 and Line Junctor Switch Frame 301 are identical except for their respective locations in the switch train of the switching network. Although only one Line Junctor Switch Frame 301 is shown in the drawing, a plurality of Line Junctor Switch Frames may be included in the switching system. The aforenoted patent application of A. Feiner describes an arrangement of a plurality of Line Junctor Switch Frames in an illustrative switching network. A fully detailed description of a Junctor Switch Frame is given herein following the more general description below.

Line Junctor Switch Frame 301 includes two modular Junctor Network Units 310, 320, two Junctor Network Control Units 1302, 1303 and a Receiver Circuit 1301 through which the Junctor Network Control Units 1302, 1303 are inductively coupled to their discretely associated enable-verify pairs 20613 of the Enable-Verify Cable 2060 and to each of the conductor pairs 20100, 20101 of the respective Command Buses 0 and 1.

JUNCTOR NETWORK UNITS 310, 320

The network portion of Line Junctor Switch Frame 301 includes two Junctor Network Units 310, 320, which are designated Upper Junctor Network Unit 310 and Lower Junctor Network Unit 320. A Junctor Network Unit such as 310 comprises two octal grids 311, 312 each providing selectable, bidirectional, connecting facilities between sixty-four LB link terminals 330 and sixty-four line junctor terminals 350 via LC interstage links 380 through two switching stages 360, 370.

A junctor network unit partial call connection, between a selected LB link terminal 3301 and a selected line junctor terminal LJ0, is established by selecting an LC link 381 and closing the crosspoint switching device contacts 361 and 371 at the respective first and second stage crosspoints of the selected LB link and line junctor terminals 3301, LJ0 and the selected LC link 381.

A Junctor Network Unit, such as 310, further includes test-vertical relay contacts 340 whereby each line junctor terminal 350 is connectable through discrete test-vertical relay contacts 340 and via test-vertical cables 1348, 1349 to the respective Junctor Network Control Units 1302, 1303. The test-vertical relay contacts 340 provide a means of access to the switching network via the line junctor terminals 350 for certain test operations which are described later herein.

JUNCTOR NETWORK CONTROL UNITS 1302, 1303

The two Junctor Network Control Units 1302, 1303 of Line Junctor Switch Frame 301 are respectively designated Left Junctor Network Control Unit 1302 and Right Junctor Network Control Unit 1303. The Left Junctor Network Control Unit 1302 normally controls switching operations in the Upper Junctor Network Unit 310. However, when Left Junctor Network Control Unit 1302 is placed in the combined mode of operation (i.e., when Right Junctor Network Control Unit 1303 is in the quarantine mode of operation), it also controls switching operations in the Lower Junctor Network Unit 320. Correspondingly, Right Junctor Network Control Unit 1303 normally controls switching operations in the Lower Junctor Network Unit 320. However, when in the combined mode of operation, Right Junctor Network Control Unit 1303 can also control switching operations in the Upper Junctor Network Unit 310.

A Junctor Network Control Unit, such as 1302, comprises an enable-verify circuit 1309 which receives a central pulse distributor enable signal, generates a command-accept signal and subsequently generates a verify signal; a bus selector 1307 which accepts the central processor command from Command Bus 0 or 1 as indicated by the particular enable lead 1315 energized responsive to the enable signal; and a buffer circuit 1305 which registers the accepted central processor command, controls the execution thereof within Junctor Network Unit 310, and subsequently generates a RESET signal via left RESET lead 1319 to prepare itself and enable-verify circuit 1309 for the recepit of another enable signal and accompanying central processor command.

ENABLE-VERIFY OPERATION

The enable-verify operation in a Junctor Network Control Unit 1302, 1303 is completely analogous to the previously described enable-verify operation of a Line Network Control Unit 1102, 1202. The central processor command is received and registered in the junctor buffer circuit 1305, 1306 from Command Bus 0 or 1 in accordance with the enable-verify pair 20613 from which the enable signal was received. A verify signal is subsequently returned from enable-verify circuit 1309, 1310 via the appropriate verify lead 1314 and the enable-verify cable receiver 1321 through which the enable signal was received.

JUNCTOR NETWORK OPERATIONS

As in the case of the previously described Line Switch Frame 201, several different types of orders can be executed in a Junctor Network Unit 310, 320 under the direction of Junctor Network Control Units 1302, 1303 in response to central processor commands. The purpose of the various orders described below will be more apparent when they are incorporated in the description of the processing of various types of calls by this illustrative system which appears later herein.

A connect-with-FCG order is usually commanded prior to the establishment of a connection to a line terminal 230 by a Line Switch Frame 201. This order is generally associated with the above-described FCG order executed by a Line Switch Frame 201. The connect-with-FCG order results in the closing of the first and second stage crosspoint device contacts 360 and 370 through which a selected LB link terminal 330 is connected via a selected LC link 380 to a selected line junctor terminal 350, and in the closing of the test-vertical relay contacts 340 through which the selected line junctor terminal 350 is connected via a test-vertical cable 1348, 1349 to a junctor network buffer circuit 1305, 1306. The connect-with-FCG order is used to establish a test connection whereby the call connection path to be established may be tested for foreign potentials prior to the final establishment of the call connection to a selected line terminal 230 by a Line Switch Frame 201.

A connect order is used to establish a partial call connection through a Junctor Network Unit 310, 320 and to disconnect the line junctor terminal 350 from the junctor buffer circuit 1305, 1306. This order results in the closing of first and second stage crosspoint device contacts 360, 370 similar to those which were closed responsive to the above-described connect-with-FCG order; however, the test-vertical relay contacts 340 associated with the selected line junctor terminal 350 are opened if previously closed.

A restore-verify order is used to establish a partial test path via test-vertical relay contacts 340 to determine whether or not cut-off relay contacts 240 on Line Switch Frame 201 have been closed responsive to a restore-cut-off order or a connect-with-cut-off-closed order directed to Line Switch Frame 201. This order results in the closing of identical first and second stage cross-point contacts 360, 370 and test-vertical relay contacts 340 as the above-described connect-with-FCG order; however, the testing operations performed by the connected junctor buffer circuit 1305, 1306 are different, as described later herein.

An operate-no-test order is used to give access to the switching network via Line Junctor Switch Frame 301 for providing an operator bridge on busy call connections or for miscellaneous test purposes without interrupting the connection. This order results in the closing of the test-vertical relay contacts 340 associated with a selected line junctor terminal 350.

A remove-no-test-FCG-verify order is used to open the test-vertical relay contacts 340 associated with a selected line junctor terminal 350 which were previously closed responsive to either a prior connect-with-FCG order, a connect-verify order or an operate-no-test order. This order results in the opening of the test-vertical relay contacts 340 through which a selected line junctor terminal 350 is connected via a test-vertical cable 1348, 1349 to a junctor buffer circuit 1305, 1306.

MODE OF OPERATION CONTROL

A further type of order which may be executed by a Line Junctor Switch Frame 301 is the test order. The execution of a test order does not involve any operations within the Junctor Network Units 310, 320 but is concerned with the control of one Junctor Network Control Unit 1302 by the other Junctor Network Control Unit 1303 (or vice versa) of a Junctor Switch Frame 301. The several types of test orders which may be performed by a Line Junctor Switch Frame 301 are similar to those previously described with reference to Line Switch Frame 201 and will not be further described herein.

JUNCTOR SWITCH FRAME TEST-VERTICAL OPERATIONS

The junctor buffer circuits 1305, 1306 are substantially similar to the previously described line buffer circuits 1105, 1205. However, in addition to translation and logic circuitry similar to that of line buffer circuits 1105, 1205, junctor buffer circuits 1305, 1306 include test circuitry whereby various tests are performed on the transmission paths of the switching network. In performing a test on a transmission path, the test-vertical relay contacts 340 of Line Junctor Switch Frame 301 are used. A test element, within the test circuitry of a junctor buffer circuit 1305, 1306, is connected to the selected network transmission path, the test is performed, its results are transmitted to the Central Processor 2030 and the test element is then disconnected from the selected transmission path upon which the test was performed.

To initiate the performance of a test, the Central Processor 2030 transmits appropriate commands to the Switch Frames, such as Line Switch Frame 201 and Line Junctor Switch Frame 301, commanding the establishment of the transmission path upon which the test is to be performed. The central processor command to Line Junctor Switch Frame 301 also results in the connection of a test-vertical cable, such as 1348, via test-vertical relay contacts, such as FO0, to the junctor terminal, such as LJ0, included in the selected transmission path. Subsequent to the establishment of the above transmission path and test-vertical cable connection, one of several types of test elements is selected by the junctor buffer circuit, such as 1305, and connected to the test-vertical cable 1348. The test is then performed, the result being reflected in an appropriate one of the system Scanners, for example Line Scanner 1000 or Master Scanner 2032. The Central Processor 2030 then commands the appropriate Scanner 1000 or 2032 to return the test result via the Scanner Response Bus System 2020 to the Central Processor 2030. In response to a subsequent enable signal the test element is automatically disconnected from the test-vertical cable 1348, and in response to a subsequent central processor command the test-vertical cable 1348 is disconnected from the line junctor terminal LJ0.

The particular type of test to be performed is determined from the order portion of the central processor command directed to the Line Junctor Switch Frame 301. The transmission path upon which the test is to be performed and the test-vertical relay contacts 340 which are to be closed are determined from the address portion of the central processor command.

Before commencing a test operation, it is advantageous to be certain that the transmission path upon which the test is to be performed has been established. The initiation of the test is therefore delayed sufficiently to allow the establishment of the transmission path and the establishment of the test connection. Each Command Bus 0 and 1 includes a conductor pair FCG0, FCG1 via which a pulse known as an FCG pulse is transmitted from the Central Processor 2030 at predetermined time intervals. The FCG pulse serves two purposes. It serves as a start signal for the performance of various transmission path tests by the test circuitry of junctor buffer circuits 1305, 1306. It also serves as a time check point for the Junctor Network Control Units 1302, 1303 to check their own operating cycles against the allowable command execution cycle time.

The FCG pulse is transmitted periodically via both Command Buses 0 and 1 whether or not a central processor command has preceded it. It, therefore, is incumbent upon the Central Processor 2030 to transmit its commands to Junctor Switch Frames, such as 301, at the appropriate time between FCG pulses to provide the proper time interval for establishing the test connection and the transmission path upon which the test is to be performed.

The FCG test (false cross and ground test) is provided to detect possible foreign potentials which may be present on transmission paths through the switching network. In response to a connect-with-FCG order, a portion of the transmission path to be tested is established through the appropriate Junctor Network Unit, for example 310, a test-vertical connection is made to the transmission path via a junctor terminal, such as LJ0, and a current detecting device is connected via the test-vertical cable 1348 and test-vertical contacts F0 to the junctor terminal LJ0 of the transmission path to be tested. The FCG pulse is received by the Junctor Network Control Unit 1302 after sufficient time has elapsed for the establishment of these connections. In response to the receipt of the FCG pulse the detecting device is interrogated, and one of the previously mentioned supervisory scan points of the junctor buffer circuit 1305 reflects the result of the interrogation.

The supervisory scan points, as previously described, are connected via cable 1354 to the Diagnostic Cable 2070 and thence to Master Scanner 2032. Central Processor 2030 then commands the Master Scanner 2032 to return information to the Central Processor 2030 which is indicative of the state of the supervisory scan points via the Scanner Response Bus System 2020. The Central Processor 2030 is thus informed of the successful or unsuccessful result of the FCG test.

The test circuitry of junctor buffer circuit 1305 is arranged so that the next enable signal received by Junctor Network Control Unit 1302 will cause the disconnection of the detection element from the test vertical cable 1348. The test-vertical contacts F0 are released in response to a subsequent central processor command.

The restore-cut-off-verification tests, as previously mentioned, are used to check the reconnection of a line terminal 230, 235 to its associated ferrod in the Line Scanner Matrix 1004 subsequent to the transmission of a connect-with-cut-off-closed command to a Line Switch Frame 201. The restore-cut-off-verification test operation is initiated in response to an FCG pulse following the establishment of a transmission path and a test vertical connection. A transmission path from a selected junctor terminal LJ0 to the line terminal L448 upon which the test is to be made is established in response to a connect-with-cut-off-closed order to Line Switch Frame 201 and a restore-verify order to Line Junctor Switch Frame 301. An FCG pulse is then received by junctor buffer circuit 1305. In response to the FCG pulse and to the order portion of the priorly received restore-verify order, the test circuitry of the junctor buffer circuit 1305 connects a resistance element to the transmission path via test-vertical cable 1348, test-vertical contacts F0 and the line junctor terminal LJ0 included in the transmission path. The resistance element is connected in such a manner as to simulate a subscriber station off-hook condition. If the ferrod of the Line Scanner Matrix 1004 has been reconnected to the selected line terminal L448 via cut-off contacts CO448, the simulated off-hook condition will be reflected thereby. The Line Scanner 1000 is then commanded by Central Processor 2030 to return information via the Scanner Response Bus System 2020 which indicates to the Central Processor 2030 the state of the ferrod associated with the selected line terminal L448. If the indicated state reflects an off-hook condition to the Central Processor 2030, the connection of the line terminal L448 to its associated ferrod in the Line Scanner Matrix 1004 is verified. The receipt by Junctor Network Control Unit 1302 of a subsequent enable signal initiates the disconnection of the off-hook simulating resistance element from the test-vertical cable 1348. A subsequent FCG command to the Line Switch Frame 201 will open the first stage cross-point contacts 260 of the test connection. A subsequent remove-no-test-FCG-verify command to the Line Junctor Switch Frame 301 will cause the test-vertical relay contacts FO0 to be opened.

The no-test operation is used to provide access from some external source to the transmission paths of the switching network. Various uses of such an access point are well known in the telephone art and will not be discussed herein. The establishment of a no-test connection is similar to the above-described FCG and restore-cut-off-verification test operations in that a connection from the external circuit is established via the test circuitry of a junctor buffer circuit 1305, 1306 and a test-vertical cable 1348, 1349 to a selected junctor terminal 350 responsive to an FCG pulse and a previously received central processor command. However, the no-test connection is not automatically removed in response to the receipt of a subsequent enable signal. The no-test connection is allowed to remain until a remove-no-test order is received from the Central Processor 2030. During the time that the test-vertical relay contacts 340 are being used for a no-test connection, no FCG or restore-cut-off-verification tests can be performed, only one connection through the test circuitry of a junctor buffer circuit 1305, 1306 being possible at any given time.

In brief summary of the Junctor Switch Frame test-vertical operations, a transmission path to be tested is first established through the network in response to appropriate central processor commands to appropriate Switch Frames, the command to the Line Junctor Switch Frame further resulting in the connection of the test circuitry of a junctor buffer circuit 1305, 1306 to the transmission path under test via a test-vertical cable 1348, 1349 and test-vertical relay contacts 340. An FCG pulse is then received, and the appropriate test is performed. The Central Processor 2030 then requests information relating to the test results from the appropriate Scanner 1000, 2032, which returns the requested information to the Central Processor 2030 via the Scanner Response Bus System 2020. The next enable signal received by the Junctor Network Control Unit 1302, 1303 initiates the disconnection of the testing device from the test-vertical cable 1348, 1349. A further central processor command is necessary to cause the disconnection of the test-vertical cable 1348, 1349 from the junctor terminal 350 included in the transmission path upon which the test was performed.

*Junctor switch frame (detailed description)*

FIGS. 21 through 65 illustrate in partial detail the organization of a typical Junctor Switch Frame. As set forth hereinbelow, Line Junctor Switch Frames and Trunk Junctor Switch Frames are identical in organization and operation. The following description therefore refers both to Line Junctor Switch Frames and to Trunk Junctor Switch Frames.

Each circuit element, lead and cable shown on FIGS. 21–65 is numerically designated. The first two digits of each numerical designation correspond to either the number of the figure on which the designated circuit element is shown or the number of the figure on which the designated lead or cable originates. For example, pulse generator 5703 is shown on FIG. 57. As a further example, lead 6392 originates on FIG. 63 and appears on FIGS. 54, 57, 58, 59 and 60 as lead 6392.

The control winding of each relay shown in FIGS. 21–65 is given a letter designation. The contacts associated with each relay are given an identical letter designation. Where relay contacts are shown in a figure other than that on which the control winding is shown, the number of the figure on which the control winding is shown follows the letter designation of the contacts. For example, the control winding of relay LTP is shown on FIG. 61. Various contacts of relay LTP are shown on FIGS. 47 and 51 as well as FIG. 61. These contacts are designated LTP (61), thus indicating that the associated control winding is shown on FIG. 61.

This detailed description of a Junctor Switch Frame will be presented in three basic parts: first, a brief description of the various circuits of the Junctor Switch Frame; second, a description of the enable-verify and command execution operations in general; and third, a description of several specific command execution operations.

JUNCTOR SWITCH FRAME CIRCUITS

Figure 63:
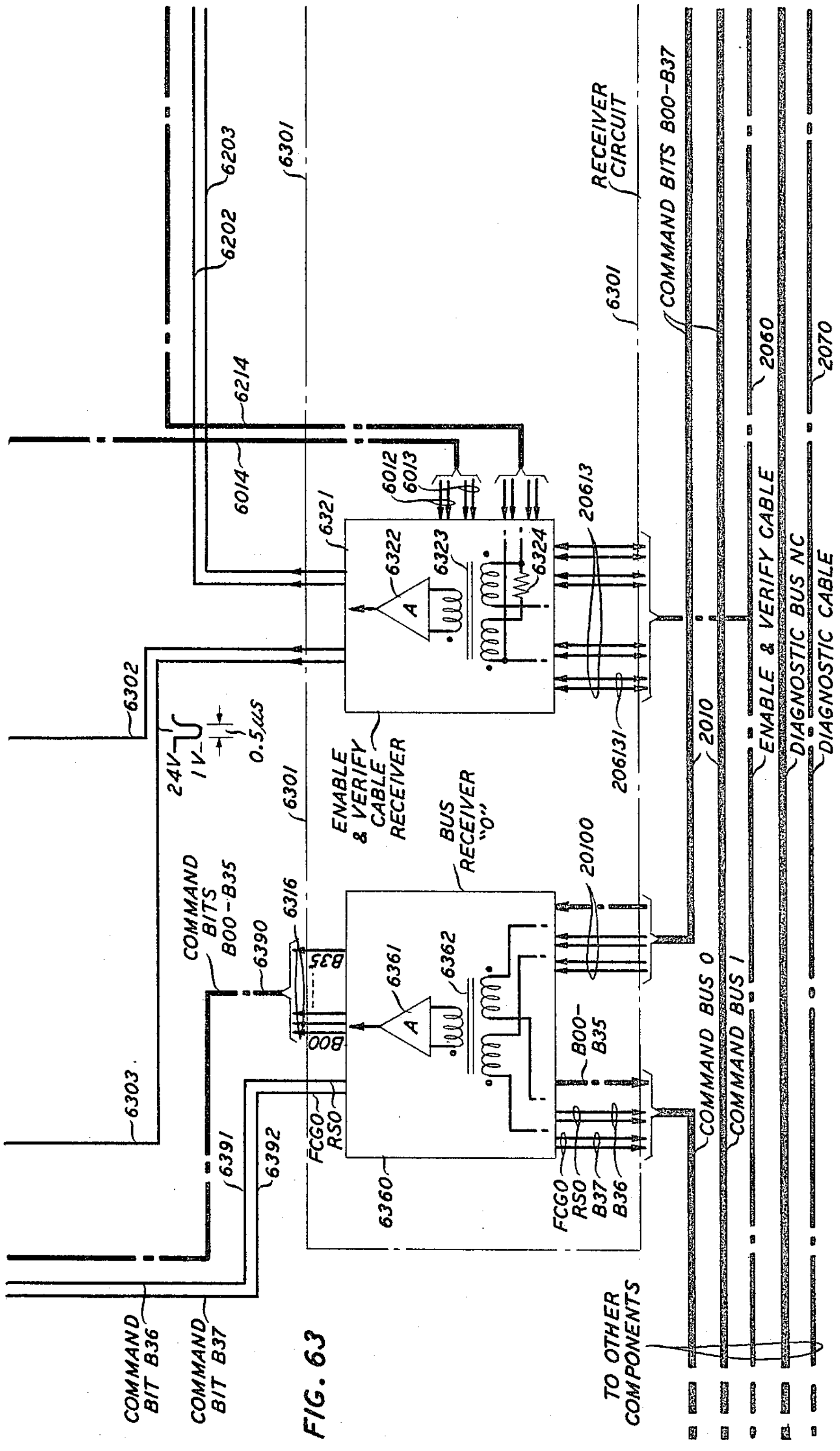
Figure 64:
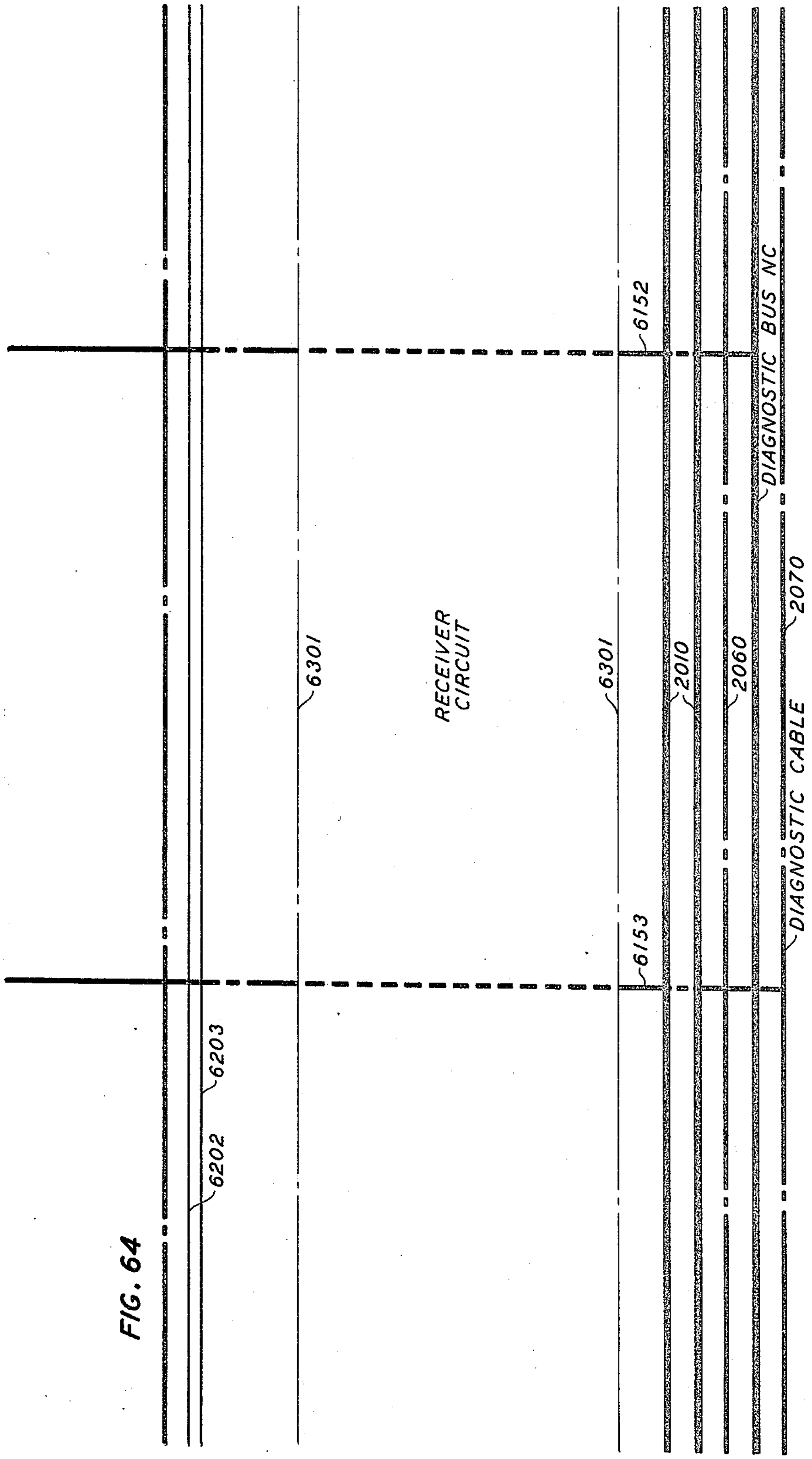

*Receiver Circuit 6301.*—FIGS. 63–65 illustrate the Receiver Circuit 6301 of a Junctor Switch Frame. As previously described, Receiver Circuits, such as 6301, of all system components serve to inductively couple the Command Buses 0 and 1 and the Enable-Verify Cable 2060 to the respective system network components. Receiver Circuit 6301 comprises a bus receiver 6360 for each of the respective conductor pairs 20100 of Command Bus 0, a bus receiver 6570 for each of the respective conductor pairs 20101 of Command Bus 1, and an enable-verify cable receiver 6321 for each of the respective enable-verify pairs 20613 which are discrete to the Junctor Switch Frame.

*Junctor Network Control Units.*—As previously described, a Junctor Switch Frame includes two Junctor Network Control Units each of which is associated with a particular Junctor Network Unit. Generally speaking, the Left Junctor Network Control Unit is illustrated by FIGS. 39, 41 through 43, 45 through 47, 49 through 51, 53 through 55, 57, 58, 60, 61, 63 and 64; and the Right Junctor Network Control Unit is illustrated by FIGS. 40, 44, 48, 52, 56, 59 and 62. Only the Left Junctor Network Control Unit has been shown in detail since the Right Junctor Network Control Unit is a substantial duplicate thereof. This description is directed to the circuitry of the Left Junctor Network Control Unit, with a few minor exceptions.

Enable-Verify Circuit 6009

Figure 57:
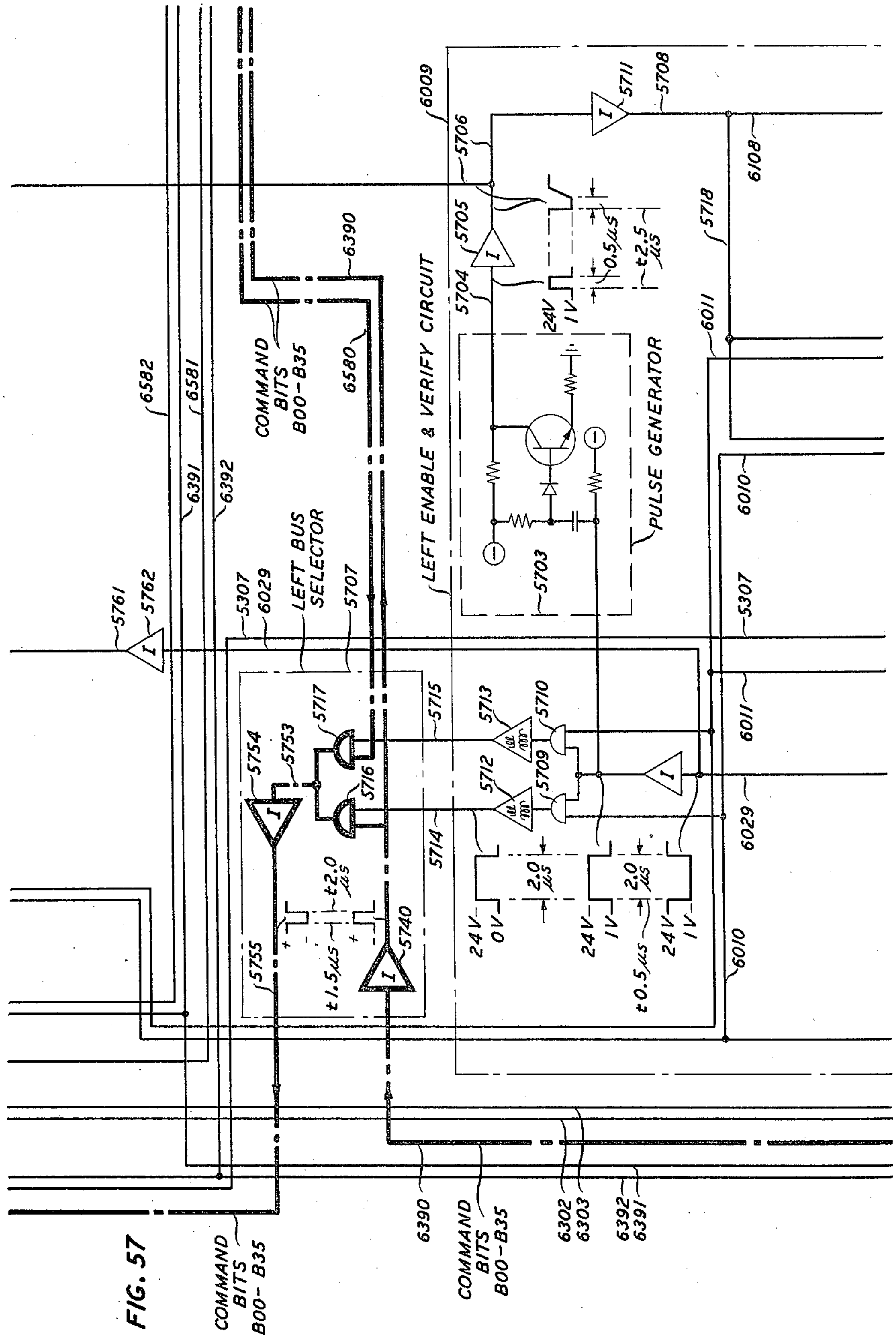
Figure 60:
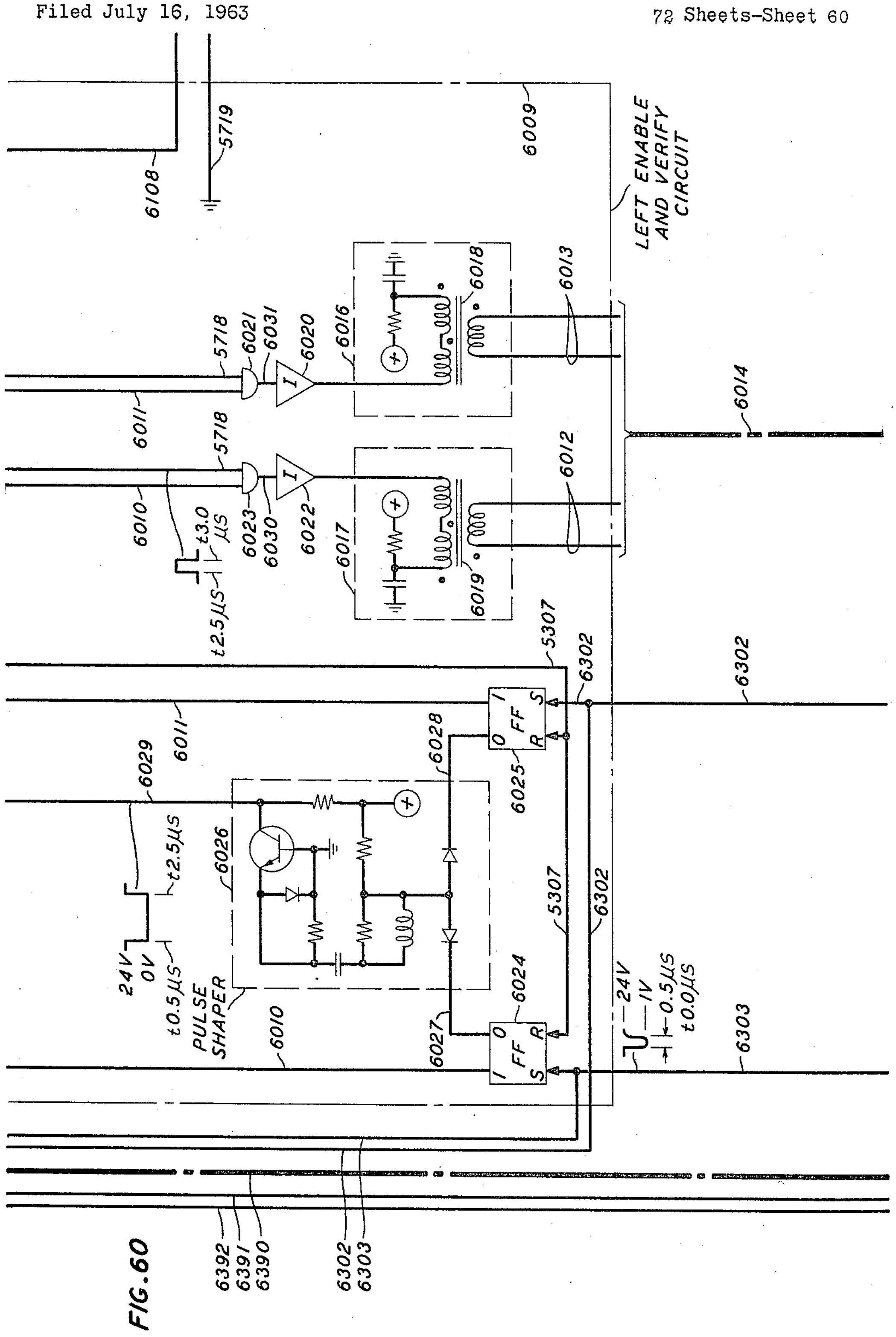

The Left Junctor Network Control Unit includes left enable-verify circuit 6009 which is illustrated on FIGS. 57 and 60. Enable-verify circuit 6009 comprises a combination of logic circuits for generating a command-accept signal in response to an enable signal, and for generating a verify signal upon the termination of the command-accept signal. This operation will be described in more detail later herein.

Bus Selector 5707

The Left Junctor Network Control Unit further includes left bus selector 5707 shown on FIG. 57 which comprises a plurality of AND gates, such as 5716 and 5717, through which the received command bits are transmitted in response to the command-accept signal generated by enable-verify circuit 6009.

Execution Control 5325

FIGS. 41, 42, 45, 46, 49, 50, 53, 54 illustrate left execution control 5325 of the Left Junctor Network Control Unit. Execution control 5325 includes a left buffer register 4505 in which the command bits accepted via left bus selector 5707 are registered. Buffer register 4505 may advantageously comprise a plurality of flip-flop circuits each of which is discrete to one of the command bits B00–B35.

Execution control 5325 further includes left translator 4506. Translator 4506 may advantageously comprise a plurality of reed relay translators which selectively enable particular output leads thereof in accordance with the received command bits B00–B35 registered in buffer register 4505.

Figure 49:
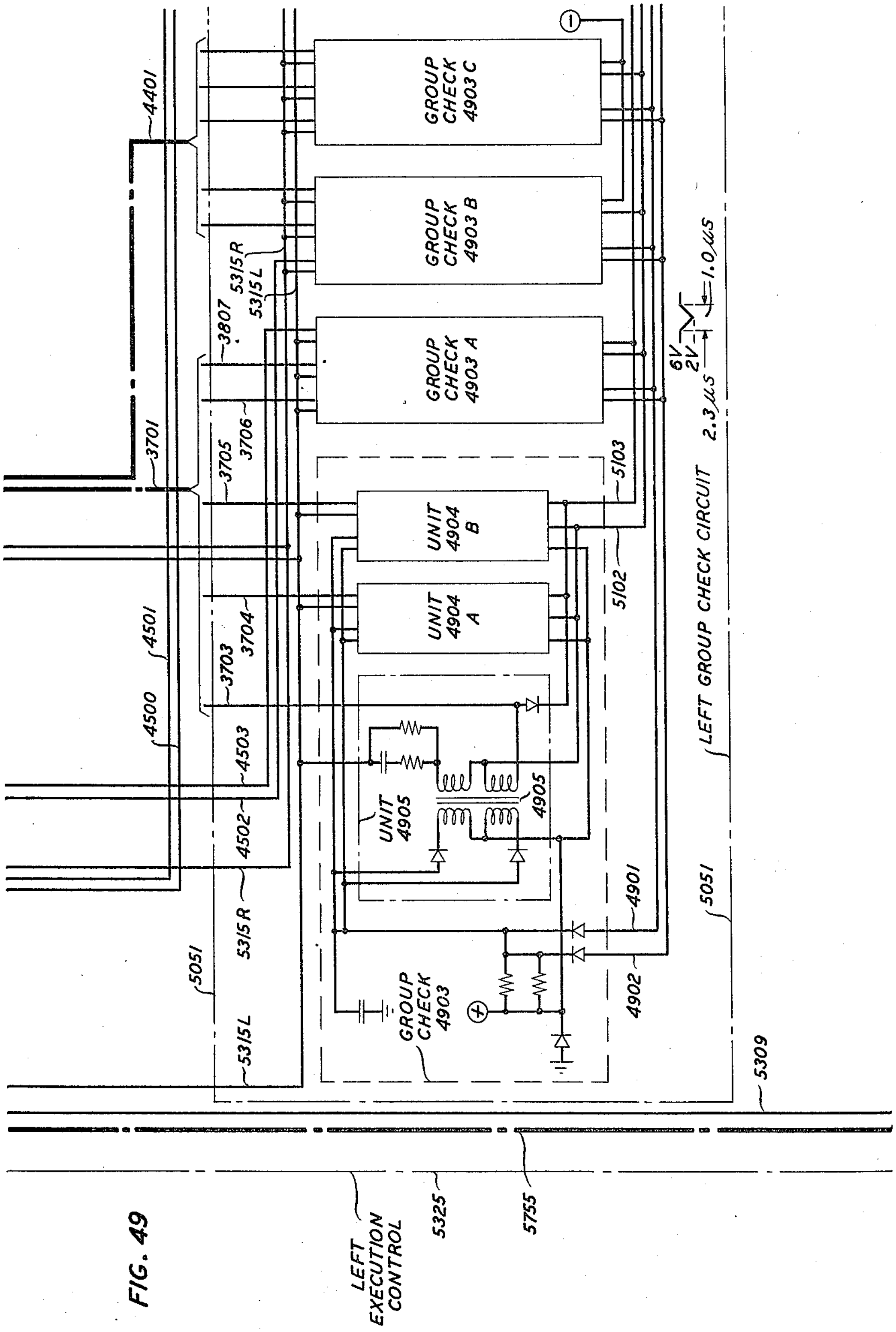
Figure 50:
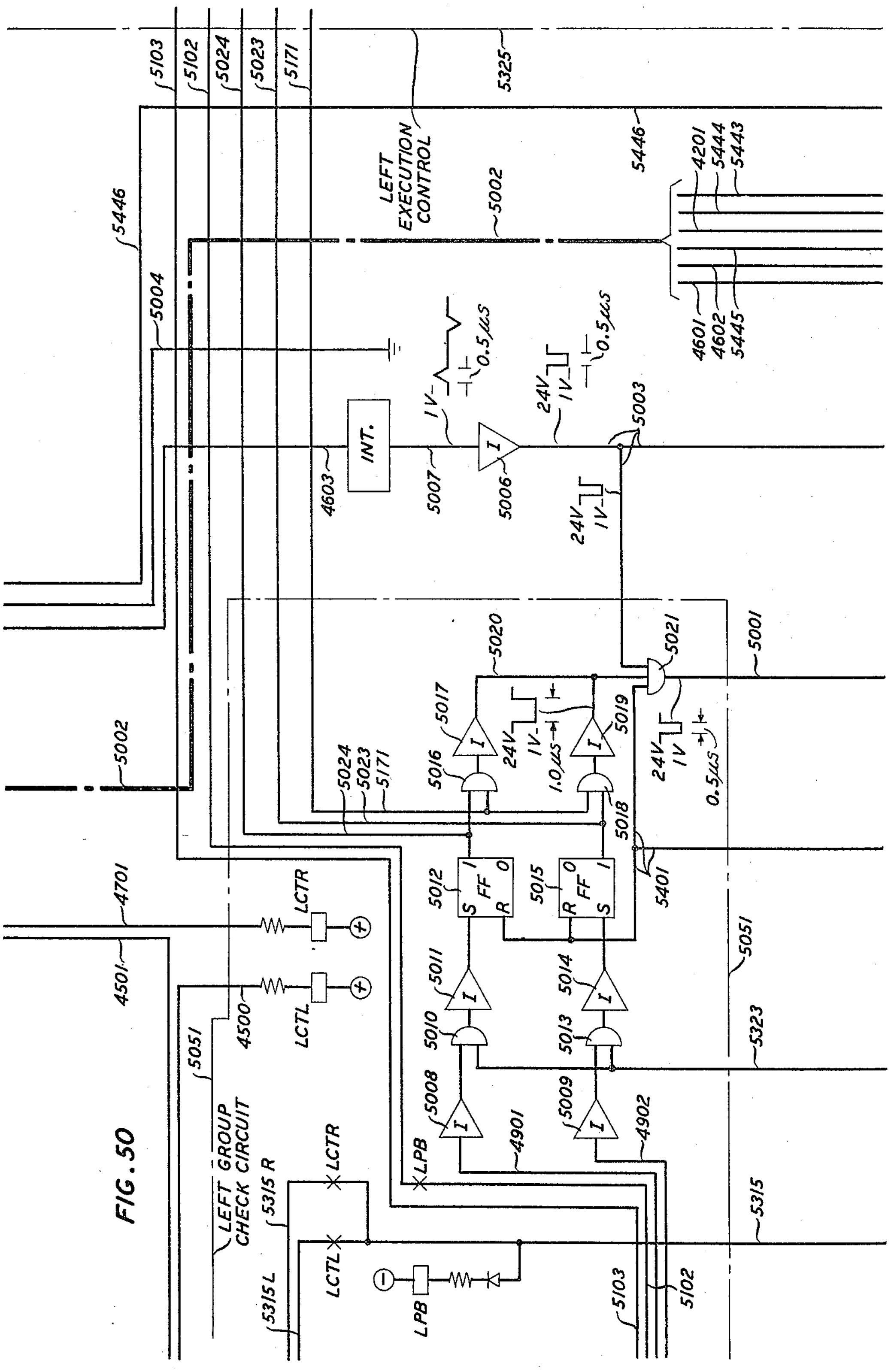

FIGS. 49 and 50 illustrate the left group check circuit 5051 of execution control 5325. This circuit performs a check on the respective outputs of left translator 4506 to insure that at least one and no more than one of the outputs of each of the plurality of reed relay translators is energized. A more complete description of the function of group check circuit 5051 is included later herein.

Execution control 5325 further includes left pulse steering circuit 4590, which is illustrated on FIGS. 41, 42, 45 and 46. This circuit may advantageously comprise a plurality of relays, each representing a particular type of command which may be executed under the control of the Left Junctor Network Control Unit. These relays are termed "order relays" LOR0–LOR7. They are selectively controlled in accordance with the order portion (bits B30–B35) of the command information registered in buffer register 4505 and translated by translator 4506.

Left pulser 4612 shown on FIG. 46 generates network control pulses in response to the establishment of a network control pulse path as described later herein. The network control pulse is transmitted through the contacts of an operated order relay LOR0–LOR7 in pulse steering circuit 4590 to initiate switching operations in the appropriate Junctor Network Unith 2110, 4020. Pulser 4612 includes circuitry for checking the continuity of the pulsing path, for detecting false grounds on the pulsing path, and for checking the amplitude of the network control pulses.

Diagnostic Control 6126

The Left Junctor Network Control Unit further includes left diagnostic control 6126, which is shown in FIGS. 39, 43, 47, 51, 55, 58 and 61. Diagnostic control 6126 includes left test access 6127, shown on FIG. 61, for selectively controlling the connection of the diagnostic and supervisory scan points of the Left Junctor Network Control Unit and the Upper Junctor Network Unit 2110 to the Diagnostic Cable 2070 and the Diagnostic Bus NC. Further included in diagnostic control 6126 is left test-vertical control 5520, shown in FIGS. 51 and 55, which selectively controls the performance of various testing operations on Upper Junctor Network Unit 2110 as described later herein. The remaining circuitry of left diagnostic control 6126 is associated with mode of operation control of the Left Junctor Network Control Unit.

Figure 40:
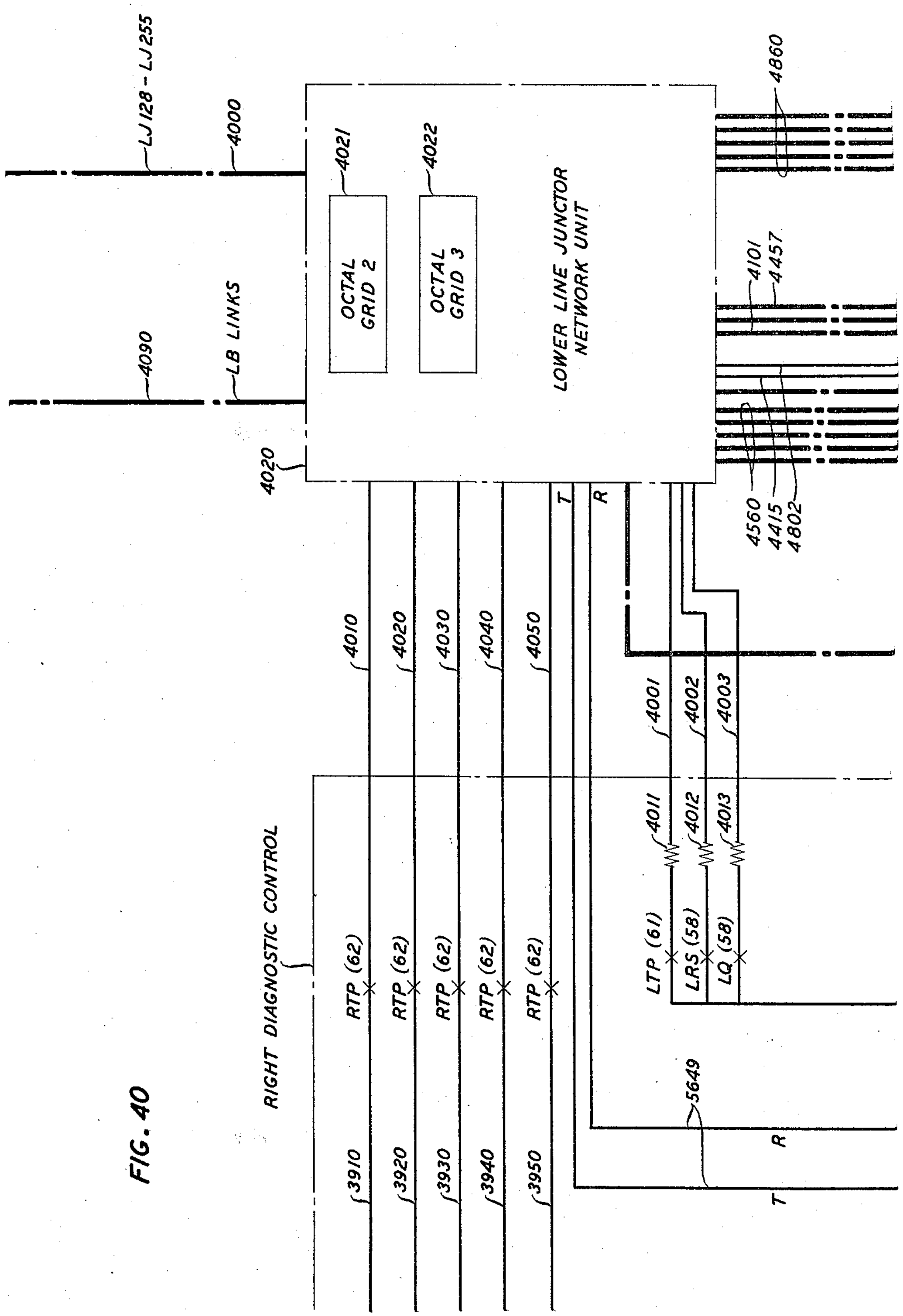
Figure 41:
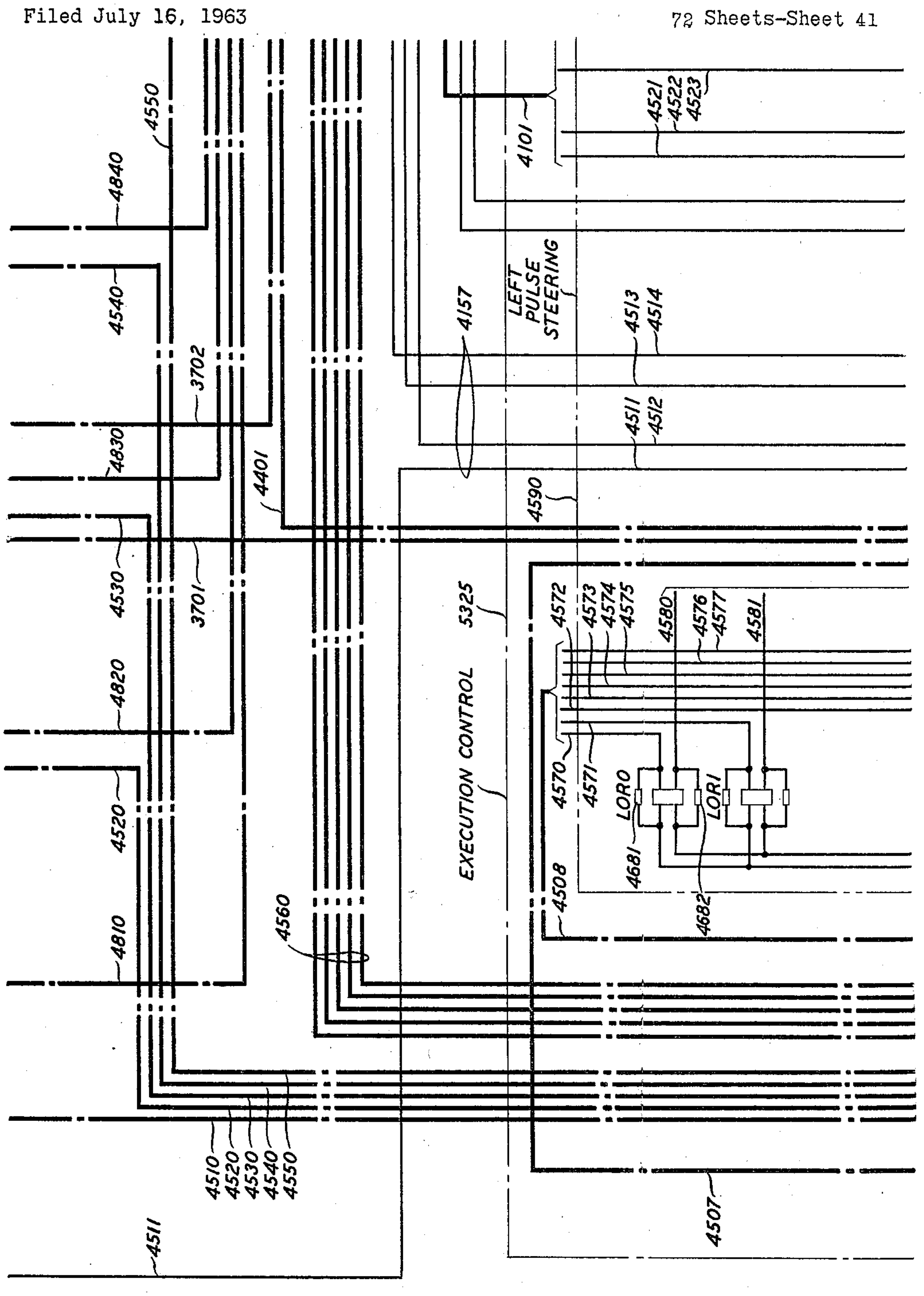

*Junctor Network Units 2110, 4020.*—FIGS. 21 through 38 schematically illustrate Upper Junctor Network Unit 2110. The Lower Junctor Network Unit 4020 shown on FIG. 40 is a substantial duplicate of Upper Junctor Network Unit 2110 and the following description is understood to apply to both Junctor Network Units 2110 and 4020.

Network Unit Organization

FIGS. 23, 24, 27, 28, 31, 32, 35 and 36 illustrate the cross-point device contacts through which partial call and test connection transmission paths which may be selectively established and released in accordance with central processor commands. Upper Junctor Network Unit 2110 comprises two octal grids 2111 and 3312 of which octal grid 2111 is partially detailed on FIGS. 23, 24, 27, 28, 31 and 32. Octal grid 2111 comprises eight first stage cross-point switch arrays SWO00–SWO07 and eight second stage switch arrays SWO10–SWO17.

Each first stage switch array SWO00–SWO07 comprises a plurality of tip and ring cross-point contacts 2160, 2560, 2960 in coordinate array. The inputs 2330, 2730, 3130 of the respective first stage switch arrays SWO00–SWO07 are the tip and ring conductors of LB links 3590 which are distributed as outputs of the various Line Switch Frames, such as 201, of the switching network. An example of an advantageous pattern of LB link distribution may be seen in the aforenoted patent application of A. Feiner which has been included herein by reference.

The outputs of each of the first stage switch arrays SWO00–SWO07 are C links 2380 which are distributed in a full distribution pattern as inputs to the second stage switch arrays SWO10–SWO17. The pattern of C link distribution is such that each of the first stage switch arrays SWO00–SWO07 has access via an individual C link 2380 to each of the second stage switch arrays SWO10–SWO17.

Each of the second stage switch arrays SWO10–SWO17 comprises a plurality of second stage tip and ring cross-point contacts 2270, 2670, 3270 in coordinate array. The inputs of each of the second stage switch arrays SWO10–SWO17 are the aforementioned C links 2380. The outputs 2150, 2850, 3250 of each of the second stage switch arrays SWO10–SWO17 are the line junctor terminals LJ0–LJ63 which are connected to the Junctor Grouping Frame 490 as shown in FIG. 3.

The octal grid 2111 further includes test-vertical switch arrays SWO0–SWO7. Each test-vertical switch array SWO0–SWO7 comprises test-vertical relay tip and ring contacts 2240, 2640, 3040, via which each respective line junctor terminal 2150, 2850, 3250 is connectable to the left test-vertical control 5520 over tip and ring conductors 5548. The various tests which may be performed by the Junctor Network Control Units on the switching network transmission paths are performed via the test-vertical relay contacts 2240, 2640, 3040.

Network Unit Control

The control windings of the cross-point devices which control the above-mentioned first stage cross-point contacts 2160, 2560, 2960, second stage cross-point contacts 2270, 2670, 3070 and test-vertical contacts 2240, 2640, 3040 are shown in FIGS. 21, 22, 25, 26, 29 and 30. The designation given the respective windings of the cross-point and test-vertical devices are identical to those given the corresponding cross-point and test-vertical contacts. For example, the cross-point device 2161 of FIG. 21 controls the cross-point contacts 2161(21) of FIG. 23.

Figure 37:
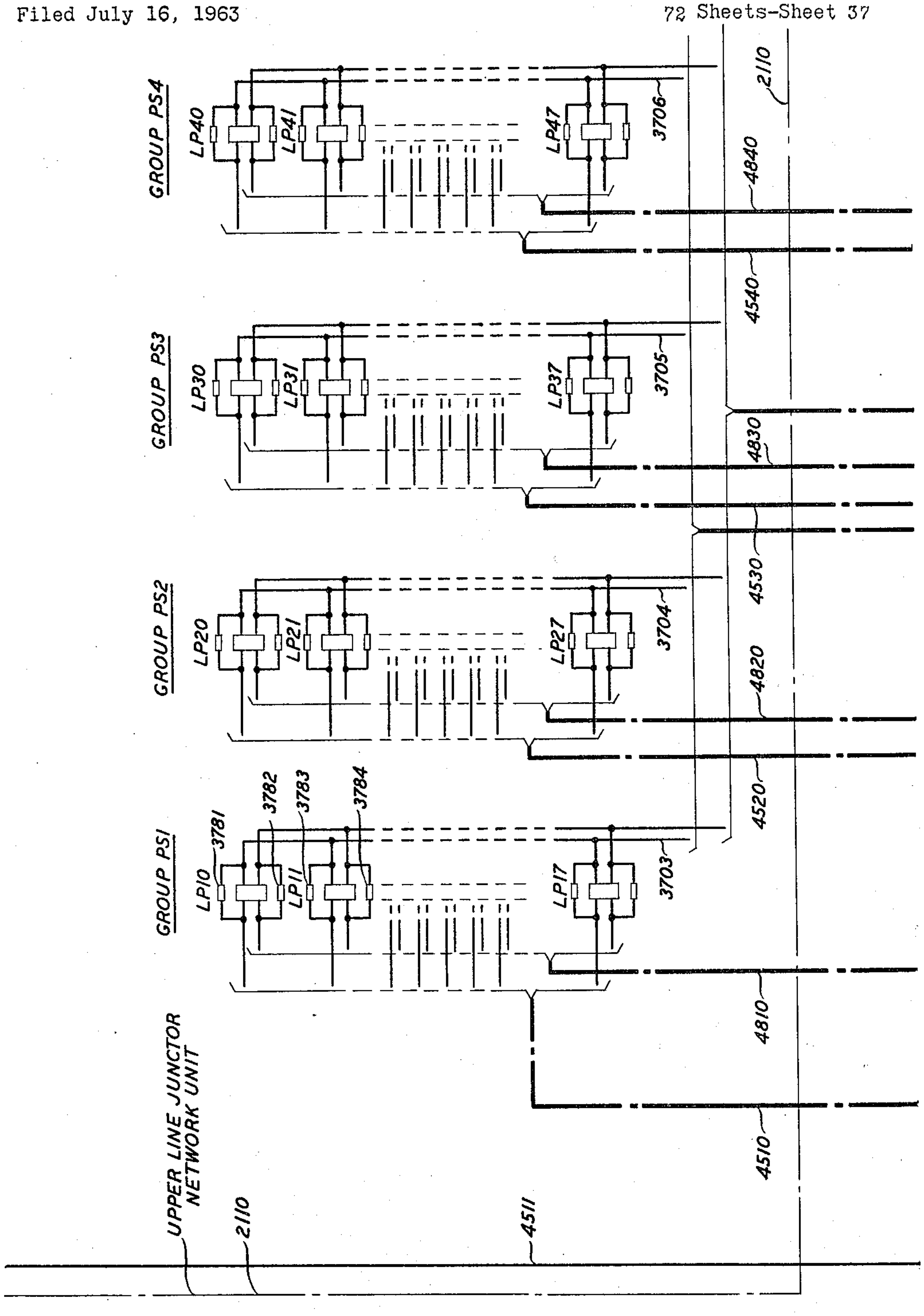
Figure 38:
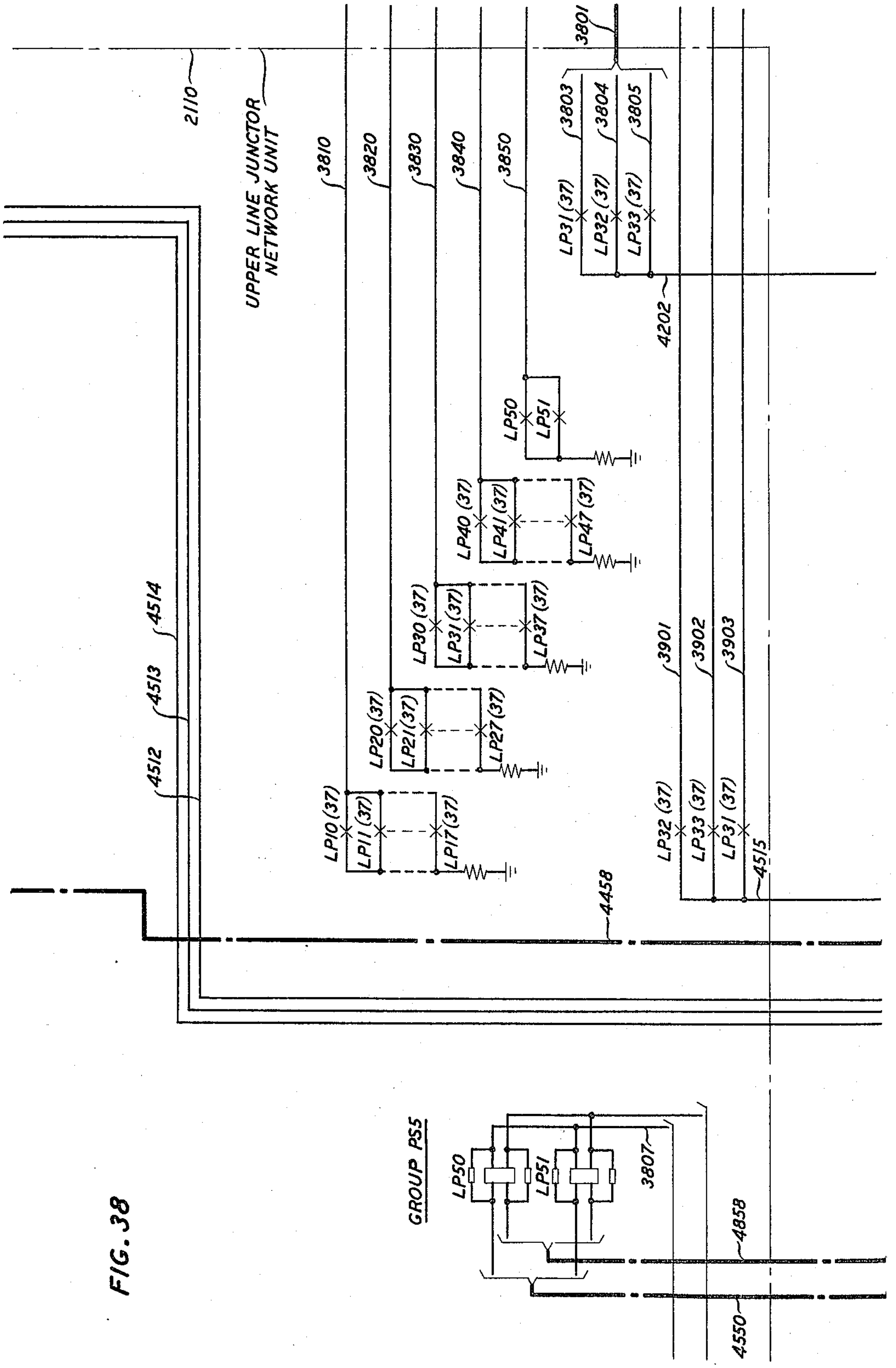

Each Junctor Network Unit 2110, 4020 includes five groups, PS1–PS5, of path selection relays LP10–LP51 as shown in FIGS. 37 and 38. A single selected relay in each group PS1–PS5 is operated in accordance with the address portion (bits B00–B27) of each command. The contacts of relays LP10–LP51 are used to select specific network control pulse paths through octal grids 2111 and 3312 of Upper Junctor Network Unit 2110 as indicated on FIGS. 21, 22, 25, 26, 29, 30, 33 and 34. A corresponding set of path selection relays (not shown) are included in Lower Junctor Network Unit 4020 to select paths through octal grids 4021 and 4022.

One illustrative arrangement of path selection relays LP10–LP51 is indicated on FIGS. 21, 22, 25, 26, 29, 30, 33 and 34. Contacts of relays LP50–LP51 in group PS5 select the particular octal grid, 2111 or 3312, through which a network control path is to be established. Contacts of relays LP40–LP47 in group PS4 select the particular second stage switch SWO10–SWO17 of grid 2111 through which a network control path is to be established. Contacts of relays LP30–LP37 in group PS3 select the particular C link 2180 via which a network control path is to be established. Contacts of relays LP20–LP27 in group PS2 select the particular line junctor terminal via which a network control path is to be established through octal grid 2111. Contacts of relays LP10–LP17 in group PS1 select the particular B link terminal via which a network control path is to be established. This arrangement of contacts of the path selection relays LP10–LP50 is merely illustrative of one advantageous pattern of path selection.

The manner in which the path selection relay contacts LP10–LP51 are used to select paths through Upper Junctor Network Unit 2110 will be more clearly understood from the description of the execution of the specific types of commands which is included later herein.

JUNCTOR SWITCH FRAME OPERATIONS IN GENERAL

The various circuit elements shown in FIGS. 49–65 represent discrete logical functions performed during the operations of the Left Junctor Network Control Unit. Generally speaking, they are responsive to changes in the potential applied to their respective input terminals to apply an appropriate potential to their respective output terminals. In the context of the following description the term "low potential" infers a potential at or near ground potential, and the term "high potential" infers a potential above ground potential. To simplify the description, terminals and leads will occasionally be referred to as being "high" when a high potential is applied thereto and as being "low" when a low potential is applied thereto.

Flip-flops such as 6024 on FIG. 60 assume a SET condition when low potential is applied to their SET terminals S and assume a RESET condition when low potential is applied to their RESET terminals R. When in a SET condition, the 0 output terminals of flip-flops such as 6024 are low and the 1 output terminals thereof are high. When in a RESET condition, the 0 output terminals of flip-flops such as 6024 are high and the 1 output terminals thereof are low.

Inverters such as 5701 on FIG. 57 merely invert the potential applied to their respective input terminals. For example, if lead 6029 is low, lead 5702 will be high as a result of the operation of inverter 5701. Further, if lead 6029 is high, lead 5702 will be low.

AND gates, such as 6023 on FIG. 60, apply low potential to their respective output leads when either or both of their respective input leads are low. However, when all input leads of an AND gate are high, the output lead thereof will be high. For example, due to the operation of AND gate 6023, when either or both of leads 6010 and 5718 are low, lead 6030 will be low, but when both leads 6010 and 5718 are high, lead 6030 will be high.

Amplifiers, such as 5712 on FIG. 57, merely amplify the potential applied to their respective input leads. For example, when the output of AND gate 5709 is low, lead 5714 will also be low, and when the output of AND gate 5709 is high, lead 5714 will also be high.

Various other special circuits, such as pulse generators 5314 and 5703, will be described as required in the course of the following description.

*Enable-Verify Operation.*—As previously described, each central processor command transmitted by Central Processor 2030 via Command Bus 0 or 1 is associated with an enable signal transmitted via Enable-Verify Cable 2060 from the Central Pulse Distributor 2031. The enable signal identifies the particular System Unit which is to execute the associated central processor command. The enable signal is transmitted over a conductor pair, such as 2056; of the Enable-Verify Cable 2060 which is discrete both to the System Unit which is to respond to the command and to the Command Bus 0 or 1 via which the central processor command is transmitted.

It is assumed that an enable signal is transmitted by Central Pulse Distributor 2031 over conductor pair 206131 (FIG. 63) and that an associated central processor command to be executed by the Junctor Switch Frame of FIGS. 21–65 is transmitted by the Central Processor 2030 via Command Bus 0. The enable signal is received from conductor pair 206131 by an enable-verify cable receiver 6321 which is discretely associated with conductor pair 206131. Conductor pair 206131 is terminated in its characteristic impedance 6324 via primary windings of pick-off transformer 6323. The magnetic flux produced in the oppositely poled primary windings of pick-off transformer 6323 by the enable signal induces a corresponding signal in the secondary winding of pick-off transformer 6323. The induced enable signal is amplified by amplifier 6322.

The amplified enable signal appears as a 0.5 microsecond transition from high potential to low potential on the particular enable lead 6303 of the enable leads 6315 which is discretely associated with conductor pair 206131. This momentary application of low potential to lead 6303 causes flip-flop 6024 to become SET. When flip-flop 6024 is SET, lead 6010 changes from low to high and lead 6027 changes from high to low.

To indicate the sequence in which various circuit operations occur, a time reference convention has been adopted. Time $t0.0$ microseconds represents the time at which flip-flop 6024 is SET in response to the amplified enable signal on lead 6303.

Pulse shaper 6026 is not described in detail herein although shown in some detail on FIG. 60. Its circuit elements are arranged so that 0.5 microsecond after the potential applied to either of its input leads 6027 or 6028 is changed from high to low, the normally high potential on its output lead 6029 is abruptly lowered for a period of 2.0 microseconds and then returned to the normal high potential condition. This 2.0 microsecond period of low potential on lead 6029 is the command-accept signal during which commands are accepted from Command Bus 0 or 1. The command-accept signal is generated at time $t0.5$ microsecond and lasts until time $t2.5$ microseconds.

As a result of the action of inverter 5701, when lead 6029 becomes low for a 2.0 microsecond period lead 5702 becomes high for a corresponding period of time. Lead 5702 is connected to one input terminal of AND gates 5709 and 5710 and to the input terminal of pulse generator 5703. The function of pulse generator 5703 is described later herein. The other input terminal of AND gate 5709 is connected to lead 6010, which became high as a result of flip-flop 6024 becoming SET at time $t0.0$ microseconds. Therefore, during the period of the command-accept signal ($t0.5$–$t2.5$ microseconds) both input leads 5702 and 6010 of AND gate 5709 are high. As a result, the output of AND gate 5709 changes from low to high during the command-accept signal period. This high potential is amplified by inductively coupled amplifier 5712 and applied to lead 5714 from time $t0.5$ microseconds until time $t2.5$ microseconds.

Each conductor pair 20100 represents one bit B00–B37 of a central processor command. Bits B00–B35 represent the order and address information of a command and bits B36 and B37 represent other special signals which are described later herein. Selected ones of the conductor pairs 20100 are energized by the Central Processor 2030 in accordance with the switching operation to be performed. Each of the conductor pairs 20100 is indvidually coupled via a bus receiver 6360 which includes a pick-off transformer 6362 to a discrete command bit lead 6316, 6391, 6392. The command bits B00–B35 appear at approximately time $t0.75$ microseconds as 0.5 microsecond transitions from a normally high potential state to a low potential state on the ones of the command bit leads 6316 which correspond to the energized conductor pairs 20100 of Command Bus 0. The command bit leads 6316 are combined into cable 6390 which terminates in both the left bus selector 5707 and the right bus selector 5908.

Left bus selector 5707 comprises a plurality of AND gates represented by AND gates 5716 and 5717. A separate AND gate 5716 is provided for each command bit lead 6316 of command transmission cable 6390. One input lead 5714 of each of the AND gates 5716 is connected to the output of amplifier 5712. The other input lead of each of the AND gates 5716 is connected via an inverter 5740 to its discretely associated command bit lead 6316 of command transmission cable 6390. The AND gates represented by AND gate 5717 are similarly associated with lead 5715 and the command bit leads 6516 of command transmission cable 6580 via which commands are received from Command Bus 1. Thus, the AND gates represented by AND gate 5716 accept commands bit signals received via cable 6390 from the Command Bus 0 and the AND gates represented by AND gate 5717 accept command bit signals received via command transmission cable 6580 from Command Bus 1.

As previously described, one input lead 5714 of each of the AND gates 5716 is high from time $t0.5$ microseconds until time $t2.5$ microseconds. Due to the action of inverter 5740, the other input terminals of those of AND gates 5716 which are associated with energized command bit leads 6316 are also high at approximately time $t0.75$ microseconds when the command bit signals are received.

The output leads of AND gates 5716 and 5717 are represented by cable 5753. During the time that both input leads 5714 and 6316 of each of the AND gates 5716 are high, the output leads thereof, as represented by cable 5753, will change from low to high. Thus the command bit signals on command bit leads 6316 are transmitted through AND gates 5716 and appear as momentary applications of high potential to corresponding leads of cable 5753. The command-accept signal period (time $t0.5$–$t2.5$ microseconds) is sufficiently long to allow for some variation in the time at which the command bit signals are received.

Each of the leads of cable 5753 is connected to the input of an inverter, represented by inverter 5754, the respective output leads of which are incorporated in cable 5755. The high potential on the energized leads of cable 5753 is inverted by inverter 5754 and appears as a low potential on the corresponding leads of cable 5755. The leads of cable 5755 corresponding to the received command bits B00–B35 remain low for a time corresponding to the duration of the command bit signals, i.e., from approximately time $t0.75$ microseconds until approximately time $t1.5$ microseconds.

Figure 45:
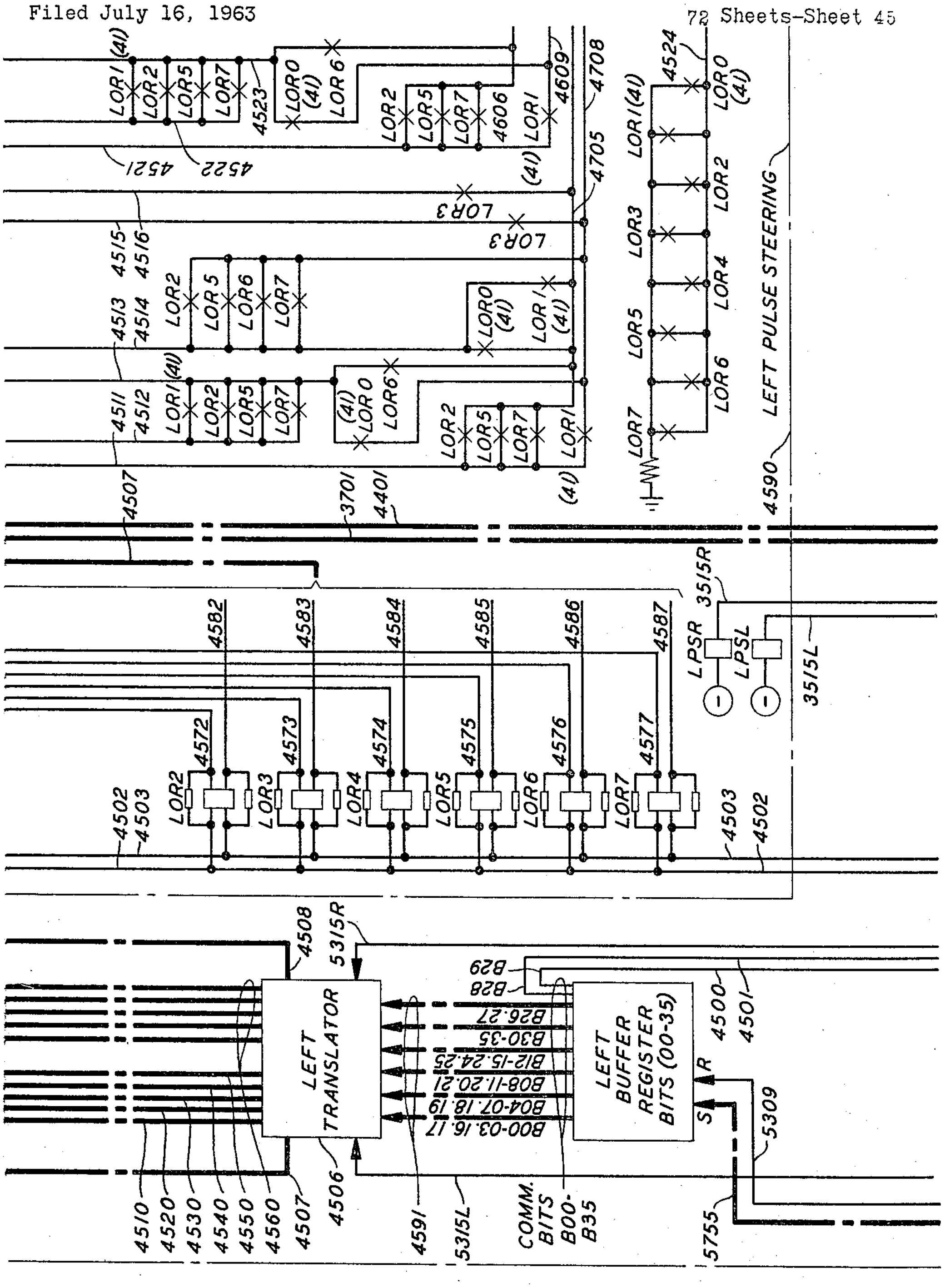

Each lead of cable 5755 is associated with a discrete register element in left buffer register 4505 on FIG. 45. These discrete register elements are responsive to a transition from a high to a low potential on the respective leads of cable 5755 to store the received command bits B00–B35 represented by the low potential applied to certain leads of cable 5755. The register elements of buffer register 4505 may advantageously comprise flip-flop circuits which become SET in response to the application of low potential to their respective SET input terminals. Thus the received command bits B00–B35, which indicate the switching operation to be performed, are accepted from Command Bus 0 and stored in left buffer register 4505 at some time during the command-accept signal period.

Returning now to FIG. 57 and left enable-verify circuit 6009, the input lead 5702 of pulse generator 5703 is high during the command-accept signal period, as previously described. Pulse generator 5703 provides a pulse of high potential lasting approximately 0.5 microsecond on lead 5704 in response to a change in the potential applied to lead 5702 from high to low. Thus at time $t2.5$ microseconds, when lead 5702 changes from high to low due to the termination of the command-accept signal, lead 5704 becomes high for 0.5 microsecond. This is the verify signal which indicates that the Left Junctor Network Control Unit has been enabled and that a proper command-accept signal has been generated.

Due to the operation of inverter 5705, the high potential on lead 5704 is inverted and lead 5706 becomes low for 0.5 microsecond at time $t2.5$ microseconds. The low condition of lead 5706 appears as a high condition on lead 5708 due to the operation of inverter 5711. The high potential on lead 5708 is connected via lead 5718 to one input terminal of AND gates 6021 and 6023. The other input lead 6010 of AND gate 6023 became high at time $t0.0$ microseconds when flip-flop 6024 became SET. Both input leads 5718 and 6010 of AND gate 6023 therefore are high from time $t2.5$ microseconds until time $t3.0$ microseconds, i.e., the verify pulse period, and lead 6030 becomes high for a corresponding period of time. Due to the operation of inverter 6022, the verify pulse is applied in the form of a 0.5 microsecond transition from high potential to low potential through the primary winding of answer-back transformer 6019 and an RC recoupling network to positive potential. This application of low potential to the primary winding of answer-back transformer 6019 occurs at time $t2.5$ microseconds and continues until time $t3.0$ microseconds.

The flux produced in the primary winding of answer-back transformer 6019 by the application of low potential through it to positive potential induces a corresponding signal through answer-back transformer 6019 and into the secondary winding thereof. The induced verify signal is transmitted via verify pair 6012 through cable 6014 and applied to the conductor pair 206131 from which the enable signal was originally received. Verify pair 6012 is connected across the oppositely poled primary windings of pick-off transformer 6323, and resistor 6234 is connected in shunt of the primary windings. Due to the oppositely poled primary windings of pick-off transformer 6323 and the shunting resistor 6234, the magnetic flux produced in the primary windings of pick-off transformer 6323 is self-canceling and the verify signal does not induce any corresponding signal in the secondary winding of pick-off transformer 6323. The verify pulse is transmitted back to the Central Pulse Distributor 2031 via conductor pair 206131.

The above-described enable-verify sequence included the generation of a 2.0 microsecond command-accept signal during which appropriate ones of command bits B00–B35 were accepted from Command Bus 0 and registered in left buffer register 4505; the generation of a verify signal upon the termination of the command-accept signal; and the application of the verify signal to the same conductor pair from which the enable signal was received in such a way as to prevent a false enable indication but to permit the transmission of the verify signal back to the source of the enable signal.

*Command execution cycle.*—Each command from Central Processor 2030 comprises thirty-six command bits, B00–B35. The order portion of the command indicates the type of operation to be performed, and the address portion of the command indicates the particular locations in the Junctor Network Units 2110, 4020 at which the operation is to be performed. Command bits B30–B35 may advantageously comprise the order portion of the command, and command bits B00–B29 may advantageouly comprise the address portion of the command.

Execution control 5325 includes left pulse steering circuit 4590 shows in FIGS. 41, 42, 45 and 46. Pulse steering circuit 4590 comprises a plurality of order relays LOR0–LOR7, each of which is associated with a particular type of operation which may be performed by the Junctor Switch Frame. A single order relay LOR0–LOR7 is operated in response to the order portion of each command. In accordance with one illustrative command composition, command bits B30–B35 may indicate which order relay LOR0–LOR7 is to be operated. As there are eight order relays, LOR0–LOR7, provided, two of the six command bits B30–B35 are sufficient to define a discrete order relay LOR0–LOR7 when translated from a two-out-of-six code into a one-out-of-eight code. This translation is performed by one of the reed relay translators in left translator 4506.

Upper Junction Network Unit 2110 includes a plurality of path selection relays LP10–LP51 which are arranged into five path selection groups PS1–PS5, as shown on FIGS. 37 and 38. A single path selection relay LP10–LP51 within each path selection group PS1–PS5 is operated in response to the address portion of each central processor command. In accordance with one illustrative composition of a command, command bits B00–B03, B16 and B17 may indicate which path selection relay LP10–LP17 of path selection group PS1 is to be operated; command bits B04–B07, B18 and B19 may indicate which path selection relay LP20–LP27 of path selection group BS2 is to be operated; command bits B08–B11, B20 and B21 may indicate which path selection relay LP30–LP37 of path selection group PS3 is to be operated; command bits B12–B15, B24 and B25 may indicate which path selection relay LP40–LP47 of path selection group PS4 is to be operated; and command bits B26 and B27 may indicate which path selection relay LP50–LP51 of path selection group PS5 is to be operated. With the exception of path selection group PS5, all other path selection groups PS1–PS4 comprise eight path selection relays which may be discretely defined on a two-out-of-six code basis in a manner similar to the order relay LOR0–LOR7. Relays LP50 and LP51 of path selection group PS5 may be defined on a one-out-of-two code basis.

Since the Left Junctor Network Control Unit can be used to direct operations within Lower Junctor Network Unit 4020 as well as Upper Junctor Network Unit 2110 it is necessary to define in which Junctor Network Unit 2110, 4020 a command is to be executed. Command bits B28 and B29 may provide this information on a one-out-of-two code basis.

The illustrative command organization described above is illustrated on FIG. 45 by translator control cables 4591 and leads 4500 and 4501. Left translator 4506 comprises a plurality of translator circuits each of which is associated with one of the translator control cables 4591. The reed relays in each of the translators in left translator 4506 are selectively controlled in accordance with the command information registered in left buffer register 4505. They translate the respective two-out-of-six code indications received via cables 4591 into appropriate one-out-of-eight code indications which define a discrete order relay LOR0–LOR7 and a discrete path selection relay LP10–LP51 within each path selection group PS1–PS5. The outputs of left translator 4506 which are associated with Upper Junctor Network Unit 2110 are represented by cables 4510, 4520, 4530, 4540, 4550, 4560 and 4507 each of which is respectively associated with a path selection group PS1–PS5 and the order relays LOR0–LOR7. Thus, left translator 4506 completes a path via a discrete lead in each of the aforenoted cables 4510, 4520, 4530, 4540, 4550, 4560 and 4507 for operating the selected path selection relay LP10–LP51 and the selected order relay LOR0–LOR7 as prescribed by the command information registered in left buffer register 4505.

Since, in this illustrative embodiment, translator 4506 comprises a plurality of reed relay translators the contacts of which may be damaged if opened or closed while current is flowing through them, it is undesirable to apply operating potentials for the path selection relays LP10–LP51 and order relays LOR0–LOR7 until the reed contacts of translator 4506 are fully closed. The completion of the operating path for these relays LP10–LP51, LOR0–LOR7 therefore is delayed sufficiently to insure that the contacts of the reed relays are fully closed. The reed relays in translator 4506 start to operate when the command information is registered in buffer register 4505 at time $t2.5$ microseconds and require approximately 1 millisecond to become fully operated.

As previously mentioned, command bits B28 and B29 indicate the Junctor Network Unit 2110, 4020 in which a command is to be executed. Cut-through relays LCTL and LCTR, whose windings appear on FIG. 50, are operated directly from buffer register 4505 via leads 4500 and 4501 in accordance with the command bit B28 or B29 stored in buffer register 4505. For purposes of description it will be assumed that the command presently stored in buffer register 4505 is to be performed in Upper Junctor Network Unit 2110. Therefore, lead 4500 is energized as a result of command bit B29 being stored in buffer register 4505. Relay LCTL starts to operate over this obvious circuit at time $t2.5$ microseconds. Relay LCTL requires approximately 1 millisecond to become fully operated.

Returning again to FIG. 57, lead 5706 has low potential applied thereto at time $t2.5$ microseconds, as previously described. The low potential applied to lead 5706 and through OR gates 5433 and 5311 causes flip-flops 5431 and 5310 to become SET at time $t2.5$ microseconds. The potential applied to lead 5450 from the 0 output terminal of flip-flop 5431 is changed from high to low when flip-flop 5431 becomes SET. An obvious circuit is thus completed via lead 5450 for the operation of relay LF on FIG. 54. Relay LF requires approximately 1 millisecond to become fully operated.

The potential applied to lead 5313 from the 0 output terminal of flip-flop 5310 is changed from high to low when flip-flop 5310 is SET. An obvious circuit via lead 5313 is thus completed for the operation of relay LVCT on FIG. 53. The RC network comprising resistor 5321 and capacitor 5322 insures that relay LVCT will not operate for at least 2 milliseconds.

As indicated by the above-mentioned operate times of relays LF, LCTL and the reed relays in translators 4506, at approximately time $t1.5$ milliseconds relay LF is fully operated, relay LCTL is fully operated and the reed relays of translators 4506 are fully operated. At approximately time $t2.2$ milliseconds relay LVCT is fully operated. The full operation of relays LVCT, LF, LCTL and the reed relays in translator 4506 completes a path for the operation of the selected order relay LOR0–LOR7 and the selected path selection relays LP10–LP51. The completion of this operating path was delayed, as a result of the slow operation of relay LVCT, until the reed relays of translator 4506 became fully operated.

Figure 53:
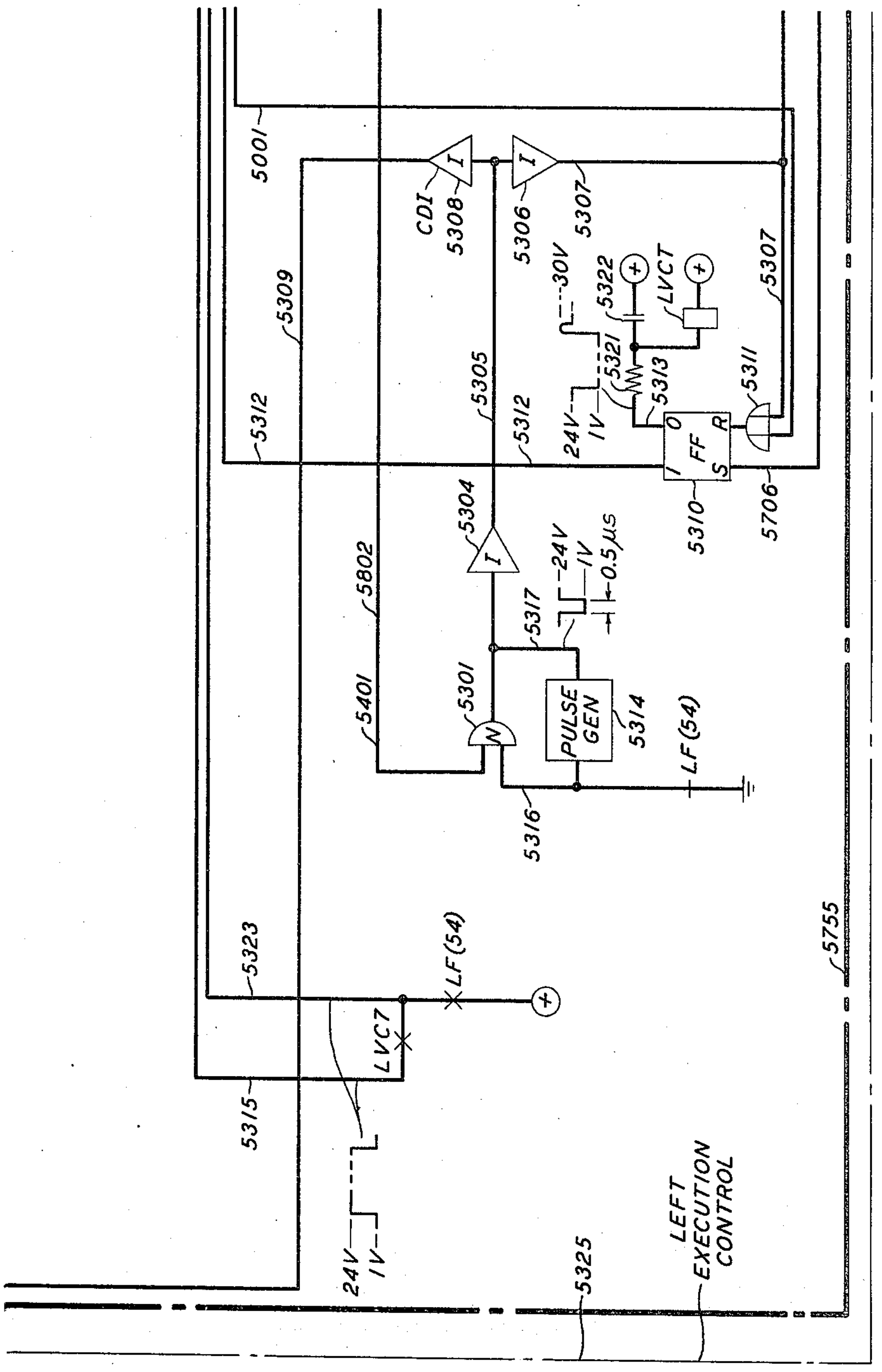

At approximately time $t2.2$ milliseconds positive potential is applied to lead 5315 through operated contacts of relay LF and relay LVCT on FIG. 53. An obvious circuit for the operation of relay LPB on FIG. 50 is thus completed. The positive potential on lead 5315 is extended to lead 5315L through an operated contact of relay LCTL, thus completing an obvious circuit for the operation of relay LPSL on FIG. 45. The positive potential on lead 5315L is extended through contacts of the selectively operated reed relays in left translator 4506 to a single conductor in each of the cables 4510, 4520, 4530, 4540, 4550 and 4507. The positive potential is thereby extended through a winding of a discrete path selection relay LP10–LP51 in each path selection group PS1–PS5 and a winding of a discrete order relay LOR0–LOR7. The positive potential on the windings of the selected path selection relays LP10–LP51 and order relays LOR0–LOR7 is extended via leads 3703, 3704, 3705, 3706, 3807 and 4503 to left group check circuit 5051 on FIG. 49. Lead 3703 is shown as a typical example. The positive potential on lead 3703 is extended through Group Check Unit 4904 to lead 5103. Corresponding leads 3704, 3705, 3706, 3807 and 4503 are similarly extended through associated Group Check Units 4904A, 4904B in group checks 4903 and 4903A and connected to lead 5103. Positive potential on lead 5103 is extended through a non-operated contact of relay LQ on FIG. 51 to negative potential, thus completing a circuit from positive to negative potential which includes the windings of the selected path selection and order relays LP10–LP51, LOR0–LOR7.

The path selection and order relays LP10–LP51 require approximately 4.5 milliseconds to operate. Prior to the full operation of these relays a check is performed by group check circuit 5051 to insure that one and only one path selection relay in each path selection group PS1–PS5 and one and only one order relay LOR0–LOR7 will operate. The validity of the command information registered in buffer register 4505 and the accuracy of the translations performed by left translator 4506 is thus verified. A more complete description of the group check operation is included later herein, it being assumed for now that paths have been completed via left translator 4506 for the operation of a single path selection relay LP10–LP51 in each path selection group PS1–PS5 and a single order relay LOR0–LOR7.

At approximately time *t*7.0 milliseconds the selected path selection relays LP10–LP51 and the selected order relay LOR0–LOR7 are fully operated. The closure of the contacts of the selected path selection and order relays LP10–LP51, LOR0–LOR7 completes a network control pulsing path which extends from left pulser 4612 through the control windings of selected cross-point devices in Upper Junctor Network Unit 2110 via which a network control pulse is transmitted to effect the execution of the command. The complete pulsing path may be traced from a secondary winding of transformer 4616 via lead 4604 through operated contacts of relay LPSL, over lead 4608, through a nonoperated contact of relay LQ, on FIG. 47, through an operated contact of one operated order relay LOR0–LOR7 on FIGS. 45 and 46, over one of the path selection leads 4157, through operated contacts of the selectively operated path selection relays LP10–LP51 and the selected cross-point device control windings in Upper Junctor Network Unit 2110 on FIGS. 21, 22, 25, 26, 29, 30, 33 and 34, back over another of the path selection leads 4157, through other operated contacts of the operated order relay LOR0–LOR7, over lead 4705, through another nonoperated contact of relay LQ on FIG. 47, over lead 4605, through another operated contact of relay LPSL, over lead 4607, through the other secondary winding of transformer 4616 and through rectifier 4631 back to the original secondary winding of transformer 4616. The path selection operation will be more fully understood from the description of certain specific commands which is given later herein.

Left pulser 4612 includes two network control path continuity check relays PC1 and PC2 which detect the closure of a network control pulsing path; a short-to-ground detection relay SC which detects the presence of any false ground potential applied to the pulsing path; and an early time-out relay ETO which disables the pulse generation circuitry of pulser 4612 when operated, as described later herein. Negative potential is connected through the primary winding of polar relay SC, a resistor 4635, the primary winding of polar relay PC2, one secondary winding of transformer 4616 and one winding of magnetic core 4614 to lead 4607. Positive potential is connected through the secondary winding of relay SC, resistor 4637, the winding of PC1 and the other secondary winding of transformer 4616 to lead 4604. When the selected path selection and order relays LP10–LP51, LOR0–LOR7 have fully operated, current flows from positive potential through the windings of relays SC and PC1, over leads 4604 and 4607 and through one winding of relays PC2 and SC to negative potential. This current is insufficient to affect the cross-point devices in the pulse path, however, the current is sufficient to cause the operation of relays PC1 and PC2. If any foreign ground potential is applied to the pulse path, relay SC will operate and provide an indication of its operation for diagnostic purposes as hereinafter described. The operation of relay SC does not affect the cycle of left pulser 4612.

Pulser 4612 includes a bank of capacitors 4615 having negative potential connected to one side thereof. The other side of each of the capacitors 4615 is connected to positive potential through inductance 4622, resistor 4621 and a nonoperated contact of relay PC2. This is the charging path for the capacitors 4615. It is important to insure that the capacitors 4615 are fully charged before they are discharged across the primary winding of transformer 4616 to generate the network control pulse. The operation of relay PC2 is therefore delayed until charging current for the capacitors 4615 ceases to flow. The secondary winding of polar relay PC2 is connected in series between one side of capacitor 4628 and negative potential via resistor 4630. So long as charging current for the capacitors 4615 flows, current will also flow through capacitor 4628 and thus prevent polar relay PC2 from operating over its primary winding. Relay PC2 will not operate until the charging current from capacitors 4615 and 4628 ceases to flow, thereby insuring that capacitors 4615 are fully charged before allowing a network control pulse to be generated.

Assuming that capacitors 4615 are fully charged, relays PC1 and PC2 start to operate when the pulsing path circuit is completed. Relays PC1 and PC2 require approximately 2 milliseconds to operate, thus allowing for any contact vibration during the closure of the contacts of the path selection and order relays LP10–LP51, LOR0–LOR7. When relays PC1 and PC2 are fully operated, positive potential is applied to the gate element of the controlled rectifier 4626 through the operated contacts of relay PC2, a nonoperated contact of relay ETO, operated contacts of relay PC1 and an RC protection network comprising resistors 4625, 4633 and capacitors 4644, 4629. Controlled rectifier 4626 is enabled when positive potential is applied to its gate element. The positive charge on capacitors 4615 is discharged through the enabled controlled rectifier 4626 and the primary winding of pulse transformer 4616. The discharging of capacitors 4615 induces a network control pulse through transformer 4616 into the secondary windings thereof. The network control pulse is transmitted over the above-traced network control path to effect the operation or release of the contacts of selected cross-point devices in Upper Junctor Network Unit 2110. Had relay ETO been operated, as described later herein, the circuit whereby controlled rectifier 4626 was enabled would have been opened, thus preventing the discharge of the capacitors 4615 across the primary winding of transformer 4616.

Magnetic core 4614, through which the network control pulse is applied via lead 4607, verifies that the network control pulse is of sufficient amplitude to effect the operation or release of the selected cross-point devices. A bias potential tending to maintain magnetic core 4614 in one state of magnetic remanence is applied to winding 4632 of the core 4614 via lead 5613 through operated contacts of relay LPSL. This bias serves as a reference, and prevents the magnetic core 4614 from changing its magnetic state unless the amplitude of the network control pulse applied via lead 4607 is sufficient to overcome the biasing current. If the network control pulse is of sufficient amplitude to overcome the biasing current, a signal is developed in readout winding 4633 when magnetic core 4614 changes its magnetic state. The signal developed in winding 4643 of core 4614 is called a local RESET signal in that it indicates the successful completion of a pulsing cycle and initiates the return of the Left Junctor Network Control Unit to its idle state.

The local RESET signal appears on lead 4603 as an A.C. signal which is integrated by integrator 5005. Under normal operating conditions the local RESET signal is generated at approximately time *t*10.0 milliseconds. The output of integrator 5005, as a result of the integration of the local RESET signal, is a positive going current spike on lead 5007 which is followed by a negative going current spike. Inverter 5006 is responsive to the raise in potential on lead 5007, due to the aforegoing positive current spike, to lower the potential on its output lead 5003 for a period of 0.5 microsecond. The momentary low potential condition of lead 5003 causes flip-flop 5431 to be RESET via OR gate 5433 at approximately time *t*10.0 milliseconds.

Lead 5003 also serves as one input to AND gate 5021. AND gate 5021 has three input leads 5003, 5020 and 5041 all of which are normally high due to their connection to the respective output terminals of inverters 5006, 5017, 5018, 5441 and 5442. Thus the normal condition of lead 5001 is high due to the operation of AND gate 5021. When, as a result of the local reset signal, the potential applied to lead 5003 is momentarily lowered, lead 5001 becomes low for a corresponding period of time due to the disablement of AND gate 5021. The low potential applied to lead 5001 causes flip-flop 5310 to be RESET via OR gate 5311 at approximately time *t*10.0 milliseconds.

Figure 54:
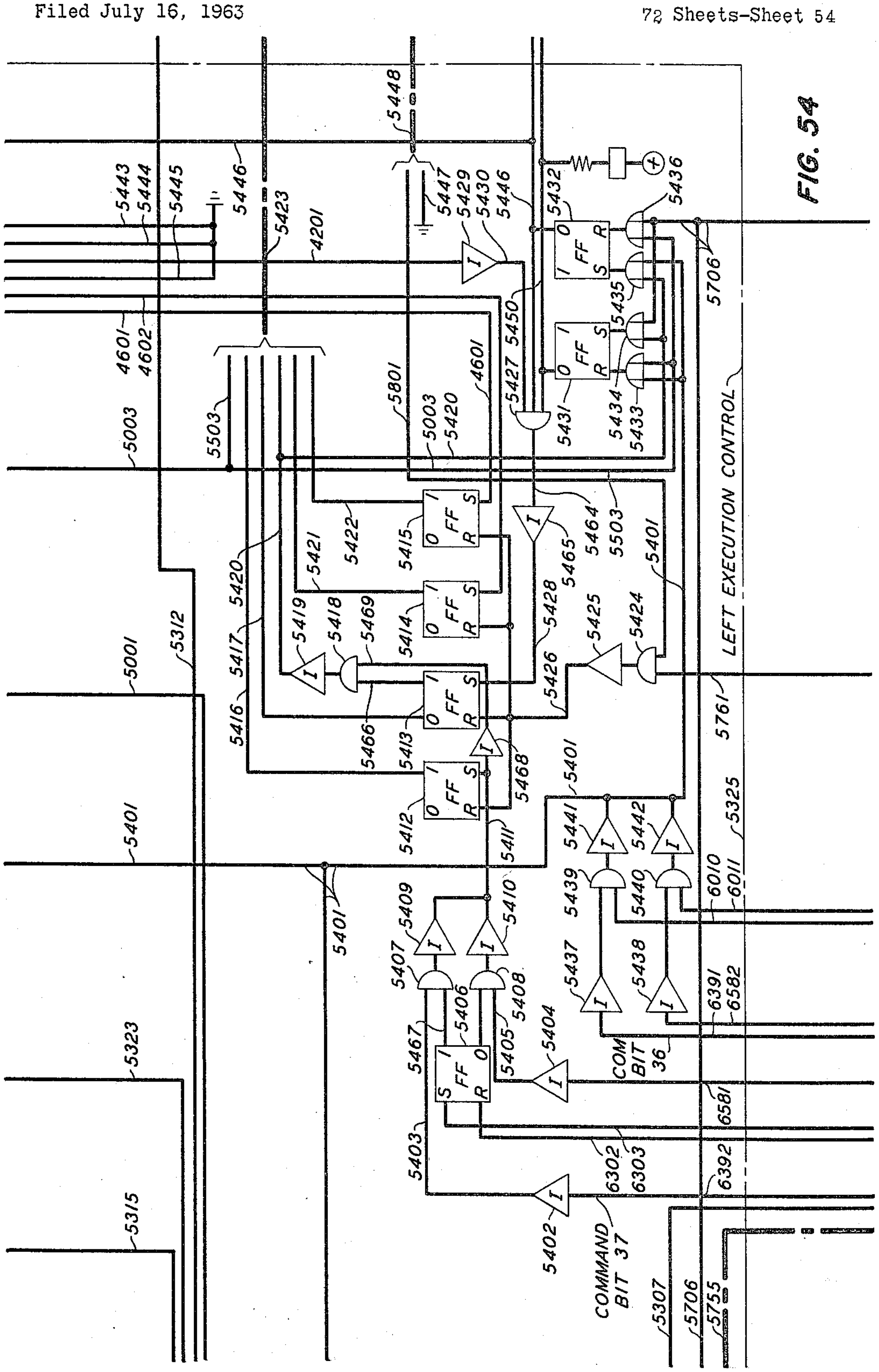

When flip-flop 5431 was RESET, as described above, the potential on lead 5450 changed from low to high thereby initiating the release of relay LF on FIG. 54. Relay LF requires approximately 1 millisecond to release.

When flip-flop 5310 is RESET, as described above, the potential on lead 5313 changes from low to high, thereby initiating the release of relay LVCT. Relay LVCT requires in excess of one millisecond to release due to the RC network comprising capacitor 5322 and resistor 5321 associated with its control winding.

At approximate time *t*11.0 milliseconds relay LF is fully released and the potential on lead 5316 is abruptly lowered to ground potential through a nonoperated contact of relay LF on FIG. 53. At this time the operating current through the reed relays of left translator 4506 for the path selection and order relays LP10–LP51, LOR0–LOR7 ceases to flow due to the removal of positive potential from lead 5315. In response to the low potential on lead 5316, pulse generator 5314 lowers the potential applied to lead 5317 for approximately 0.5 microsecond. Lead 5305 becomes high at this time due to the operation of inverter 5304. The momentary high potential on lead 5305 appears as a momentary low potential on leads 5309 and 5307 due to the operation of inverters 5308 and 5306. The low potential on lead 5309 is applied to left buffer register 4505 on FIG. 45 and causes the enable register elements therein to be disabled (RESET), thus preparing them to register a subsequent command. The low potential on lead 5307 is applied to the RESET terminals of flip-flops 6024 and 6025 causing flip-flop 6024 to be RESET. Relay LVCT subsequently releases and the Left Junctor Network Control Unit is prepared to receive and execute a subsequent enable signal and central processor command.

*Group check operations.*—Left group check circuit 5051 is provided to insure that one and only one path is available through each reed relay translator of left translator 4506 to operate a path selection relay LP10–LP51 within each path selection group PS1–PS5 and an order relay LOR0–LOR7. The details of operation of an automatic path verifier which may be advantageously used for this purpose are disclosed in the copending application, Serial No. 227,813, filed October 2, 1962, of D. Danielsen. This application is incorporated herein by reference.

Functionally, each Group Check Unit 4904 compares a reference current to the current flowing through the operating path for one path selection group PS1–PS5 by means of a transformer 4905. The operating path includes the contact protection networks 4681, 4682, 3781, 3782, etc., of the path selection and order relays LP10–LP51, LOR0–LOR7. Transient currents flow through the contact protection network of each path selection group PS1–PS5 prior to the full operation of the path selection relays LP10–LP51. The magnitude of the transient currents in the operating circuits of a path selection group PS1–PS5 is proportional to the number of contact protection networks such as 3781 and 3783 having transient currents flowing therein. The detection of a current greater or less in magnitude than the reference current will cause a failure, and a negative going current spike will be applied to either or both of leads 4902 and 4901. A separate group check unit 4904 is provided for each path selection group PS1–PS5 and for the order relays LOR0–LOR7.

For purposes of description it is assumed that a group check failure signal is applied to lead 4901 as a result of more than one circuit being completed for the operation of a path selection relay LP10–LP51 within one of path selection groups PS1–PS5. Responsive to the abruptly lowered potential on lead 4901, one input terminal of AND gate 5010 becomes momentarily high due to the operation of inverter 5008. The other input lead 5323 of AND gate 5010 is also high at this time due to the connection of positive potential thereto by operated contacts of relay LF on FIG. 53.

AND gate 5010 will transmit the group check failure signal only when relay LF is operated, thus preventing false group check failure indications from prematurely disturbing the command execution cycle. Further, it will be recalled that relay LPB on FIG. 50 started to operate in response to the application of positive battery potential to lead 5315 when relays LF and LVCT had fully operated. Relay LPB requires 1 millisecond to operate fully. The negative potential which produces the group check failure pulse is applied via lead 5103 to the secondary winding of transformer 4905, as previously described. When relay LPB is fully operated, this same negative potential is applied via lead 5102 and a nonoperated contact of relay LQ to the other side of the secondary winding of transformer 4905. Thus the secondary winding of transformer 4905 is shunted and the generation of group check failure signals is prevented. The group check operation therefore occurs in the one millisecond interval between the time relay LVCT operates and the time relay LPB operates, after which the Group Check Units 4904 are disabled.

When both input terminals of AND gate 5010 become high, as previously described, the SET terminal of flip-flop 5012 becomes low due to the operation of inverter 5011 and flip-flop 5012 assumes its SET condition. In its SET condition, flip-flop 5012 assumes its SET condition. In its SET condition, flip-flop 5012 applies high potential to one input terminal of AND gate 5016. The other input of AND gate 5016 is connected via lead 5171 through an operated contact of relay LQ to ground potential on FIG. 51. Relay LQ is not operated at this time and high potential is therefore present on lead 5171. When both input terminals of AND gate 5016 becomes high lead 5020 becomes low due to the operation of inverter 5017.

As previously described, the three input leads, 5003, 5020 and 5401, of AND gate 5021 normally are high. In the same manner as previously described, the lowering of the potential on one input lead 5020 of AND gate 5021 causes lead 5001 to become low and flip-flop 5310 to be RESET. When flip-flop 5310 becomes RESET, relay LVCT starts to release as previously described. Although its release time is slowed by the RC network 5321, 5322, relay LVCT will release before the slow operating path selection and order relays LP10–LP51, LOR0–LOR7 are fully operated. The release of relay LVCT removes positive potential from the operating path for the path selection and order relays LP10–LP51, LOR0–LOR7. Thus, all circuit operations in the Left Junctor Network Control Unit are halted and any false operation of cross-point devices in Upper Junctor Network Unit 2110 is prevented.

Upon receiving an indication from the Left Junctor Network Control Unit that a failure has occurred, as hereinafter described, Central Processor 2030 may transmit a RESET signal via Command Bus 0 to return the Left Junctor Network Control Unit to its idle condition.

*External Reset operation.*—Each Command Bus 0 and 1 provides transmission paths for thirtysix-bits B00–B35 of normal command information and two bits B36, B37 of special command information. Command bits B00–B35 define a particular system operation to be performed and the location at which it is to be performed, as previously described. Command bit B36 is termed an external RESET signal, and is transmitted by the Central Processor 2030 when it is desired to interrupt the operations of a Control Unit. Command bit B37 will be described later herein.

It is assumed that a command has been accepted from Command Bus 0 and registered in left buffer register 4505 and that the Left Junctor Network Control Unit is in the process of executing the registered command. For some reason Central Processor 2030 ascertains that an error has been made and that the execution of the command should be halted. The Cental Processor 2030 then transmits a RESET signal via Command Bus 0. The external RESET signal is received via a bus receiver 6360 in a manner similar to that previously described with reference to the command bits B00–B35, and command bit B36 appears as a momentary lowering of the potential applied to lead 6391.

Lead 6391 is connected to left execution control 5325 and right execution control 5626. The low potential applied to lead 6391 results in the application of high potential to one input terminal of AND gate 54939 due to the action of inverter 5437. The other input lead 6010 of flip-flop 5439 is connected to flip-flop 6024 which is in its SET condition as previously described. High potential is therefore present on lead 6010 and AND gate 5439 is enabled. The output potential of AND gate 5439 becomes high and is applied to inverter 5441. The potential on lead 5401 is lowered as a result of the action of inverter 5441. The low potential applied to lead 5401 causes flip-flop 5431 to be RESET, flip-flop 5432 to be SET, flip-flop 5025 to be RESET if previously SET and flip-flop 5012 to be RESET if previously SET. The low potential on lead 5401 is also applied to one input terminal of AND gate 5021 causing the potential on lead 5001 to be lowered as previously described.

When flip-flop 5432 is SET, the potential applied to lead 5446 becomes low. An operating circuit is thereby completed for relay ETO in pulser 4612 on FIG. 46. The operation of relay ETO disables the pulse generating circuitry of pulser 4612 as described above. Relay ETO remains operated until flip-flop 5432 is RESET in response to a subsequent enable signal.

When low potential is applied to lead 5001, flip-flop 5310 is RESET and relay LVCT is released, and, as a result of flip-flop 5431 being RESET, relay LF is released, however, both of these relays require in excess of 1 millisecond to fully release.

The low potential on lead 5401 is also applied to one input terminal of negative AND gate 5301. Negative AND gate 5301 provides low potential on its output terminal when both input leads 5401 and 5316 have low potential applied thereto. When both or one of the input leads 5401 and 5316 have high potential applied thereto the output of negative AND gate 5301 remains at high potential. Negative AND gate 5301 insures that the command execution cycle will not be interrupted unless relay LF is in a released condition. High potential remains on lead 5316 unless relay LF is released.

As previously described, pulse generator 5314 is responsive to a change in potential on lead 5316 from high to low. If an external RESET signal is received from Central Processor 2030 before relay LF has operated, no change in potential occurs on lead 5316 and pulse generator 5314 is ineffective. Should an external RESET signal be received from Central Processor 2030 subsequent to the establishment of a pulsing path, i.e., after the path selection and order relays LP10–LP51, LOR0–LOR7 have operated, the RESET signal will also be ineffective and the command execution cycle will proceed in a normal fashion. It is further important to insure that the reed relay translator contacts in translator 4506 are not released until positive potential is removed from lead 5315 in order to prevent current from flowing through the contacts of the relays at the time they start to release.

When the potential on leads 5401 and 5316 is low, the output of negative AND gate 5301 is low. This output is applied to inverter 5304 resulting in the application of high potential to lead 5305. As previously described, the application of high potential to lead 5305 results in the disablement of the register elements in left buffer register 4505 and the RESET of flip-flop 6024.

The remainder of the external RESET operation is similar to that previously described with reference to the local RESET operation.

*Supervisory scan points.*—As previously mentioned, each System Control Unit is equipped with supervisory scan points whereby the Central Processor 2030 can monitor the command-execution cycle of the System Unit by way of the Master Scanner 2032. Flip-flops 5431 and 5432 provide two such supervisory scan points.

The 0 output terminal of flip-flop 5431 is connected to lead 5450. Lead 5450 is connected via inverter 6114 and lead 6115 to left test-access 6121. Similarly, the 0 output terminal of flip-flop 5432 is connected to lead 5446, which in turn is connected via inverter 6112 and lead 6113 to left test-access 6127.

Left test-access 6127 includes test point relay LTP whose operation is described later herein, it being assumed for the present that relay LTP is not operated. Lead 6113 is connected through a nonoperated contact of relay LTP to lead 6119. Lead 6115 is connected through a nonoperated contact of relay LTP and a nonoperated contact of relay LQ to lead 6117. Leads 6117 and 6123, 6119 and 6124, 6120 and 6125 are grouped as diagnostic pairs in cable 6153 which is turn is grouped with other similar cables in Diagnostic Cable 2070. Each diagnostic pair, such as 6117 and 6123, of Diagnostic Cable 2070 is connected to a discrete ferrod in the ferrod matrix of Master Scanner 2032. The presence or absence of current flow in a diagnostic pair such as 6117 and 6123 of Diagnostic Cable 2070 is reflected in the magnetic state of its discretely associated ferrod. These ferrods are periodically interrogated via Master Scanner 2032 by the Central Processor 2030, as previously described, to ascertain the supervisory state of the scan points associated therewith.

One illustrative manner in which the supervisory scan points may be used is described below. At the start of an execution cycle flip-flops 5431 and 5432 are both in the RESET condition. At this time high potential is applied to leads 5446 and 5450. The low potential on leads 5446 and 5450 is inverted by inverters 6112 and 6114 and appears on leads 6113 and 6115 as low potential. This low potential is applied through nonoperated contacts of relay LTP in test-access 6127 to leads 6117 and 6119. Since the leads 6123 and 6124 respectively associated with leads 6117 and 6119 are connected to positive potential, current will flow through their associated ferrods. Further, ground potential is applied to lead 6120 through nonoperated contacts of relay LQ and relay LTP thus causing current to flow through the diagnostic pair of leads 6120 and 6125 by way of the Master Scanner 2032.

At time *t*2.5 microseconds flip-flop 5431 was RESET by the verify signal applied to lead 5706. Flip-flop 5432 was not affected since it was already in its RESET condition. The potential on lead 5454 is lowered when flip-flop 5431 became SET. This low potential is inverted by inverter 6114 and appears as a high potential on lead 6115. The high potential is extended through the nonoperated contact of relay LTP in left test-access 6127 to lead 6117. The raising of the potential of lead 6117 stops the current flow through the diagnostic pair 6117 and 6123. Master Scanner 2032 will reflect this change of potential when interrogated responsive to a central processor command thereto. In this manner the Central Processor 2030 can ascertain that the proper Control Unit has been enabled.

Flip-flop 5431 remains SET until the potential on lead 5003 is lowered in response to an internal RESET signal or until the potential on lead 5401 is lowered in response to an external RESET signal is previously described. Assuming that a successful command-execution cycle has been completed and an internal RESET signal generated as previously described, lead 5003 becomes low thus causing flip-flop 5431 to be RESET but having no effect on flip-flop 5432 since it is already RESET. The return of the flip-flops 5431 and 5432 to a RESET condition indicates the successful completion of a command-execution cycle and further indicates that the Left Junctor Network Control Unit is idle and ready to receive a subsequent central processor command.

Assuming now that an external RESET signal is received via one of the Command Buses 0 or 1, lead 5401 becomes low as previously described. With low potential applied to lead 5401 flip-flop 5431 is RESET and flip-flop 5432 is SET. This is the exact reverse of the condition of flip-flop 5431 and 5432 which indicated that the Left Junctor Network Control Unit had been enabled. As a result current will flow through the diagnostic pair 6119 and 6124 but will not flow through the diagnostic pair 6117 and 6123. In this manner the Central Processor 2030, through selective interrogation by the Master Scanner of the ferrods associated with the diagnostic pairs 6117 and 6123, 6119 and 6124, can determine that the Left Junctor Network Control Unit has received an external RESET signal.

The supervisory indications given by the diagnostic pair 6120 and 6125 are associated with the various modes of operation in which the Left Junctor Network Control Unit can be placed. A further description of these indications is included in the discussion in the mode of operation control hereinbelow.

SPECIFIC COMMAND EXECUTION OPERATIONS

The aforegoing description relates to the general operation of the circuits of the Left Junctor Network Control Unit. The following description relates to specific operations within the Junctor Network Units 2110, 4020 and the Left and Right Junctor Network Control Units in response to specific central processor commands. For each of the commands described it will be assumed that selected path selection relays are operated in response to command information registered in left buffer register 4505 as previously described. The circuits over which the selected path selection relays LP10–LP51 are operated will not be described.

*Connect command.*—It is assumed that path selection relays LP17, LP20, LP37, LP40 and LP50 are operated in response to appropriate command information registered in left buffer register 4505. It is further assumed that relay LCTL and relay LPSL have been operated as previously described.

The order portion of a command defines the particular switching function to be performed at the locations indicated by the address portion of the command. A connect command is distinguished from all other commands by the operation of order relay LOR1 on FIG. 41 in response to the order portion of the command information registered in left buffer register 4505.

When the above-noted path selection relays LP17, LP20, LP37, LP40 and LP50 and order relay LOR7 are fully operated, a network control pulsing path is completed. This pulsing path extends from left pulser 4612 via lead 4604, through an operated contact of LPSL, over lead 4608, through a nonoperated contact of relay LQ on FIG. 47, over lead 4708, through an operated contact of relay LOR1, over lead 4511, through an operated contact of relay LP50 on FIG. 21, through an operated contact of relay LP17 on FIG. 21, through the vertical control windings of a plurality of cross-point devices including cross-point device 2161, via the common bus 2100 of switch array SW000, through the horizontal control windings of a plurality of cross-point devices including cross-point device 2161, over C link 2181, through an operated contact of relay LP37 on FIG. 22, through the horizontal windings of a plurality of cross-point devices including cross-point device 2271, through the common conducting bus 2200 of switch array SW010, through the vertical control windings of a plurality of cross-point devices including cross-point devices 2271, through an operated contact of relay LP20 on FIG. 22, through an operated contact of relay LP40 on FIG. 22, over lead 4512, through another operated contact of relay LOR1 on FIG. 45, over lead 4513, through an operated contact of relay LP40 on FIG. 22, through the control winding of test vertical relay F00, through another operated contact of relay LP20, through an operated contact of LP50, over lead 4514, through a further operated contact of relay LOR1 on FIG. 45, over lead 4705, through another nonoperated contact of relay LQ on FIG. 47, over lead 4605, through another operated contact of relay LPSL and over lead 4607 to the left pulser 4612. Thus, a pulse path is completed for the network control pulse to be generated by left pulser 4612. When the network control pulse is generated, as previously described, the contacts associated with cross-point devices 2161 and 2271 will be closed, as indicated on FIGS. 23 and 24.

*Test-vertical operations.*—The test vertical relays, such as F00, are responsive to pulses of one polarity to open their associated contacts and to pulses of an opposite polarity to close their associated contacts. The cross-point devices such as 2161 respond to either polarity of pulses. A pulse applied from lead 4513 through the winding of test-vertical device F00 on FIG. 22 to lead 4514 causes the associated test-vertical contact F00 on FIG. 24 to be opened if previously closed. A transmission path has now been established from an LB link 2330 on FIG. 23 via tip and ring conductors 2337 of switch array SW000, cross-point device contacts 2161, C link 2181, cross-point device contacts 2271 of switch array SW010 on FIG. 24, and tip and ring conductors 2450 to a selected line junctor terminal LJ0.

In response to the network control pulse, an internal RESET signal is generated and the Left Junctor Network Control Unit returned to its idle condition, as previously described.

Connect-with-FCG Command

A connect with FCG command is identical to the above-described connect command except for the polarity of the network control pulse applied to the pulse path. The connect-with-FCG command is identified by the operation of order relay LOR2. It is assumed that identical path selection relays LP17, LP20, LP37, and LP40 and LP50 are operated as were operated for the above-described connect command.

Figure 21:
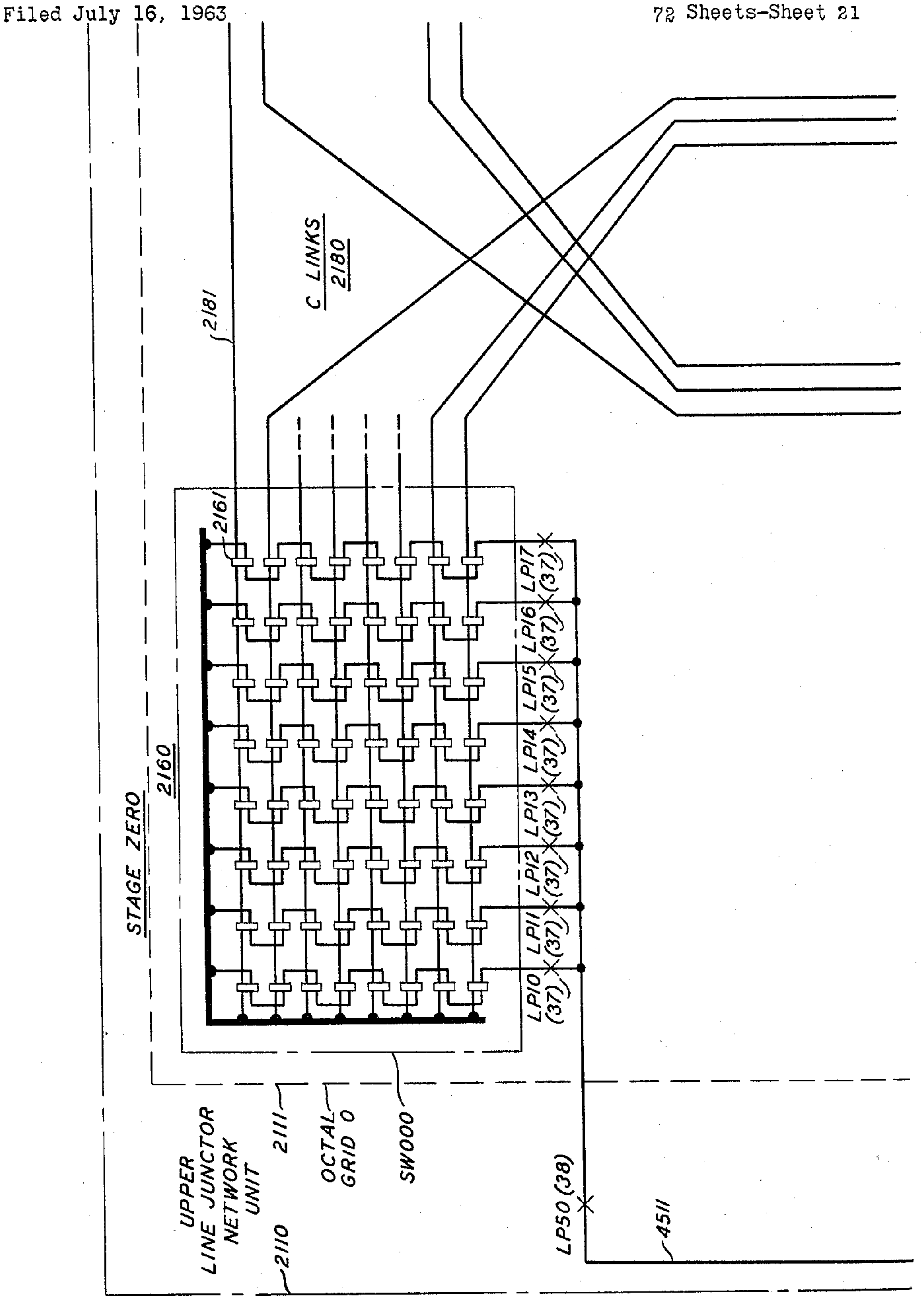
FIGS. 21–65 are a more detailed schematic representation of a Line Junctor Switch Frame.
Figure 22:
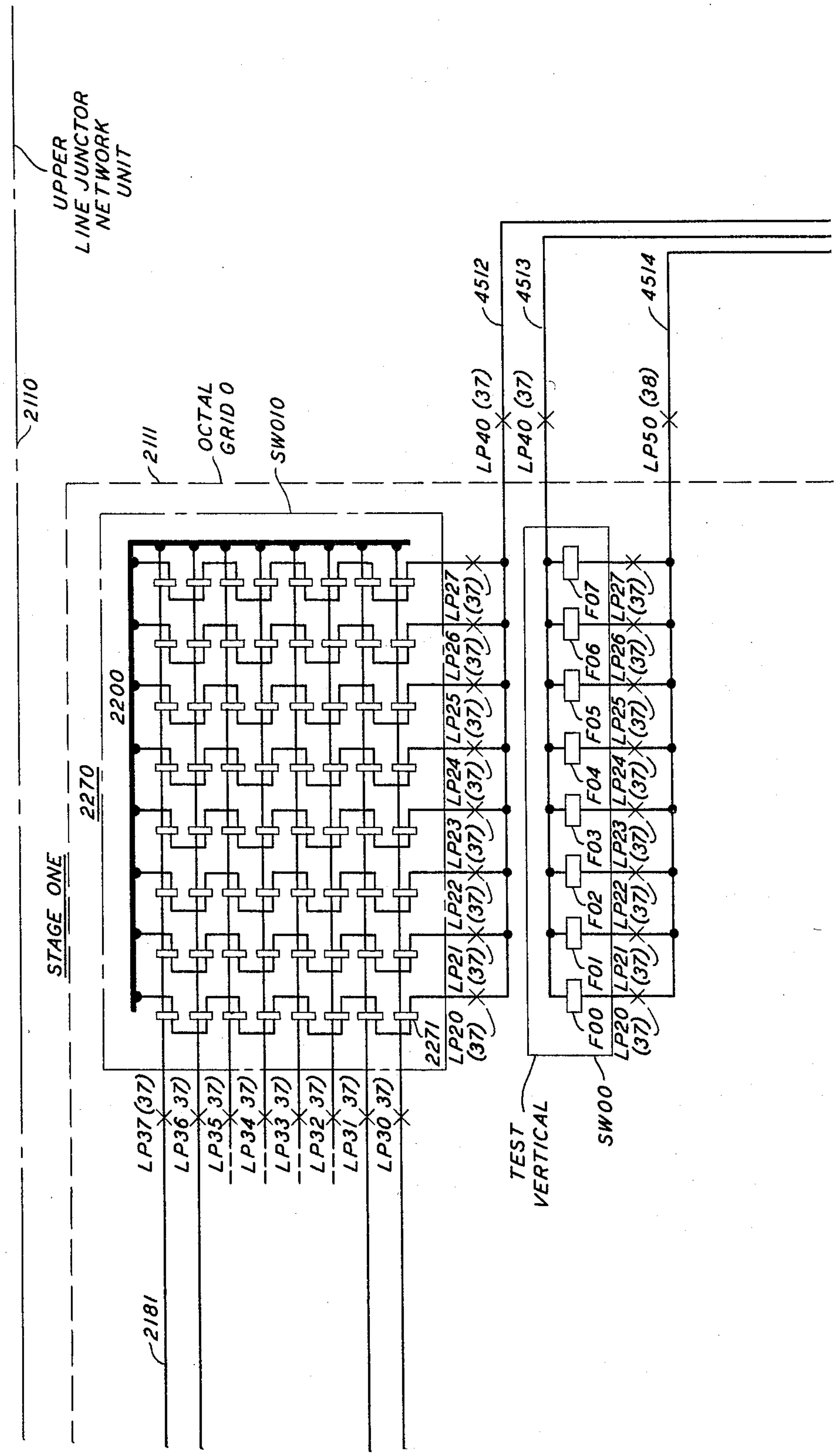
Figure 23:
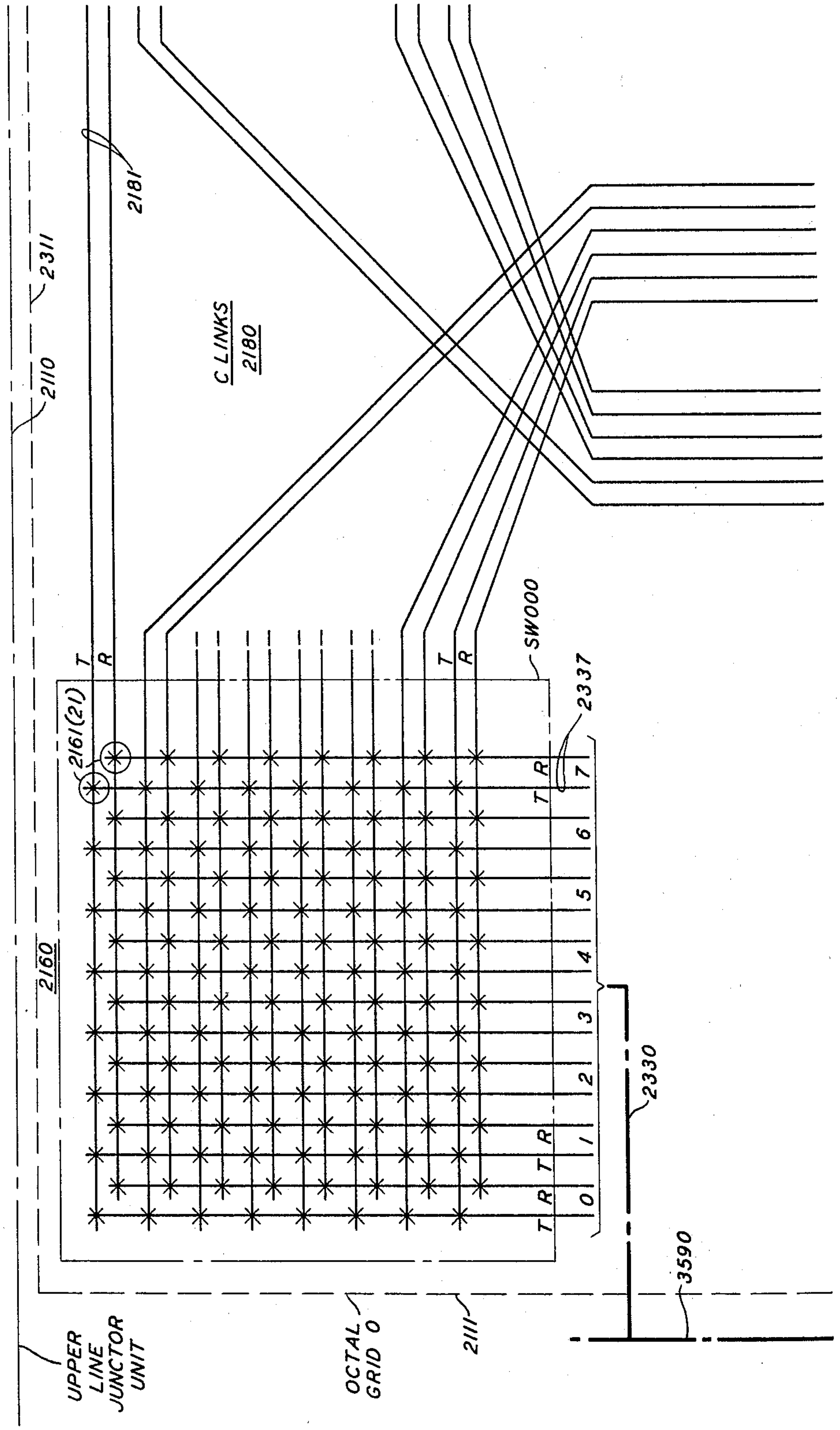

The network control path over which the network control pulse is transmitted may be traced as follows: from left pulser 4612 via lead 4604, through an operated contact of relay LPSL, over lead 4608, through a nonoperated contact of relay LQ on FIG. 47, over lead 4708, through an operated contact of relay LOR2 on FIG. 45, over lead 4514, through an operated contact of relay LP50 on FIG. 22, through an operated contact of relay LP20, through the control winding of test-vertical relay F00, through an operated contact of relay LP40, over lead 4513, through another operated contact of relay LOR2 on FIG. 45, over lead 4512, through another operated contact of relay LP40 on FIG. 22, through another operated contact of relay LP20, through the vertical control windings of a plurality of cross-point devices including cross-point device 2271, through the common conducting bus 2200 of switch array SW010, through the horizontal control windings of a plurality of cross-point devices including cross-point device 2271, over C link 2181, through the horizontal control windings of a plurality of cross-point devices including cross-point device 2161, through the common conducting bus 2100 of switch array SW000 on FIG. 21, through the vertical control windings of a plurality of cross-point devices including cross-point device 2161, through operated contacts of relay LP17, through operated contacts of relay LP50, over lead 4511, through a further operated contact of relay LOR2 on FIG. 45, over lead 4705, through another nonoperated contact of relay LQ on FIG. 47, over lead 4605, through another operated contact of relay LPSL on FIG. 46 and over lead 4607 to left pulser 4612.

Figure 24:
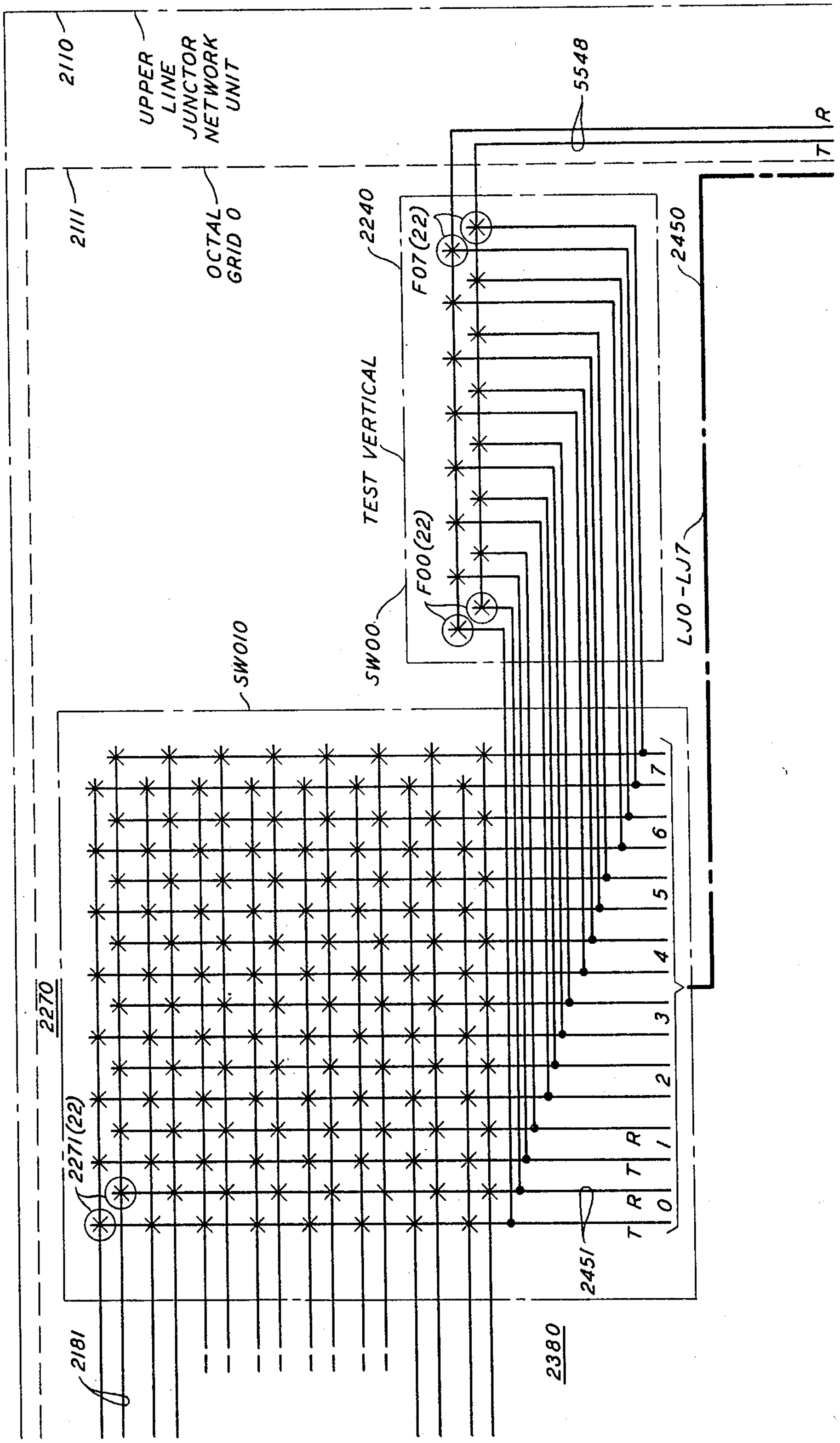
Figure 25:
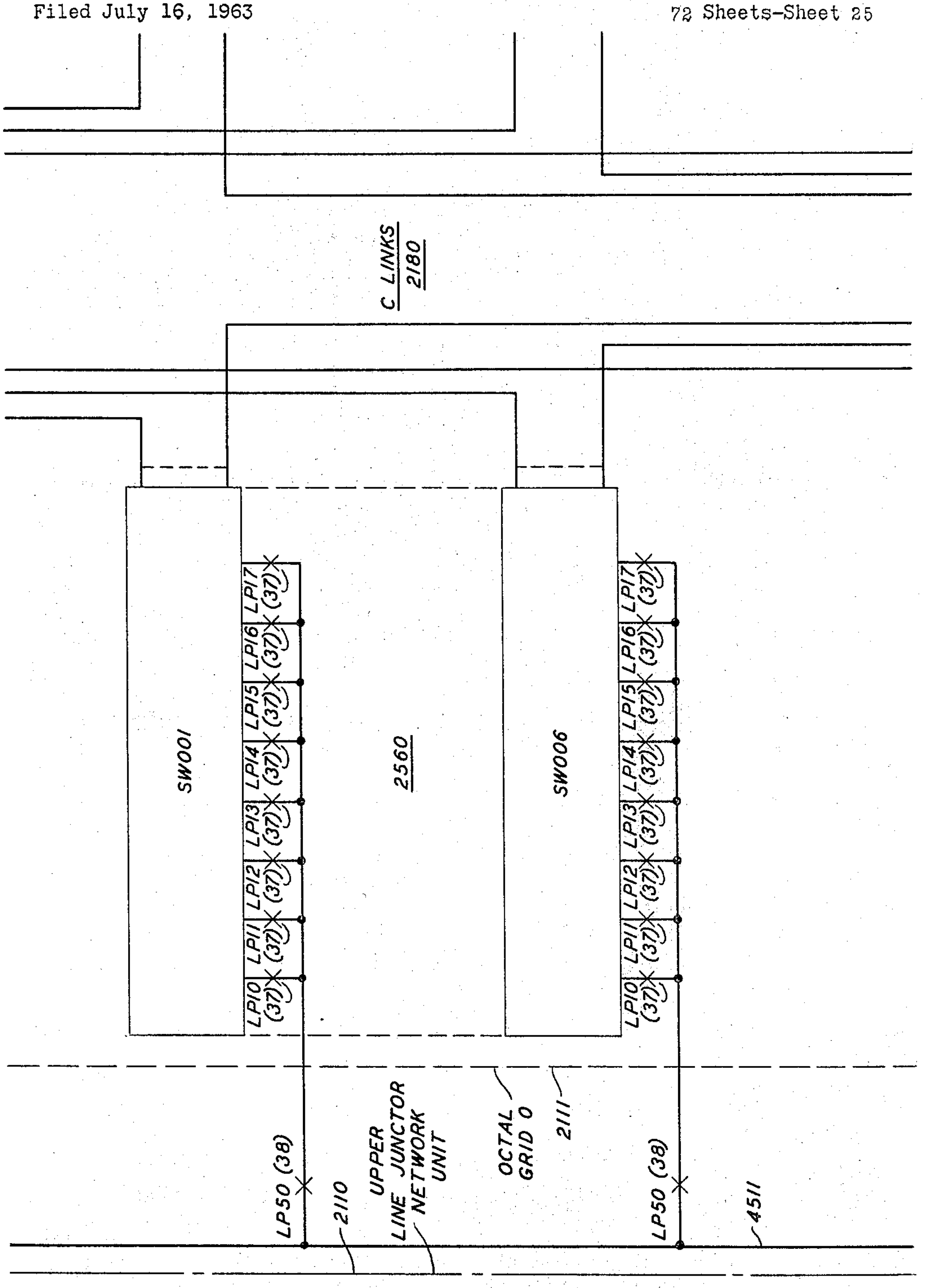
Figure 26:
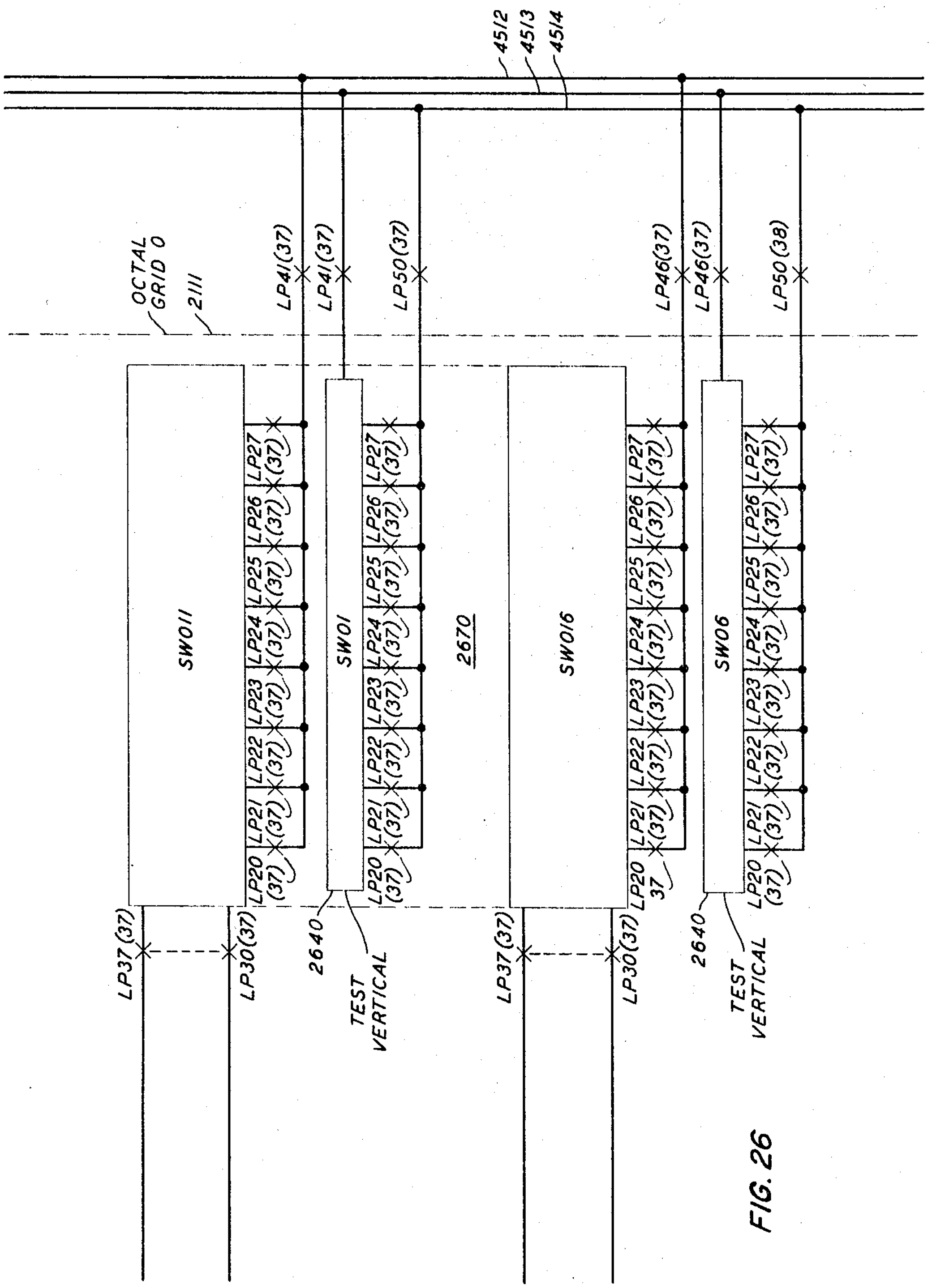
Figure 27:
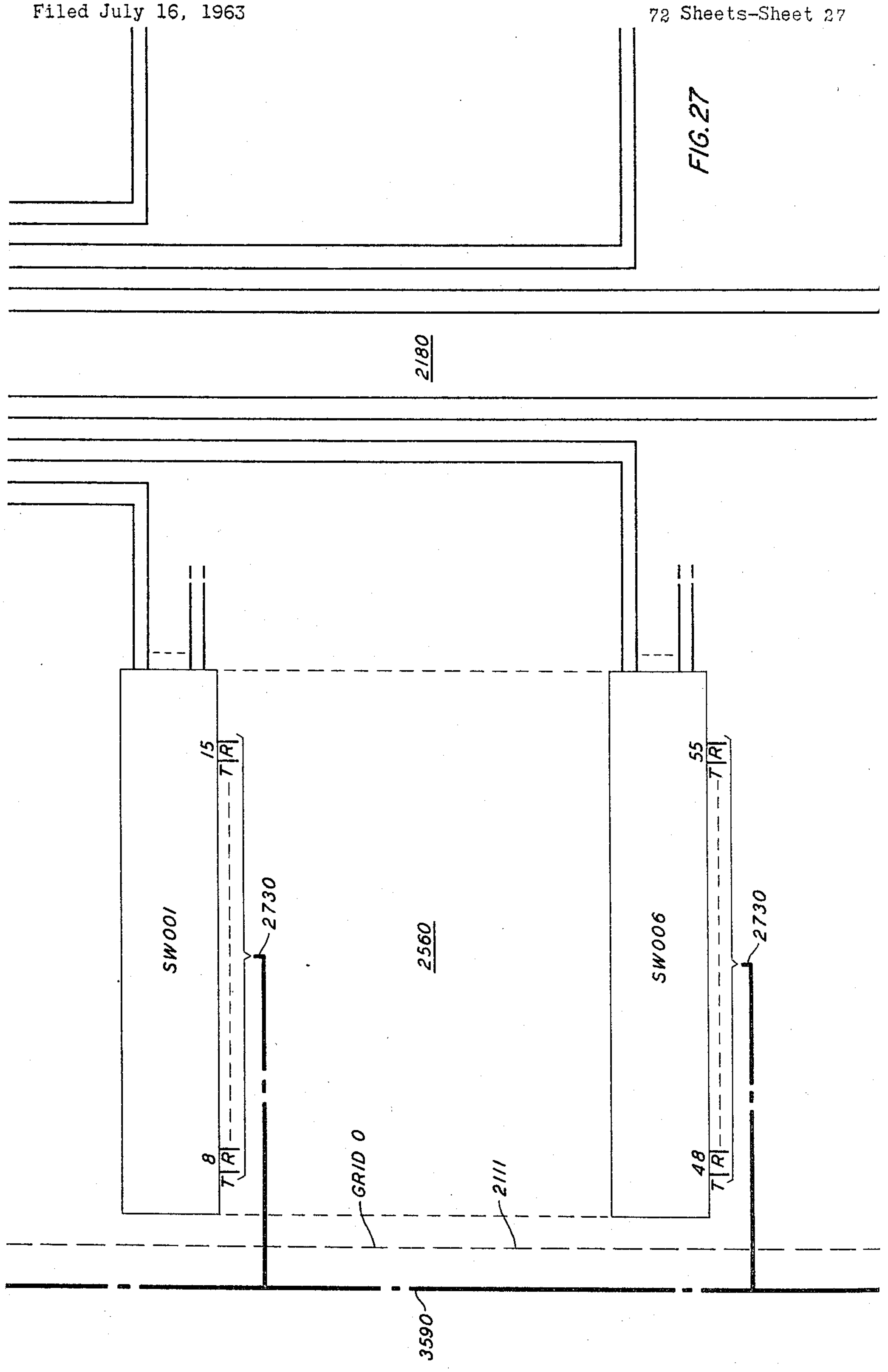
Figure 28:
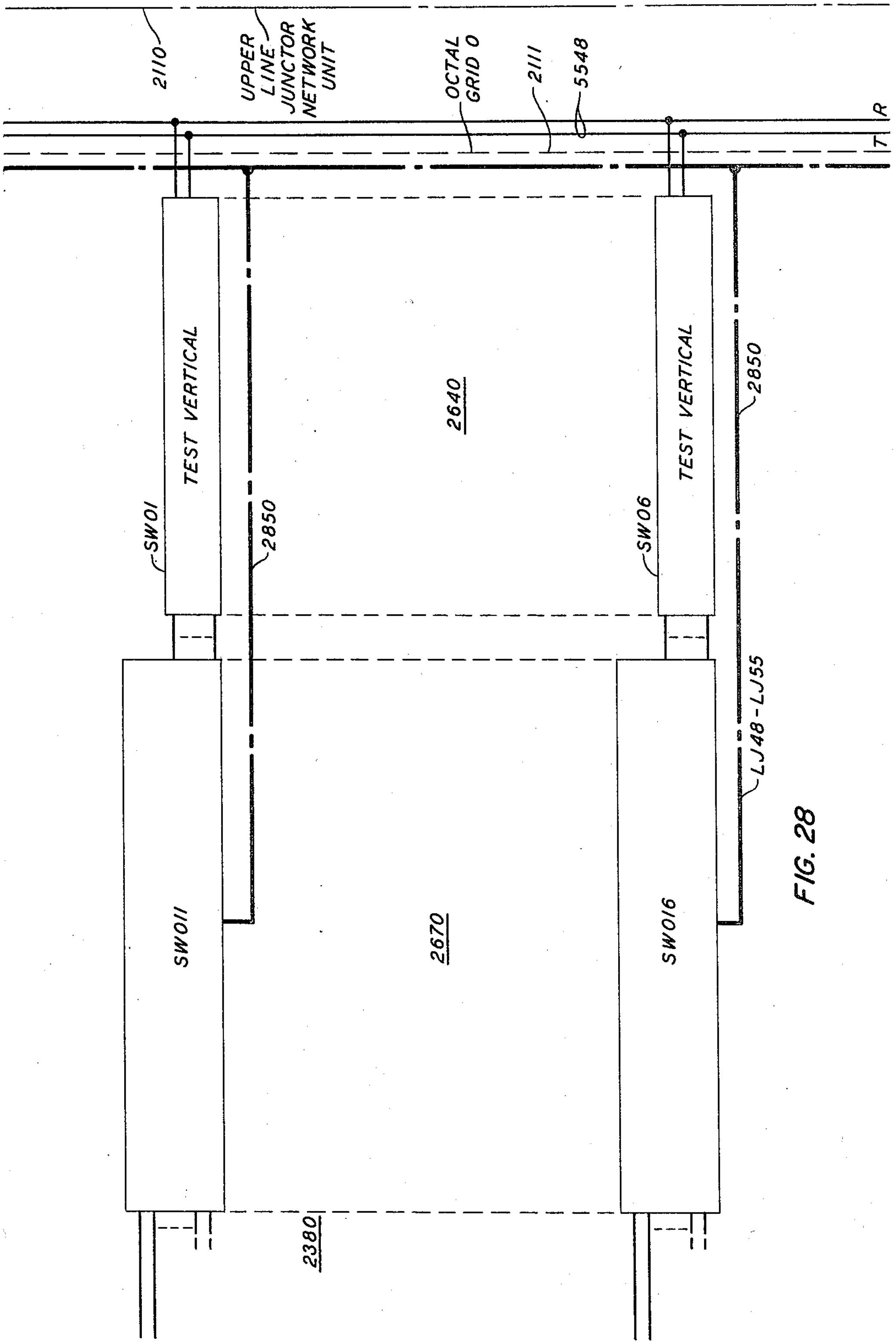
Figure 29:
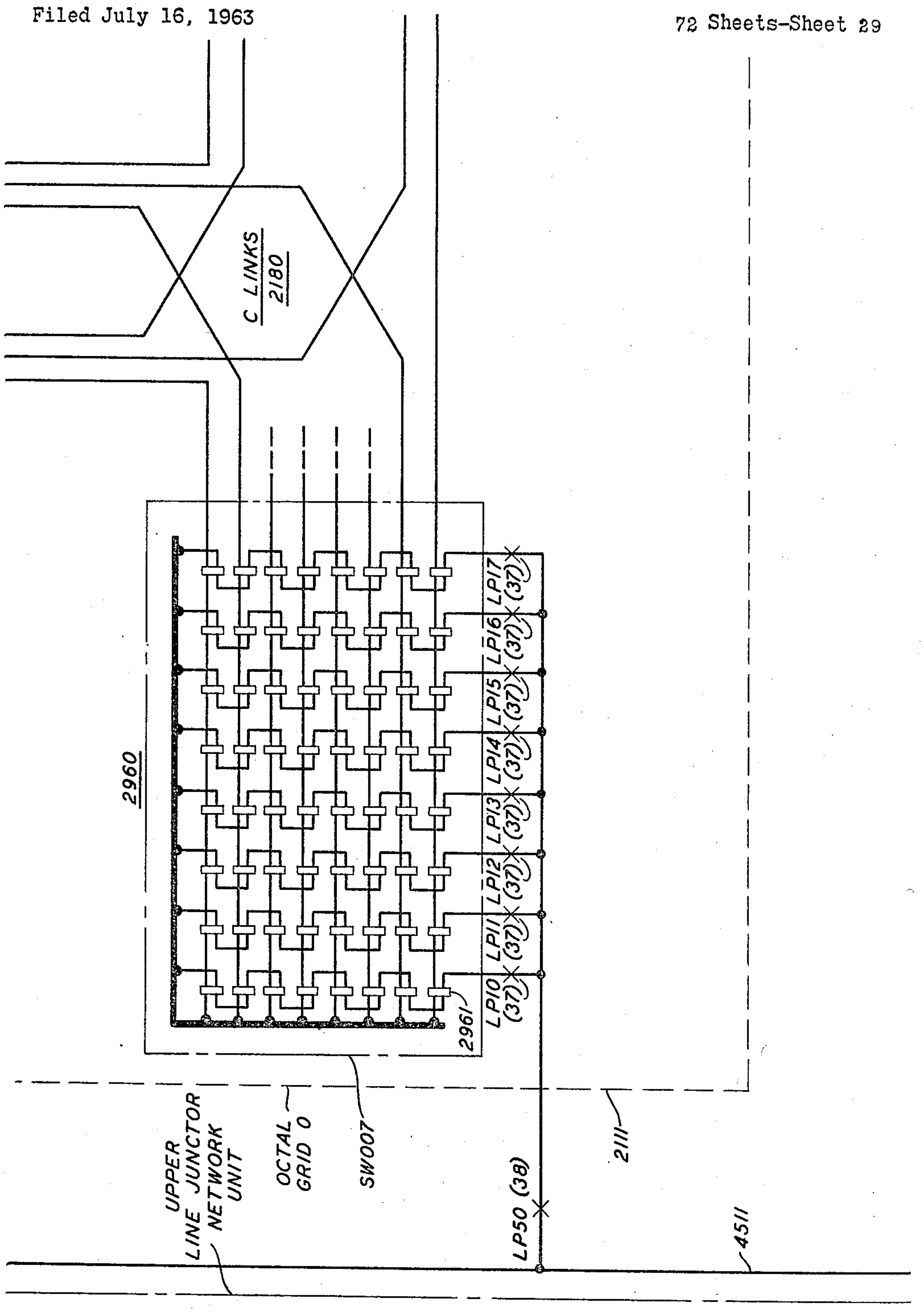
Figure 30:
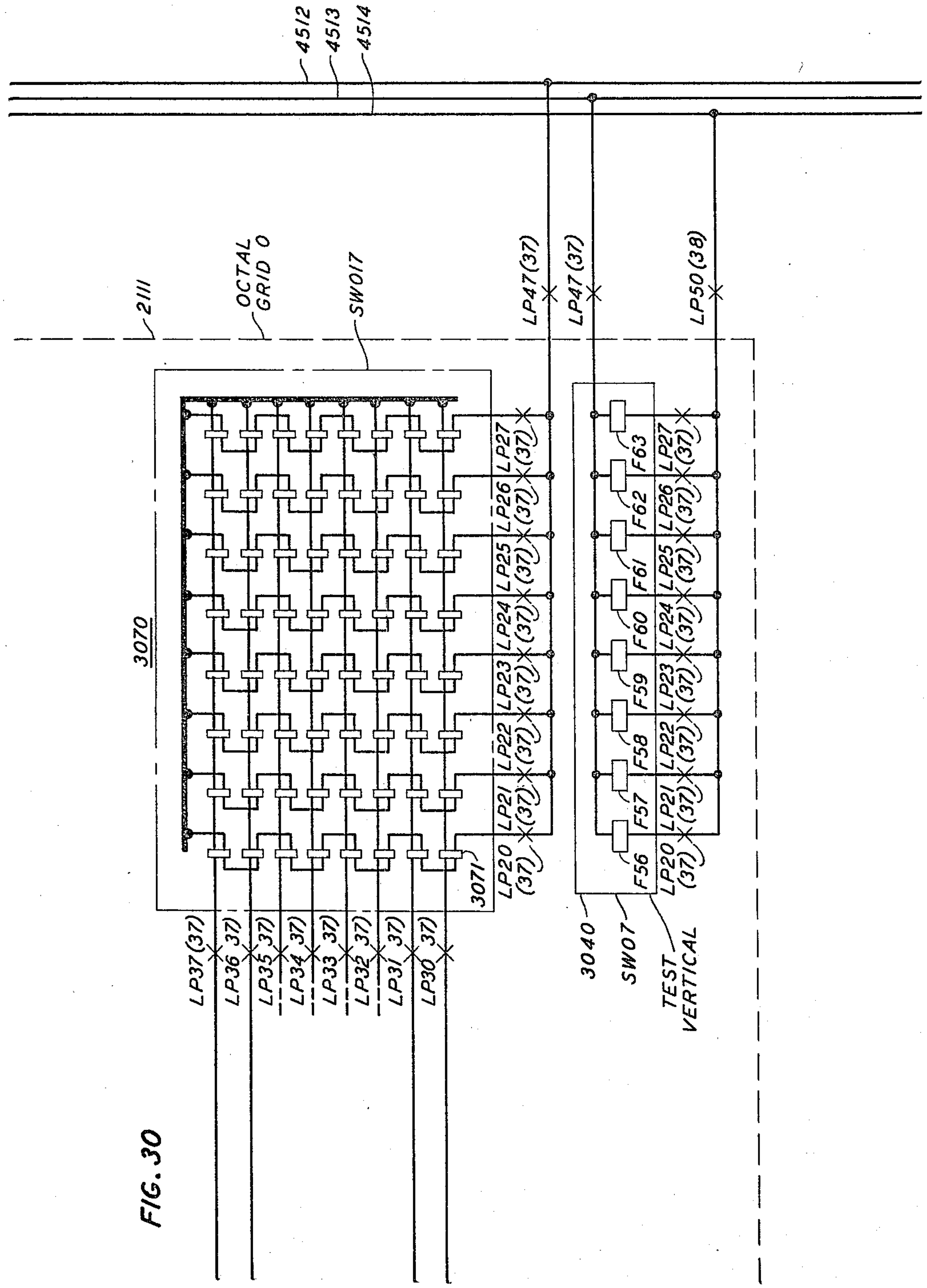
Figure 31:
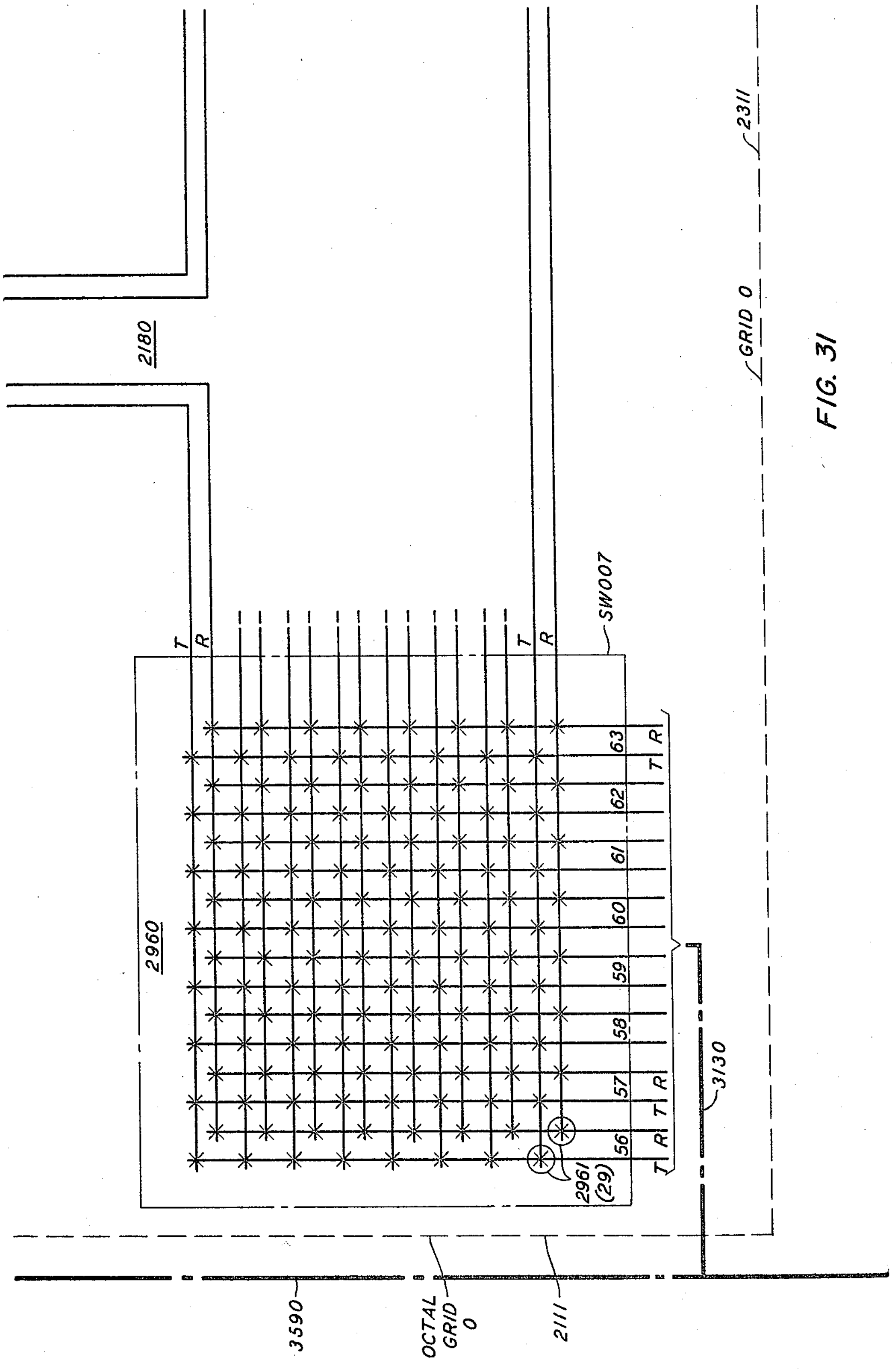
Figure 32:
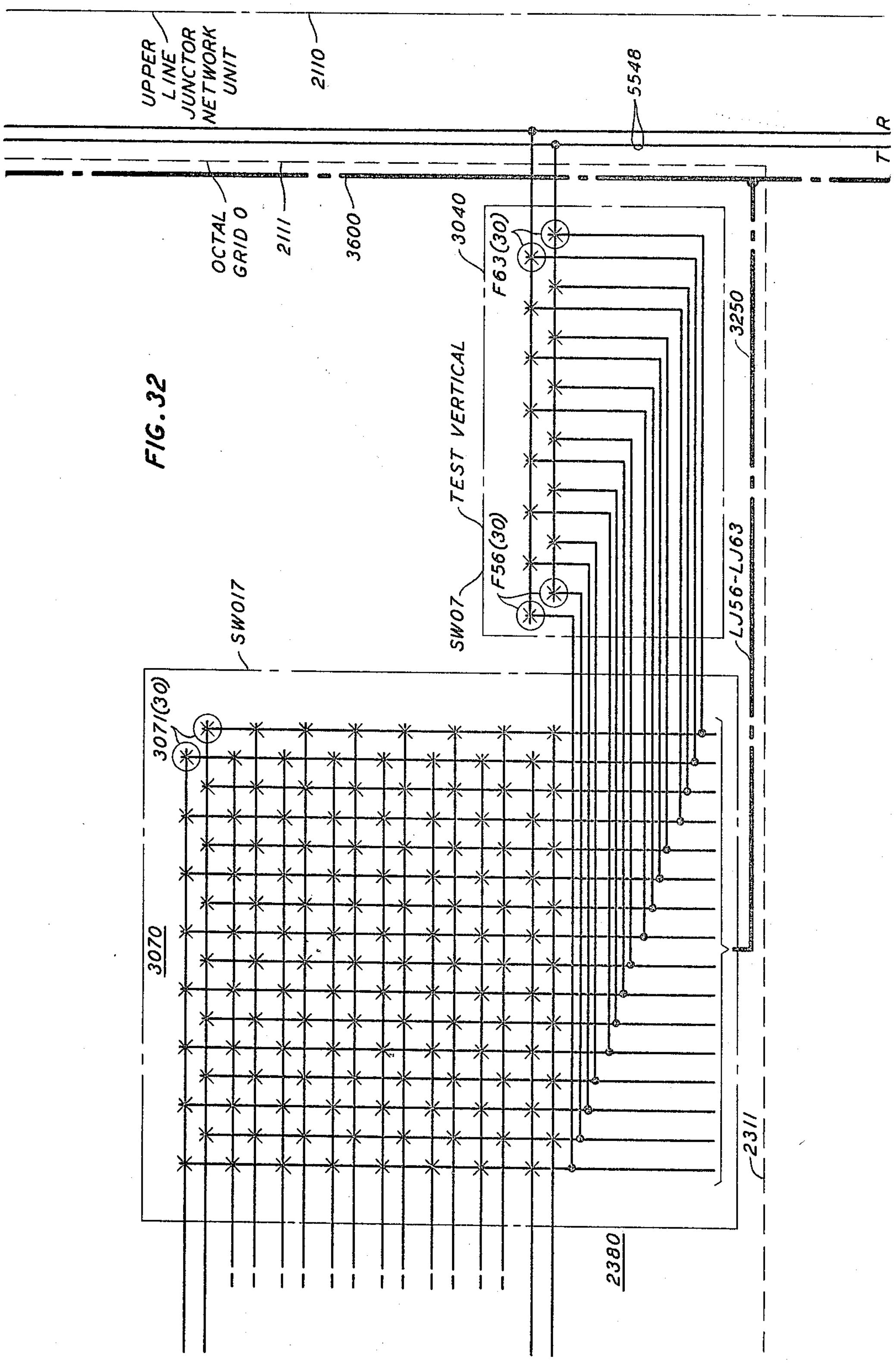
Figure 33:
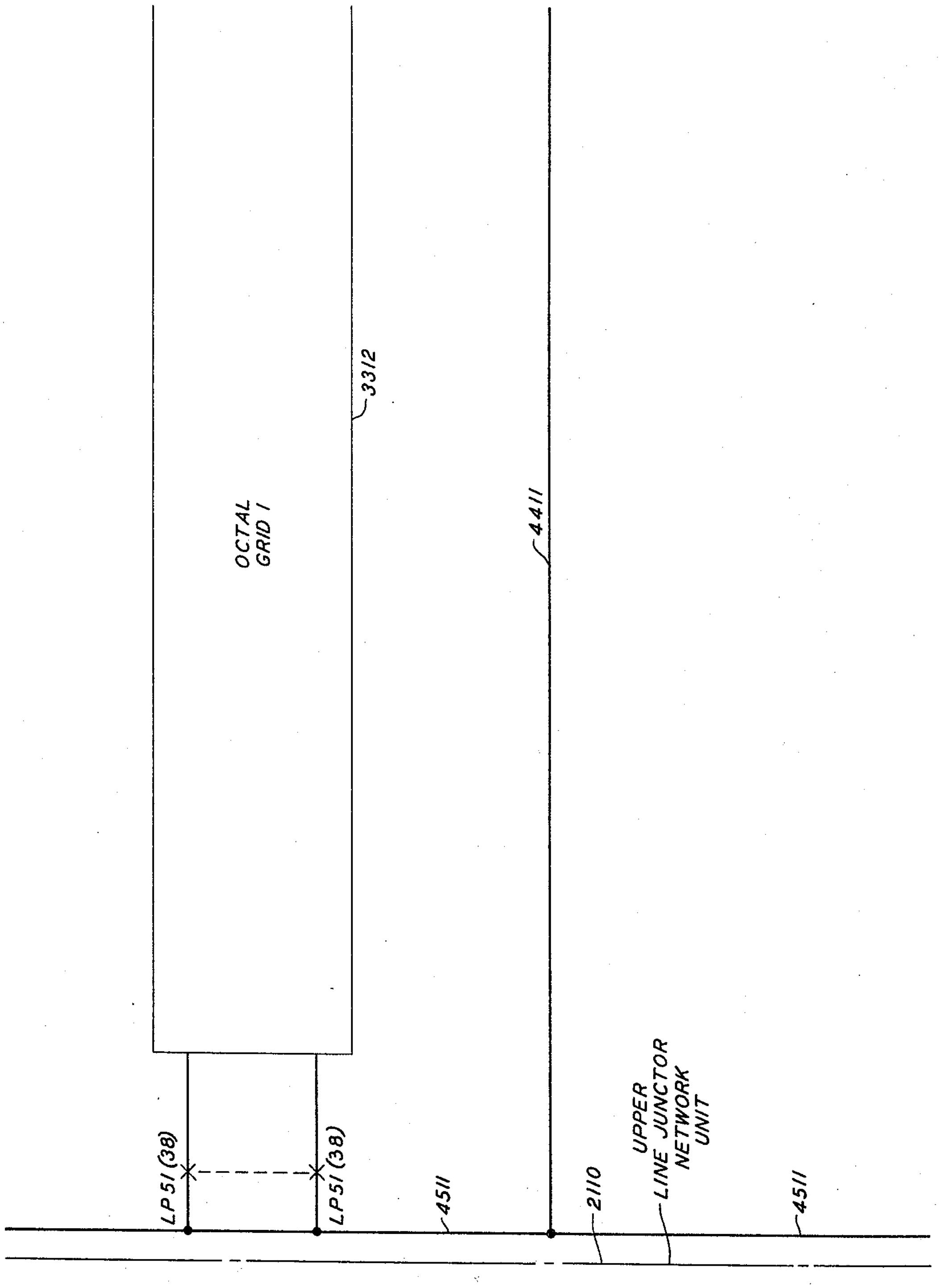
Figure 34:
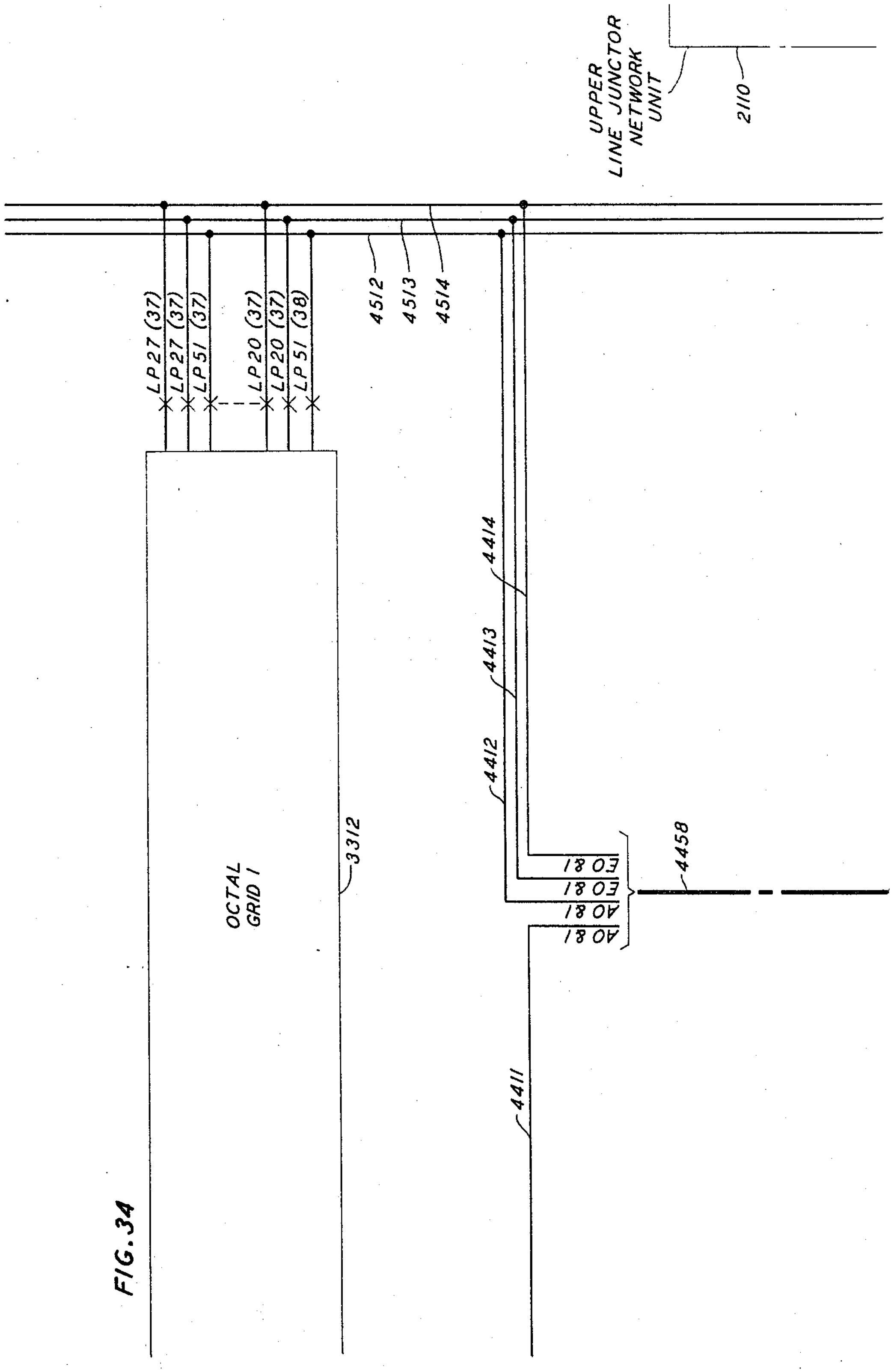
Figure 35:
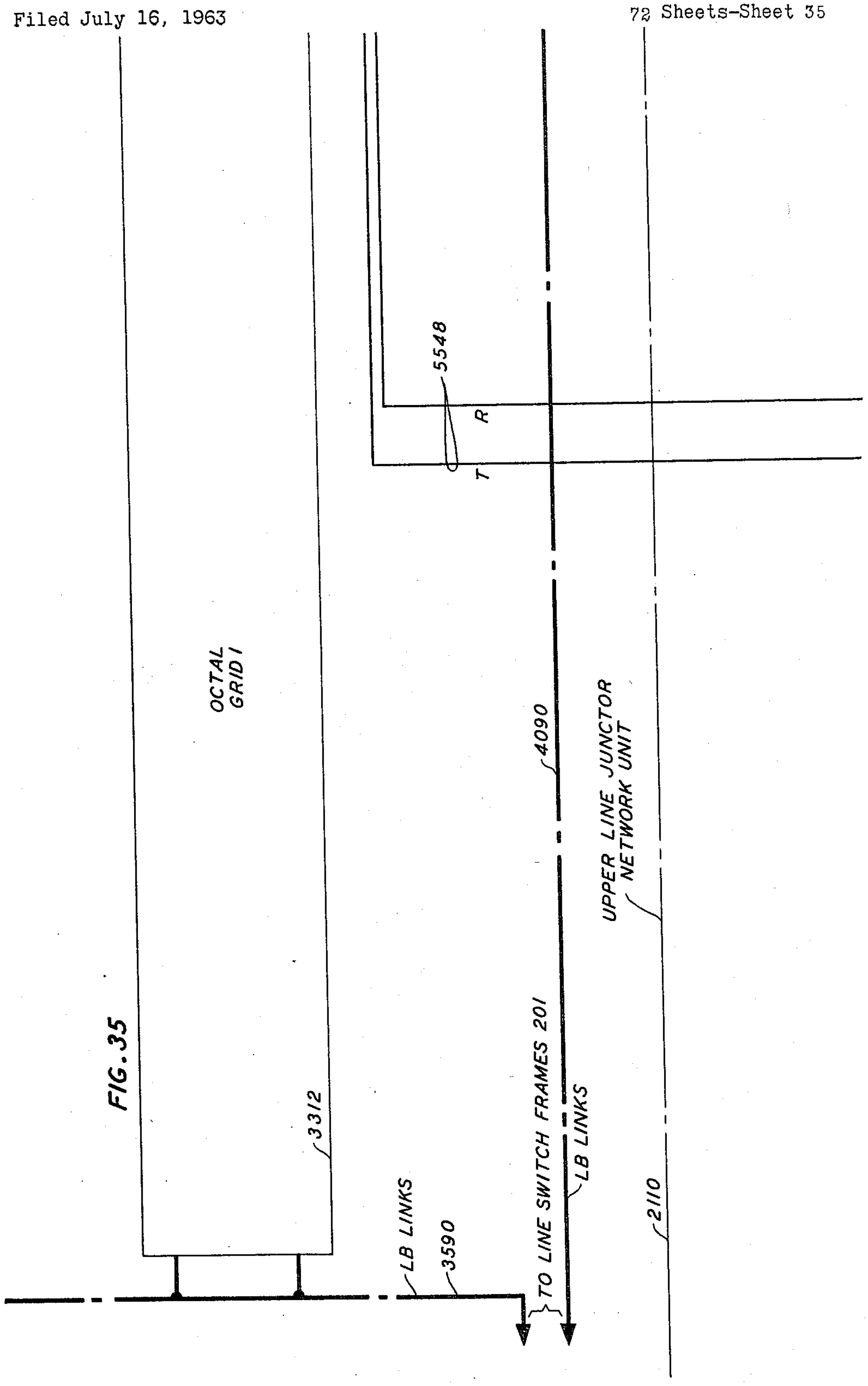
Figure 36:
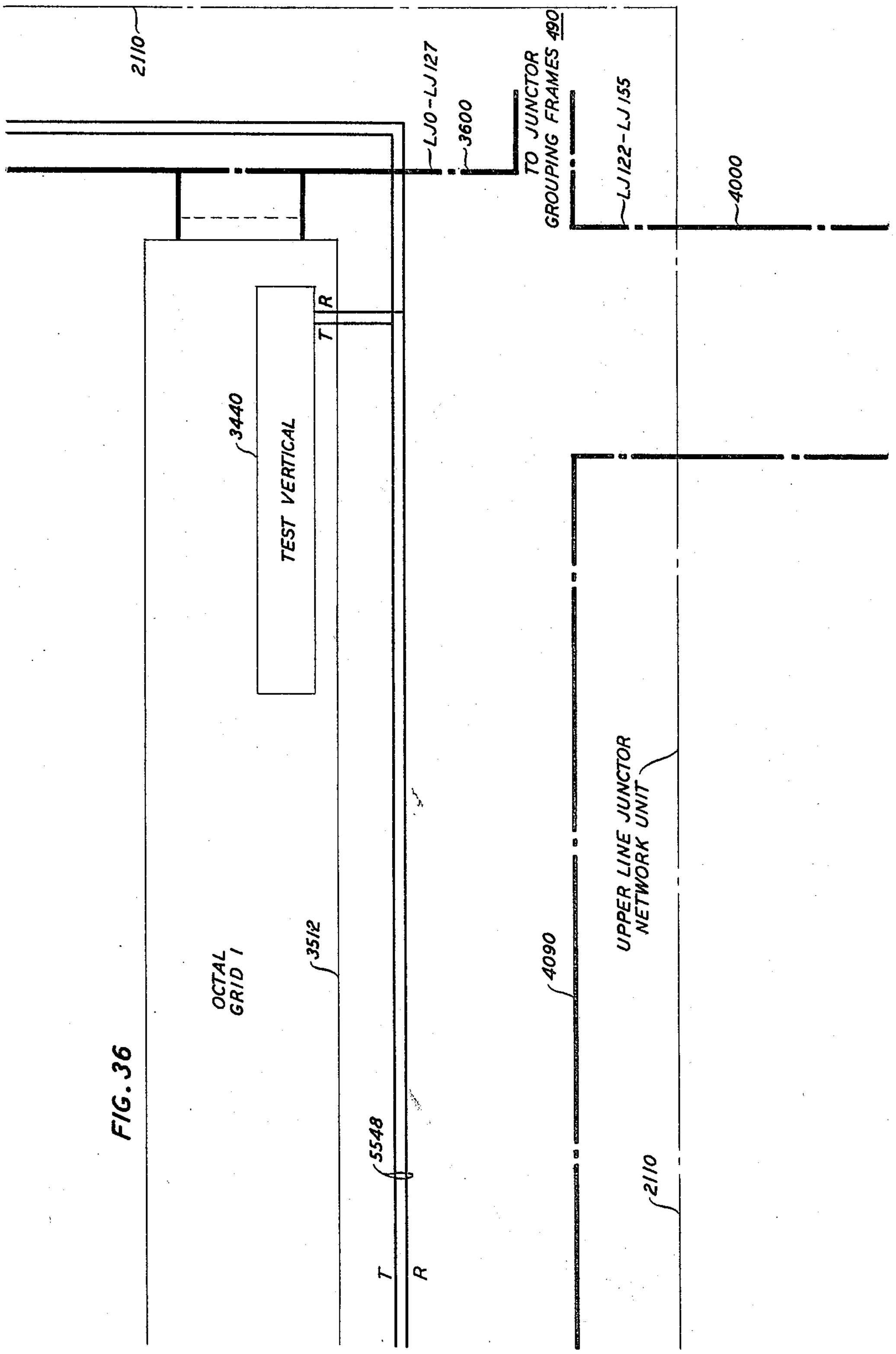

The above-traced pulse path is identical to the pulse path established in response to the above-described connect command except that the network control pulse is applied in the opposite direction. As a result, the polarity of the network control pulse is reversed and the contacts of test-vertical relay F00 shown on FIG. 24 are closed.

The transmission path established responsive to the connect-with-FCG command is identical to that established in response to the above-described connect command. However, an additional connection is established from the tip and ring conductors 2451, through the test-vertical relay contacts F00 and over tip and ring conductors 5548 to left test-vertical control 5520.

Prior to the execution of the connect-with-FCG command, an enable signal was received from the Central Pulse Distributor 2031. Responsive to this enable signal the potential applied to lead 6303 became low and flip-flop 6024 was SET, as previously described. Lead 6303 is also connected to the SET input terminal of flip-flop 5406 on FIG. 54. Therefore, flip-flop 5406 was SET at the same time (*t*0.0 microseconds) that flip-flop 6024 was SET. In its SET condition flip-flop 5406 applies high potential via lead 5467 to one input terminal of AND gate 5407.

In response to the network control pulse, an internal RESET signal is generated by left pulser 4612 causing a momentary low potential to be applied to lead 5003, as previously described. The low potential on lead 5003 causes flip-flops 5431 and 5432 to be RESET via OR gates 5433 and 5436. The RESET state of flip-flops 5431 and 5432 provide an idle condition indication to Central Processor 2030 via Diagnostic Cable 2070 and Master Scanner 2032 as described above. When flip-flops 5431 and 5432 are RESET, high potential is applied to leads 5450 and 5446.

Figure 42:
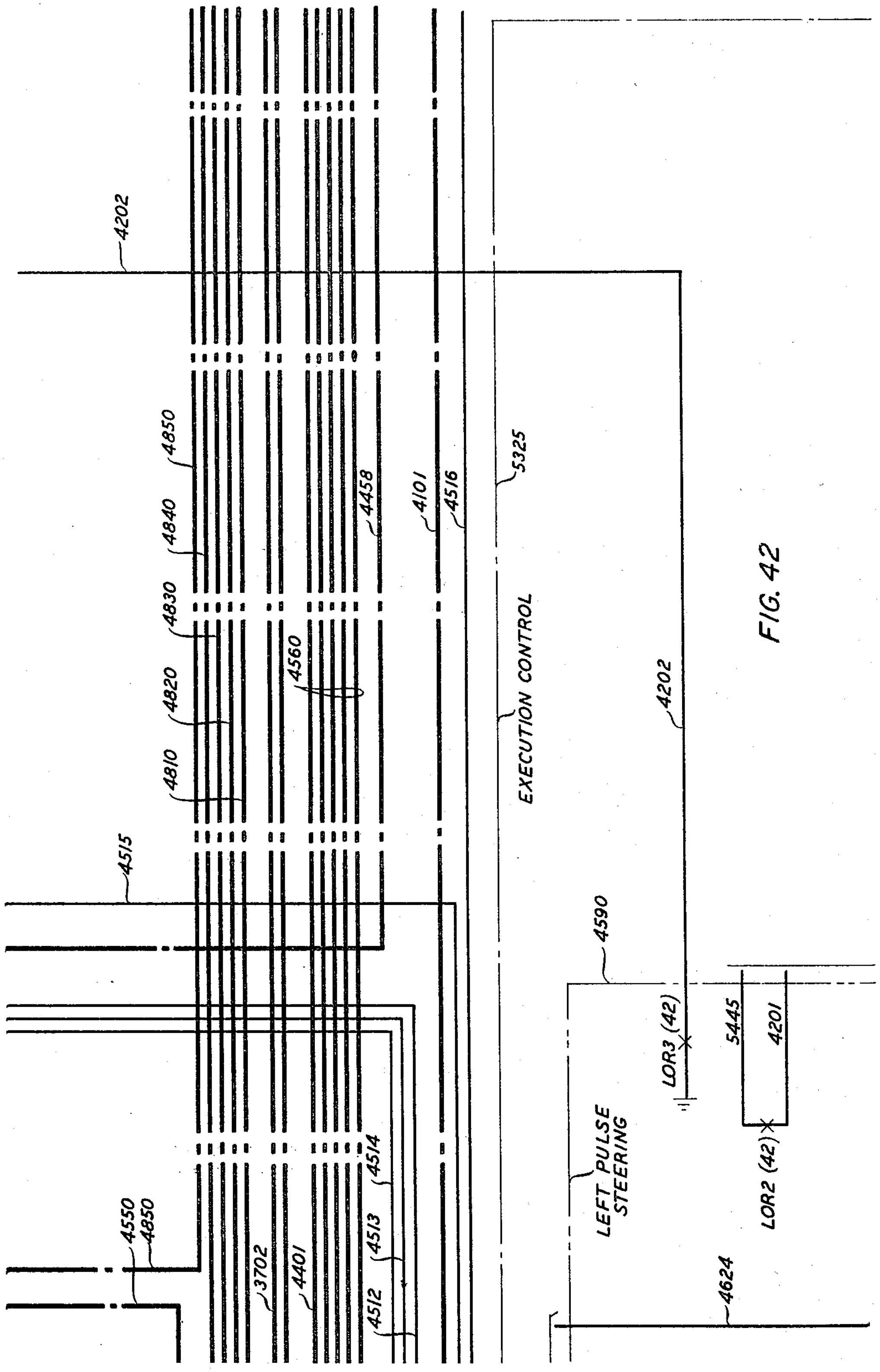
Figure 43:
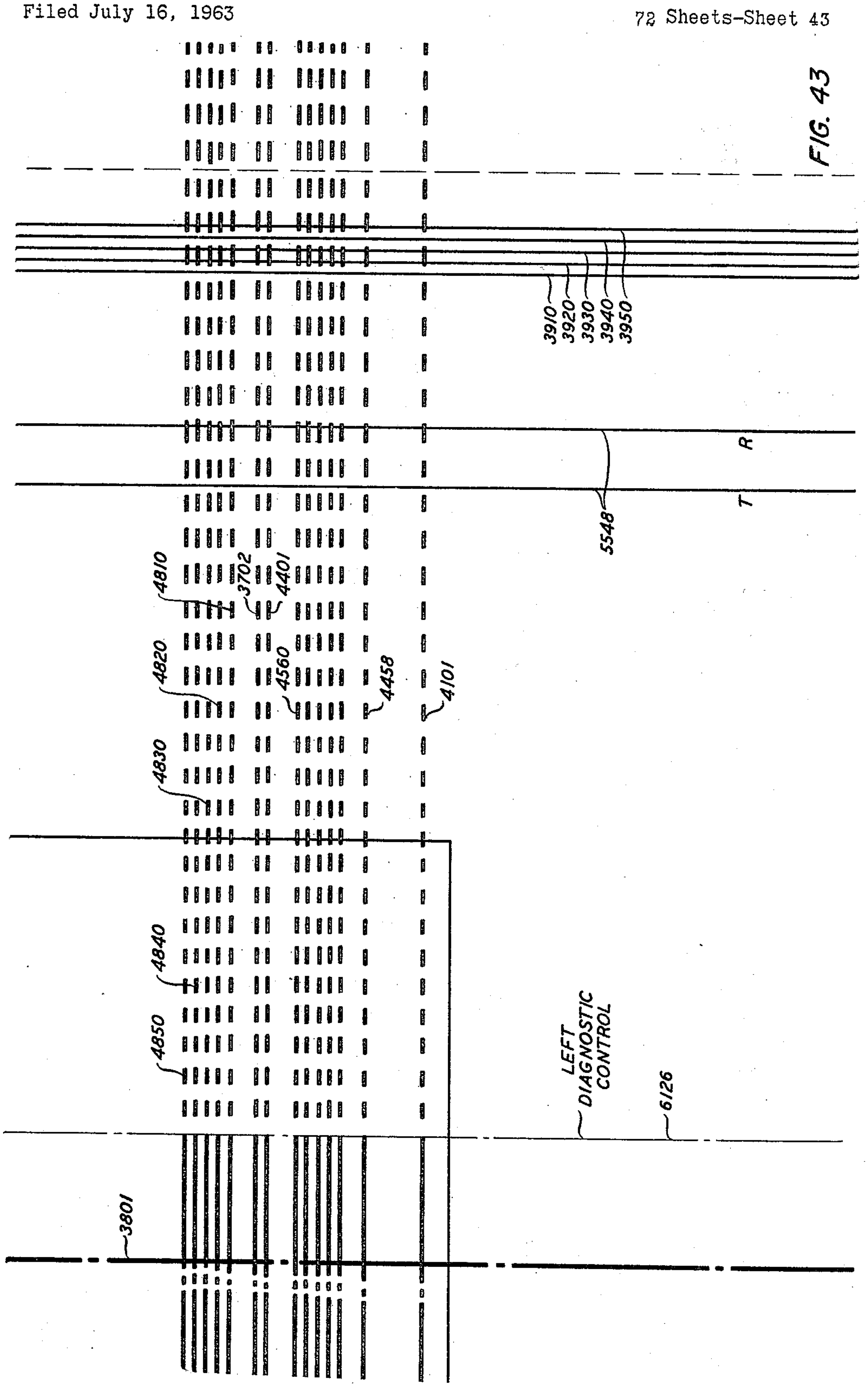
Figure 44:
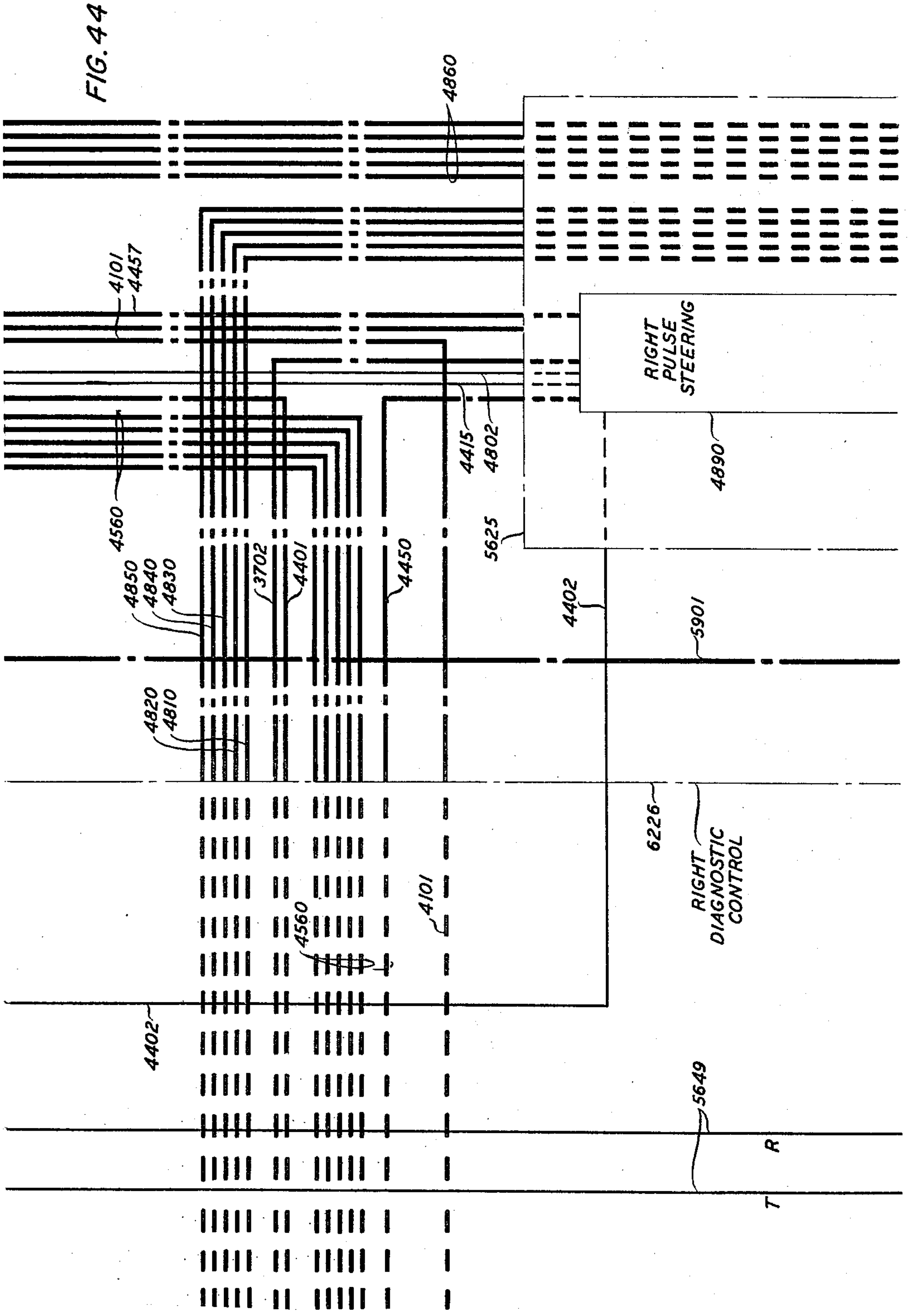

The above-described operation of order relay LOR2 caused the application of low potential to lead 4201, over a circuit which may be traced from ground potential on FIG. 54 via lead 5445, through cable 5002, via lead 5445 on FIG. 42, through an operated contact of relay LOR2, over lead 4201, back through cable 5002, and over lead 4201. The low potential on lead 4201 is inverted by inverter 5429 causing lead 5430 to become high.

The three input leads 5450, 5446 and 5430 of AND gate 5427 have high potential applied thereto thereby causing its output lead 5464 to become high. The high potential on lead 5464 is inverted by inverter 5465 causing lead 5428 to become low and flip-flop 5413 to be SET.

Figure 55:
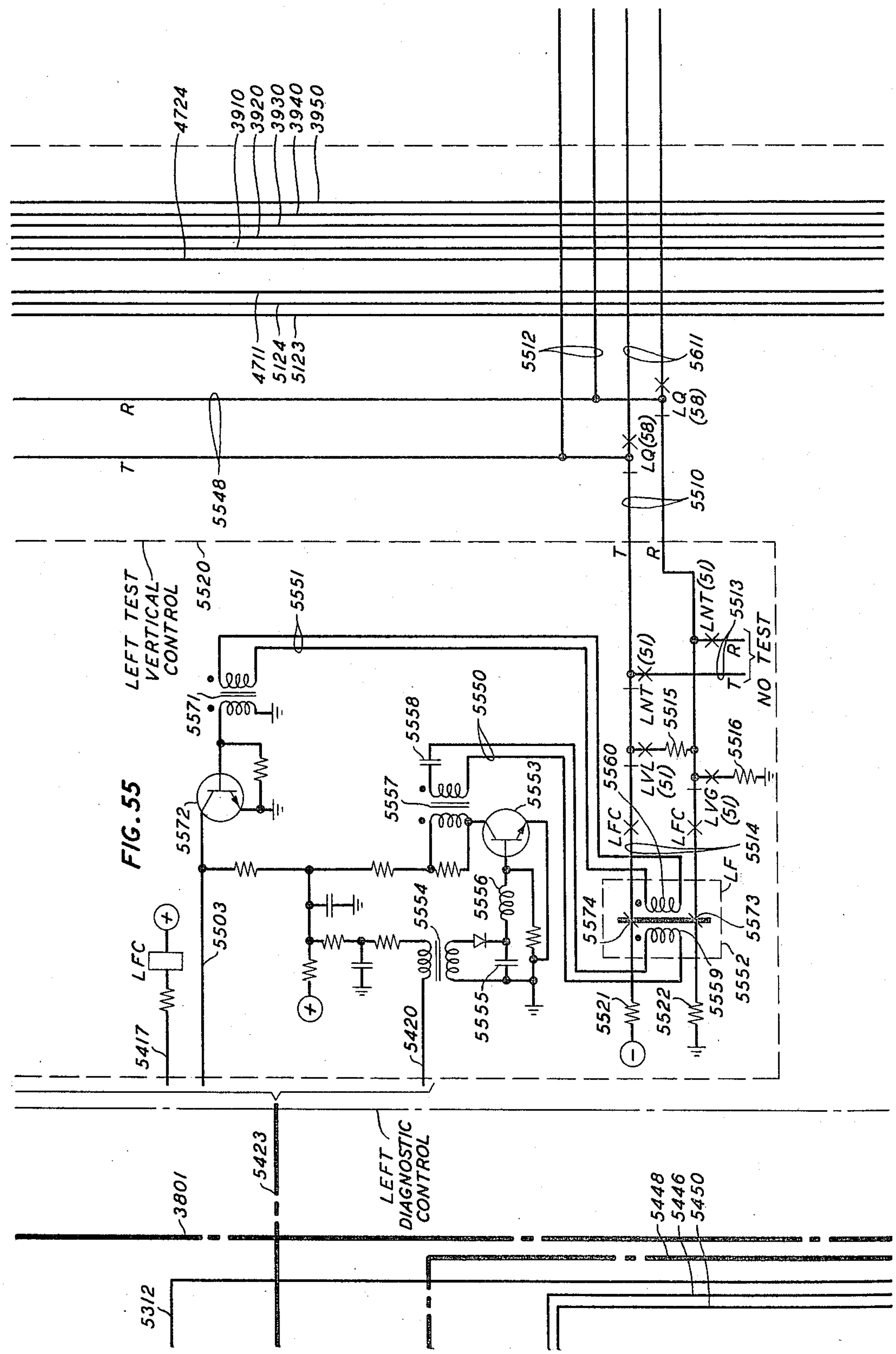
Figure 56:
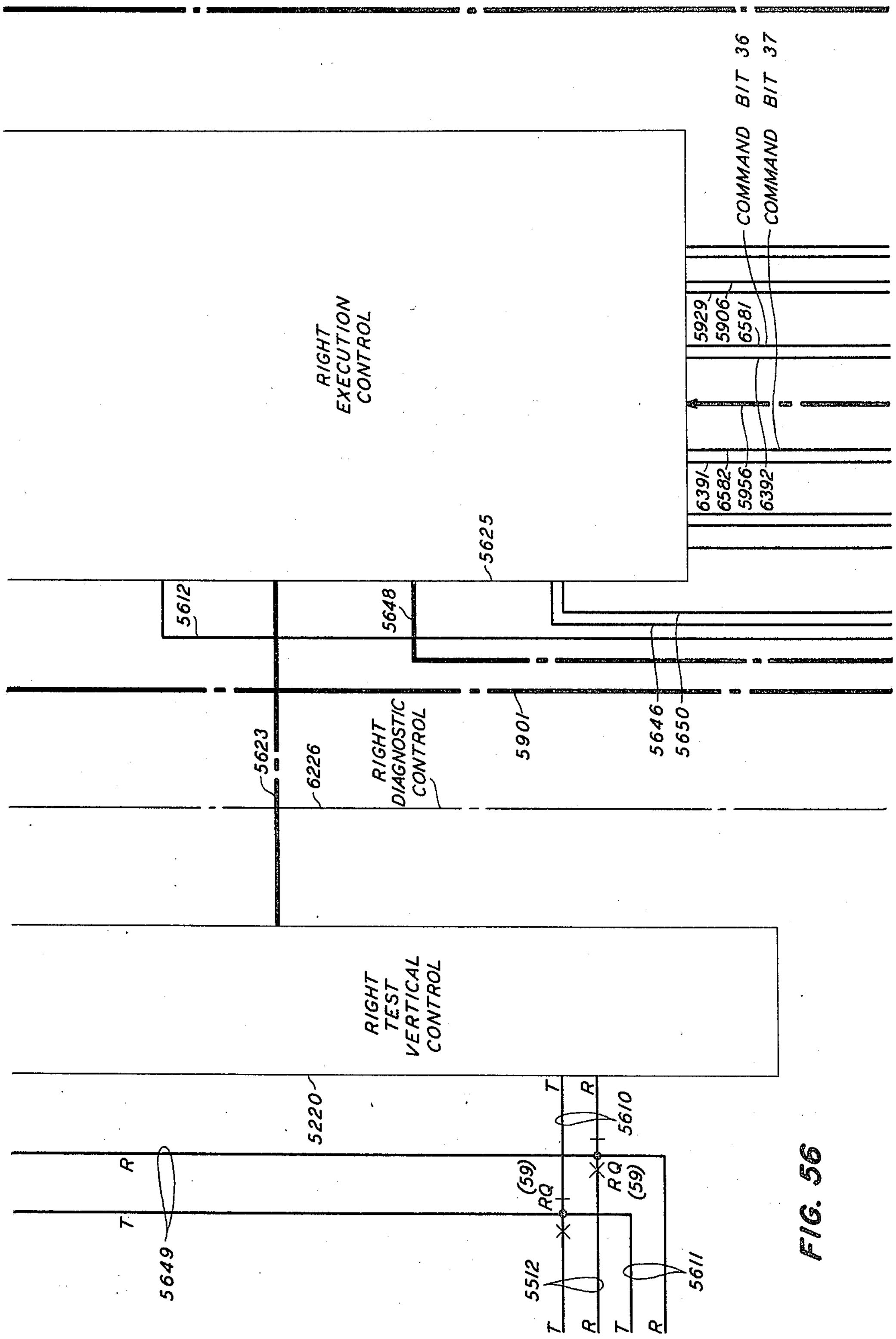

In its SET condition, flip-flop 5413 applies low potential to lead 5417 thus establishing an obvious operating circuit for relay LFC on FIG. 55. The operation of relay LFC connects the respective tip and ring conductors 5548 to negative potential and ground potential through windings 5554 and 5553 of the ferrod 5552. This connection can be traced from tip and ring conductors 5548, through nonoperated contacts of relay LQ, over tip and ring conductors 5510, through nonoperated contacts of relay LNT, through nonoperated contacts of relay LVL, through operated contacts of relay LFC, over tip and ring conductors 5514 and through the ferrod windings 5574, 5573.

A test connection has now been established from a transmission path to the left test-vertical control 5520 and a detecting device 5552 has been connected to the test connection. The Left Junctor Network Control Unit now awaits a further signal from Central Processor 2030 before interrogating the detection element 5552.

The command bit B37 represents a signal from the Central Processor 2030 that the test indicated by its immediately preceding command should be performed. Command bit B37 is called an FCG signal. This signal is transmitted from Central Processor 2030 sufficiently after the transmission of the test command to insure that the contacts of the selected cross-point devices and test-vertical relay have fully closed.

The FCG signal is received from Command Bus 0 through a bus receiver 6360 in a manner similar to that described with reference to command bits B00–B36. Responsive to the receipt of command bit B37, low potential is applied to lead 6392. The low potential on lead 6392 is inverted by inverter 5402 on FIG. 54 causing lead 5403 to become high.

Both input leads 5403 and 5467 of AND gate 5407 are now high, flip-flop 5406 having previously been SET in response to the enable signal. AND gate 5407 therefore is enabled and, due to the operation of inverter 5409, lead 5411 becomes low. The low potential on lead 5411 causes flip-flop 5412 to become SET. The low potential on lead 5411 is inverted by inverter 5468 causing lead 5469 to become high. Lead 5466 is also high due to the SET condition of flip-flop 5413. Since both input leads 5466 and 5469 of AND gate 5418 are high the output of AND gate 5418 is also high and lead 5420 becomes low due to the operation of inverter 5419. Lead 5420 is connected via OR gate 5434 to the SET terminal of flip-flop 5431 and via OR gate 5435 to the SET terminal of flip-flop 5432. The low potential on lead 5420 causes flip-flops 5431 and 5432 to become SET, which state is reflected via Diagnostic Cable 2070 in the Master Scanner 2032, as previously described.

Lead 5420 is also connected via cable 5423 to left test-vertical control 5520 on FIG. 55. In response to momentary application of low potential to lead 5420, transistor 5553 will be turned on for approximately 2.0 microseconds. The pulse of negative potential on lead 5420 induces a corresponding potential change through transformer 5554 causing capacitor 5555 to charge. Capacitor 5555 then discharges slowly through inductance 5556 and causes transistor 5553 to be turned on during the period of discharge. Thus transistor 5553 is maintained in its turned-on condition regardless of the subsequent potential applied to lead 5420 due to the capacitive and inductive circuitry 5555 and 5556. While transistor 5553 is turned on, current flows through the primary winding of transformer 5557. This current induces a corresponding signal in the secondary winding of transformer 5557 which is applied via conductors 5550 to the interrogate winding 5559 of ferrod 5552. The capacitor 5558 in series with the secondary winding of transformer 5557 will cause a momentary current reversal to be generated following the interrogating pulse. This negative current will cause the ferrod 5552 to switch to its normal magnetic state in preparation for another FCG test.

Ferrod 5552 is so arranged that if a false cross or ground is not present on the transmission path being tested, the application of an interrogating pulse to winding 5559 will cause a readout signal to be developed in winding 5560. The readout signal is applied via conductors 5551 to transformer 5571. The signal induced in the secondary winding of transformer 5571 responsive to the readout signal causes transistor 5572 to be turned on and low potential to be applied to lead 5503. Thus the potential on lead 5503 will be low if no false cross or ground has been detected and will be high if a false cross or ground has been detected.

Lead 5503 is connected via cable 5423 to lead 5003 on FIG. 54. Lead 5003 becomes low in response to the low potential on lead 5503 for approximately 4.0 microseconds. Due to the low potential on lead 5003, flip-flops 5431 and 5432 are RESET via OR gates 5434 and 5435. Thus flip-flops 5431 and 5432 were both SET in preparation for the FCG test, and are now both RESET in response to a successful completion of the FCG test. If a false cross or ground had been detected, flip-flops 5431 and 5432 would have remained in the SET condition.

As previously described, Central Processor 2030 monitors the superviory state of flip-flops 5431 and 5432 by way of the Master Scanner 2032 thus ascertaining the result of the FCG test.

Relay LFC on FIG. 55 was operated, as described above, before command bit B37 was received from Command Bus 0. It therefore is possible that the detecting ferrod 5552 was connected to the transmission path under test before the contacts of the cross-point devices have fully closed. It is generally undesirable to have current flowing through a transmission path before the cross-point device contacts are fully closed in order that damage to the contacts is avoided. However, the potential applied to the transmission path through the ferrod 5552 is applied through high resistances 5521 and 5522. The current is therefore limited so as not to damage the cross-point device contacts as they are closing. Further, as it is not expected that a false cross or ground will be present on the transmission path, it is not felt necessary to insure that connection of the detecting potentials to the transmission path be delayed until the cross-point device contacts are fully closed.

Relay LFC on FIG. 55 remains operated until the next enable signal is received by the Left Junctor Network Control Unit. As previously described, in response to an enable signal a command-accept signal is generated by left enable-verify circuit 6009 causing low potential to be applied to lead 6029. The low potential on lead 6029 is inverted by inverter 5762 causing lead 5761 to become high. At this time, due to the absence of either an internal RESET signal or an FCG test answer signal from left test-vertical control 5520, lead 5003 is high. Since both input leads 5761 and 5003 of AND gate 5424 are high, the output of AND gate 5424 was also high. The output potential of AND gate 5424 is inverted by inverter 5425 causing lead 5426 to become low. Low potential on lead 5426 causes flip-flop 5412 to be RESET, flip-flop 5413 to be RESET, flip-flop 5414 to be RESET if previously SET and flip-flop 5415 to be RESET if previously SET. When flip-flop 5413 is RESET lead 5417 becomes high thus initiating the release of relay LFC on FIG. 55.

A subsequent central processor command is required to release the test-vertical relay contacts F00. This command will be described later herein.

Restore-Verify Command (Loop-Start)

A loop-start restore-verify command is identical to the above-described connect-with-FCG command except that order relay LOR5 is operated in place of order relay LOR2. The network control path established for a restore-verify test is identical to that described for the connect-with FCG command except that contacts of relay LOR5 are substituted for those of relay LOR2 in left pulse steering 4590. A network control pulse is generated by left pulser 4612 to operate the identical cross-point device contacts 2161, 2271 and test-vertical relay contacts F00 as were operated for the above-described connect-with FCG command. An internal RESET signal is generated by left pulser 4612 causing lead 5003 to become low and flip-flops 5431 and 5432 to be RESET.

Figure 46:
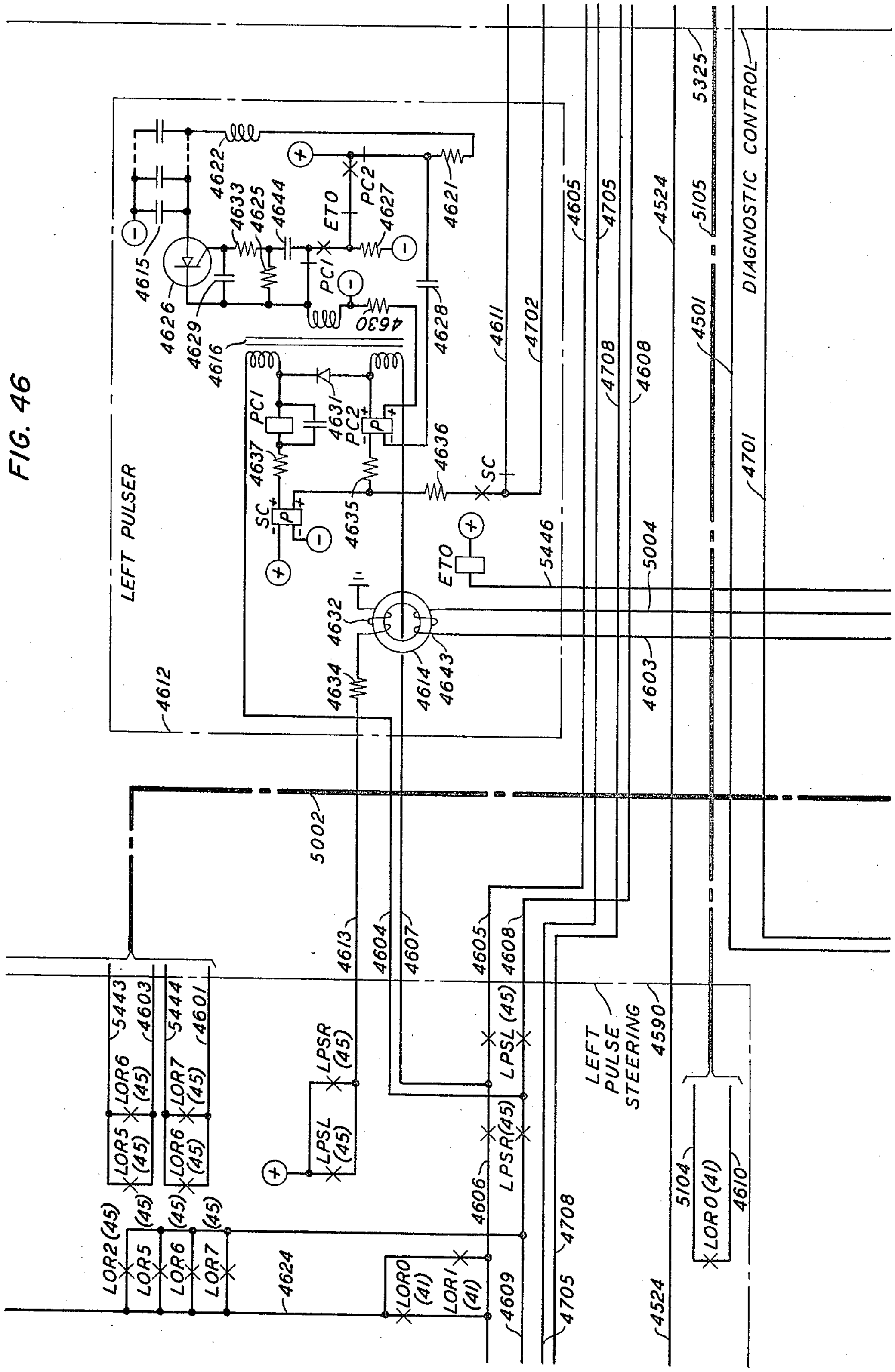

Responsive to the operation of relay LOR5, lead 4602 becomes low, over a path extending from ground potential on FIG. 54, over lead 5443, through cable 5002, over lead 5443 on FIG. 46, through an operated contact of relay LOR5, over lead 4602, back through cable 5002, and over lead 4602 on FIGS. 50 and 54. In response to the low potential on lead 4602, flip-flop 5414 is SET.

Central Processor 2030 now transmits an FCG signal, i.e., command bit B37. In response to the receipt of command bit B37, flip-flop 5412 is SET as previously described with reference to the FCG test opeartion. However, AND gate 5418 is not enabled at this time and flip-flops 5431 and 5432 are not affected as they were during the FCG test operation.

When flip-flop 5412 is SET, lead 5416 becomes high. Lead 5416 is connected via cable 5423 as one input lead of AND gate 5107. The other input lead 5125 of AND gate 5107 is also high at this time since flip-flop 5106 is in its RESET condition. AND gate 5107 is thus enabled. As a result of the enablement of AND gate 5107, the operation of inverter 5108 and the operation of inverter 5109, the potential applied to lead 5116 becomes high.

When flip-flop 5414 is SET, as described above, the potential on lead 5421 becomes high. Lead 5421 is connected via cable 5423 as one input lead of AND gate 5114. Both input leads, 5116 and 5421, of AND gate 5114 are high, thus enabling AND gate 5114. In response to the enablement of AND gate 5114 and the operation of inverter 5115, lead 5126 becomes low. An obvious operating circuit for relay LVL on FIG. 51 is thereby completed, and relay LVL starts to operate.

Relay LVL requires approximately 1 millisecond to fully operate. The delay of its operation for at least 1 millisecond after the receipt of the FCG signal insures that no current will flow through the transmission path under test until the cross-point device contacts, 2161 and 2271, and test-vertical relay contacts F00 are fully closed.

When relay LVL has fully operated, a load resistor 5515 is connected across the tip and ring conductors 5510 through operated contacts of relay LVL on FIG. 55. The connection of resistor 5515 in shunt of the tip and ring conductors 5510 simulates a service request from a subscriber station. As described with reference to Line Switch Frame 201, a connection has already been established through a Line Switch Frame, and the cut-through relay contacts associated with a selected line terminal are in a closed condition. During the time that resistor 5515 is connected across the tip and ring conductors 5510, which in turn are connected via test-vertical relay contacts F00 to the transmission path, the Central Processor 2030 commands the Line Scanner 1000 to ascertain the supervisory state of the line terminal to which the test connection has been established. In this manner the Central Processor verifies that the cut-off relay contacts associated with the selected line terminal have been closed.

Figure 51:
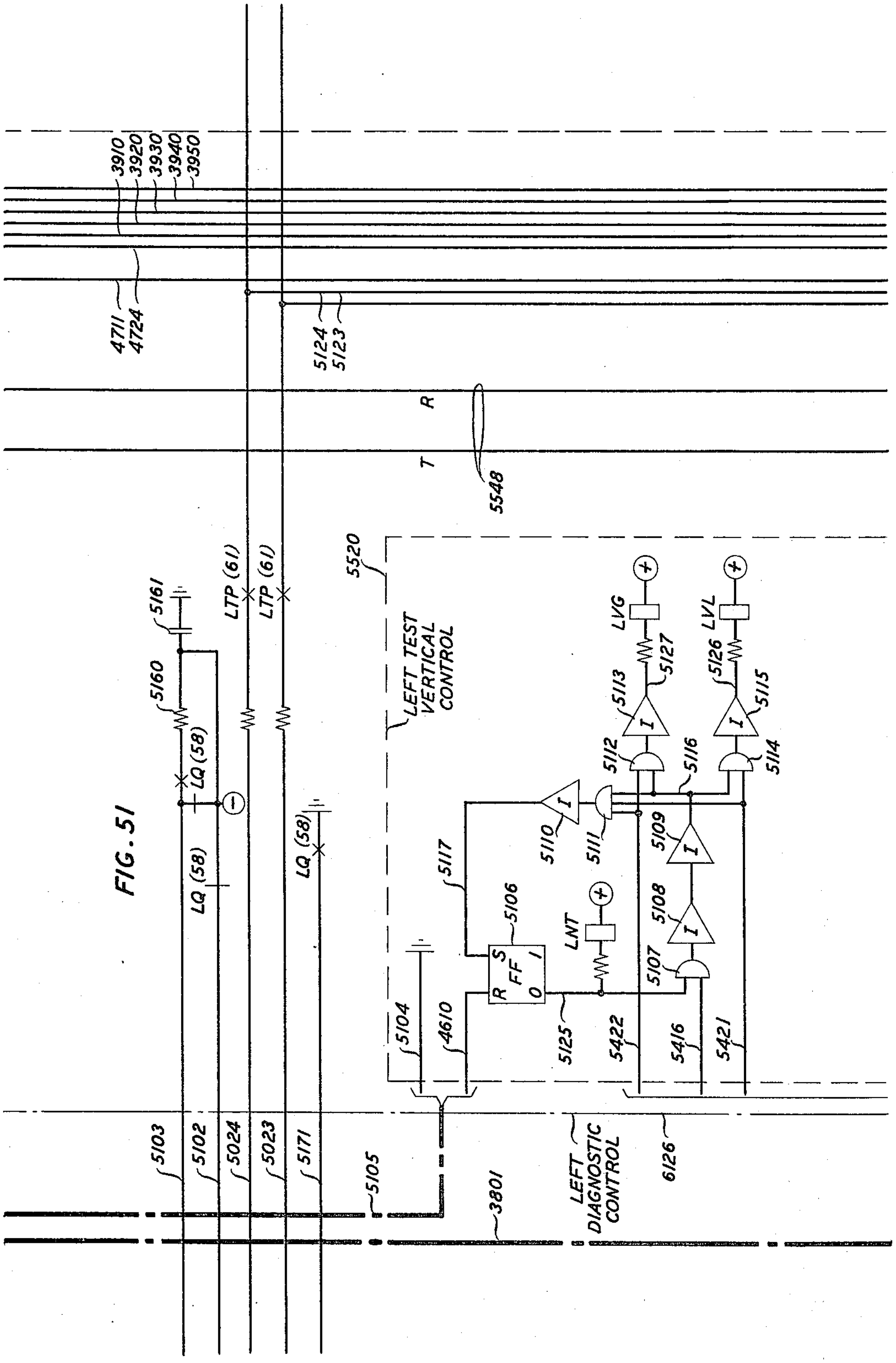
Figure 52:
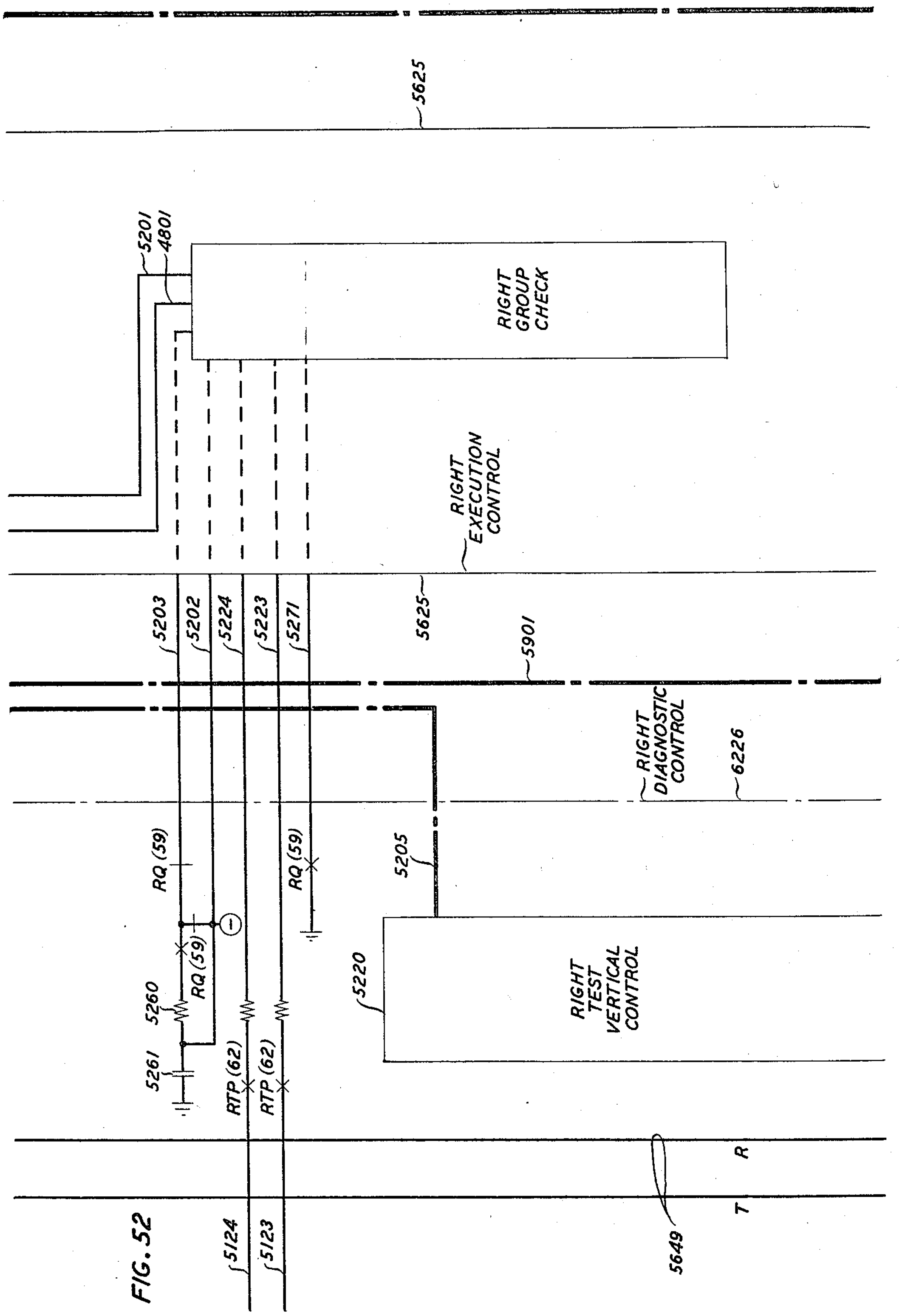

Relay LVL on FIG. 51 remains operated until a subsequent enable signal is received by the Left Junctor Network Control Unit. As described with reference to the connect-with-FCG command, those of flip-flops 5412, 5413, 5414 and 5415 which are previously SET will be RESET when a subsequent command-accept signal is generated. When flip-flop 5414 is RESET the potential applied to lead 5421 becomes low and relay LVL on FIG. 51 starts to release.

This particular restore-verify test is used to test those line terminals which are associated with loop-start lines, i.e., lines indicating a service request by means of shunting the tip and ring conductors thereof. Since certain lines may not be of the loop-start variety, a different type of restore-verify test may be performed from a Junctor Switch Frame.

Restore-Verify Command (Ground-Start)

A ground-start restore-verify command is utilized to test those line terminals which require the application of ground to a single conductor thereof to initiate a service request. This type of command is distinguished from all others by the operation of order relay LOR7. The network control pulse path and the transmission path established in response to this command are identical to those described above for the loop-start restore-verify command and the connect-with-FCG command except that contacts of relay LOR7 are utilized in the network control pulse path.

Responsive to the operation of relay LOR7, lead 4601 becomes low over a circuit extending from ground potential on FIG. 54, over lead 5444, through cable 5002, over lead 5444 on FIG. 46, through an operated contact of relay LOR7, over lead 4601, back through cable 5002 and over lead 4601 on FIGS. 50 and 54. Due to the low potential applied to lead 4601, flip-flop 5415 is SET. When flip-flop 5415 is SET, high potential is applied to lead 5422.

An FCG signal is received from Command Bus 0 as command bit B37. Responsive to the receipt of command bit B37, lead 5116 on FIG. 51 becomes high, as previously described for the loop-start restore-verify test operation. Both input leads 5422 and 5116, of AND gate 5112 are high and AND gate 5112 is enabled. Responsive to the enablement of AND gate 5112 and the operation of inverter 5113, lead 5127 becomes low. An operating circuit for relay LVG on FIG. 51 is thus completed, and relay LVG starts to operate.

When relay LVG is fully operated, ground potential is connected via a resistance 5516 and an operated contact of relay LVG to the ring conductor of the test-vertical transmission pair 5510 on FIG. 55. The ground potential connected to the ring conductor simulates a service request to a ground-start line terminal in the same manner that the connection of resistance 5515 between tip and ring conductors 5510 simulated a service request to a loop-start line terminal. Central Processor 2030 commands the appropriate Line Scanner 1000 to ascertain the supervisory state of the selected line terminal, thus verifying the closure of the associated cut-off relay contacts.

The release of relay LVG on FIG. 51 in response to a subsequent enable signal is substantially similar to the previously described release of relay LVL. Flip-flop 5415 is RESET, lead 5422 becomes low and relay LVG is released.

Operate-No-Test Command

A no-test termination provides access to the switching network for various service circuits, testing circuits and operator positions. It is represented by tip and ring conductors 5513 on FIG. 55.

In response to the enable signal associated with an operate-no-test command from Command Bus O, the Left Junctor Network Control Unit functions as previously described with reference to other commands. An operate no-test command is distinguished from all other commands by the operation of order relay LOR6.

It is assumed that it is desired to establish a no-test connection to the transmission connection previously established in response to the above-described connect command. Identical path selection relays LP10–LP51 are operated as were operated for the connect command. A network control pulse path is thereby established extending from left pulser 4612 via lead 4604, through operated contacts of relay LPSL, over lead 4605, through a nonoperated contact of relay LQ on FIG. 47, over lead 4705, through an operated contact of relay LOR6 on FIG. 45, over lead 4514, through an operated contact of relay LP50 on FIG. 22, through an operated contact of relay LP20, through the control winding of test-vertical control winding of test-vertical F00, through an operated contact of relay LP40, over lead 4513, through an operated contact of relay LOR6 on FIG. 45, over lead 4705, through non-operated contact of relay LQ on FIG. 47, over lead 4605, through an operated contact of relay LPSL, and over lead 4607 to left pulser 4612. The application of a network control pulse over this pulse causes test-vertical relay F00 to close its contacts shown on FIG. 24. However, the network control pulse path does not include the control windings of any cross-point devices, thereby preventing any disturbance of established transmission connections.

In response to the operation of order relay LOR6, leads 4603 and 4601 have low potential applied thereto over a path extending from ground potential on FIG. 54, over leads 5443 and 5444, through cable 5002, over leads 5443 and 5444 on FIG. 46, through operated contacts of relay LOR6, over leads 4602 and 4601, back through cable 5002 and over leads 4602 and 4601 on FIGS. 50 and 54. In response to the low potential applied to leads 4601 and 4602, flip-flops 5414 and 5415 are SET. When flip-flops 5414 and 5415 are SET, leads 5421 and 5422 become high. Leads 5421 and 5422 are connected via cable 5423 as input leads to AND gate 5111 on FIG. 51.

When an FCG signal is received from Command Bus 0 as command bit B37, flip-flop 5412 is SET as previously described. When flip-flop 5412 is SET, lead 5416 become high. Lead 5416 is connected via cable 5423 as a third input lead to AND gate 5111 on FIG. 51. When all three input leads, 5416, 5421 and 5422, of AND gate 5111 be-described. When flip-flop 5412 is SET, lead 5416 becomes high. When the output of AND gate 5111 is high, lead 5117 becomes low due to the operation of inverter 5110, thus causing flip-flop 5106 to be SET.

When flip-flop 5106 is SET, lead 5125 becomes low and an obvious operating circuit for relay LNT is completed. In addition to providing operating potential for relay LNT, the low potential on lead 5125 disables AND gate 5107, thus preventing the operation of relays LVG and LVL on FIG. 51 in response to subsequent commands until flip-flop 5106 is RESET as described later herein.

When relay LNT is fully operated, the no-test conductors 5513 on FIG. 55 are connected through operated contacts of relay LNT to the tip and ring conductors 5510. Due to the arrangement of the contacts of relays LFC, LVL, LVG and LNT on FIG. 55, no other tests can be performed by way of tip and ring conductors 5510 when relay LNT is operated. Relays LVG and LVL are also operated when relay LNT is operated. However, their operation is ineffective due to the aforenoted arrangement of their contacts on FIG. 55.

Flip-flop 5106 remains in its SET condition until a remove-no-test-FCG-verify command is received, as described hereinbelow. Subsequent enable signals do not effect flip-flop 5106, and the no-test connection remains established until the Central Processor 2030 commands its release.

Remove No-Test-FCG-Verify Command

This type of command is distinguished from others by the operation of order relay LOR0. Identical path selection relays are operated responsive to this command as were operated for the previously described commands. However, the network control pulse path is different and the polarity of the network pulse is thus reversed. This path extends from left pulser 4612, via lead 4604, through an operated contact of relay LPSL, over lead 4608, through a nonoperated contact of relay LQ on FIG. 47, over lead 4708, through an operated contact of relay LOR0 on FIG. 45, over lead 4513, through an operated contact of relay LP40 on FIG. 22, through the control winding of test-vertical relay F00, through an operated contact of relay LP20, through an operated contact of relay LP50, over lead 4514, through an operated contact of relay LOR0 on FIG. 45, over lead 4705, through a nonoperated contact of relay LQ on FIG. 47, over lead 4605, through an operated contact of relay LPSL on FIG. 46, and over lead 4607 to left pulser 4612. A network control pulse transmitted over this pulsing path causes the contacts of test-vertical relay F00 on FIG. 24 to be opened, an internal RESET signal to be generated, and the Left Junctor Network Control Unit to be returned to its idle condition.

The operation of relay LOR0 also caused flip-flop 5106 to be RESET and relay LNT to be released. Low potential is applied to the RESET terminal of flip-flop 5106 over a path extending from ground potential on FIG. 51, over lead 5104, through cable 5105, over lead 5104 on FIG. 46, through an operated contact of relay LOR0, over lead 4610, back through cable 5105 and over lead 4610 on FIG. 51. In its RESET condition, flip-flop 5106 applied high potential to lead 5125, thus allowing relay LNT to release and returning the normal high potential to one input terminal of AND gate 5107.

*Test commands* (*mode of operation control*).—The left Junctor Network Control Unit may be selectively placed into four operating modes in response to specific central processor commands, and may be manually placed in a fifth operating mode. The operating modes of all Network Control Units include the quarantine mode, the combined mode, the test-point-access mode, the normal mode and the power-off mode.

No special description will be given of the normal mode of operation as this has been fully described above. However, a description will be included herein for each of the other operating modes.

The control of the mode of operation of a Network or Signal Distributor Control Unit is accomplished by way of the other Control Unit of the same Switch Frame or Trunk Frame. Therefore, the mode in which the Right Junctor Network Control Unit operates is controlled by way of the Left Junctor Network Control Unit, and the mode in which the Left Junctor Network Control Unit operates is controlled by way of the Right Junctor Network Control Unit.

Order relay LOR3 on FIG. 45 is called the test order relay. Whenever a change in operating mode is commanded by Central Processor 2030, order relay LOR3 will be operated in accordance with the order portion of the central processor command. Path selection relays LP31, LP32 and LP33, in addition to their above-described path selection functions for other types of commands, are used to indicate the mode control operation to be performed by the Left Junctor Network Control Unit in response to a test command. One of the three path selection relays, LP31, LP32 or LP33 is operated in accordance with the address portion of each test command. A path selection relay LP10–LP27, LP40–LP51 is also operated in each of the path selection groups PS1, PS2, PS4 and PS5 to satisfy the group check operation. The contacts of the path selection relays in path selection groups PS1, PS2, PS4 and PS5 are not used for any other purpose during mode control operations.

Combined Mode of Operation

The Left Junctor Network Control Unit is automatically placed in the combined mode of operation when the Right Junctor Network Control Unit is placed in the quarantine mode of operation to insure that both Junctor Network Units 2010 and 4020 are constantly subject to the control of at least one Junctor Network Control Unit. The Right Junctor Network Control Unit is placed in the quarantine mode of operation by operating relay RQ on FIG. 59.

To place the Right Junctor Network Control Unit in the quarantine mode of operation, a central processor test command is transmitted via Command Bus 0 to the Left Junctor Network Control Unit. The appropriate command bits B00–B35 are registered, as previously described, in Left Buffer Register 4505. In accordance with the command information, order relay LOR3 and path selection relay LP31 are operated. Path selection relays are also operated in path selection groups PS1, PS2, PS4 and PS5.

Figure 59:
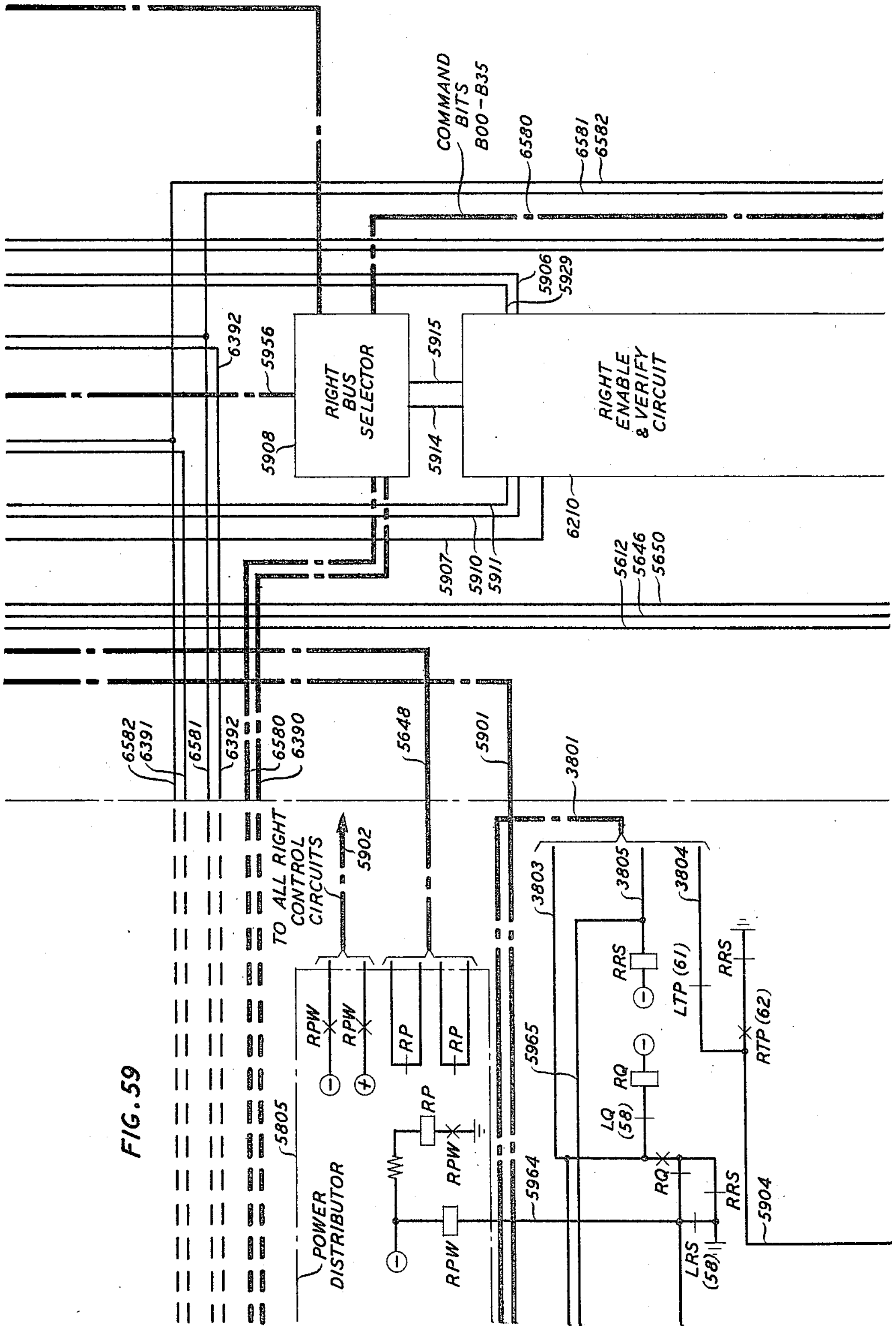

Relay RQ on FIG. 59 is operated in response to the operation of relays LOR3 and LP31. The operating circuit extends from negative potential through the winding of relay RQ on FIG. 59, through a nonoperated contact of relay LQ, over lead 3803, through cable 3801, through an operated contact of relay LP31 on FIG. 38, over lead 4202 and through an operated contact of relay LOR3 to ground potential on FIG. 42. The operation of relay RQ places the Right Junctor Network Control Unit in the quarantine mode of operation and further places the Left Junctor Network Control Unit in the combined mode of operation.

Provision must be made for the completion of the command-execution cycle of the Left Junctor Network Control Unit so that it can return itself to an idle condition. A pulsing path is therefore required in order that a local RESET signal can be generated by left pulser 4612. This auxiliary pulsing path extends from left pulser 4612, via lead 4604, through an operated contact of relay LPSL, over lead 4608, through a nonoperated contact of relay LQ, over lead 4708, through an operated contact of relay LOR3 on FIG. 45, over lead 4515, through an operated contact of LP31 on FIG. 38, over lead 3903, through a compensating load resistance 3913 on FIG. 39, through an operated contact of relay RQ, over lead 4516, through another operated contact of relay LOR3 on FIG. 45, over lead 4705, through another operated contact of relay LQ on FIG. 47, over lead 4605, through another operated contact of relay LPSL on FIG. 46 and over lead 4607 to left pulser 4612.

When relay RQ is operated, as described above, the auxiliary pulsing path is completed, and left pulser 4612 generates a network control pulse as previously described. Responsive to the network control pulse, a local RESET signal is generated and the Left Junctor Network Control Unit is returned to its idle condition.

The combined mode of operation allows the Left Junctor Network Control Unit to control switching operations in the Lower Junctor Network Unit 4020 as well as in Upper Junctor Network Unit 2110 during the time that the Right Junctor Network Control Unit is in the quarantine operating mode. As mentioned above, command bits B28 and B29 determine in which Junctor Network Unit a command is to be executed by the Left Junctor Network Control Unit. The operation of relay LCTL on FIG. 50 in response to the registration of command bit B29 in Left Buffer Register 4505 would indicate that the command is to be executed in Upper Junctor Network Unit 2110. The operation of relay LCTR on FIG. 50 responsive to the registration of command bit B28 in Left Buffer Register 4505 would indicate that the command is to be executed in Lower Junctor Network Unit 4020.

Figure 47:
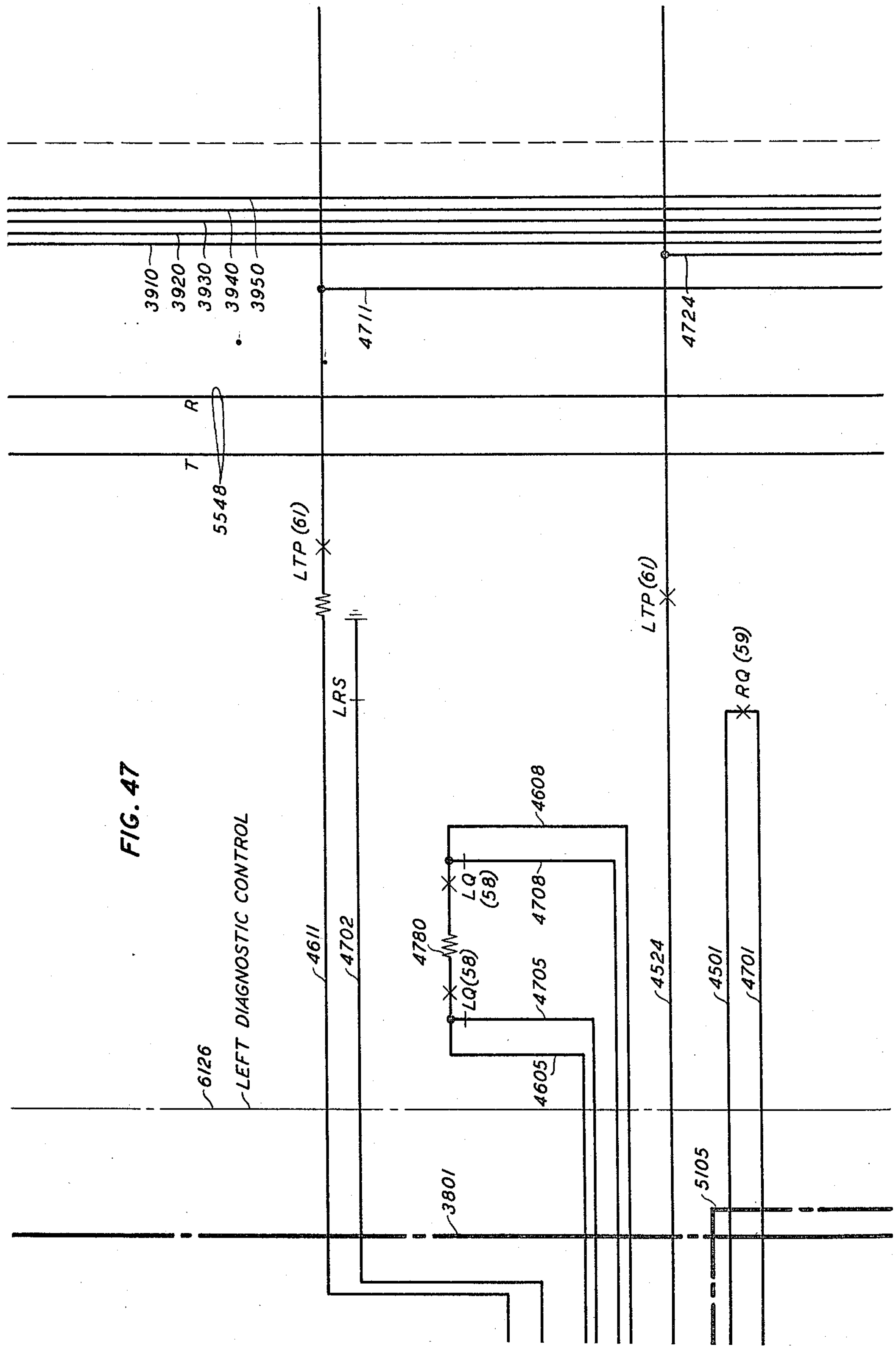
Figure 48:
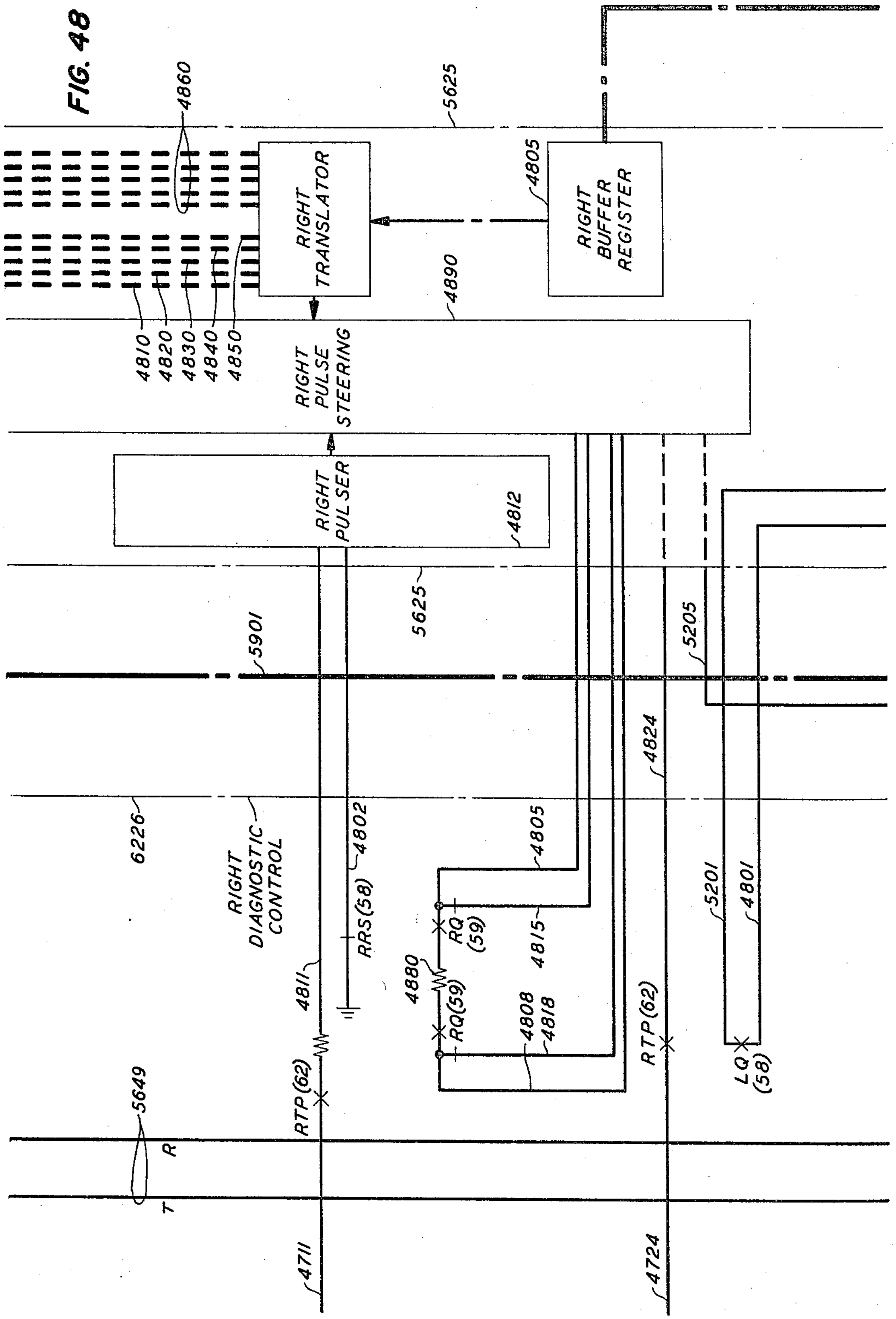

The operating path for relay LCTR includes an operated contact of relay RQ on FIG. 47, thus precluding the control of Lower Junctor Network Unit 4020 by the Left Junctor Network Control Unit unless relay RQ is operated. The operating path for relay LCTR extends from positive potential, through its control winding, over lead 4701, through an operated contact of relay RQ on FIG. 47, over lead 4501 to Left Buffer Register 4505 on FIG. 45.

The operation of relay LCTR enables duplicate Group Check Units similar to 4904 within group checks 4903B and 4903C which check the outputs of left translator 4506 as previously described. The operation of relay LCTR also completes an operating path for relay LPSR on FIG. 45 similar to the previously described path for operating relay LPSL. The contacts of relay LPSR are shown on FIG. 46 and serve to steer the network control pulses from left pulser 4612, through contacts of the order relays LOR0–LOR7 and over leads 4521, 4522, 4523, and 4624, through cable 4101 to the Lower Junctor Network Unit 4020. Control Lower Junctor Network Unit 4020 may therefore be accomplished in a manner similar to that described above with reference to the control of Upper Junctor Network Unit 2110.

The tip and ring conductors 5649, through which the right test-vertical control 5220 is connected to the test-vertical relay contacts of Lower Junctor Network Unit 4020, are transferred through operated contacts of relay RQ to tip and ring conductors 5512. Tip and ring conductors 5512 are in turn connected to tip and ring conductors 5510 through nonoperated contacts of relay LQ on FIG. 55. In this way, left test-vertical control 5520 can perform the above-described tests on the transmission paths of Lower Junctor Network Unit 4020 as well as those of Upper Junctor Network Unit 2110.

Since it is undesirable to have both Junctor Network Control Units in the quarantined operated mode at the same time, relay LQ is prevented from operating while relay RQ is operated. The operating circuit for relay LQ on FIG. 58 includes a nonoperated contact of relay RQ in series therewith. Similarly the operating path for relay RQ on FIG. 59 includes a nonoperated contact of relay LQ in series therewith. Thus neither of the Junctor Network Control Units can be placed in the quarantine mode of operation when the other is already in the quarantine mode of operation.

Quarantine Mode of Operation

The Left Junctor Network Control Unit may be placed in the quarantine mode of operation in response to a central processor test command executed by the Right Junctor Network Control Unit. It is assumed that relay LQ on FIG. 58 has been operated in a manner similar to that previously described for the operation of relay RQ on FIG. 59.

When operating in the quarantine mode, the Left Junctor Network Control Unit is prevented from transmitting network control pulses through Upper Junctor Network Unit 2110. The various network control pulsing paths, which were traced during the above description of the execution of commands in Upper Junctor Network Unit 2110, included nonoperated contacts of relay LQ in series therewith, as shown on FIG. 47. When relay LQ is operated, the aforenoted network control pulse paths are opened, however, a load resistance 4780 is connected between leads 4605 and 4608 on FIG. 47 to provide an auxiliary path through which network control pulses may be transmitted without affecting Upper Junctor Network Unit 2110. This quarantine mode auxiliary pulse path extends from left pulser 4612 via lead 4604, through an operated contact of relay LPSL, over lead 4608, through an operated contact of relay LQ on FIG. 47, through load resistance 4780, through another operated contact of relay LQ, over lead 4605, through another operated contact of relay LPSL and over lead 4607 to left pulser 4612. By means of this auxiliary pulse path, commands can be directed to the Left Junctor Network Control Unit and fully executed thereby for testing purposes without affecting the Upper Junctor Network Unit 2110.

As previously described, the negative potential for operating path selection relays LP10–LP51 and order relays LOR0–LOR7 was supplied through a normal contact of relay LQ on FIG. 51. When relay LQ operates, the negative potential on lead 5103 is removed. However, sufficient potential is still applied through the RC network comprising resistance 5160 and capacitor 5161 and through an operated contact of relay LQ to lead 5103 to allow for testing the operation of left group check circuit 5051.

Figure 58:
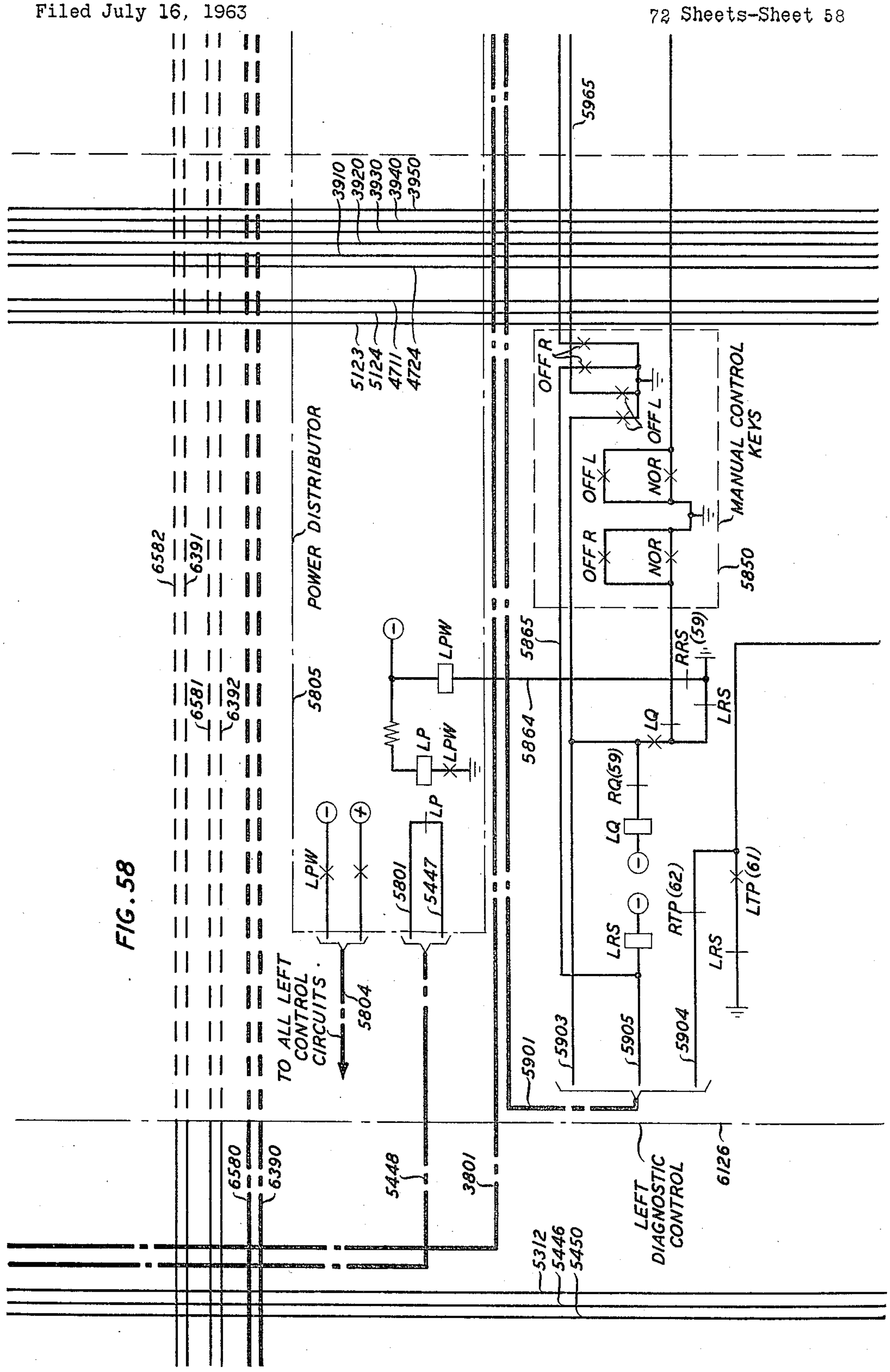

When relay LQ operates, it is maintained operated until relay LRS on FIG. 58 is operated in response to a subsequent command described later herein. The locking path for relay LQ on FIG. 58 extends from negative potential through its winding, through a nonoperated contact of relay RQ, an operated contact of relay LQ and a nonoperated contact of relay LRS to ground potential.

Figure 61:
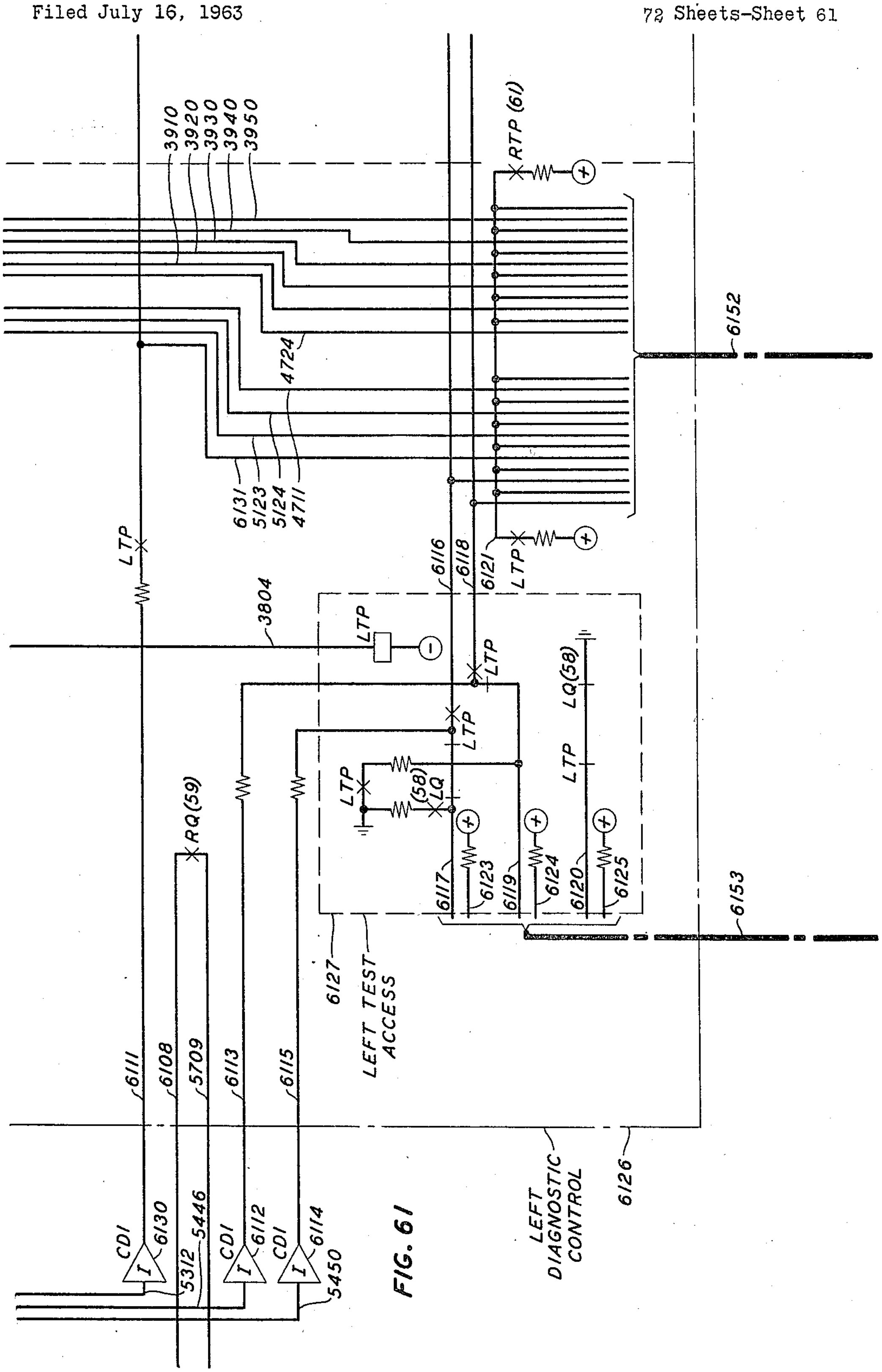

The operation of relay LQ removes ground potential from lead 6120 on FIG. 61. The removal of ground potential from lead 6120 interrupts current flow in the diagnostic pair 6120 and 6125. This cessation of current provides an indication that the Left Junctor Network Control Unit is in the quarantine mode of operation. This information is available to the Central Processor 2030 by way of the Master Scanner 2032 as previously described.

Test-Point Access Mode of Operation

Each Network Control Unit includes supervisory scan points which are normally connected via the Diagnostic Cable 2070 to the Master Scanner 2032. The supervisory scan points of the Left Junctor Network Control Unit include flip-flop 5431, flip-flop 5432 and lead 6120.

Each Network Control Unit further includes a plurality of diagnostic scan points which reflect more detailed information concerning various circuit elements of the Network Control Unit. The diagnostic scan points are not normally connected to the Master Scanner but may be connected thereto by way of Diagnostic Bus NC in response to a central processor test command.

Upon the receipt of a test-point-access command from the Central Processor 2030 and the registration thereof in Left Buffer Register 4505, order relay LOR3 and path selection relay LP32 are operated. Other path selection relays are also operated to satisfy the group check operation.

Figure 62:
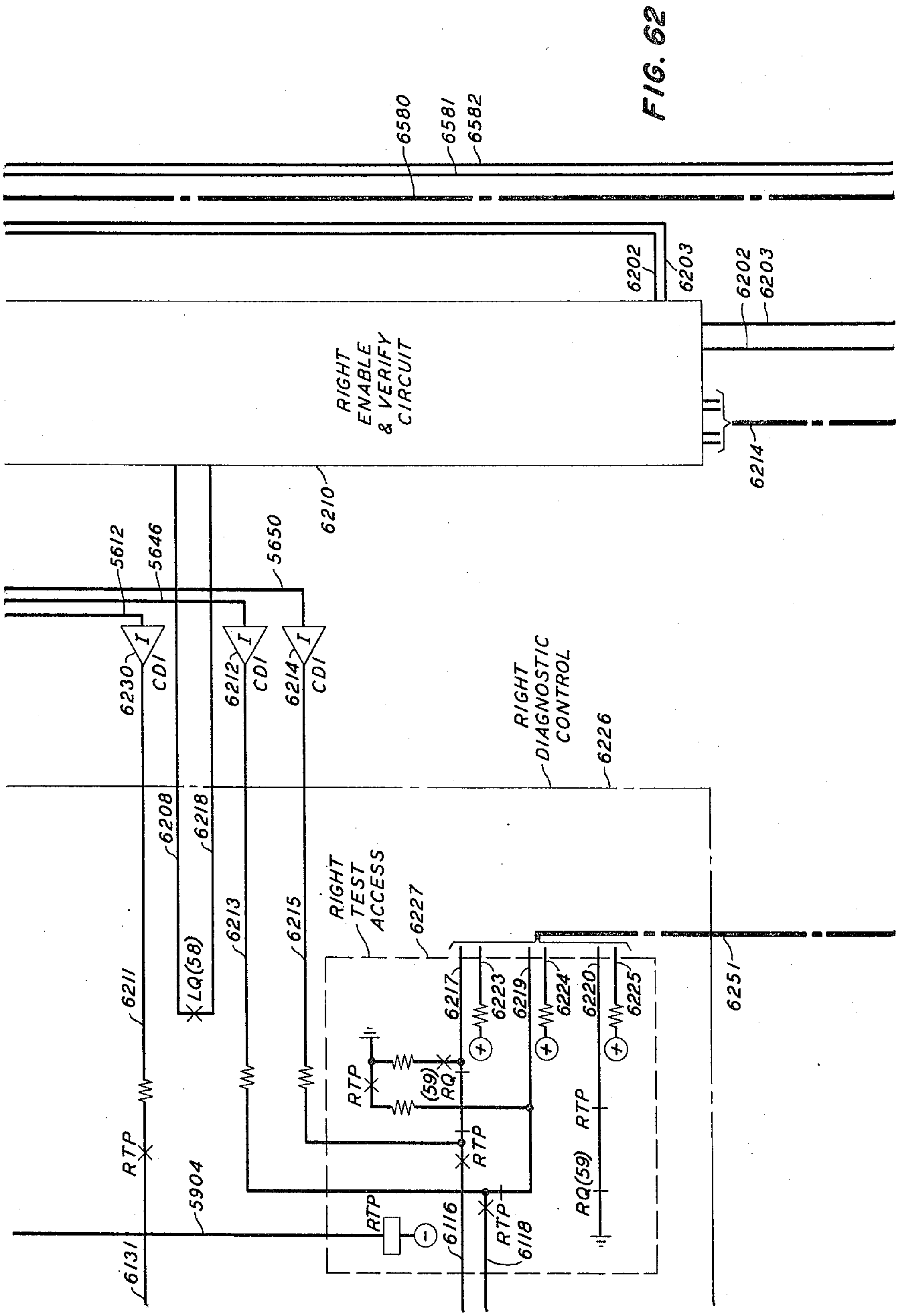

When relays LOR3 and LP32 operate, an operating circuit is completed for relay RTP on FIG. 62. The operation of relay RTP places the Right Junctor Network Control Unit in a test-point-access operating mode. The operating circuit for relay RTP on FIG. 62 extends from negative potential through its winding, over lead 5904, through a nonoperated contact of relay LTP on FIG. 59, over lead 3804, through cable 3801, over lead 3804 on FIG. 38, through an operated contact of relay LP32, over lead 4202, and through an operated contact of relay LOR3 to ground potential on FIG. 42.

Relay RTP on FIG. 62 remains operated, over a circuit extending from negative potential through its winding, over lead 5904, through an operated contact of relay RTP on FIG. 59 and through a nonoperated contact of relay RRS to ground potential, until relay RRS is operated in response to a subsequent command described later herein.

The Left Junctor Network Control Unit may be placed in the test-point-access mode of operation responsive to a command directed to the Right Junctor Network Control Unit in a manner similar to that described above. Responsive to the operation of an appropriate order and path selection relay in the Right Junctor Network Control Unit, an operating circuit is completed for relay LTP on FIG. 61. The operation of relay LTP will place the Left Junctor Network Control Unit in the test-point-access operating mode.

Cable 6152 comprises a plurality of diagnostic pairs which connect the diagnostic scan points of the Left and Right Junctor Network Control Units to the Diagnostic Bus NC. The operation of relay LTP causes the diagnostic scan points of the Left Junctor Network Control Unit to be connected to the diagnostic pairs of cable 6151. Positive potential is applied to a single conductor of each of the diagnostic pairs of cable 6152 through an operated contact of relay LTP on FIG. 61. The other conductors 3910, 3920, 3930, 3940, 3950, 4711, 5123, 4724, 5124 and 6131 of the respective diagnostic pairs are connected through operated contacts of relay LTP to various strategic points in the Upper Junctor Network Unit and the Left Junctor Network Control Unit.

Figure 39:
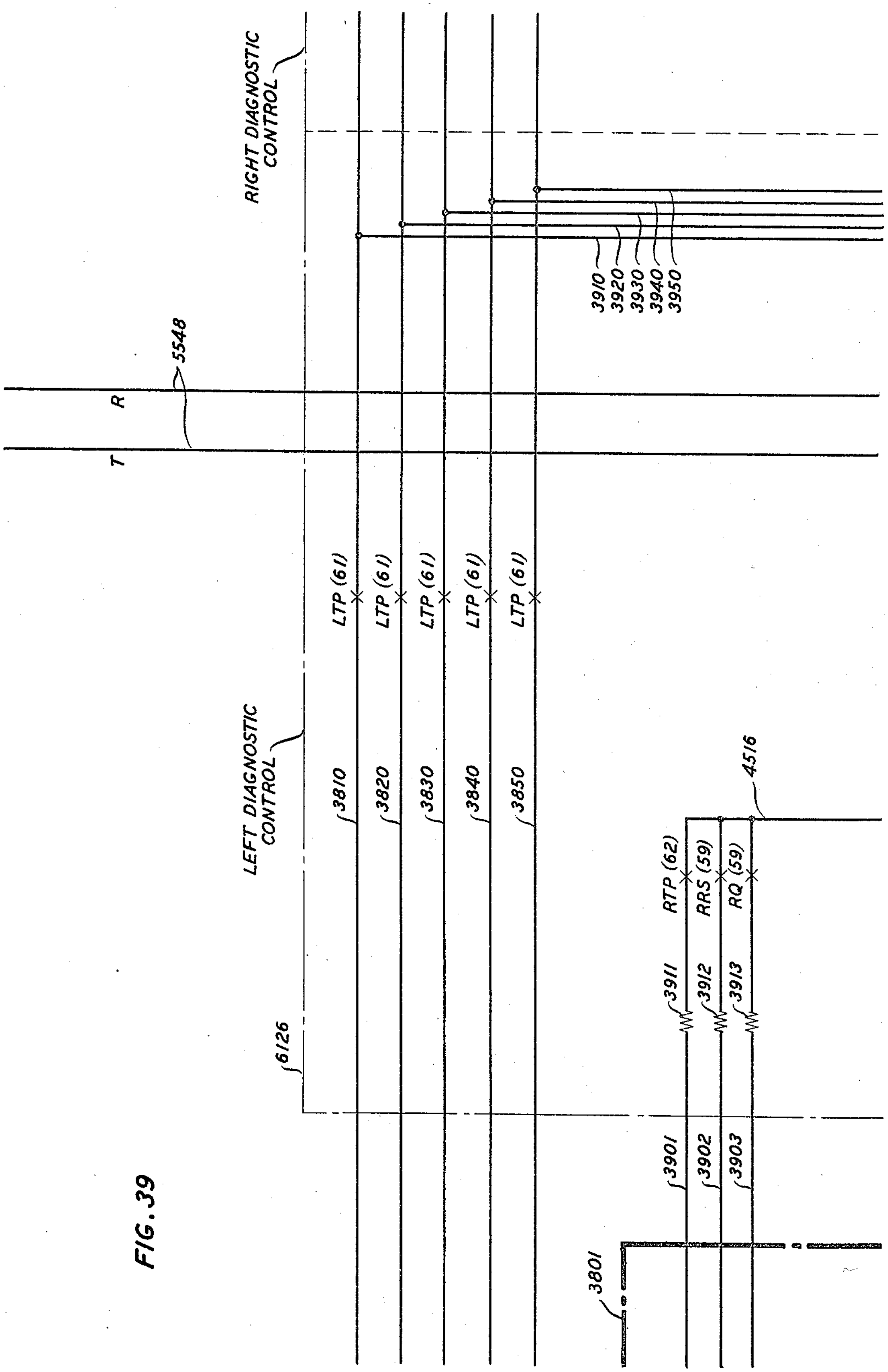

Lead 3910 is connected through an operated contact of relay LTP on FIG. 39 to lead 3810. Ground potential is applied via an operated contact of a path selection relay LP10–LP17 to lead 3810 whenever at least one path selection relay LP10–LP17 of Path Selection Group 1 is operated. Similarly ground potential is applied to lead 3920 through an operated contact of relay LTP when at least one path selection relay LP20–LP27 of group PS2 is operated; ground potential is applied to lead 3930 through an operated contact of relay LTP whenever one path selection relay LP30–LP37 of group PS3 is operated; ground potential is applied to lead 3940 through an operated contact of relay LTP whenever at least one path selection relay LP40–LP47 of group PS4 is operated; and ground potential is applied to lead 3950 when at least one path selection relay LP50–LP51 of group PS5 is operated. Since positive potential is applied to the other conductor 6121 associated with conductors 3910–3950 as diagnostic pairs, current will flow through those diagnostic pairs having ground potential applied to one conductor thereof. The Central Processor 2030 therefore can ascertain, by way of the Master Scanner, whether or not at least one path selection relay LP10–LP51 has operated in each path selection group PS1–PS5.

As previously described, the operation of relay SC in pulser 4612 indicates the detection of a false ground on a pulsing path. Relay SC remains operated, over a path extending from negative battery on FIG. 46 through its winding, through resistor 4636, through an operated contact of relay SC, over lead 4702 and through a nonoperated contact of relay LRS on FIG. 47 to ground potential, until relay LRS is operated. When relay SC is not operated, ground potential is applied to lead 4711 over a circuit extending from ground potential through a nonoperated contact of relay LRS on FIG. 47, over lead 4702, through a nonoperated contact of relay SC on FIG. 46, over lead 4611 and through an operated contact of relay LTP. Thus, when relay SC is not operated, current will flow in the diagnostic pair including lead 4711. However, when relay SC is operated, no current will flow through the diagnostic pair including lead 4711.

Ground potential is applied to lead 4724 when at least one order relay LOR0–LOR7 is operated. This circuit extends from ground on FIG. 45 through an operated contact of an order relay LOR0–LOR7, over lead 4524, through an operated contact of relay LTP on FIG. 47 to lead 4724. Thus, when any order relay is operated, current will flow through the diagnostic pair including lead 4724. However, no current flows unless at least one order relay LOR0–LOR7 is operating.

Flip-flops 5012 and 5015 become SET, as previously described, in response to group check failure signals. The 1 output terminals of flip-flops 5012 and 5014 are connected over leads 5023 and 5024 and through operated contacts of relay LTP on FIG. 51 to leads 5123 and 5124, respectively. When flip-flops 5012 and 5015 are SET, low potential is applied to their respective 1 output terminals. Therefore, when flip-flop 5012 is SET no current will flow through the diagnostic pair including conductor 5124, and when flip-flop 5012 is RESET, current will flow. When flip-flop 5015 is SET, no current will flow through the diagnostic pair including conductor 5123, and when flip-flop 5015 is RESET, current will flow. The presence or absence of current flow through the diagnostic pairs including conductors 5123 and 5124 respectively indicate the presence or absence of a group check failure.

Flip-flop 5310 on FIG. 53 is SET just prior to the time that operating potential is supplied for the path selection relays LP10–LP51 and order relays LOR0–LOR7, as previously described. The 1 output terminal of flip-flop 5310 is connected via lead 5312, inverter 6130, lead 6111, and an operated contact of relay LTP to conductor 6131. When flip-flop 5310 is SET, the high potential applied to lead 5312 is inverted by inverter 6130 and current flows through the conductor pair including conductor 6131. When flip-flop 5310 is RESET, the potential applied to conductor 6131 is high and no current will flow.

The operation of relay LTP causes ground potential to be applied to lead 6119 through an operated contact thereof. The operation of relay LTP removes ground potential from lead 6120. The operation of relay LTP transfers lead 6115 from lead 6117 to lead 6116. The operation of relay LTP transfers lead 6113 from lead 6119 to lead 6118. As a result of the above transfer actions in left test-access 6127, the supervisory state indications of flip-flops 5431 and 5432 are transferred from the Diagnostic Cable 2070 to the Diagnostic Bus NC, and arbitrary indications are placed on the supervisory pairs of the diagnostic cable. The Central Processor 2030 is thus informed by way of Master Scanner 2032 that the Left Junctor Network Control Unit has been placed in the test-point access mode of operation, and that the Diagnostic Bus NC should be examined by the Master Scanner to ascertain the supervisory information relating to the Left Junctor Network Control Unit.

As previously mentioned, a Network Unit can be placed in both the quarantine and test-point access modes of operation at the same time. When placed in the quarantine mode as a result of the operation of relay LQ ground is applied to lead 6117 thus proving an indication whereby the Central Processor 2030 can differentiate between the various modes of operation.

*Return-to-Normal Mode of Operation*

It is assumed that the Right Junctor Network Control Unit has been placed in the quarantine mode of operation as previously described. Relay RQ is therefore operated. In order to return the Right Junctor Network Control Unit to its normal operating mode, a return-to-normal test command is transmitted from the Central Processor 2030 to the Left Junctor Network Control Unit. In response to the registration of this command in left buffer register 4505, order relay LOR3 is operated and path selection relay LP33 is operated. A circuit is thereby completed for the operation of relay RRS on FIG. 59, which extends from negative potential through its winding, over lead 3805, through cable 3801, over lead 3805 on FIG. 38, through operated contacts of relay LP33, over lead 4202 and through operated contacts of relay LOR3 to ground potential on FIG. 42. The operation of relay RRS opens the locking circuit for relay RQ, thus allowing it to release. Had relay RTP been operated on FIG. 62, the operation of relay RRS would have opened its locking path thus allowing it to release also. The pulsing path established to satisfy the command-execution operation is similar to that previously described with reference to the quarantine and test-point access operations. No locking path is provided for relay RRS, and it releases when relays LOR3 and LP33 release, as previously described.

*Power-Off Mode*

The power distributor 5805 shown on FIGS. 58 and 59 provides negative and positive potentials to the circuit elements of the Left and Right Junctor Network Control Units.

Relay LPW on FIG. 58 is normally held operated over a path extending from negative potential through its control winding, over lead 5864 and through a nonoperated contact of relay RRS to ground potential. The release of relay LPW will remove negative and positive potential from the circuit elements in Left Junctor Network Unit. Similarly, potentials are supplied to the Right Junctor Network Control Unit through normally operated contacts of relay RPW.

Manual control keys 5850 are provided to completely disable either of the Network Control Units of the Switch Frame. When power is removed from one Network Control Unit of a Switch Frame, the other Network Control Unit is precluded from entering the quarantine mode of operation and, if previously in the quarantine operating mode, it is automatically placed in the normal mode of operation.

When it is desired to disable the Left Junctor Network Control Unit, the OFF-L key is manually operated and the NOR key is released. A circuit is automatically completed from ground potential through an operated contact of the OFF-L key, over lead 5965 and through the winding of relay RRS on FIG. 59 to negative potential, over which relay RRS operates. If the Right Junctor Network Control Unit is presently in the quarantine mode of operation, the operation of relay RRS will release relay RQ and return the Right Junctor Network Control Unit to the normal mode of operation.

The operation of the OFF-L key also completes a circuit from ground through an operated contact thereof, over lead 5865, through a nonoperated contact of relay RQ and through the control winding of relay LQ to negative potential, over which relay LQ operates. The operation of relay LQ divorces the Left Junctor Network Control Unit from the Upper Junctor Network Unit 2110, as previously described, with reference to the quarantine mode of operation. The operation of relay RRS opens the above-described operating circuit of relay LPW, and relay LPW releases, thus removing power from the Left Junctor Network Control Unit.

To insure that only one Network Control Unit of any Switch Frame can be placed in a power-off mode at any time, in extra holding path for relay RPW on FIG. 59 is completed when the OFF-L key is manually operated. This holding path extends from negative potential on FIG. 59 through the control winding of relay RPW, over lead 5964, over lead 5852 and through an operated contact of the OFF-L key to ground potential.

Power is returned to the Left Junctor Control Unit when the NOR key is manually operated and the OFF-L key is released.

*Trunk Switch Frame 701*

Figure 7:
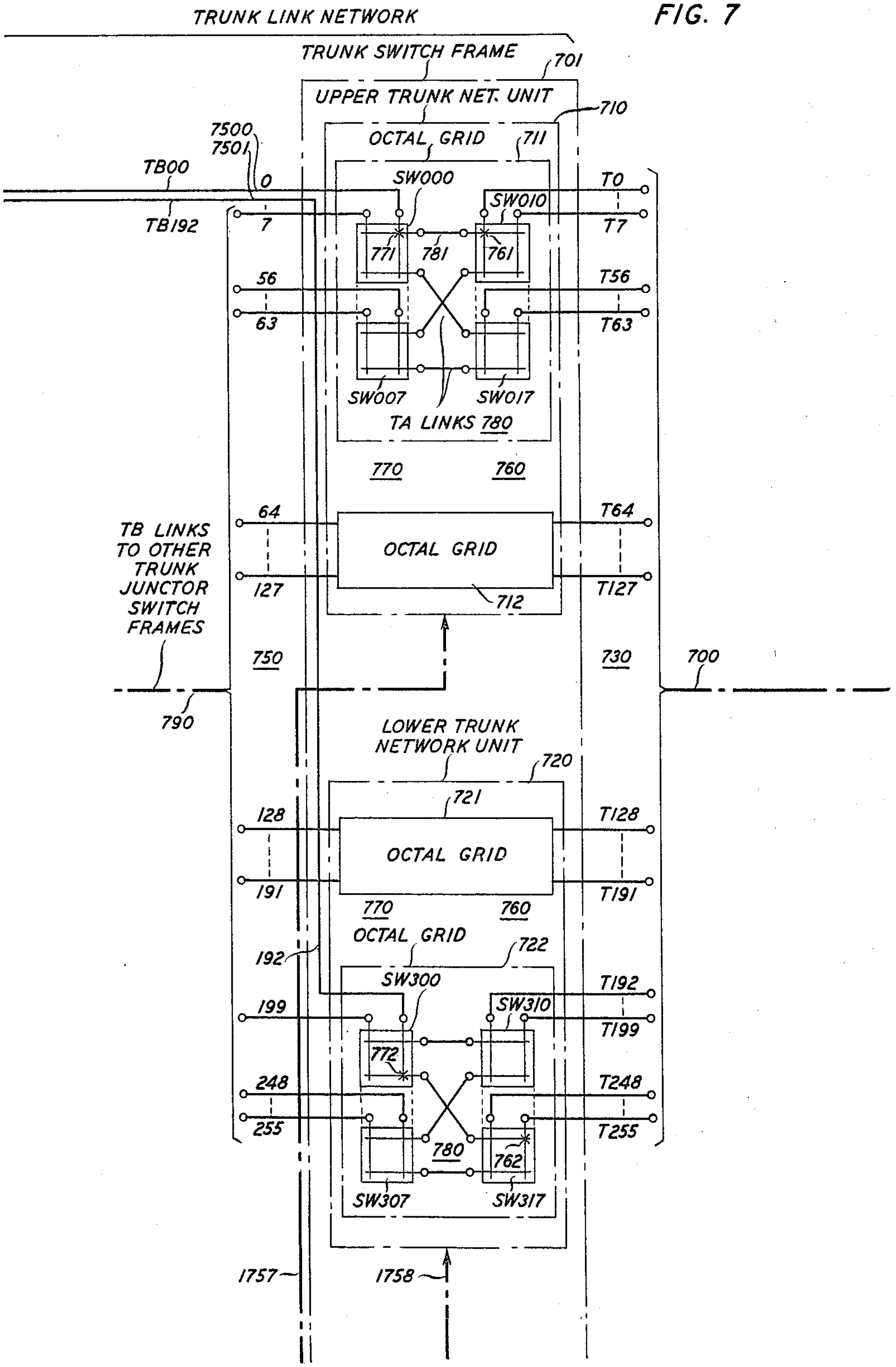
FIGS. 7 and 17 are a schematic representation of a Trunk Switch Frame.
Figure 17:
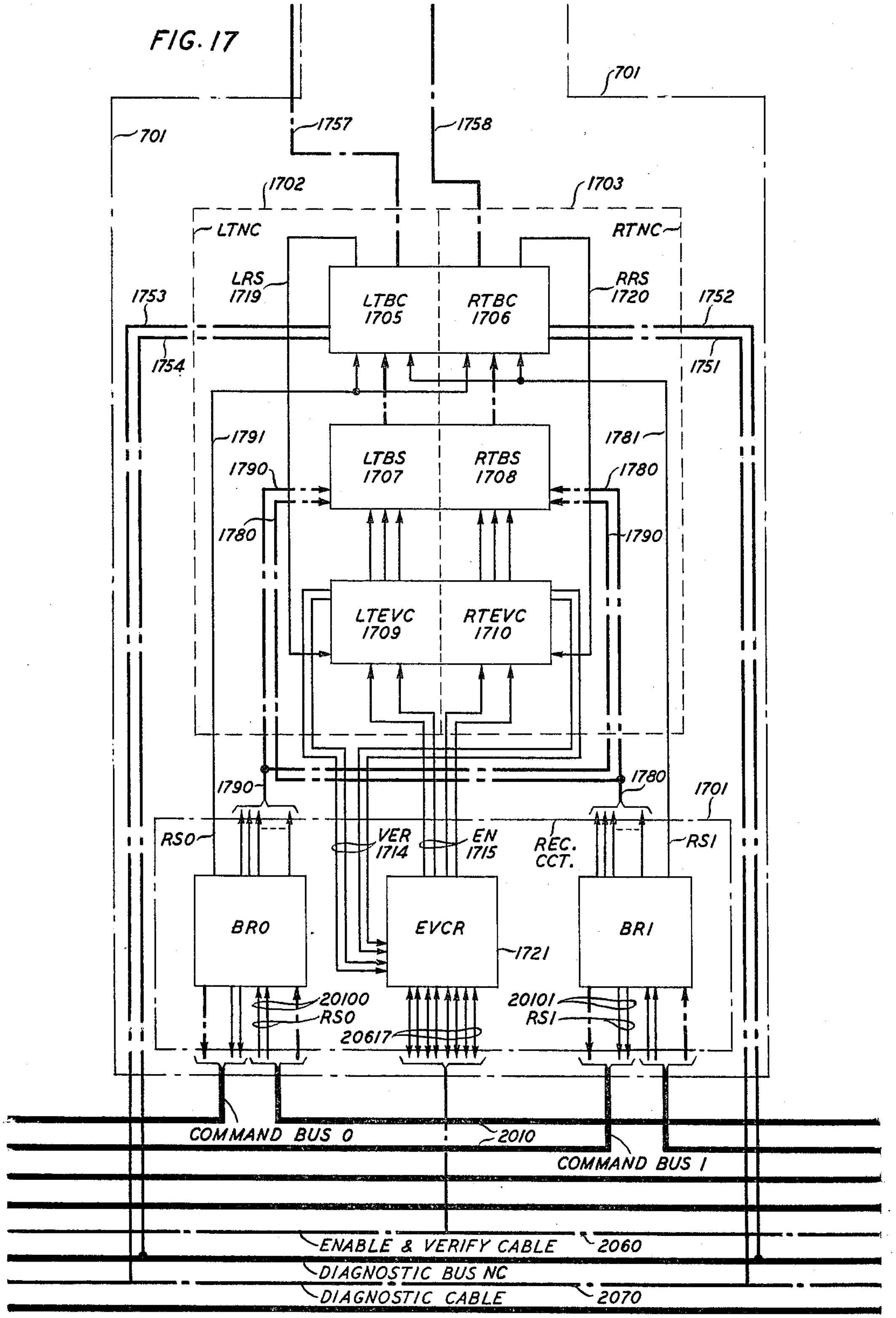

FIGS. 7 and 17 illustrate the organization of a typical Trunk Switch Frame 701. Although only one representative Trunk Swith Frame 701 is shown in the drawing, a plurality of Trunk Switch Frames are included in the switching system. The aforenoted patent application of A. Feiner describes an arrangement of Trunk Switch Frames in an illustrative switching network.

Trunk Switch Frame 701 includes two modular Trunk Network Units 710, 720, two Trunk Network Control Units 1702, 1703 and a Receiver Circuit 1701 through which the Trunk Network Control Units 1702, 1703 are inductively coupled to their discretely associated enable-verify pairs 20617 of Enable-Verify Cable 2060 and to each of the conductor pairs 20100, 20101 of the respective Command Buses 0 and 1.

TRUNK NETWORK UNITS 710, 720

The network portion of Trunk Switch Frame 701 includes two Trunk Network Units 710, 720 which are respectively designated Upper Trunk Network Unit 710 and Lower Trunk Network Unit 720. A Trunk Network Unit, such as 710, is similar to the Junctor Network Unit 310, previously described with reference to Line Junctor Switch Frame 301, except that no test-vertical relay contacts, such as 340, are included in Trunk Network Units 710, 720. Trunk Network Unit 710 comprises two octal grids 711, 712 each providing selectable, bidirectional, connecting facilities between sixty-four trunk terminals 730 and sixty-four TB link terminals 750 via TA interstage links 780 through two switching stages 760, 770.

A trunk network unit partial call connection between a selected trunk terminal T0 and a selected TB link terminal 7500 is established by selecting a TA link 781 and closing the first and second stage cross-point switching device contacts 761, 771 at the respective cross-points of the selected trunk and TB link terminals T0 and 7500 and the selected TA link 781.

TRUNK NETWORK CONTROL UNITS 1702, 1703

The Trunk Network Control Units 1702, 1703 are identical to the previously described Junctor Network Control Units 1302, 1303 except that the test circuitry associated with the use of the test-vertical relay contacts 340 of Line Junctor Switch Frame 301 is not included in the Trunk Network Control Units 1702, 1703. The enable-verify operation of Trunk Network Control Units 1702, 1703 is similar to the aforedescribed enable-verify operation of Line Network Control Units 1102, 1202 of Line Switch Frame 201.

Reference to the above description of the operations of Line Junctor Networks 310, 320 will disclose that all of such operations, with the exception of the connect order and the various test orders, are concerned with the establishment of test connections via the test-vertical relay contacts 340. Since Trunk Network Units 710, 720 are not equipped with test-vertical relay contacts 340, the only type of command appropriate for execution therein is one including a connect order. Therefore, the only type of command associated with network control operations which is executed by a Trunk Switch Frame 701 is one which includes a connect order. Test orders, responsive to which the modes of operation of Trunk Network Control Units 1702, 1703 are controlled, are executed in Trunk Switch Frame 701 in a manner similar to the execution thereof by the above-described Line Switch Frame 201 and Line Junctor Switch Frame 301.

*Trunk Junctor Switch Frame 601*

FIGS. 6 and 16 illustrate the organization of a typical Trunk Junctor Switch Frame 601. Although only one representative Trunk Junctor Switch Frame 601 is shown in the drawing a plurality of Trunk Junctor Switch Frames are included in the switching system. The aforenoted patent application of A. Feiner describes an arrangement of a plurality of Trunk Junctor Switch Frames in an illustrative switching network.

Trunk Junctor Switch Frame 601 is a substantial duplicate of Line Junctor Switch Frame 301. It includes two modular Junctor Network Units 610, 620, two Junctor Network Control Units 1602, 1603 and a Receiver Circuit 1601 through which the Junctor Network Control Units 1602, 1603 are inductively coupled to their discretely associated enable-verify pairs 20616 of Enable-Verify Cable 2060 and to each of the conductor pairs 20100, 20101 of the respective Command Buses 0 and 1.

JUNCTOR NETWORK UNITS 610, 620

The network portion of Trunk Junctor Switch Frame 601 includes two Junctor Network Units 610, 620, which are respectively designated Upper Junctor Network Unit 610 and Lower Junctor Network Unit 620. A Junctor Network Unit, such as 610, comprises two octal grids 611, 612 each providing selectable, bidirectional, connecting facilities between sixty-four TB link terminals 630 and sixty-four trunk junctor terminals 650 via TC interstage links 680 through two switching stages 660, 670.

A junctor network unit partial call connection between a selected TB link terminal 6300 and a selected trunk junctor terminal TJ0 is established by selecting a TC link 681 and closing the first and second stage cross-point switching device contacts 661, 671 at the respective cross-points of the selected TB link and trunk junctor terminals 6300 and TJ0 and the selected LC link 681.

In addition to the second stage cross-point switching device contacts 370 through which junctor network unit partial call connections are established, each trunk junctor terminal 650 is connectable through discrete test-vertical relay contacts 640 via a test-vertical cable 1648, 1649 to the respective junctor buffer circuits 1605, 1606. The test-vertical relay contacts 640 provide an additional means of access to the switching network similar to that previously described with reference to Line Junctor Switch Frame 301. This access point, via the respective trunk junctor terminals 650, is used alternatively with the access point of Line Junctor Switch Frame 301 for the various test operations previously described.

Thus, a Trunk Junctor Switch Frame 601 is identical to Line Junctor Switch Frame 301 except for its physical location in the switching train of the switching network.

TRUNK JUNCTOR SWITCH FRAME OPERATION AND CONTROL

The Junctor Network Control Units 1602, 1603 are identical to the previously described Junctor Network Control Units 1302, 1303. The operations of Trunk Junctor Switch Frame 601 and the control thereof is identical to the above-described operations and control of Line Junctor Switch Frame 301. The enable-verify sequence of operation is the same. Mode of operation control in response to test orders is the same. The central processor commands directed to Trunk Junctor Switch Frame 601 result in the establishment of junctor network unit partial call connections, test vertical connections, testing operations and changes in mode of operation in a manner similar to the above-described corresponding functions of Line Junctor Switch Frame 301. Due to the complete similarity of Trunk Junctor Switch Frame 601 to Line Junctor Switch Frame 301, no further description thereof is included herein.

*Junctor Frame 501*

Figure 5:
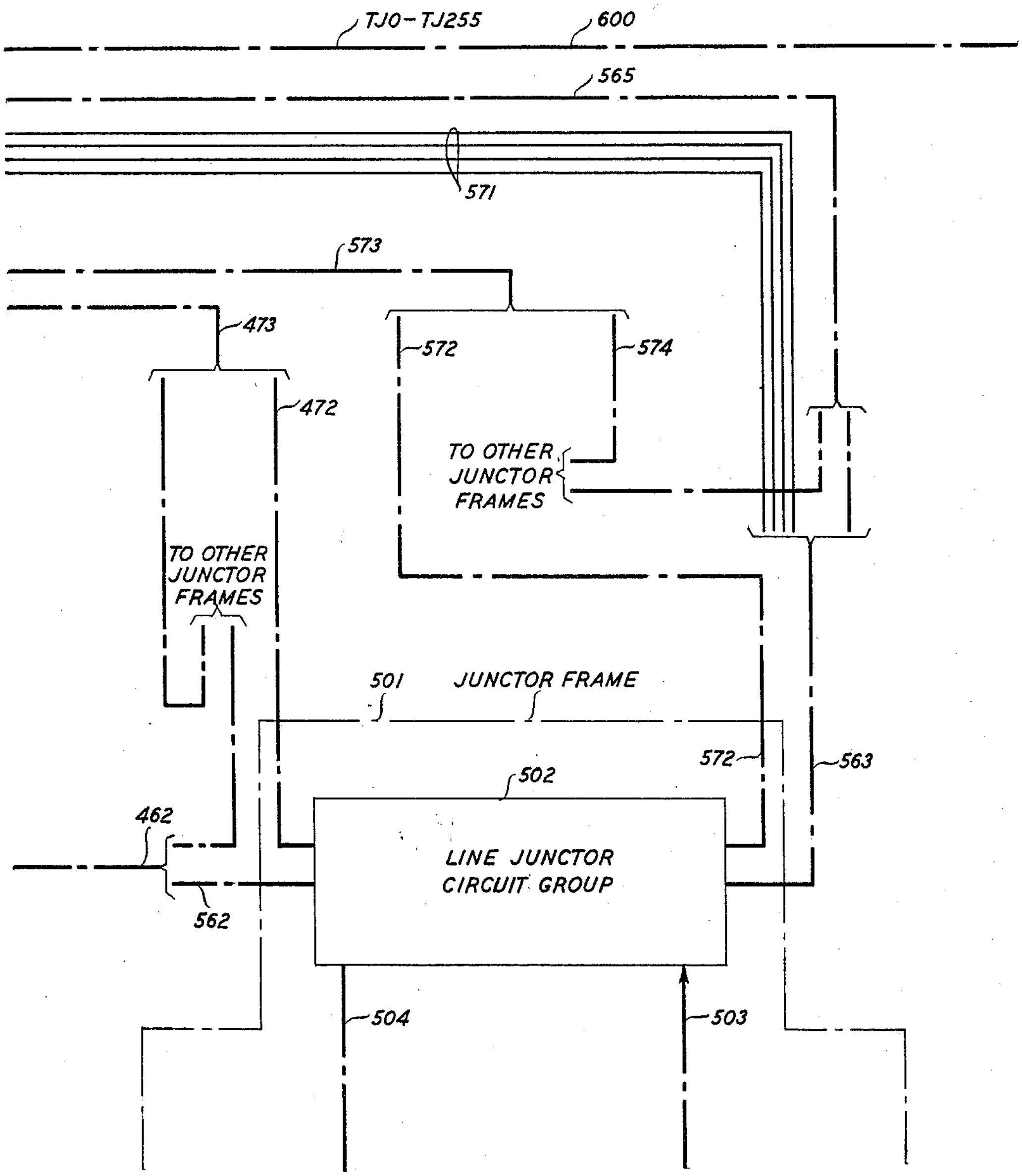
FIGS. 5 and 15 are a schematic representation of a Junctor Frame.
Figure 15:
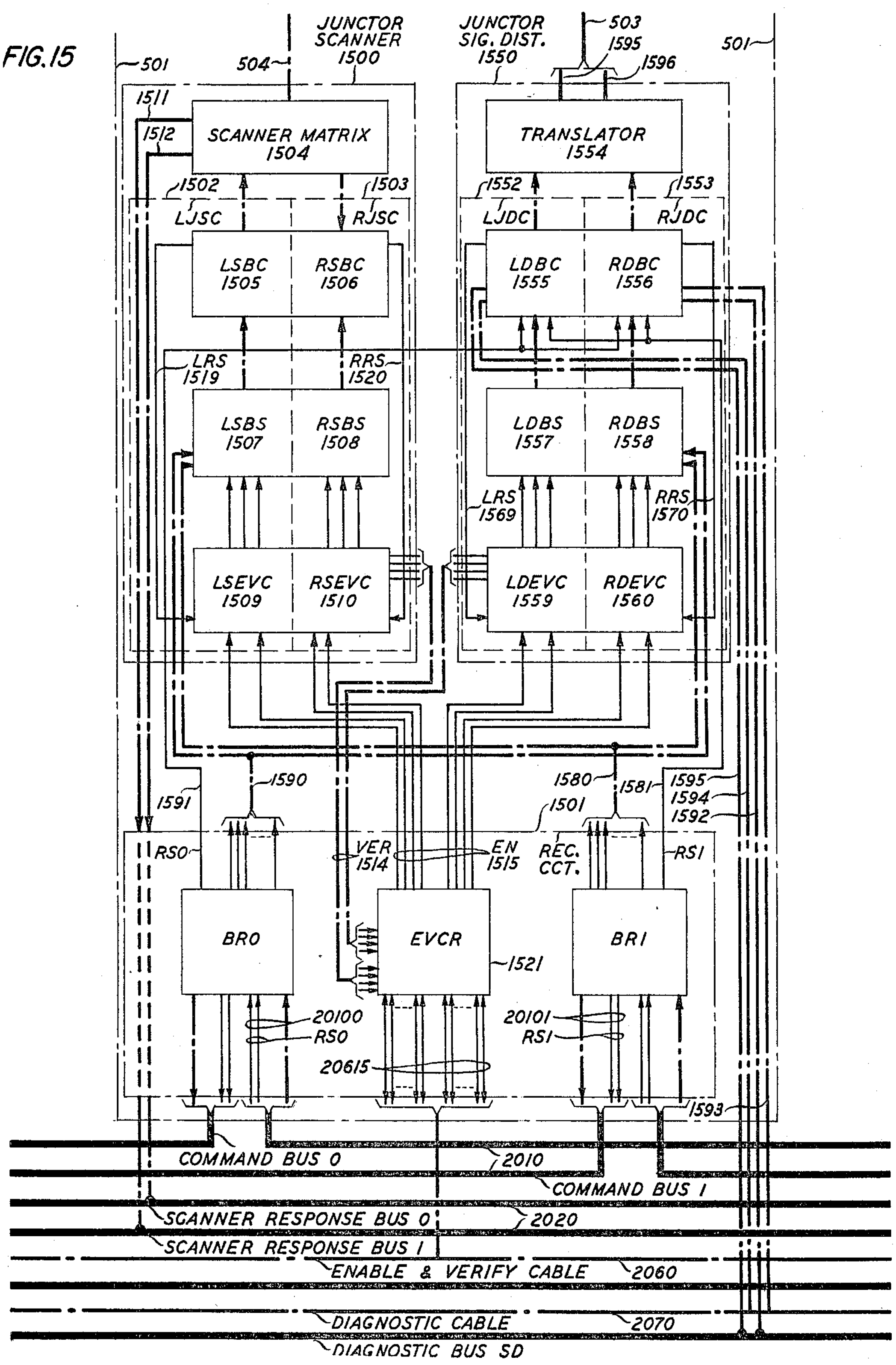

FIGS. 5 and 15 illustrate the organization of a typical Junctor Frame 501. A plurality of Junctor Frames, such as 501, may be included in the switching system, their number being equal to the number of modular line junctor circuit groups, such as 502, which are required to serve line-to-line traffic.

Junctor Frame 501 includes a line junctor circuit group 502, a Junctor Scanner 1500 for monitoring established line to line network connections, a Junctor Signal Distributor 1550 for controlling the cut-through relays in the respective line junctor circuits of line junctor circuit group 502 and a Receiver Circuit 1501 through which the respective Control Units 1502, 1503, 1552, 1553 of the Junctor Scanner 1500 and the Junctor Signal Distributor 1550 are inductively coupled to their discretely associated enable-verify pairs 20615 and to each of the conductor pairs 20100, 20101 of the respective Command Buses 0 and 1.

JUNCTOR SCANNER 1500

Junctor Scanner 1500 comprises a Junctor Scanner Matrix 1504, which includes an individual ferrod for each scan point of line junctor circuit group 502, and two Scanner Control Units 1502, 1503.

A Scanner Control Unit, such as 1502, includes an enable verify-circuit 1509 which receives a central pulse distributor enable signal via a cable receiver 1521 and an enable lead 1515, generates a command-accept signal and subsequently generates a verify signal which is applied via a verify lead 1514 and cable receiver 1521 to the one of enable-verify pairs 20615 from which the enable signal was received. Scanner Control Unit 1502 further comprises a bus selector 1507 which accepts the central processor command accompanying the enable signal from Command Bus 0 or 1, as indicated by the enable-verify pair 20615 from which the enable signal was received. The buffer circuit 1505 includes translation and logic circuitry which selects the particular ferrods of the Junctor Scanner Matrix 1504 to be interrogated in accordance with the accepted central processor command and initiates the interrogation thereof. Signals representing the respective status of the interrogated ferrods are then transmitted via cables 1511, 1512 and the Scanner Response Bus System 2020 to the Central Processor 2030.

The aforenoted copending patent application of A. M. Guercio and H. F. May includes a complete description of a scanner which is analogous to Junctor Scanner 1500.

JUNCTOR SIGNAL DISTRIBUTOR 1550

Junctor Signal Distributor 1550 comprises two Signal Distributor Control Units 1552, 1553 and a relay tree translator 1554, the outputs of which are individually connected via cable 503 to the windings of the respective cut-through relays in the line junctor circuits of line junctor circuit group 502. A Signal Distributor Control Unit, such as 1552, includes an enable-verify circuit 1559, which is similar in operation to the previously described enable-verify circuit 1203 of Line Switch Frame 201. The bus selector 1557 is similar in operation to the previously described buffer circuit selector 1204 of Line Switch Frame 201. Buffer circuit 1555 registers the central processor command accepted via bus selector 1557 in response to the command-accept signal generated by enable-verify circuit 1559 and, by means of translation and logic circuitry, initiates the selective operation of translation relays in the Translator 1554. The contacts of the translation relays in Translator 1554 define a path to a particular output point 1595, 1596 of Translator 1554 in accordance with the registered central processor command. A pulse of the proper polarity is then generated by buffer circuit 1555 in accordance with the registered command and transmitted, via the path defined by the operated relay contacts in Translator 1554 and cable 503, to operate or release the cut-through relay associated with the particular output point 1595, 1596 of Translator 1554. The resulting release or operation of the cut-through relay is then detected in buffer circuit 1555 and a RESET signal is generated via left RESET lead 1569 to prepare enable-verify circuit 1559 for the receipt of another enable signal and to prepare buffer circuit 1555 for the receipt and registration of accompanying central processor command.

The Signal Distributor Control Units 1552, 1553 may be placed in the various modes of operation previously described with reference to the Line Network Control Units 1102, 1202 of Line Switch Frame 201 in response to central processor commands which include a test order. A Signal Distributor Control Unit, such as 1552, is directed in changing its mode of operation by the other Signal Distributor Control Unit 1553 of the Signal Distributor 1550. The operation is similar to that of the previously described mode control operations of Line Network Control Units 1102, 1202 of Line Switch Frame 201.

Each Junctor Scanner Control Unit 1502, 1503 is associated with one Signal Distributor Control Unit 1552, 1553. Although the Scanner Control Units 1502, 1503 cannot be placed in nonnormal modes of operation in response to central processor commands directed thereto, a Scanner Control Unit 1502, 1503 is disabled when its associated Signal Distributor Control Unit 1552, 1553 is placed in the quarantine mode of operation. This is similar to the relationship between the operations of Line Scanner Control Units 1002, 1003 and Line Network Control Units 1102, 1202 which were described hereinabove.

The supervisory scan points of a Signal Distributor Control Unit, such as 1552, are normally connected via cable 1594 and the Diagnostic Cable 2070 to Master Scanner 2032. During the test point access mode of operation, the supervisory scan points and the diagnostic scan points of Signal Distributor Control Units 1552 are connected via cable 1595 to the Diagnostic Bus SD which, in turn, is connected to Master Scanner 2032. This is similar to the test point access mode of operation previously described with reference to Line Switch Frame 201.

*Trunk Frames 801, 901*

Figure 8:
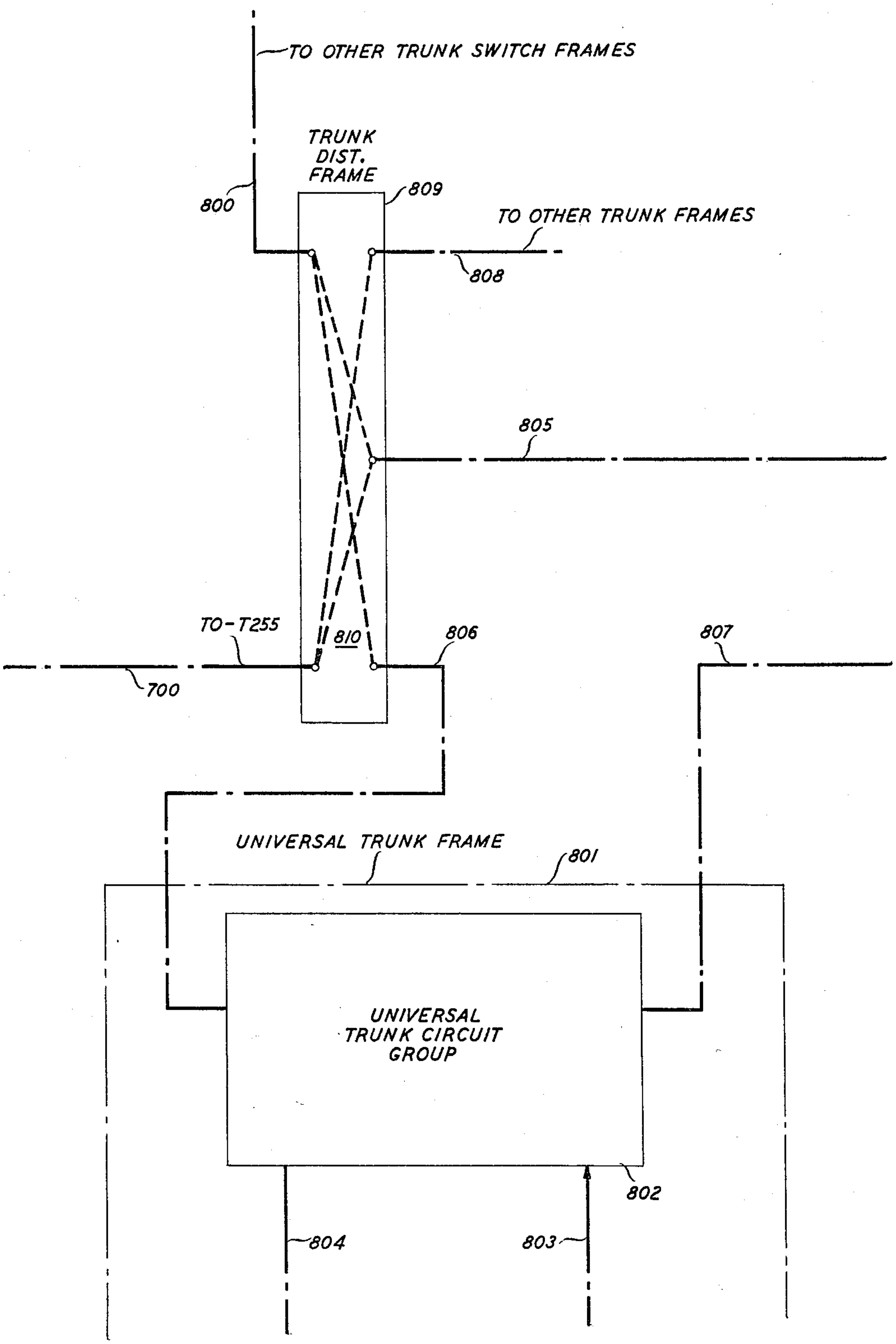
FIGS. 8 and 18 are a schematic representation of the Trunk Distribution Frame and a Universal Trunk Frame.
Figure 18:
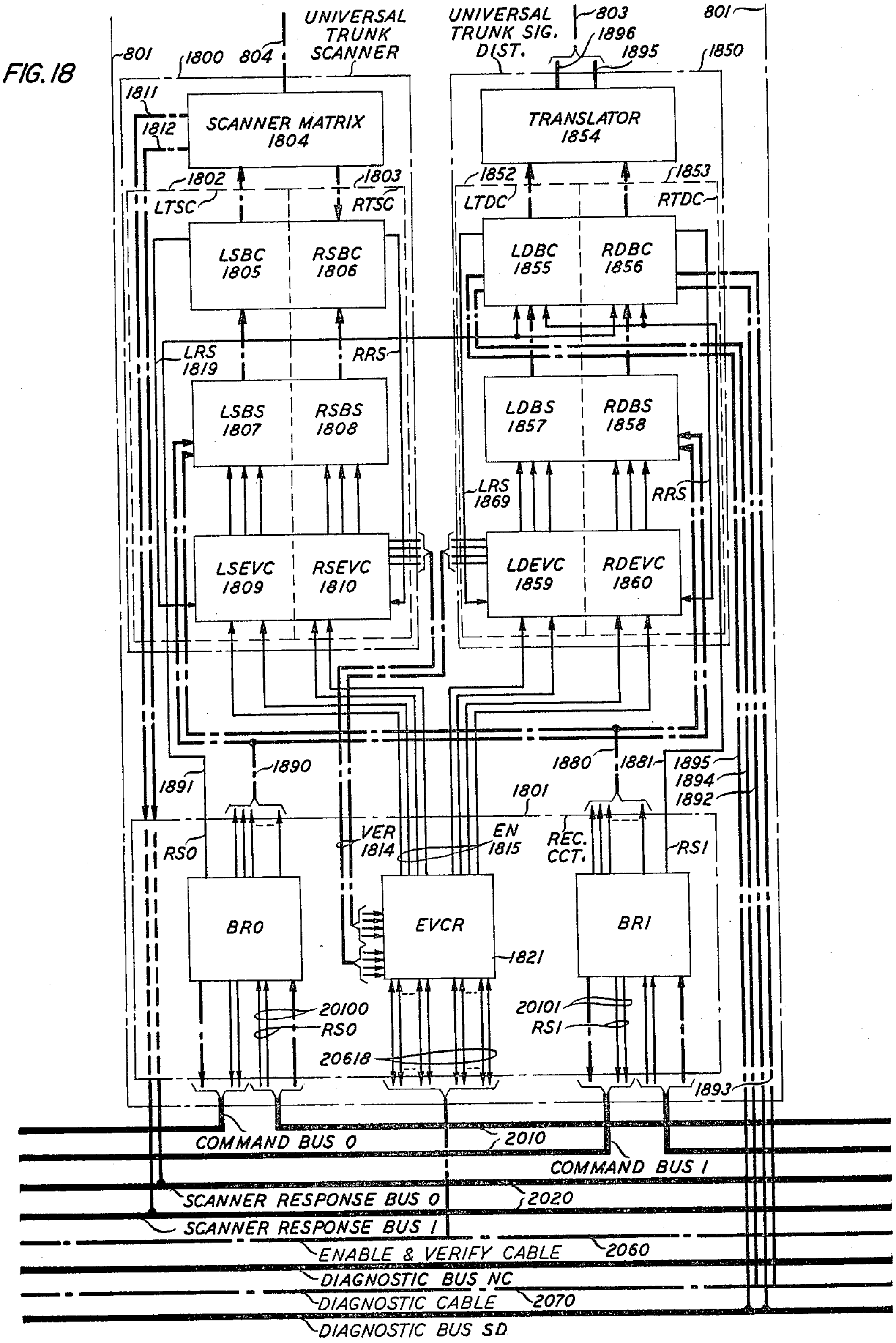
Figure 19:
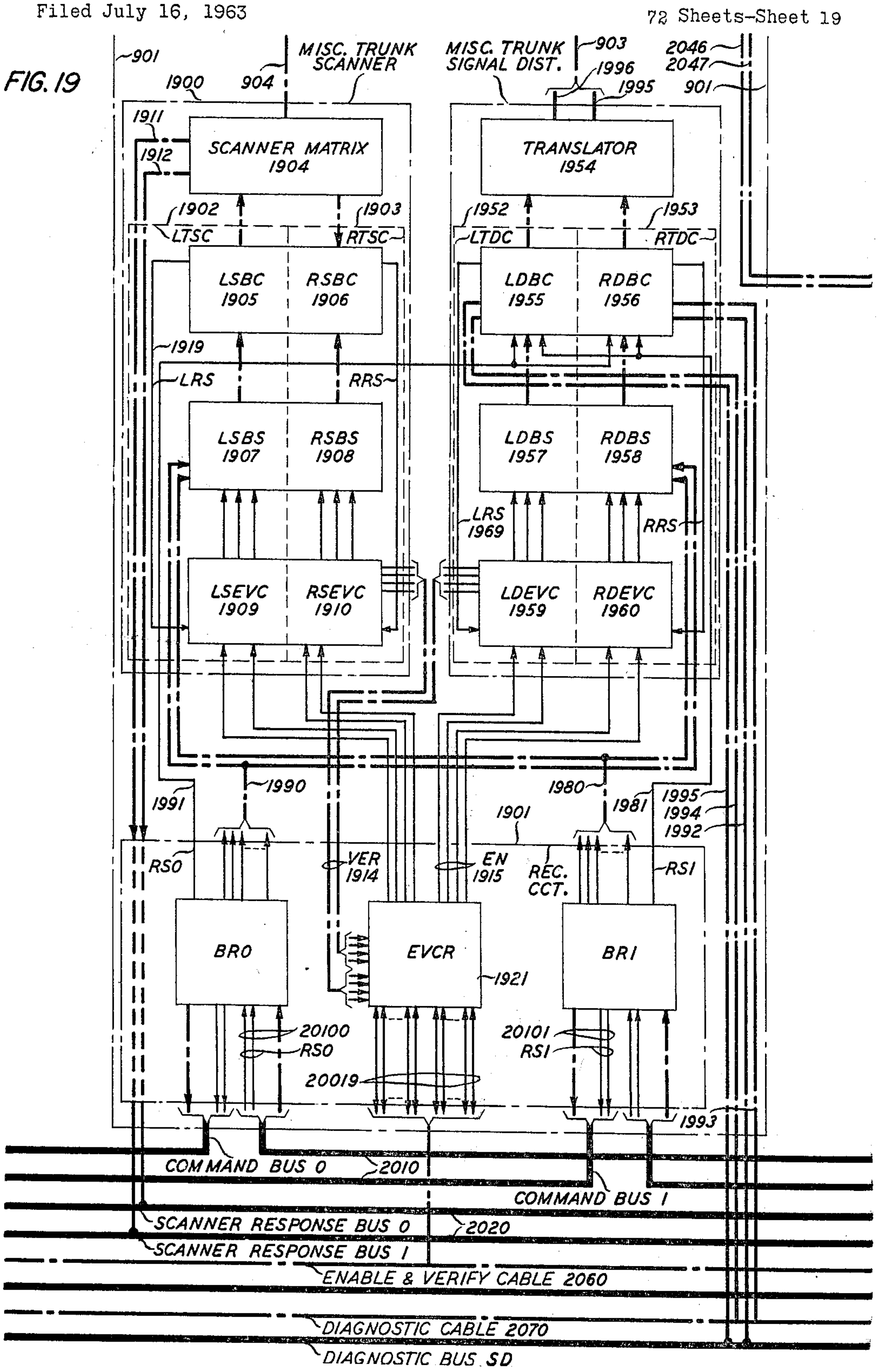

FIGS. 8 and 18 illustrate the organization of a typical Universal Trunk Frame 801. FIGS. 9 and 19 illustrate the organization of a typical Miscellaneous Trunk Frame 901. A plurality of Universal and Miscellaneous Trunk Frames, such as 801, 901, are included in the illustrative switching system, their number being equal to the number of universal and miscellaneous trunk circuit groups, such as 802, 902, which are required to serve traffic through the switching network.

The general differences between a Universal Trunk Frame 801 and a Miscellaneous Trunk Frame 901 have been described hereinabove. The operations of the various trunks and service circuits appearing thereon will be more apparent from a description of the processing of various types of calls which is included later herein.

The supervision of the trunk and service circuits 802, 902 of a Trunk Frame 801, 901, either universal or miscellaneous, is similar to the previously described supervisory monitoring and control of the line junctor circuits of line junctor circuit group 502. Since the operations of the Trunk Scanners 1800, 1900 and the Trunk Signal Distributors 1850, 1950 are analogous to the operations of the previously described Junctor Signal Distributor 1550 and Junctor Scanner 1500, no further description will be given thereof.

CALL PROCESSING

The above description has set forth the manner in which various switching functions are accomplished in discrete system components of the illustrative switching system. These functions include the selective establishment of two-stage partial call connections by Switch Frames, the selective operation and release of the various control relay contacts within the respective line junctor, trunk and service circuits, and the selective interrogation of various circuit elements of the system components as to the supervisory state thereof. The possible combinations of such switching functions to perform switching system operations are many, and no attempt is made herein to describe all of the potentially advantageous combinations in which the switching functions may be used. However, a brief discussion of a few illustrative combinations of available switching functions is included hereinbelow to exemplify one manner in which certain of these switching functions advantageously may be utilized in processing certain types of calls.

Figure 67B:
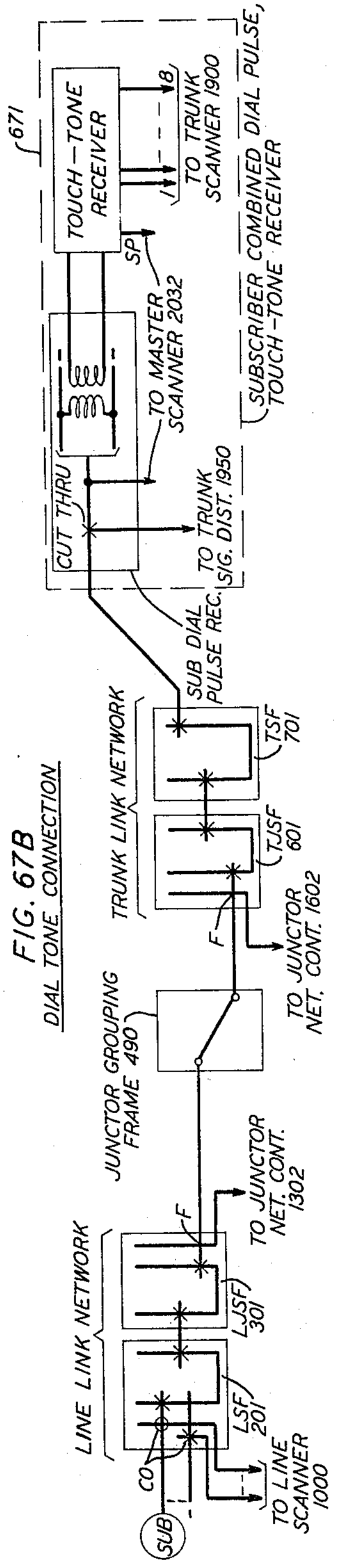
Figures 68, 68A, 68B:
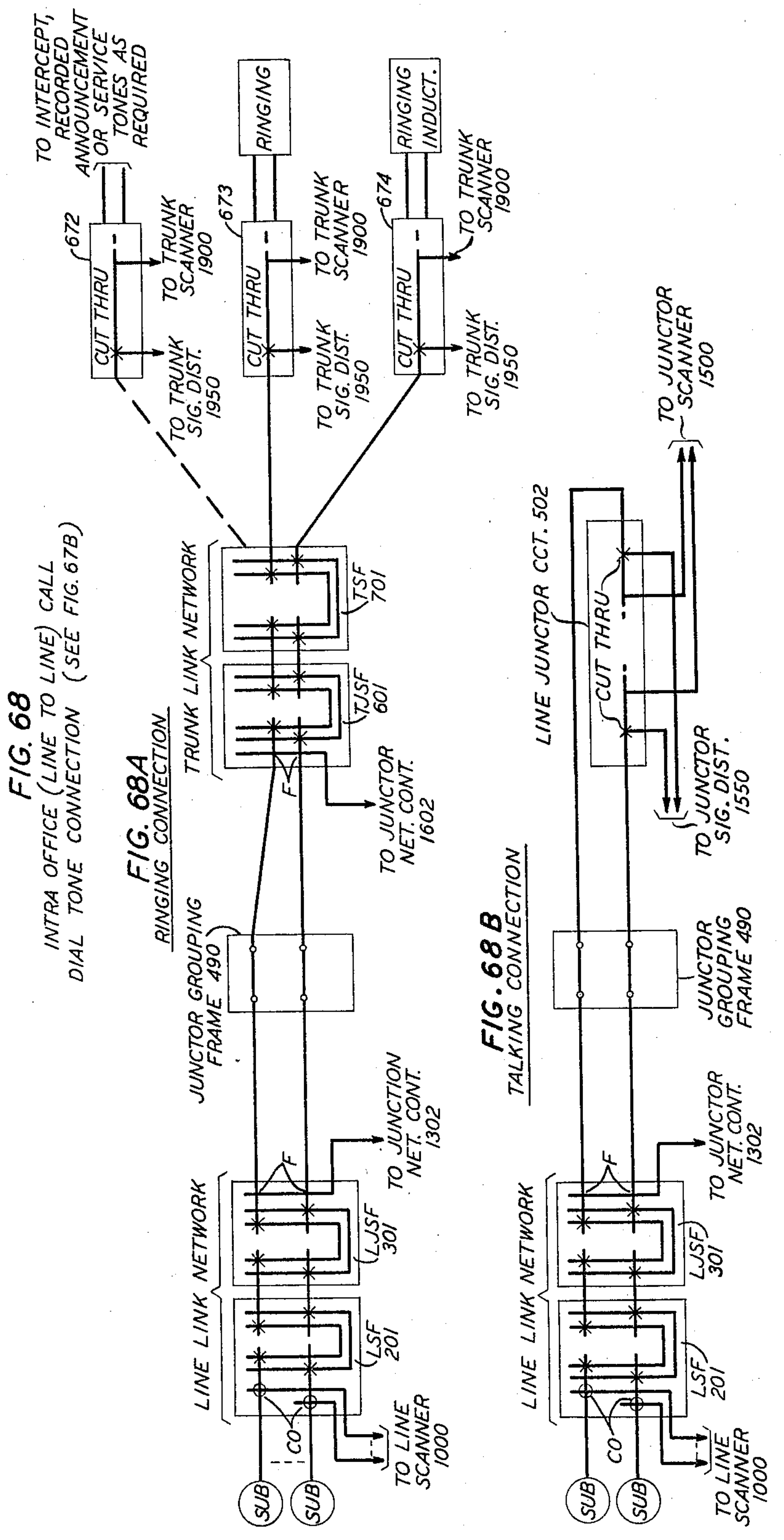
Figures 69, 69A, 69B:
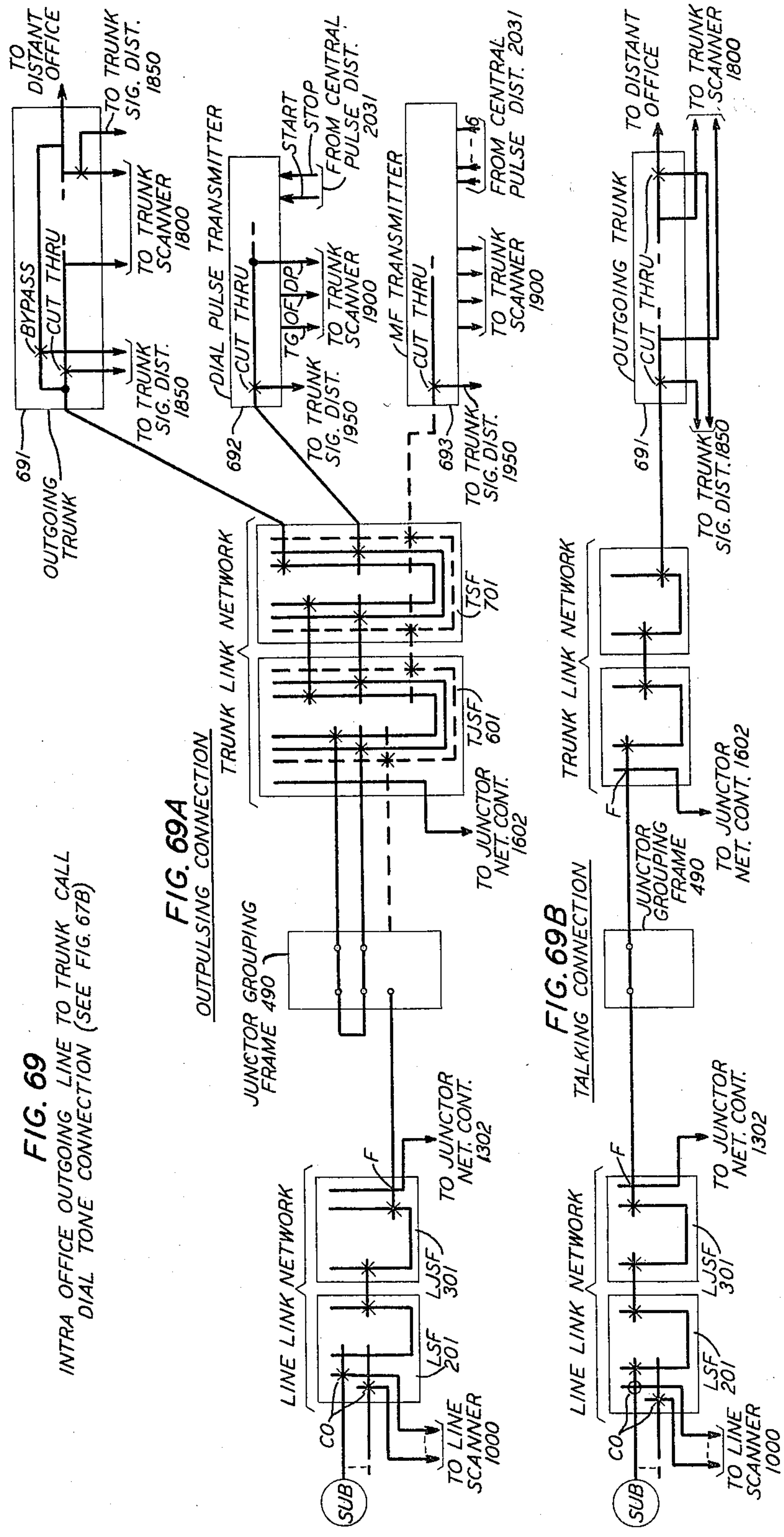
Figures 70, 70A, 70B:
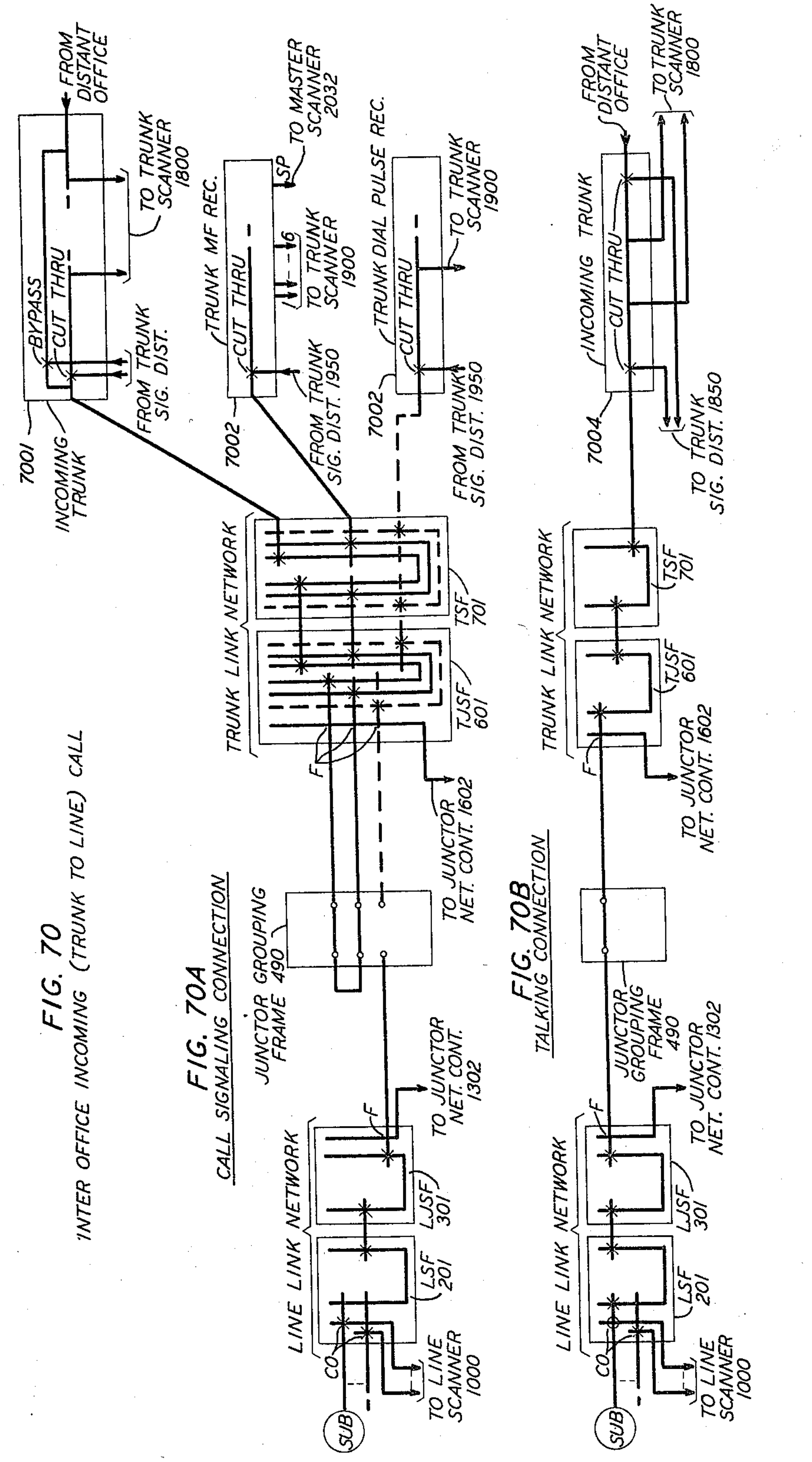
Figure 71:
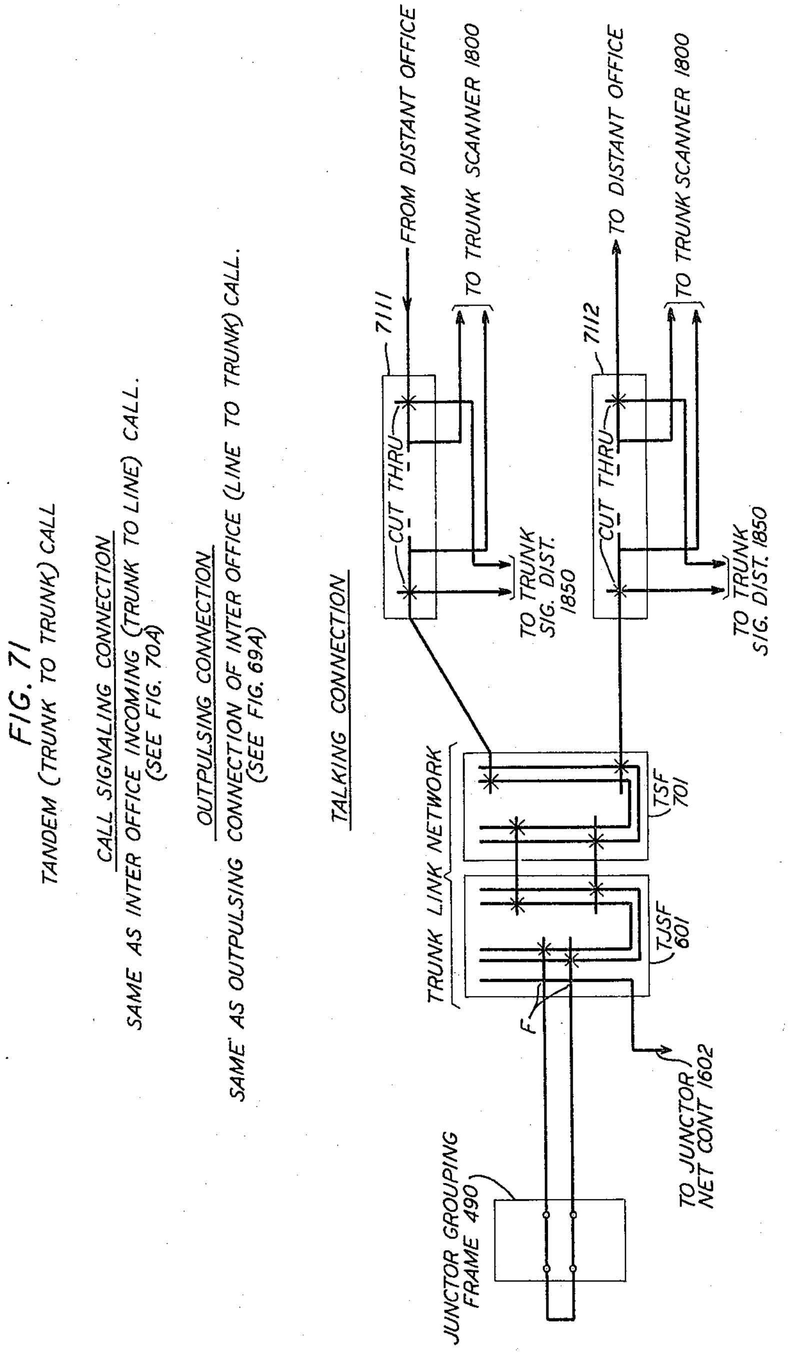
Figures 72, 72A, 72B:
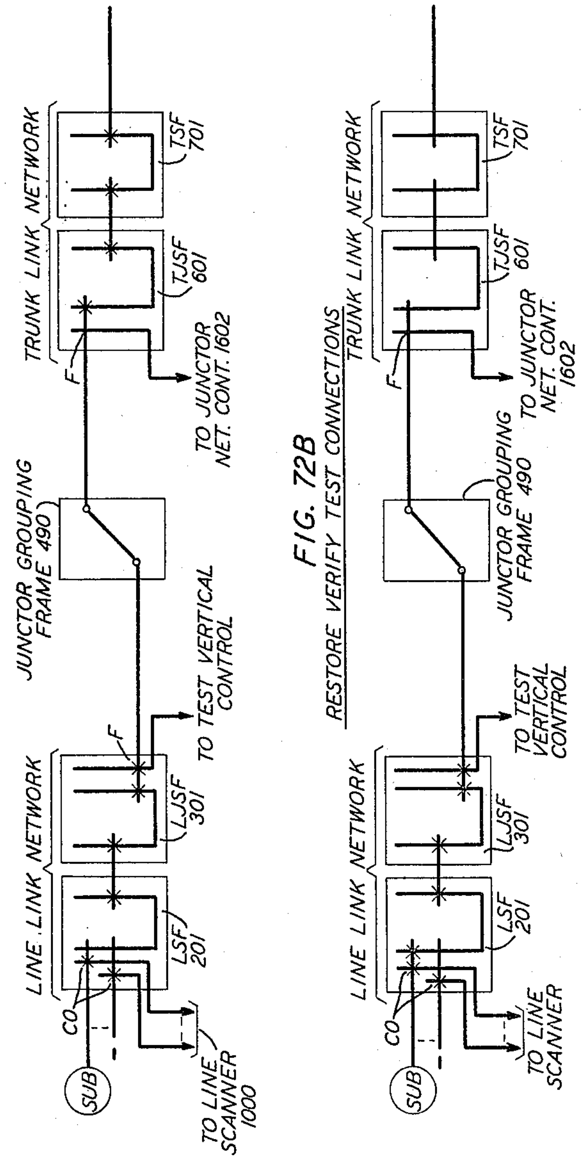

Four basic types of traffic must be handled by a switching system. FIGS. 67 through 72 illustrate these four types of traffic. FIG. 68 illustrates intraoffice traffic, i.e., the establishment of line-to-line connections. FIG. 69 illustrates interoffice outgoing traffic, i.e., the establishment of line-to-trunk call connections. FIG. 70 illustrates interoffice incoming traffic, i.e., the establishment of trunk-to-line call connections. FIG. 71 illustrates tandem traffic, i.e., the establishment of trunk-to-trunk call connections. FIG. 72 illustrates certain test operations. It is to be understood that FIGS. 67 through 72 are functional in form and are not intended to represent circuit details of any of the indicated system components. The trunk and service circuits shown in FIGS. 67 and 71 are understood to appear on miscellaneous or universal trunk frames 801, 901 as appropriate.

All complete call connections, as illustrated in FIGS. 67–72, established by the illustrative switching system are comprised of four, discretely established, partial call connections, each extending through two switching stages. Certain test call connections, as illustrated in FIG. 72, may comprise a lesser number of partial test call connections, certain of which may extend through only a single switching stage. The following are brief functional descriptions of certain of the call processing operations performed by the illustrative switching system.

In FIGS. 67 through 72 the contacts of cut-off relays CO are represented by a circle when in an open condition and by a cross when in a closed condition. The cross-point device contacts and the test-vertical contacts are represented as being closed by a cross and as being open by the absence of any symbol. Relay contacts in the various trunk and service circuits are also represented by a cross, but are not necessarily closed when the call connection is established.

*Intraoffice Traffic, FIGS. 67 and 68*

The ultimate desired call connection for an intraoffice call extends from a calling line terminal, such as 213, to a called line terminal, such as 214. However, this final complete call connection is preceded by certain preliminary system operations as indicated hereinbelow.

DIAL-TONE CONNECTION, FIG. 67B

Figure 67A:
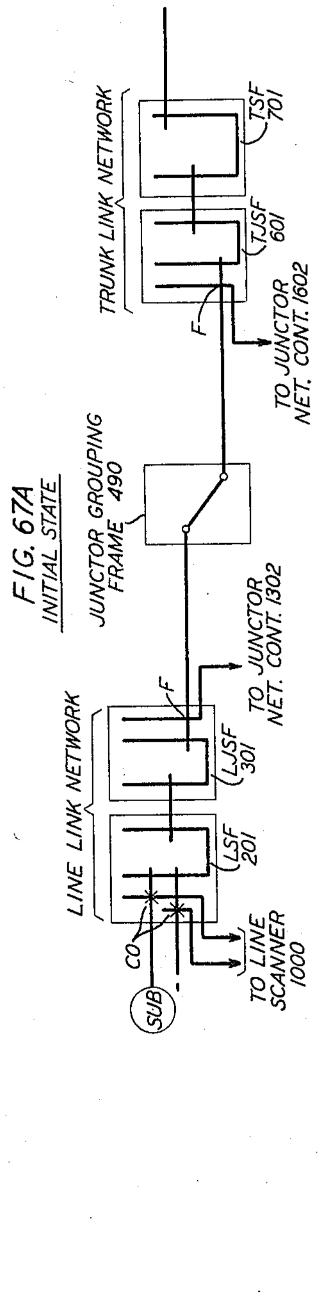

The initial or idle state of a calling line is shown in FIG. 67A. Upon the detection of a service request from a calling line 213 by the Line Scanner 1000, Central Processor 2030 selects an appropriate idle subscriber receiver 671 by consulting its memory, and commands the establishment of a dial-tone connection between the calling line 213 and the selected subscriber receiver 671. This dial-tone connection is illustrated in FIG. 67B.

The dial-tone connection comprises four partial call connections which are respectively established by a Line Switch Frame 201, a Line Junctor Switch Frame 301, a Trunk Junctor Switch Frame 601 and a Trunk Switch Frame 701 in response to discrete connect commands transmitted thereto by the Central Processor 2030. The sequence in which these partial call connections are established and the sequence in which the connect commands are transmitted by the Central Processor 2030 are not critical.

As a result of the connect command to Line Switch Frame 201, the appropriate cut-off contacts CO connecting the calling line terminal 213 to the Line Scanner 1000 are opened, and the Line Scanner 1000 is thereby disconnected from the line terminal 213. Supervision of the calling line 213 is transferred to the subscriber receiver circuit 671 following an appropriate command to Trunk Signal Distributor 1950 which initiates the final cut-through of the dial-tone connection within the receiver circuit 671.

Appropriate commands are then generated and transmitted by the Central Processor 2030 to the Trunk Signal Distributor 1950 which initiates the performance of certain tests by the subscriber receiver circuit 671, the connection of dial tone to the dial-tone connection and the subsequent removal of dial tone from the dial-tone connection following the initial receipt of call information signals by the subscriber receiver circuit 671. Appropriate commands are periodically generated and transmitted by the Central Processor 2030 to the Master Scanner 2032 causing it to monitor certain of these test results and certain of the call information signals generated by the subscriber. Appropriate commands are periodically generated and transmitted by the Central Processor 2030 to the Trunk Scanner 1900 to monitor others of the call information signals generated by the subscriber at the calling line 213 and to detect a possible abandoned call. The sequence in which the above commands are generated and transmitted to the Trunk Signal Distributor 1950, the Trunk Scanner 1900 and the Master Scanner 2032 is determined by the Central Processor 2030 in accordance with its program and memory and the supervisory information it receives from the Scanners 1900 and 2032.

The Central Processor 2030 then determines the identity of the called line terminal, for example 214 on FIG. 68, from the call information received by monitoring the call information signals from the calling line 213.

RINGING CONNECTIONS, FIG. 68A

Upon determining the identity of the called line 214, the Central Processor 2030 commands the establishment of two complete call connections, one to supply ringing current to the called line 214 and the other to supply ringing tone to the calling line 213. The ringing-current connection comprises four partial call connections which are respectively established by a Line Switch Frame 201, a Line Junctor Switch Frame 301, a Trunk Junctor Switch Frame 601 and a Trunk Switch Frame 701 in response to discrete connect commands transmitted thereto from the Central Processor 2030. Appropriate commands are generated and transmitted by the Central Processor 2030 to the Trunk Signal Distributor 1950 initiating the final cut-through of the ringing-current connection and the application and removal of ringing current from the ringing-current connection. Central processor commands are periodically transmitted to the Trunk scanner 1900 to monitor the ringing-current connection for an answer by the called line 214.

The ringing-tone connection comprises four partial call connections which are respectively established by a Line Switching Frame 201, a Line Junctor Switch Frame 301, a Trunk Junctor Switch Frame 601 and a Trunk Switch Frame 701 in response to discrete connect commands from the Central Processor 2030. Portions of the above-described dial-tone connection may be reused in the ringing-tone connection thereby eliminating any requirement of transmitting connect commands to those Switch Frames in which partial call connections are reused. Central processor commands are transmitted to the Trunk Signal Distributor 1950 initiating the final cut-through of the ringing-tone connection and initiating application and removal of ringing tone from the ringing-tone connection. Central processor commands are periodically transmitted to the Trunk Scanner 1900 to monitor the ringing-tone connection for a possible hang-up by the calling line 213. The sequence in which these supervisory control and monitoring commands are generated and transmitted by the Central Processor 2030 is determined by the Central Processor in accordance with its program and memory and the information received from the Trunk Scanner 1900.

In the event that the called line 214 is busy, or if the call information signals received from the calling line 213 indicate a vacant code or some other required special service, a single complete call connection from the calling line 213 is established to the appropriate service circuit as represented by service circuit 672.

INTRAOFFICE TALKING-CONNECTION, FIG. 68B

The final connection established for an intraoffice call is the talking connection. It comprises four partial call connections which are respectively established by a Line Switch Frame 201 (or two Line Switch Frames) and a Line Junctor Switch Frame 301 (or two Line Junctor Switch Frames) responsive to discrete connect commands transmitted thereto by the Central Processor 2030. The intraoffice talking connection further includes a line junctor circuit 502 through which supervisory monitoring and control is accomplished. Portions of the ringing-tone connection and the ringing-current connection may be reused in the talking connection. Connect orders are transmitted by the Central Processor 2030 only to those Line Switch Frames and Line Junctor Switch Frames in which new partial call connections must be established to complete the talking connection. Appropriate central processor commands are generated and transmitted to the Junctor Signal Distributor 1550 to effect the final cut-through of the talking connection within the line junctor circuit 502 and the initial release thereof after hang-up by either party. Central processor commands are periodically transmitted to the Junctor Scanner 1500 to monitor the supervisory states of the calling and the called lines 213, 214 and thereby detect a hang-up by either party.

DISCONNECT

When the call has been completed, hang-up by either the called or the calling line 213, 214 is detected by the Junctor Scanner 1500. Responsive to this information received via the Junctor Scanner 1500, Central Processor 2030 generates and transmits restore-cutoff commands to the appropriate Line Switch Frame 201 (or frames as appropriate) on which the called and the calling lines 213, 214 terminate. As a result of the restore-cutoff commands, the cut-off contacts CO associated with the called and calling lines 213, 214 are closed and the first stage cross-point contacts of the talking connection are opened, thus returning lines 213 and 214 to the initial state as shown in FIG. 67A.

*Interoffice outgoing traffic, FIG. 69*

The procedure for establishing an interoffice outgoing call connection is illustrated in FIG. 69. The desired final connection extends from a calling line 213 through an outgoing trunk circuit 691 and via an interoffice trunk to a called line in a distant office. However, certain preliminary connections must be established and certain preliminary system operations must be performed prior to the establishment of the outgoing talking connection of FIG. 69B.

DIAL-TONE CONNECTION, FIG. 67B

The detection of a service resuest from calling line 213 by Line Scanner 1000 and the subsequent establishment of a dial-tone connection from the called line 213 to an appropriate subscriber receiver circuit is accomplished as previously described with reference to FIG. 67B.

OUT-PULSING CONNECTION, FIG. 69A

After the first several call information signals have been received by a subscriber receiver circuit, Central Processor 2030 determines from the signals the call destination and the type of trunk which is suitable to reach the determined destination. A suitable idle outgoing trunk circuit, such as 691, and an appropriate transmitter circuit, such as dial-pulse transmitter circuit 692, are selected by Central Processor 2030. An out-pulsing connection is then established in accordance with central processor commands, which connection is utilized to transmit call information signals from the transmitter circuit 692 to the distant office.

The out-pulsing connection comprises four partial call connections which are respectively established by a Trunk Switch Frame 701 (or Frames as appropriate) and a Trunk Junctor Switch Frame 601 (or Frames as appropriate) in response to discrete connect commands transmitted thereto by Central Processor 2030. A restore-cut-off command is transmitted to the Line Switch Frame 201 initiating the closure of cut-off contacts CO to facilitate the supervision of calling line 213 by Line Scanner 1000 during outpulsing.

Appropriate central processor commands are transmitted to Trunk Signal Distributor 1850 initiating the closure of bypass contacts within outgoing trunk circuit 691 to provide a clean transmission path for out-pulsing, and subsequently initiating the release of the bypass contacts upon the completion of out-pulsing. Appropriate central processor commands are tranmsitted to the Trunk Signal Distributor 1950 initiating the final cut-through of the out-pulsing connection within transmitter circuit 692. Responsive to further central processor commands to the Trunk Signal Distributor 1950, several tests are performed via the out-pulsing connection on the interoffice trunk to the distant office by the transmitter circuit 692. The rerults of these tests are monitored by Trunk Scanner 1900 in response to appropriate central processor commands periodically directed thereto. When the tests are satisfactorily completed, out-pulsing from transmitter circuit 692 is initiated under control of the Central Pulse Distributor 2031.

Since the out-pulsing connection is completely separate from the dial-tone connection, out-pulsing of call information to the distant office via the out-pulsing connection may commence before all call information signals are received by the subscriber receiver circuit 671 via the dial-tone connection. In such a situation the aforementioned restore-cut-off command to Line Switch Frame 201 will be delayed until all call information signals have been received.

Supervision of the out-pulsing connection is maintained by Trunk Scanner 1900 via the transmitter circuit 692 as periodically commanded by Central Processor 2030 until such time as an indication is received from the distant office that all call information signals have been received. At this time a central processor command to Trunk Signal Distributor 1950 initiates the release of the out-pulsing connection by opening the cut-through contacts in the transmitter circuit 692.

As indicated in FIG. 69A a similar out-pulsing connection to that described above can be established between MF transmitter 693 and outgoing trunk circuit 691. This out-pulsing connection is shown in dotted lines. This type of connection is required when the distant office requires that call information be transmitted in multifrequency code. The control and supervision of an MF out-pulsing connection is similar to that described above for the dial pulse out-pulsing connection.

OUTGOING TALKING CONNECTION, FIG. 69B

Upon the receipt of an indication that all call information signals have been received by the distant office, a complete call connection is established between the calling line 213 and the outgoing trunk circuit 691. This talking connection comprises four partial call connections which are respectively established by a Line Switch Frame 201, a Line Junctor Switch Frame 301, a Trunk Junctor Swich Frame 601 and a Trunk Switch Frame 701 in response to discrete connect commands transmitted thereto from Central Processor 2030. The connect command to Line Switch Frame 201 initiates the release of the cut-off contacts CO associated with calling line terminal 213.

Appropriate central processor commands are then transmitted to Trunk Signal Distributor 1850 initiating the release of the bypass contacts and the closure of cut-through contacts within outgoing trunk circuit 691. Central processor commands are transmitted to Trunk Scanner 1800 at predetermined intervals initiating supervisory monitoring of the talking connection for a hang-up by the called line or the calling line 213.

DISCONNECT

When the call is completed, Trunk Scanner 1800 detects a change in supervisory state of the calling line 213 or the outgoing trunk circuit 691. In response to this detection, Central Processor 2030 transmits a command to Trunk Signal Distributor 1850 initiating the release of cut-through contacts in outgoing trunk circuit 691. Central Processor 2030 then transmits a restore-cut-off command to Line Switch Frame 201 initiating the operation of the appropriate cut-off contacts CO and the release of the first stage cross-point contacts.

*Interoffice incoming traffic, FIG. 70*

The final desired call connection for an incoming call extends from an incoming trunk circuit 7001 via which a service request is received, to a called line terminal such as 214. However, certain preliminary operations must be performed prior to the establishment of this call connection.

CALL-SIGNALING CONNECTION, FIG. 70A

A service request from an incoming trunk circuit, such as 7001, is detected by the Trunk Scanner 1800 in response to periodic central processor commands. Central Processor 2030 then selects a suitable idle receiver circuit, such as 7002, which will receive the call information signals transmitted from the distant office. A call-signaling connection is established from the incoming trunk circuit 7001 to the selected receiver circuit 7002. This connection comprises four partial call connections which are respectively established by a Trunk Switch Frame 701 (or two Trunk Switch Frames) and a Trunk Junctor Switch Frame 601 (or two Trunk Junctor Switch Frames) in response to discrete central processor commands transmitted thereto. A central processor command is then transmitted to Trunk Signal Distributor 1850 initiating the closure of bypass contacts within incoming trunk circuit 7001. Central processor commands are transmitted to Trunk Signal Distributor 1950 initiating the closure of cut-through contacts in receiver circuit 7002. A suitable signal is returned from receiver circuit 7002 via the call-signaling connection and incoming trunk circuit 7001 to to the distant office indicating that a receiver circuit 7002 is connected to the trunk circuit 7001 and out-pulsing may commence. Periodic central processor commands are transmitted to the Master Scanner 2032 to detect the presence of an initial signal from the distant office. Upon detection by the Master Scanner 2032 of such a signal, central processor commands are periodically transmitted to Trunk Scanner 1900 to monitor the subsequent call information signals from the distant office.

The call information signals detected by Trunk Scanner 1900 are processed by central processor 2030 which thereby determines the identity of the called line 214. When all digits of the call information have been received, a central processor command is transmitted to Trunk Signal Distributor 1950 initiating the release of the cut-through contacts in receiver circuit 7002.

If the distant office is equipped to transmit only dial pulses, a call signaling connection may be established as shown by the dotted lines on FIG. 70A between the incoming trunk circuit 7001 and the trunk dial pulse receiver 7003. Supervisory control of this connection is similar to that described above for the multifrequency call signaling connection.

RINGING CONNECTIONS (NOT SHOWN)

Upon determining the identity of the called line 214, a ringing-current connection is established from a selected ringing current-source to the called line 214, and a ringing-tone connection is established from a source of ringing tone through incoming trunk circuit 7001 to the calling line at the distant office. The ringing-current connection is identical to that previously described with reference to FIG. 68A. The ringing-tone connection is similar to the above-described call-signaling connection of FIG. 70A with the exception that a ringing tone source is substituted for the receiver circuit 7002.

TALKING CONNECTION, FIG. 70B

When the Trunk Scanner 1800 detects an off-hook or answer condition at the called line 214 via the ringing-current connection, the ringing-current and ringing-tone connections are released and a talking connection is established from the called line 214 through the incoming trunk circuit 7001 to the distant office. This talking connection comprises four partial call connections which are respectively established by a Line Switch Frame 201, a Line Junctor Switch Frame 301, a Trunk Junctor Switch Frame 601 and a Trunk Switch Frame 701 in response to discrete connect commands transmitted thereto by Central Processor 2030. Appropriate central processor commands are then transmitted to Trunk Signal Distributor 1850 initiating the closure of cut-through contacts within incoming trunk circuit 7001. Periodic central processor commands are transmitted to Trunk Scanner 1800 initiating supervisory monitoring of the talking connection so that a hang-up by either the called line 214 or the calling line at the distant office may be detected.

DISCONNECT

Upon detection of a hank-up condition by Trunk Scanner 1800, central processor commands are transmitted to Trunk Signal Distributor 1850 initiating the release of the cut-through contacts in incoming trunk circuit 7001. A restore-cut-off command is transmitted to Line Switch Frame 201 initiating the release of the first stage cross-point contacts and the closure of the cut-off contacts CO associated with the called line 214.

*Tandem traffic, FIG. 71*

A tandem call is one which does not terminate within the local switching center but is switched through the local switching center. The final call connection for a tandem call is therefore one which extends from an incoming or tandem trunk, such as 7101, to an outgoing or tandem trunk, such as 7102. As indicated in FIG. 70, the call-signaling connection and the out-pulsing connection which precede the establishment of the tandem call connection of FIG. 71 are identical to those previously described with reference to FIG. 70A and FIG. 69A, respectively.

TALKING CONNECTION, FIG. 71

Upon determining the routing of the call from the call information signals received via the above-described call-signaling connection, Central Processor 2030 commands the establishment of an out-pulsing connection to selected outgoing trunk circuit 7102 similar to that shown in FIG. 69A. Upon the completion of out-pulsing, Central Processor 2030 commands the establishment of a talking connection as shown in FIG. 71. This talking connection comprises four partial call connections and is similar to the aforedescribed call-signaling connection shown in FIG. 70A with the exception that an outgoing trunk circuit 7102 is substituted for the receiver circuit 7002. Central processor commands are then transmitted to Trunk Signal Distributor 1850 initiating the closure of cut-through contacts within trunk circuits 7101 and 7102. Periodic central processor commands are transmitted to Trunk Scanner 1800 initiating supervisory monitoring of the talking connection so that supervisory signals from the distant offices may be detected.

DISCONNECT

When appropriate supervisory signals from either of the distant offices are detected by Trunk Scanner 1800, central processor commands are transmitted to Trunk Signal Distributor 1850 initiating the release of the cut-through contacts within trunk circuits 7101 and 7102.

*Test connections*

As previously mentioned, various combinations of available switching functions may be used to establish connections through the switching network whereby tests may be made of the network itself or of other circuit elements associated with network terminals. Two such test connections are illustrated in FIG. 72.

FALSE-CROSS-AND-GROUND TEST, FIG. 72A

A false-cross-and-ground test (FCG test) may be commanded by the Central Processor 2030 at any time during the processing of traffic. During periods of normal traffic load the establishment of any of the above-described call connections may be preceded by an FCG test of the contemplated call connection. However, during periods of heavy traffic this test may be canceled to save time.

FIG. 72A illustrtaes an FCG test connection which extends through the entire network. FCG test connections, however, may be established and tests performed on any portion of the network. This connection comprises from one to four partial call connections, of which at least one partial call connection is established through either a Line Junctor Switch Frame 301 or a Trunk Junctor Switch Frame 601. The test connection further includes test-vertical contacts F, via which the test is performed by the appropriate Junctor Network Control Unit. If the test connection is extended through a Line Switch Frame 201, the first stage cross-point contact is opened to avoid interference with the supervision by Line Scanner 1000 of the various line terminals, such as 213.

An FCG test, as illustrated in FIG. 72A, is initiated by central processor commands as follows:

Connect command transmitted to Trunk Switch Frame 701; connect command transmitted to Trunk Junctor Switch Frame 601; FCG command to Line Switch Frame 201; and connect-with-FCG command transmitted to Line Junctor Switch Frame 301. The sequence in which these commands are transmitted is critical only in that the connect-with-FCG command to the Line Junctor Switch Frame 301 from which the test is to be performed is transmitted at essentially the same time or later than the other commands.

Following the establishment of the FCG test connection, central processor commands are transmitted to the Master Scanner 2032 initiating the monitoring of the particular diagnostic cable conductors associated with Line Junctor Switch Frame 301. The result of the FCG test is reflected via these conductors and thus made available to the Central Processor 2030.

When call connections are preceded by FCG test connections, portions of the test connection may be reused for the final call connections. For example, following an FCG test it is usually necessary only to transmit a remove-FCG command to the appropriate Junctor Switch Frame and a connect command to the Line Switch Frame 201, since the remaining partial call connections of the desired complete call connection are already established.

Although the FCG test connection illustrated in FIG. 72A provides for the performance of the FCG test by a Line Junctor Network Control Unit, the Trunk Junctor Switch Frame 601 also includes test-vertical contacts F through which FCG tests may be performed. Thus, where a contemplated call connection does not include partial call connections established by either a Line Switch Frame or a Line Junctor Switch Frame, FCG tests may be performed on the contemplated call connection from the Trunk Junctor Switch Frame 601.

RESTORE-CUT-OFF-VERIFICATION TEST, FIG. 72B

The purpose of the restore-cut-off-verification test is to check the closure of the cut-off contacts CO via which Line Scanner 1000 supervises a line terminal following a connect-with-cut-off closed command to the Line Switch Frame 201. For example, in the above-described intra-office talking connection of FIG. 68B, the cut-off contacts CO associated with line terminals 213 and 214 may be closed in response to connect-with-cut-off-closed commands transmitted to Line Switch Frame 201 following hang-up by either party. A restore-cut-off-verification test is then performed on both line terminals 213 and 214.

The restore-cut-off-verification test connection comprises two partial call connections respectively established by a Line Junctor Switch Frame 301 and a Line Switch Frame 201. The connect-with-cut-off-closed command transmitted to Line Switch Frame 201 initiated the closure of first and second stage cross-point contacts and the closure of cut-off contacts CO associated with line terminal 213. A restore-verify command is then transmitted to Line Junctor Switch Frame 301, initiating the establishment of a partial test connection similar to the above-described FCG test connection. Responsive to a subsequent FCG pulse transmitted by central processor 2030, a simulated off-hook indication is applied to the test connection by the Junctor Network Control Unit of Line Junctor Switch Frame 301. A command is then transmitted to Line Scanner 1000 initiating the monitoring of line terminal 213. If the cut-off contacts CO associated with line terminal 213 have been closed, the simulated off-hook indication is detected by Line Scanner 1000. If so detected, an FCG command is transmitted by Central Processor 2030 to Line Switch Frame 201 and a remove-FCG command is transmitted to Line Junctor Switch Frame 301.

It is to be understood that the above-described arrangements are merely illustrative of an application of the principles of our invention. Numerous other arrangements may be devised by those skilled in the art without departing from the spirit and scope of our invention.

What is claimed is:

1. A communications switching system comprising a plurality of types of autonomous system units, each type for performing a different switching and supervisory system function;

a central control arrangement for determining and generating system commands at a first maximum cyclic rate;

a plurality of control means each responsive to said system commands for selectively controlling a discrete one of said system units at a second maximum cyclic rate;

a first command transmission bus arrangement connecting said central control arrangement with all said control means for transmitting each said system command transmitted thereon from said central control arrangement to all said control means;

a second command transmission bus arrangement connecting said central control arrangement with all said control means for transmitting each said system command transmitted thereon from said central control arrangement to all said control means;

central signaling means for selectively generating enable signals discretely defining each of said control means and further discretely defining each of said command transmission bus arrangements;

a plurality of signal transmission means each discretely connecting said central signaling means with one of said control means;

said central signaling means controllable by said central control arrangement to generate an enable signal defining a selected control means and a selected command transmission bus arrangement, said enable signal in time association with a particular system command transmitted from said central control arrangement via said selected command transmission bus arrangement;

enable circuit means in each of said control means connected to said discrete signal transmission means; and said enable circuit means of said selected control means responsive to said enable signal to initiate acceptance of said particular system command from said selected command transmission bus arrangement by said selected control means.

2. A communications switching system in accordance with claim 1 wherein said plurality of control means is divided into a lesser plurality of discrete modular groups of control means;

and further comprising a plurality of first bus receiver means, each transformer coupling all of said control means of a discrete one of said control means groups to said first command transmission bus arrangement; and a plurality of second bus receiver means, each transformer coupling all of said control means of a discrete one of said control means groups to said second command transmission bus arrangement.

3. A communications switching system in accordance with claim 1 wherein each of said control means comprises command executing means, and controllable bus selection means for connecting a selected command transmission bus arrangement to said command executing means; and said bus selection means of said selected control means is selectively controllable by said enable circuit means of said selected control means to selectively connect said selected command transmission bus arrangement to said command executing means of said selected control means.

4. A communications switching system comprising a plurality of groups of system units, each group for performing a different switching and supervisory system function;

a central control arrangement for determining and generating system commands;

a plurality of control means each responsive to said system commands for selectively controlling a discrete one of said system units;

a command transmission bus system connecting said central control arrangement with all said control means;

central signaling means for generating enable signals;

a multiconductor cable having a conductor pair discrete to each of said control means for connecting each of said control means to said central signaling means;

said central signaling means controllable by said central control arrangement selectively to transmit one of said enable signals to a selected control means via said discrete conductor pair, said one enable signal in time association with a particular system command transmitted from said central control arrangement via said command transmission bus system;

first signaling means in each of said control means responsive to said enable signals for generating a command-accept signal;

second signaling means in each of said control means responsive to said command-accept signal for generating a verify signal;

enable signal transmission means in each of said control means connecting said first signaling means to said discrete conductor pair;

verify signal transmission means in each of said control means connecting said second signaling means to said discrete conductor pair; and said verify signal transmission means including signal isolation means for isolating said enable signal transmission means from said verify signal.

5. A communications switching system comprising a multistage switching network including a plurality of switching modules;

each said switching module comprising a pair of switching units, a pair of control units for controlling said pair of switching units, one of said control units normally controlling only one of said switching units, the other of said control units normally controlling only the other of said switching units, and means for selectively causing said one of said control units to control both of said switching units and for causing said other of said control unit to control both of said switching units.

6. A communications switching system in accordance with claim 5 wherein said switching network includes a plurality of pairs of switching stages; and each of said pairs of switching stages comprises a plurality of said pairs of switching units.

7. A communications switching system comprising a multistage switching network including a plurality of switching modules;

each said switching module comprising a pair of switching units each having a plurality of differentially wound ferreed switch devices arranged in a plurality of switching grids, a pair of control units for controlling said pair of switching units, one of said control units normally controlling said switch devices of only one of said switching units to selectively establish transmission paths through said switching grids of said one of said switching units, and means for selectively causing said one of said control units of a switch module to control said switch devices of both of said switching units of said switching module to selectively establish transmission paths through said switching grids of said pair of switching units in said switching module.

8. A communications switching system comprising a central control circuit for determining and generating a plurality of types of system commands;

a multistage switching network including a plurality of pairs of switching units;

pairs of control units uniquely associated with each of said pairs of switching units;

one control unit of each of said pairs of control units normally responsive to a first type of said system commands for controlling only one switching unit of said uniquely associated pair of switching units;

the other control unit of each of said pairs of control units normally responsive to said first type of said system commands for controlling only the other switching unit of said uniquely associated pair of switching units;

said one control unit including first quarantine means responsive to a second type of said system commands for placing said other control unit in a quarantine mode of operation wherein said other control unit is precluded from controlling said other switching unit; and said other control unit including second quarantine means responsive to said second type of said system commands for placing said one control unit in said quarantine mode of operation wherein said one control unit is precluded from controlling said one switching unit.

9. A communications switching system in accordance with claim 8 wherein said one control unit further includes first switching unit simulation means;

said one control unit is responsive to said first type of said system commands when said one control unit is in said quarantine mode of operation to simulate control of a switching unit by way of said first switching unit simulation means;

said other control unit further includes second switching unit simulation means; and said other control unit is responsive to said first type of said system commands when said other control unit is in said quarantine mode of operation to simulate control of a switching unit by way of said second switching unit simulation means.

10. A communications switching system in accordance with claim 8 wherein said one control unit further includes first selecting means controlled by said second quarantine means and selectively responsive to said first type of said system commands for causing said one control unit selectively to control both said one and said other switching units; and said other control unit further includes second selecting means controlled by said first quarantine means and selectively responsive to said first type of said system commands for causing said other control unit selectively to control both said one and said other switching units.

11. A communications switching system in accordance with claim 8 wherein said one control unit further includes means responsive to a third type of said system commands for disabling said first quarantine means; and said other control unit further includes means responsive to said third type of said system commands for disabling said second quarantine means.

12. A communications switching system in accordance with claim 8 wherein said one control unit further includes means controlled by said second quarantine means for preventing said response to said second type of said system commands by said first quarantine means when said one control unit is in said quarantined mode of operation; and said other control unit further includes means controlled by said first quarantine means for preventing said response to said second type of said system commands by said second quarantine means when said other control unit is in said quarantined mode of operation.

13. A communications switching system comprising a central control circuit for determining and generating system commands;

a multistage switching network including a plurality of switching modules;

each said switching module comprising a pair of switching units, a pair of control units for controlling said pair of switching units selectively to establish communications paths therethrough;

said system commands including data indicating in which switching unit of one of said switching modules said system commands are to be executed;

each of said control units comprising buffer means for registering a system command, command execution control means for controlling the execution of a registered system command in a switching unit, and controllable connecting means controlled in accordance with said data of a registered system command for selectively connecting said command execution control means to said switching units of said switching module.

14. A communications switching system comprising a multistage switching network including a plurality of switching units;

a central monitoring means;

a plurality of control units each for controlling a discrete one of said switching units;

a plurality of first transmission means each connecting one of said control units to said central monitoring means;

second transmission means for connecting a selected one of said control units to said central monitoring means;

each of said control units comprising a plurality of circuit elements, first indicating means for indicating the present state of certain of said circuit elements, second indicating means for indicating the present state of others of said circuit elements, first controllable connecting means for connecting said first indicating means to said first transmission means, and second controllable connecting means for connecting said second indicating means to said second transmission means; and means for selectively controlling said first and second controllable connecting means.

15. A communications switching system comprising a central control arrangement for determining and generating various types of system commands;

a multistage switching network including a plurality of switching units;

a central monitoring means;

a plurality of control units each responsive to a first type of said system commands for controlling a discrete one of said switching units;

a plurality of first transmission means each connecting one of said control units to said central monitoring means;

second transmission means for connecting a selected one of said control units to said central monitoring means; and each of said control units comprising a plurality of circuit elements, first indicating means for indicating the present state of certain of said circuit elements, second indicating means for indicating the present state of others of said circuit elements, first controllable connecting means for normally connecting said first indicating means to said first transmission means, second controllable connecting means for connecting said first and second indicating means to said second transmission means, and means responsive to a second type of said system commands for controlling said second controllable connecting means to connect said first and second indicating means to said second transmission means and for controlling said first controllable connecting means to disconnect said first indicating means from said first transmission means.

16. A communications switching system in accordance with claim 15 wherein
each of said control units further comprises
means responsive to a third type of said system commands for controlling said first controllable connecting means to connect said first indicating means to said first transmission means and for controlling said second controllable connecting means to disconnect said first and second indicating means from said second transmission means.

17. A communications switching system comprising
a central control circuit for determining and generating system commands;
a multistage switching network including a plurality of switching modules, certain of which having lines terminated as inputs thereto;
each said certain switching module comprising a pair of switching units, a pair of control units and scanner means;
one control unit of said certain switching module normally responsive to said system commands for controlling only one switching unit of said certain switching module;
the other control unit of said certain switching module normally responsive to said system commands for controlling only the other switching unit of said certain switching module; and
said scanner means of said certain switching module responsive to said system commands for scanning the lines terminated as inputs to said certain switching module.

18. A communications switching system comprising:
a multistage switching network including a plurality of switching modules, certain of which having lines terminated as inputs thereto;
each said certain switching module comprising:
a pair of switching units on which said lines are terminated,
a pair of control units for controlling said switching units,
scanner means for monitoring the lines terminated as inputs to said switching units,
and control means for seletively causing each control unit of said certain switching module to control said pair of switching units of said certain switching module and for selectively causing said scanner means of said certain switching module to scan selectively the lines terminated as inputs to said certain switching module.

19. A communications switching system in accordance with claim 18 wherein each of said switching units of said certain switching module comprises:
a plurality of differentially wound ferreed switch devices arranged in a plurality of switching grids;
and said control units control said switch devices of said switching units selectievly to establish transmission paths through said switching grids.

20. A communications switching system in accordance with claim 18 wherein each of said scanner means of said certain switching module comprises:
monitoring means for monitoring the supervisory states of the lines terminated as inputs to said certain switching module;
a pair of scanner control units for interrogating selectively said monitoring means;
and said control means enabling selectively said scanner control units and said network control units.

21. A communications switching system comprising:
a central control circuit for determining and generating switching commands;
a switching network having a plurality of output circuits divided into a lesser plurality of output circuit groups;
a plurality of supervisory modules each comprising:
one of said output circuit groups,
translator means for selectively transmitting control signals to said one output circuit group,
a pair of translator control units for generating said control signals and for selectively enabling control signal transmission paths through said translator means,
one of said translator control units normally responsive to said system commands for selectively enabling control signal transmission paths through only one portion of said translator means,
the other translator control unit normally responsive to said system commands for selectively enabling control signal transmission paths through only the other portion of said translator means,
and means responsive to said system commands for selectively causing each of said translator control units selectively to enable control signal transmission paths through any portion of said translator means.

22. A communications switching system in accordance with claim 21 wherein each said supervisory module further comprises:
monitoring means for monitoring the supervisory states of certain elements of said output circuits of said output circuit group,
a pair of scanner control units responsive to said system commands to interrogate selectively said monitoring means,
and means for enabling selectively said scanner control units and said translator control units to respond to said system commands.

23. A communications switching system comprising
a multistage switching network comprising a plurality of pairs of switching units;
each of said switching units comprising
differentially wound ferreed switch devices controllable by switch control signals, and
first translator means providing selectively enabled first transmission paths for selectively transmitting said switch control signals through said differential windings of said ferreed switch devices;
a central control circuit for determining and generating system commands;
certain of said system commands including
order data defining the type of switching operation to be performed, and
address data defining selected ferreed switch devices of one of said pairs of switching units;
a plurality of pairs of network control units, each of said pairs of network control units responsive to said system commands for controlling a discrete one of said pairs of switching units;
each of said network control units comprising
buffer means for registering said system commands,
pulsing means for generating said switch control signals,
second translator means providing selectively enabled second transmission paths for selectively transmitting said switch control signals from said pulsing means to said first transmission paths of said one discrete pair of switching units,
third translator means responsive to said buffer means for selectively enabling said first transmission paths in accordance with said address data and for selectively enabling said second transmission paths in accordance with said order data, said pulsing means responsive to said enabling of said first and second transmission paths to generate a switch control signal, and means responsive to said switch control signal for preparing said buffer means to register subsequent system commands;

a command transmission bus system connecting said central control circuit with all said network control units for transmitting each of said system commands from said central control circuit to all said network control units; and a selecting system selectively controlled by said central control circuit for selecting a discrete one of said network control units to respond to each of said certain system commands.

24. A communications switching network comprising a plurality of line terminals, a plurality of trunk and service circuit terminals, first and second pluralities of junctor terminals, a first plurality of pairs of switching stages interposed between said line terminals and said first plurality of junctor terminals, a second plurality of pairs of switching stages interposed between said plurality of trunk and service circuit terminals and said second plurality of junctor terminals, a plurality of transmission means interconnecting said junctor terminals, a plurality of pairs of network control units uniquely associated in network modules with discrete portions of said pluralities of switching stages, a plurality of supervisory scanners uniquely associated in network modules with discrete groups of said line terminals and in supervisory modules with discrete groups of said trunk and service terminals and discrete groups of said first plurality of junctor terminals, a plurality of signal distributors uniquely associated in said supervisory modules with said discrete groups of said trunk and service circuit terminals and said discrete groups of said first plurality of junctor terminals, a command signal source for determining and generating network commands, and a transmission bus system interconnecting said signal source with all said network control units, all said supervisory scanners and all said signal distributors of all said network and supervisory modules.

25. A communications switching network in accordance with claim 24 wherein said transmission bus system comprises a plurality of command signal sending transformers and amplifiers, a plurality of wire pairs, and a plurality of command signal receiving transformers and amplifiers.

26. A communications switching system comprising a central control arrangement for determining and generating system commands;

a multistage switching network including line switch frames, trunk switch frames, junctor switch frames, junctor frames and trunk frames;

lines terminated on said line switch frames;

trunk circuits terminated on said trunk switch frames;

junctor circuits terminated on certain of said junctor switch frames;

each of said switch frames comprising first and second network units, each network unit comprising differentially wound ferreed switch devices arranged in a plurality of switching grids, a first network control unit normally responsive to said system commands for selectively controlling said switch devices of said first network unit to establish transmission paths through said first network unit, a second network control unit normally responsive to said system commands for selectively controlling said switch devices of said second network unit to establish transmission paths through said second network unit, and means responsive to said system commands for selectively causing one of said first and second network control units to selectively control said switch devices of both said first and second network units;

each of said line switch frames further comprising a line scanner including line monitoring means for monitoring the supervisory states of the lines terminated on said line switch frame, and first and second line scanner control units selectively responsive to said system commands for selectively interrogating said line monitoring means;

each of said junctor frames comprising a discrete group of said junctor circuits, a junctor signal distributor including junctor translator means for selectively transmitting junctor circuit control signals to said discrete group of said junctor circuits, a first junctor signal distributor control unit normally responsive to said system commands for selectively generating said junctor circuit control signals and for selectively enabling one portion of said junctor translator means, a second junctor signal distributor control unit normally responsive to said system commands for selectively generating said junctor circuit control signals and for selectively enabling another portion of said junctor translator means, means responsive to said system commands for selectively causing one of said first and second junctor signal distributor control units to generate said junctor circuit control signals and to selectively enable both portions of said junctor translator means, and a junctor scanner including junctor circuit monitoring means for monitoring the supervisory states of junctor circuit elements of said discrete group of junctor circuits, and first and second junctor scanner control units selectively responsive to said system commands for selectively interrogating said junctor monitoring means;

each of said trunk frames comprising a discrete group of said trunk circuits, a trunk signal distributor comprising trunk translator means for selectively transmitting trunk circuit control signals to said discrete group of said trunk circuits, a first trunk signal distributor control unit normally responsive to said system commands for selectively generating said trunk circuit control signals and for selectively enabling one portion of said trunk translator means, a second trunk signal distributor control unit normally responsive to said system commands for selectively generating said trunk circuit control signals and for selectively enabling another portion of said trunk translator means, and means responsive to said system commands for selectively causing one of said first and second trunk signal distributor control units to generate said trunk circuit control signals and to selectively enable both portions of said trunk translator means, and a trunk scanner including trunk circuit monitoring means for monitoring the supervisory states of trunk circuit elements of said discrete group of trunk circuits, and first and second trunk scanner control units selectively responsive to said system commands for selectively interrogating said trunk monitoring means;

a first command transmission bus arrangement transformer coupled to said central control arrangement for transmitting said system commands from said central control arrangement to said control units;

a second command transmission bus arrangement transformer coupled to said central control arrangement for transmitting said system commands from said central control arrangement to said control units;

first bus receiver means uniquely associated with each of said frames for transformer coupling all of said control units of said associated frame to said first command transmission bus arrangement;

second bus receiver means uniquely associated with each of said frames for transformer coupling all of said control units of said associated frame to said second command transmission bus arrangement;

a central pulse distributor for selectively generating enable signals discretely defining each of said control units and further discretely defining each of said command transmission bus arrangements;

signal transmission means discretely transformer coupling said central pulse distributor with each of said control units;

said central pulse distributors controllable by said centrall control arrangement to generate an enable signal defining a selected control unit and a selected command transmission bus arrangement, said enable signal in time association with a particular system command transmitted from said central control arrangement via said selected command transmission bus arrangement;

enable circuit means in each of said control units transformer coupled to said discrete signal transmission means, and said enable circuit means of said selected control unit responsive to said enable signal to initiate acceptance of said particular system command from said selected command transmission bus arrangement by said selected control unit.

References Cited by the Examiner

UNITED STATES PATENTS

| | | | |
|---|---|---|---|
| 2,984,705 | 5/1961 | Harris | 179—15 |
| 3,133,154 | 5/1964 | Van Bosse | 179—18 |
| 3,173,994 | 3/1965 | Plescher et al. | 179—15 |
| 3,221,103 | 11/1965 | Adelaar et al. | 179—15 X |
| 3,226,687 | 12/1965 | Amdahl et al. | 179—15 X |

OTHER REFERENCES

"The Proceedings of the Institution of Electrical Engineers," Part B, Supplement No. 20, vol. 107, November 1960, London. Pages 311–327.

KATHLEEN H. CLAFFY, *Primary Examiner.*

L. A. WRIGHT, *Examiner.*